(12) United States Patent
Pena et al.

(10) Patent No.: US 12,452,383 B2
(45) Date of Patent: Oct. 21, 2025

(54) FAST AND/OR SLOW MOTION COMPENSATING TIMER DISPLAY

(71) Applicants: Henry M. Pena, Round Rock, TX (US); Thomas F. Bryant, III, Round Rock, TX (US)

(72) Inventors: Henry M. Pena, Round Rock, TX (US); Thomas F. Bryant, III, Round Rock, TX (US)

( * ) Notice: Subject to any disclaimer, the term of this patent is extended or adjusted under 35 U.S.C. 154(b) by 0 days.

(21) Appl. No.: 18/213,882

(22) Filed: Jun. 25, 2023

(65) Prior Publication Data

US 2024/0040068 A1 Feb. 1, 2024

Related U.S. Application Data

(63) Continuation of application No. 17/165,854, filed on Feb. 2, 2021, now Pat. No. 11,689,686, which is a
(Continued)

(51) Int. Cl.
*H04N 5/262* (2006.01)
*G06F 3/01* (2006.01)
(Continued)

(52) U.S. Cl.
CPC .......... *H04N 5/2621* (2013.01); *G06F 3/017* (2013.01); *G06F 3/0485* (2013.01); *H04N 5/783* (2013.01); *H04N 23/632* (2023.01)

(58) Field of Classification Search
CPC .... H04N 5/2621; H04N 23/632; H04N 5/783; G06F 3/017; G06F 3/0485
(Continued)

(56) References Cited

U.S. PATENT DOCUMENTS

| 1,042,012 A | 10/1912 | Leuthesser |
| 1,132,015 A | 3/1915 | Jacobus |

(Continued)

FOREIGN PATENT DOCUMENTS

| AU | 2014259879 A1 | 11/2015 |
| CA | 3118103 A1 | 5/2020 |

(Continued)

OTHER PUBLICATIONS

Non Final Rejection issued Oct. 2, 2019, on a U.S. Appl. No. 16/456,589, filed Jun. 28, 2019.
(Continued)

*Primary Examiner* — Joel W Fosselman
(74) *Attorney, Agent, or Firm* — Franklin & Associates International Inc; Matthew F. Lambrinos

(57) ABSTRACT

A compensating timer system and method utilizable with video data featuring sections of different playback or recording speeds. The compensating timer system can be utilized with a user interface associated with and displayable thereon. The user interface can include a video display region configured or configurable to display video data, and an animated time indicator. The animated time indicator can be dependent on a modified playing speed of the video data that changes between different first and second speed rates. The first speed rate can be changed to the second speed rate upon receipt of an input associated with an affordance, by modifying at least one frame in the video data. This allows for continuous recording and/or displaying of video at different speed rates without altering operations or settings. The animated time indicator can be an animated affordance, an animated progress bar, an elapsed timer and/or a time remaining clock.

16 Claims, 97 Drawing Sheets

Related U.S. Application Data continuation-in-part of application No. 16/793,747, filed on Feb. 18, 2020, now Pat. No. 11,218,646, which is a continuation-in-part of application No. 16/456,639, filed on Jun. 28, 2019, now Pat. No. 10,863,109, which is a continuation of application No. 16/173,066, filed on Oct. 29, 2018, now Pat. No. 10,404,923, said application No. 16/793,747 is a continuation-in-part of application No. 16/456,589, filed on Jun. 28, 2019, now Pat. No. 10,755,743, which is a continuation of application No. 16/173,033, filed on Oct. 29, 2018, now Pat. No. 10,388,322, said application No. 17/165,854 is a continuation-in-part of application No. 16/456,639, filed on Jun. 28, 2019, now Pat. No. 10,863,109, which is a continuation of application No. 16/173,066, filed on Oct. 29, 2018, now Pat. No. 10,404,923, said application No. 17/165,854 is a continuation-in-part of application No. 16/936,350, filed on Jul. 22, 2020, now Pat. No. 11,367,465, which is a continuation of application No. 16/456,589, filed on Jun. 28, 2019, now Pat. No. 10,755,743, which is a continuation of application No. 16/173,033, filed on Oct. 29, 2018, now Pat. No. 10,388,322, said application No. 17/165,854 is a continuation-in-part of application No. 16/996,711, filed on Aug. 18, 2020, now Pat. No. 11,641,439, which is a continuation-in-part of application No. 16/793,747, filed on Feb. 18, 2020, now Pat. No. 11,218,646, which is a continuation-in-part of application No. 16/456,639, filed on Jun. 28, 2019, now Pat. No. 10,863,109, which is a continuation of application No. 16/173,066, filed on Oct. 29, 2018, now Pat. No. 10,404,923, said application No. 16/793,747 is a continuation-in-part of application No. 16/456,589, filed on Jun. 28, 2019, now Pat. No. 10,755,743, which is a continuation of application No. 16/173,033, filed on Oct. 29, 2018, now Pat. No. 10,388,322, said application No. 16/996,711 is a continuation-in-part of application No. 16/456,639, filed on Jun. 28, 2019, now Pat. No. 10,863,109, and a continuation-in-part of application No. 16/456,589, filed on Jun. 28, 2019, now Pat. No. 10,755,743, and a continuation-in-part of application No. 16/936,350, filed on Jul. 22, 2020, now Pat. No. 11,367,465, said application No. 17/165,854 is a continuation-in-part of application No. 16/996,748, filed on Aug. 18, 2020, now Pat. No. 11,044,420, which is a continuation-in-part of application No. 16/996,711, filed on Aug. 18, 2020, now Pat. No. 11,641,439, and a continuation-in-part of application No. 16/793,747, filed on Feb. 18, 2020, now Pat. No. 11,218,646, and a continuation-in-part of application No. 16/456,589, filed on Jun. 28, 2019, now Pat. No. 10,755,743, and a continuation-in-part of application No. 16/456,639, filed on Jun. 28, 2019, now Pat. No. 10,863,109, and a continuation-in-part of application No. 16/936,350, filed on Jul. 22, 2020, now Pat. No. 11,367,465.

(51) Int. Cl.
  *G06F 3/0485* (2022.01)
  *H04N 5/783* (2006.01)
  *H04N 23/63* (2023.01)

(58) Field of Classification Search
  USPC .................................................... 348/239
  See application file for complete search history.

(56) References Cited

U.S. PATENT DOCUMENTS

| | | |
|---|---|---|
| 1,162,014 A | 11/1915 | Arrighi |
| 3,282,003 A | 11/1966 | Swift, Jr. |
| 4,282,011 A | 8/1981 | Terpay |
| 4,302,013 A | 11/1981 | Kavis |
| 5,182,005 A | 1/1993 | Schwiegk et al. |
| 5,192,005 A | 3/1993 | Zimmerman |
| 6,132,013 A | 10/2000 | Ganzel |
| 6,302,014 B1 | 10/2001 | Kuan |
| 6,424,789 B1 | 7/2002 | Abdel-Mottaleb |
| 6,546,188 B1 | 4/2003 | Ishil et al. |
| 6,590,586 B1 | 7/2003 | Swenton-Wall et al. |
| 7,102,014 B2 | 9/2006 | Weber et al. |
| 7,136,093 B1 | 11/2006 | Itoh et al. |
| 7,142,016 B2 | 11/2006 | Kim |
| 7,152,209 B2 | 12/2006 | Jojic et al. |
| 8,122,378 B2 | 2/2012 | Ciudad et al. |
| 8,132,012 B2 | 3/2012 | Labaton |
| 8,202,013 B2 | 6/2012 | Kubota |
| 8,249,299 B1 | 8/2012 | Dhawan et al. |
| 8,292,017 B2 | 10/2012 | Inoue et al. |
| 8,515,241 B2 | 8/2013 | Forsyth et al. |
| 8,934,762 B2 | 1/2015 | Schmit et al. |
| 9,077,957 B2 | 7/2015 | Kano |
| 9,208,819 B1 | 12/2015 | Gregg et al. |
| 9,302,004 B2 | 4/2016 | Baumler et al. |
| 9,749,676 B2 | 8/2017 | Sood et al. |
| 9,756,091 B1 | 9/2017 | Davies |
| 10,070,044 B2 | 9/2018 | Shimosato |
| 10,098,204 B1 | 10/2018 | Byers et al. |
| 10,252,016 B2 | 4/2019 | Pedro et al. |
| 10,272,009 B2 | 4/2019 | Schem |
| 10,372,052 B2 | 8/2019 | Zwartz et al. |
| 10,388,322 B1 | 8/2019 | Pena et al. |
| 10,404,767 B2 | 9/2019 | Chen |
| 10,404,923 B1 | 9/2019 | Pena |
| 10,433,400 B1 | 10/2019 | Byers et al. |
| 10,534,525 B1 | 1/2020 | Suchland |
| 10,600,220 B2 | 3/2020 | Choi et al. |
| 10,659,499 B2 | 5/2020 | Davies |
| 10,734,025 B2 | 8/2020 | Bradley et al. |
| 10,755,743 B2 | 8/2020 | Pena et al. |
| 10,771,736 B2 | 9/2020 | Inkpen et al. |
| 10,863,109 B2 | 12/2020 | Pena et al. |
| 11,044,420 B2 | 6/2021 | Pena et al. |
| 11,218,646 B2 | 1/2022 | Pena et al. |
| 11,367,465 B2 | 6/2022 | Pena et al. |
| 11,641,439 B2 | 5/2023 | Pena et al. |
| 11,689,686 B2 | 6/2023 | Pena et al. |
| 11,727,958 B2 | 8/2023 | Pena et al. |
| 11,743,414 B2 | 8/2023 | Pena et al. |
| 2003/0052909 A1 | 3/2003 | Mo et al. |
| 2004/0189691 A1 | 9/2004 | Jojic et al. |
| 2005/0053356 A1 | 3/2005 | Mate et al. |
| 2005/0108765 A1 | 5/2005 | Barletta et al. |
| 2006/0277454 A1 | 12/2006 | Chen |
| 2007/0074115 A1 | 3/2007 | Patten et al. |
| 2008/0184121 A1 | 7/2008 | Kulas |
| 2008/0307307 A1 | 12/2008 | Ciudad et al. |
| 2009/0058842 A1 | 3/2009 | Bull et al. |
| 2010/0172624 A1 | 7/2010 | Watts |
| 2010/0302059 A1 | 12/2010 | Hnatiuk et al. |
| 2011/0097059 A1 | 4/2011 | Sekiguchi et al. |
| 2012/0079386 A1* | 3/2012 | Kim .................. G06F 3/0488 715/720 |
| 2012/0274662 A1 | 11/2012 | Kim et al. |
| 2012/0301114 A1 | 11/2012 | Johnson |
| 2013/0148940 A1 | 6/2013 | Schmit et al. |
| 2013/0163955 A1 | 6/2013 | Yamamoto |
| 2013/0194476 A1 | 8/2013 | Shimosato |
| 2014/0035944 A1 | 2/2014 | Kulkarni |
| 2014/0099074 A1* | 4/2014 | Kano .................. H04N 9/7921 386/241 |
| 2014/0193140 A1 | 7/2014 | Fliderman et al. |
| 2014/0237365 A1 | 8/2014 | Oberbrunner et al. |
| 2014/0355960 A1 | 12/2014 | Paulus et al. |

(56) References Cited

U.S. PATENT DOCUMENTS

| | | |
|---|---|---|
| 2014/0355961 A1 | 12/2014 | Paulus et al. |
| 2014/0359447 A1 | 12/2014 | Kannan et al. |
| 2014/0359448 A1 | 12/2014 | Paulus et al. |
| 2015/0212667 A1 | 7/2015 | Holt et al. |
| 2015/0212694 A1 | 7/2015 | Ho |
| 2015/0213840 A1 | 7/2015 | Holt et al. |
| 2015/0261305 A1 | 9/2015 | Lee et al. |
| 2015/0318020 A1 | 11/2015 | Pribula |
| 2015/0381930 A1 | 12/2015 | Quinn et al. |
| 2016/0259412 A1 | 9/2016 | Flint et al. |
| 2016/0315986 A1 | 10/2016 | Chen |
| 2017/0034444 A1 | 2/2017 | Song et al. |
| 2018/0033173 A1 | 2/2018 | Choi et al. |
| 2018/0158486 A1 | 6/2018 | Gilley |
| 2019/0237104 A1 | 8/2019 | Jeon et al. |
| 2019/0289271 A1 | 9/2019 | Paulus et al. |
| 2020/0092493 A1 | 3/2020 | McCauley |
| 2020/0196004 A1 | 6/2020 | Kulas |
| 2020/0311120 A1 | 10/2020 | Zhao et al. |
| 2020/0411057 A1 | 12/2020 | Gilley |
| 2021/0051278 A1 | 2/2021 | Pena et al. |
| 2022/0124258 A1 | 4/2022 | Pena et al. |
| 2022/0284925 A1 | 9/2022 | Pena et al. |
| 2023/0239424 A1 | 7/2023 | Pena et al. |
| 2023/0344954 A1 | 10/2023 | Pena et al. |
| 2023/0352053 A1 | 11/2023 | Pena et al. |
| 2024/0040068 A1 | 2/2024 | Pena et al. |

FOREIGN PATENT DOCUMENTS

| | | | |
|---|---|---|---|
| CN | 106412221 | A | 2/2017 |
| CN | 113767618 | A | 12/2021 |
| CN | 113767640 | A | 12/2021 |
| EP | 1531474 | A1 | 5/2005 |
| EP | 3874736 | A1 | 9/2021 |
| EP | 3874762 | A2 | 9/2021 |
| JP | 2011028345 | A | 2/2011 |
| JP | 2015122734 | A | 7/2015 |
| JP | 6012384 | B2 | 10/2016 |
| JP | 2018098664 | A | 6/2018 |
| JP | 2022509504 | A | 1/2022 |
| KR | 20170013083 | A | 2/2017 |
| WO | 2011052045 | A1 | 5/2011 |
| WO | 2014179466 | A1 | 11/2014 |
| WO | 2016112346 | A1 | 7/2016 |
| WO | 2018034371 | A1 | 2/2018 |
| WO | 2020092301 | A2 | 5/2020 |
| WO | 2020092326 | A1 | 5/2020 |
| WO | 2021167595 | A1 | 8/2021 |
| WO | 2022040308 | A1 | 2/2022 |

OTHER PUBLICATIONS

Notice of Allowance issued Apr. 15, 2020, on a U.S. Appl. No. 16/456,589, filed Jun. 28, 2019.
Non Final Rejection issued Jun. 25, 2021, on a U.S. Appl. No. 16/936,350, filed Jul. 22, 2020.
Notice of Allowance issued Feb. 23, 2022, on a U.S. Appl. No. 16/936,350, filed Jul. 22, 2020.
Notice of Allowance issued Jun. 5, 2019, on a U.S. Appl. No. 16/173,033, filed Oct. 29, 2018.
International Search Report issued May 26, 2020, on a PCT No. PCT/US2020/018709, filed Feb. 18, 2020.
Written Opinion issued May 26, 2020, on a PCT No. PCT/US2020/018709, filed Feb. 18, 2020.
International Search Report issued Jan. 14, 2020, on a PCT No. PCT/US2019/058503, filed Oct. 29, 2019.
Written Opinion issued Jan. 14, 2020, on a PCT No. PCT/US2019/058503, filed Oct. 29, 2019.
International Search Report issued Dec. 28, 2021, on a PCT No. PCT/US2021/046499, filed Aug. 18, 2021.
Written Opinion issued Dec. 28, 2021, on a PCT No. PCT/US2021/046499, filed Aug. 18, 2021.
Non Final Rejection issued Nov. 13, 2020, on a U.S. Appl. No. 16/793,747, filed Feb. 18, 2020.
Notice of Allownace issued Aug. 25, 2021, on a U.S. Appl. No. 16/793,747, filed Feb. 18, 2020.
Non Final Rejection issued Aug. 16, 2021, on a U.S. Appl. No. 16/996,711, filed Aug. 18, 2020.
Final Rejection issued May 11, 2022, on a U.S. Appl. No. 16/996,711, filed Aug. 18, 2020.
Notice of Allowance issued Dec. 21, 2022, on a U.S. Appl. No. 16/996,711, filed Aug. 18, 2020.
Notice of Allowance issued Jan. 5, 2023, on a U.S. Appl. No. 16/996,711, filed Aug. 18, 2020.
Non Final Rejection issued Dec. 10, 2020, on a U.S. Appl. No. 16/996,748, filed Aug. 18, 2020.
Notice of Allowance Issued Mar. 17, 2021, on a U.S. Appl. No. 16/996,748, filed Aug. 18, 2020.
Notice of Allowance Issued Apr. 21, 2021, on a U.S. Appl. No. 16/996,748, filed Aug. 18, 2020.
Non Final Rejection issued Jul. 13, 2022, on a U.S. Appl. No. 17/165,854, filled Feb. 2, 2021.
Notice of Allowance issued Feb. 10, 2023, on a U.S. Appl. No. 17/165,854, filed Feb. 2, 2021.
Non Final Rejection issued Oct. 23, 2019, on a U.S. Appl. No. 16/456,639, filed Jun. 28, 2019.
Notice of Allowance issued Jul. 21, 2020, on a U.S. Appl. No. 16/456,639, filed Jun. 28, 2019.
Non Final Rejection issued Aug. 31, 2021, on a U.S. Appl. No. 17/088,582, filed Nov. 4, 2020.
Notice of Allowance issued May 20, 2022, on a U.S. Appl. No. 17/088,582, filed Nov. 4, 2020.
Non Final Rejection issued October 25, 2022, on a U.S. Appl. No. 17/088,582, filed Nov. 4, 2020.
Notice of Allowance issued Feb. 4, 2019, on a U.S. Appl. No. 16/173,066, filed Oct. 29, 2018.
Notice of Allowance issued May 20, 2019, on a U.S. Appl. No. 16/173,066, filed Oct. 29, 2018.
International Search Report Issued Jan. 27, 2020, on a PCT No. PCT/US2019/058,458, filed Oct. 29, 2019.
Written Opinion Issued Jan. 27, 2020, on a PCT No. PCT/US2019/058,458, filed Oct. 29, 2019.
Non Final Rejection issued Oct. 12, 2022, on a U.S. Appl. No. 17/751,271, filed May 23, 2022.
Mobotix, "Software Camera Manual Security-Vision-Systems Part 2", Mobotix AG—Security-Vision-Systems Made in German, Retrieved from the Internet http://www.mobotix.com/sites/default/files/2017-10/Mx_ML_Software_en_20061010.pdf pp. 1-136.
Mobotix, "Software Camera Manual Security-Vision-Systems Part 2", Mobotix AG—Security-Vision-Systems Made in German, Retrieved from the Internet http://www.mobotix.com/sites/default/files/2017-10/Mx_ML_Software_en_20061010.pdf pp. 137-273.
Lou et al. "A real-time interactive multi-view video system." Proceedings of the 13th annual ACM International Conference on Multimedia, 2005. Nov. 6, 2005 (Nov. 6, 2005) Retrieved on Dec. 7, 2021 (Dec. 7, 2021) from <https://dl.acm.org/doi/abs/10.1145/1101149.1101173> entire document.
European Search Report issued Jun. 27, 2022 on a EPO No. 19,879,645.0 filed Oct. 29, 2019, in the name of Pena Henry et. al., SubscribeMeUp.
Supplementary European Search Report issued Jun. 27, 2022 on a EPO No. 19,879,645.0 filed Oct. 29, 2019, in the name of Pena Henry et. al., SubscribeMeUp.
European Search Report issued Jun. 28, 2022 on a EPO No. 19,878,478.7 filed Oct. 29, 2019, in the name of Pena Henry et. al., SubscribeMeUp.
Supplementary European Search Report issued Jun. 28, 2022 on a EPO No. 19,878,478.7 filed Oct. 29, 2019, in the name of Pena Henry et. al., SubscribeMeUp.
First Examination Report issued Dec. 30, 2022, on an Indian Application No. 202117021181, filed May 11, 2021.
Non Final Rejection issued Sep. 14, 2022, on a U.S. Appl. No. 17/563,433, filed Dec. 28, 2021.
Final Rejection issued Jun. 8, 2023, on a U.S. Appl. No. 17/563,433, filed Dec. 28, 2021.

(56) References Cited

OTHER PUBLICATIONS

Notice of Allowance issued Mar. 24, 2023, on a U.S. Appl. No. 17/751,271, filed May 23, 2022.
Notice of Allowance issued Apr. 6, 2023, on a U.S. Appl. No. 17/751,271, filed May 23, 2022.
Notice of Allowance issued Mar. 28, 2023, on a U.S. Appl. No. 17/088,582, filed Nov. 4, 2020.
U.S. Appl. No. 18/127,587 filed date Mar. 28, 2023 in the name of SubescribeMeUp LLC.
U.S. Appl. No. 18/215,816 filed date Jun. 28, 2023 in the name of SubescribeMeUp LLC.
U.S. Appl. No. 18/349,132 filed date Jul. 8, 2023 in the name of SubescribeMeUp LLC.
CN Office Action dated Dec. 28, 2023 issued on Chinese Patent Application No. 2019800856840, filed Jun. 23, 2021.
Korean Office Action issued Jan. 30, 2024 on Korean Patent Application No. 10-2021-7016092 in the name of Henry Pena and Thomas Bryant III.
CN Office Action dated Mar. 20, 2023 issued on Chinese Patent Application No. 2019800856840, filed Jun. 23, 2021.
Notice of Reasons for Refusal idrafted Dec. 18, 2024 on Japanese Patent Application No. 2021-548524 in the name of Henry Pena and Thomas Bryant III.
CN Office Action dated Mar. 20, 2023 issued on Chinese Patent Application No. 2019800856889, filed Jul. 27, 2023.
CN Notification to Grant Patent Right for Invention issued Mar. 15, 2024 on Chinese Application No. 201980085688.9, filed Jul. 27, 2023.
U.S. Appl. 18/349,132 filed Jul. 8, 2023 in the name of SubescribeMeUp LLC.
U.S. Appl. No. 18/215,816, filed Jun. 28, 2023 in the name of SubescribeMeUp LLC.
Notice of Allowance issued Apr. 12, 2024, on a U.S. Appl. No. 17/563,433, filed Dec. 28, 2021.
Notification No. 62948/SHTT-SC.ip from the IP Office of Vietnam issued Jun. 24, 2024 on Vietnam Patent Application No. 1-2021-03116 (PCT/US2019/058503), entitled Real Time Video Special Effects System and Method in the name of PENA, Henry and Bryant, Thomas, III.

* cited by examiner

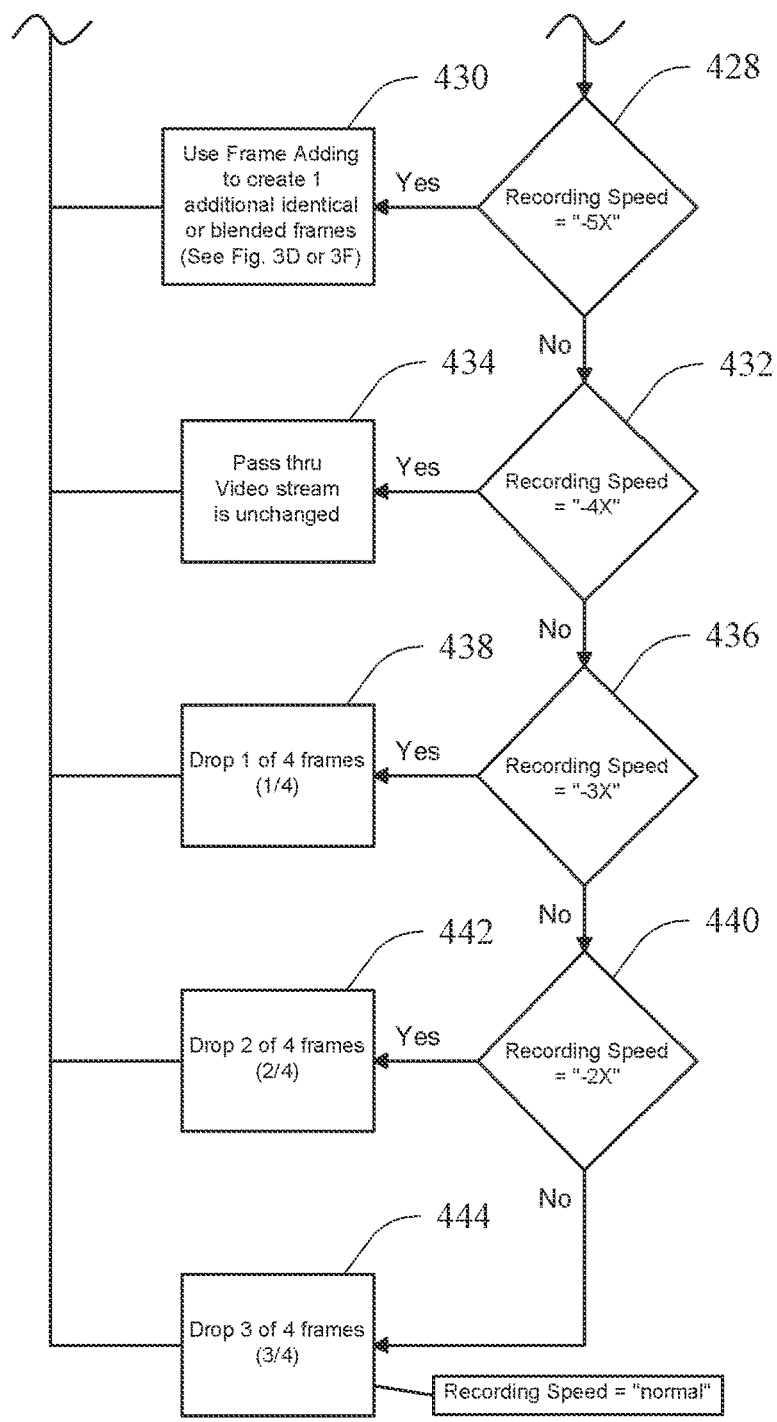
FIG. 17 - Continued

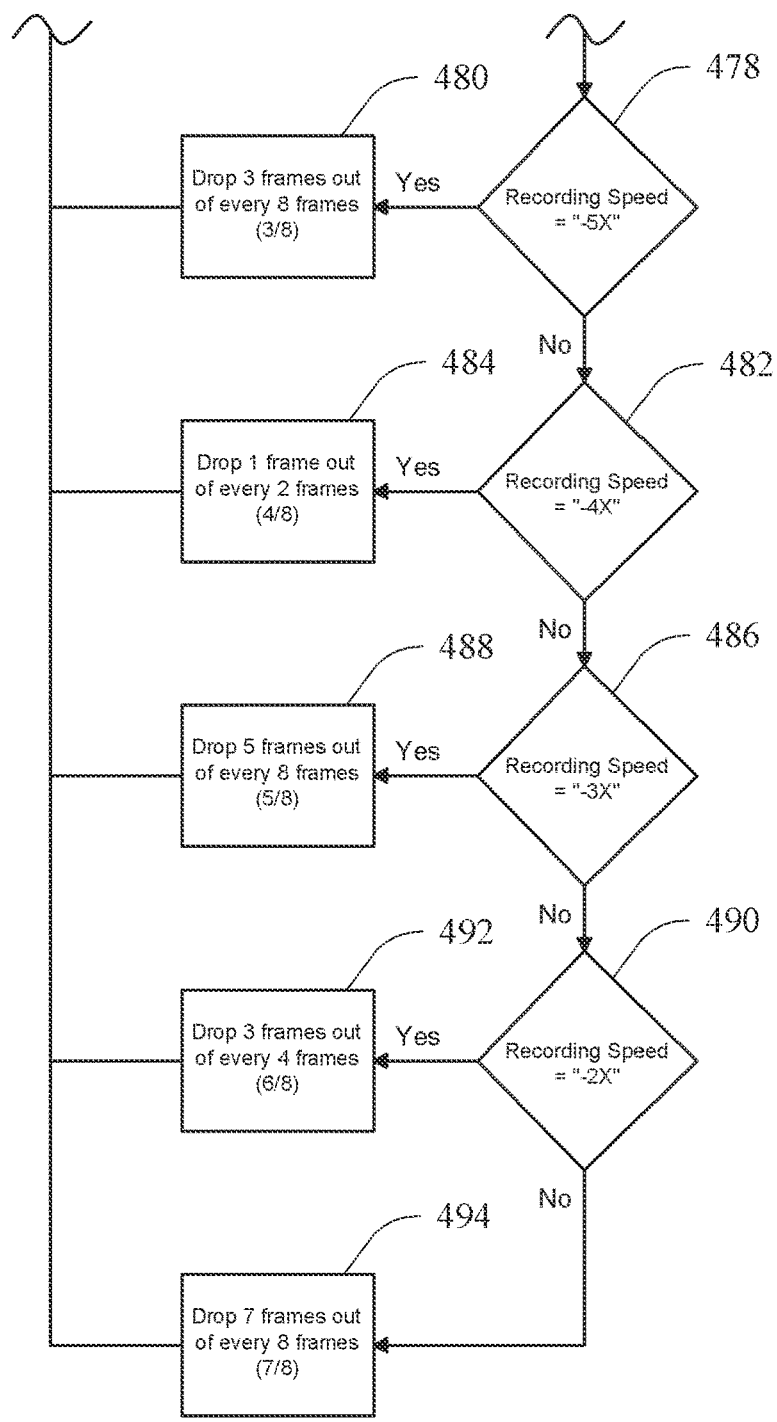
FIG. 18 - Continued

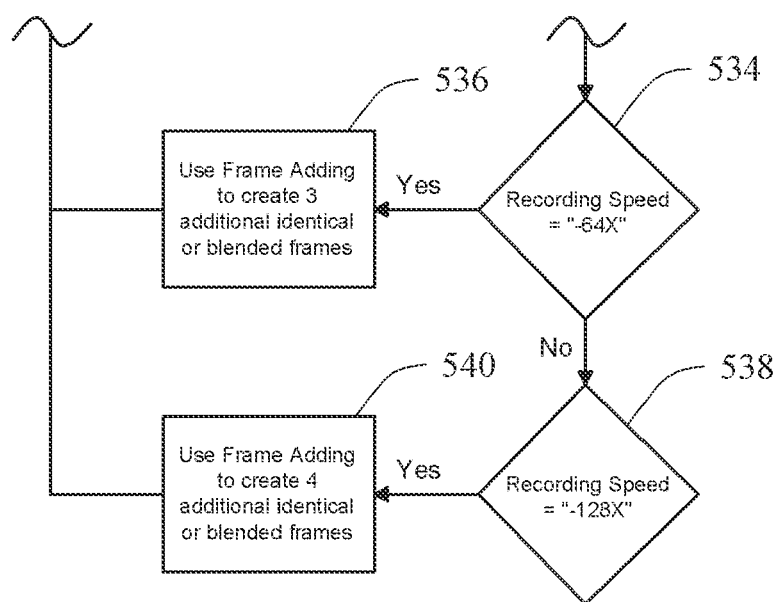
FIG. 19 - Continued

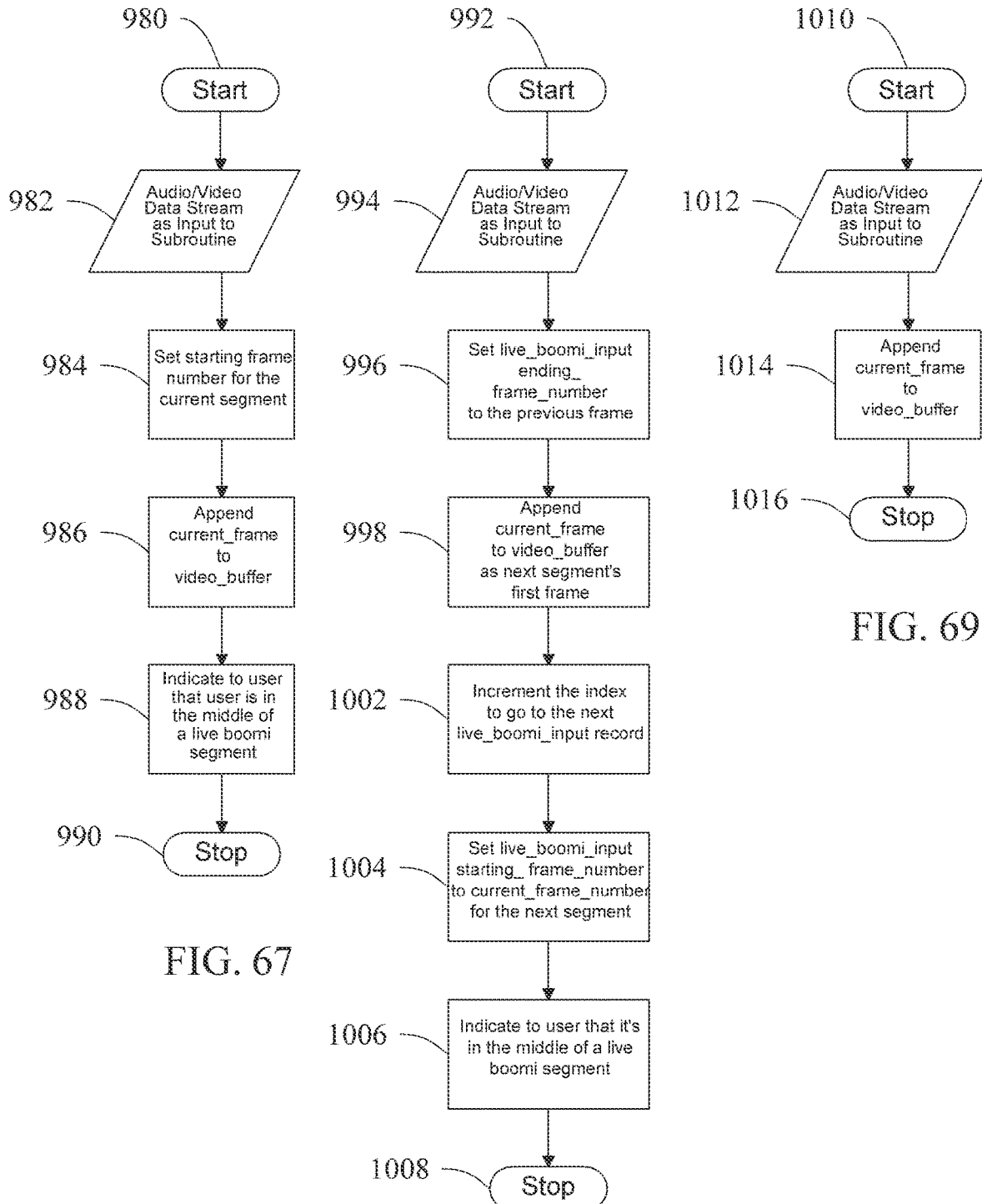

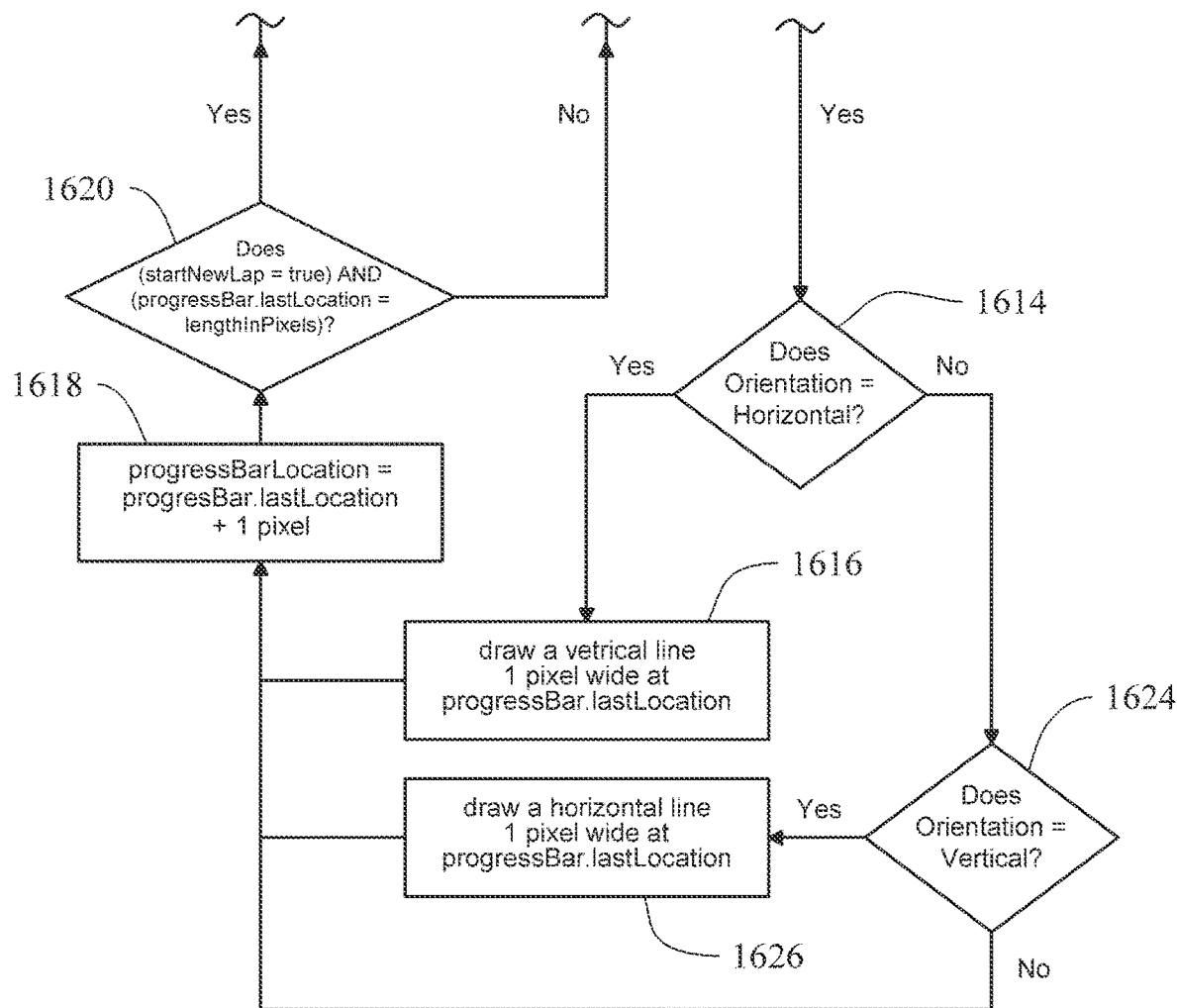
FIG. 99 - Continued

FAST AND/OR SLOW MOTION COMPENSATING TIMER DISPLAY

CROSS-REFERENCE TO RELATED APPLICATION

This application is a continuation of U.S. patent application Ser. No. 17/165,854, filed Feb. 2, 2021, which is a continuation-in-part under 35 U.S.C. § 120 based upon co-pending U.S. patent application Ser. No. 16/996,748 filed on Aug. 18, 2020 and now patented as U.S. Pat. No. 11,044,420 issued on Jun. 22, 2021, wherein U.S. patent application Ser. No. 16/996,748 is a continuation-in-part application based on U.S. patent application Ser. No. 16/996,711 filed on Aug. 18, 2020 and now patented as U.S. Pat. No. 11,641,439 issued on May 2, 2023; Ser. No. 16/793,747 filed on Feb. 18, 2020 and now patented as U.S. Pat. No. 11,218,646 issued on Jan. 4, 2022; Ser. No. 16/456,639 filed on Jun. 28, 2019 and now patented as U.S. Pat. No. 10,863,109 issued on Dec. 8, 2020; Ser. No. 16/456,589 filed on Jun. 28, 2019 and now patented as U.S. Pat. No. 10,755,743 issued on Aug. 25, 2020; and Ser. No. 16/936,350 filed on Jul. 22, 2020 and now patented as U.S. Pat. No. 11,367,465 issued on Jun. 21, 2021.

This application is a continuation of U.S. patent application Ser. No. 17/165,854, filed Feb. 2, 2021, which is a continuation-in-part under 35 U.S.C. § 120 based upon co-pending U.S. patent application Ser. No. 16/996,711 filed on Aug. 18, 2020 and now patented as U.S. Pat. No. 11,641,439 issued on May 2 2023, wherein U.S. patent application Ser. No. 16/996,711 is a continuation-in-part application based on U.S. patent application Ser. No. 16/793,747 filed on Feb. 18, 2020 and now patented as U.S. Pat. No. 11,218,646 issued on Jan. 4 2022, U.S. patent application Ser. No. 16/456,639 filed on Jun. 28, 2019 and now patented as U.S. Pat. No. 10,863,109 issued on Dec. 8 2020, U.S. patent application Ser. No. 16/456,589 filed on Jun. 28, 2019 and now patented as U.S. Pat. No. 10,755,743 issued on Aug. 25 2020, and U.S. patent application Ser. No. 16/936,350 filed on Jul. 22, 2020 and now patented as U.S. Pat. No. 11,367,465 issued on Jun. 21 2022, wherein U.S. patent application Ser. No. 16/793,747 and now patented as U.S. Pat. No. 11,218,646 issued on Jan. 4 2022 is a continuation-in-part application based on U.S. patent application Ser. No. 16/456,639 filed on Jun. 28, 2019 and now patented as U.S. Pat. No. 10,863,109 issued on Dec. 8 2020, which is a continuation application based on U.S. patent application Ser. No. 16/173,066 filed on Oct. 29, 2018 and now patented as U.S. Pat. No. 10,404,923 issued on Sep. 3, 2019, wherein U.S. patent application Ser. No. 16/793,747 and now patented as U.S. Pat. No. 11,218,646 issued on Jan. 4 2022 is a continuation-in-part application based on U.S. patent application Ser. No. 16/456,589 filed on Jun. 28, 2019 and now patented as U.S. Pat. No. 10,755,743 issued on Aug. 25, 2020, which is a continuation application based on U.S. patent application Ser. No. 16/173,033 filed on Oct. 29, 2018 and now patented as U.S. Pat. No. 10,388,322 issued on Aug. 20, 2019, wherein U.S. patent application Ser. No. 16/456,639 and now patented as U.S. Pat. No. 10,863,109 issued on Dec. 8 2020 is a continuation application based on U.S. patent application Ser. No. 16/173,066 filed on Oct. 29, 2018 and now patented as U.S. Pat. No. 10,404,923 issued on Sep. 3, 2019, wherein U.S. patent application Ser. No. 16/456,589 and now patented as U.S. Pat. No. 10,755,743 issued on Aug. 25, 2020 is a continuation application based on U.S. patent application Ser. No. 16/173,033 filed on Oct. 29, 2018 and now patented as U.S. Pat. No. 10,388,322 issued on Aug. 20, 2019, and wherein U.S. patent application Ser. No. 16/936,350 and now patented as U.S. Pat. No. 11,367,465 issued on Jun. 21, 2022 is a continuation of U.S. patent application Ser. No. 16/456,589 filed on Jun. 28, 2019, which is a continuation application based on U.S. patent application Ser. No. 16/173,033 filed on Oct. 29, 2018 and now patented as U.S. Pat. No. 10,388,322 issued on Aug. 20, 2019. The entire disclosures of the prior applications are incorporated herein by reference.

This application is a continuation of U.S. patent application Ser. No. 17/165,854, filed Feb. 2, 2021, which is a continuation-in-part under 35 U.S.C. § 120 based upon co-pending U.S. patent application Ser. No. 16/793,747 filed on Feb. 18, 2020 and now patented as U.S. Pat. No. 11,218,646 issued on Jan. 4 2022, wherein U.S. patent application Ser. No. 16/793,747 is a continuation-in-part application based on U.S. patent application Ser. No. 16/456,639 filed on Jun. 28, 2019 and now patented as U.S. Pat. No. 10,863,109 issued on Dec. 8 2020, which is a continuation application based on U.S. patent application Ser. No. 16/173,066 filed on Oct. 29, 2018 and now patented as U.S. Pat. No. 10,404,923 issued on Sep. 3, 2019, and wherein U.S. patent application Ser. No. 16/793,747 and now patented as U.S.

U.S. Pat. No. 11,218,646 issued on Jan. 4 2022 is a continuation-in-part application based on U.S. patent application Ser. No. 16/456,589 filed on Jun. 28, 2019 and now patented as U.S. Pat. No. 10,755,743 issued on Aug. 25 2020, which is a continuation application based on U.S. patent application Ser. No. 16/173,033 filed on Oct. 29, 2018 and now patented as U.S. Pat. No. 10,388,322 issued on Aug. 20, 2019. The entire disclosures of the prior applications are incorporated herein by reference.

This application is a continuation of U.S. patent application Ser. No. 17/165,854, filed Feb. 2, 2021, which is continuation-in-part under 35 U.S.C. § 120 based upon co-pending U.S. patent application Ser. No. 16/456,639 filed on Jun. 28, 2019 and now patented as U.S. Pat. No. 10,863,109 issued on Dec. 8 2020, wherein U.S. patent application Ser. No. 16/456,639 is a continuation application based on U.S. patent application Ser. No. 16/173,066 filed on Oct. 29, 2018 and now patented as U.S. Pat. No. 10,404,923 issued on Sep. 3, 2019. The entire disclosures of the prior applications are incorporated herein by reference.

This application is a continuation of U.S. patent application Ser. No. 17/165,854, filed Feb. 2, 2021, which is a continuation-in-part under 35 U.S.C. § 120 based upon co-pending U.S. patent application Ser. No. 16/936,350 filed on Jul. 22, 2020 and now patented as U.S. Pat. No. 11,367,465 issued on Jun. 21 2021, which is a continuation of U.S. patent application Ser. No. 16/456,589 filed on Jun. 28, 2019 and now patented as U.S. Pat. No. 10,755,743 issued on Aug. 25 2020, wherein U.S. patent application Ser. No. 16/456,589 is a continuation application based on U.S. patent application Ser. No. 16/173,033 filed on Oct. 29, 2018 and now patented as U.S. Pat. No. 10,388,322 issued on Aug. 20, 2019. The entire disclosures of the prior applications are incorporated herein by reference.

This application is a continuation of U.S. patent application Ser. No. 17/165,854, filed Feb. 2, 2021, which is a continuation-in-part under 35 U.S.C. § 120 based upon co-pending U.S. patent application Ser. No. 17/088,582 filed on Nov. 4, 2020, which is a continuation of U.S. patent application Ser. No. 16/456,639 filed on Jun. 28, 2019 and now patented as U.S. Pat. No. 10,863,109 issued on Dec. 8 2020, wherein U.S. patent application Ser. No. 16/456,639 is a continuation based upon U.S. patent application Ser. No.

16/173,066 filed on Oct. 29, 2018 and now patented as U.S. Pat. No. 10,404,923 issued on Sep. 3, 2019.

BACKGROUND

Technical Field

The present technology relates to a fast and/or slow motion compensating timer display system and method for use in connection with automatically speeding up or slowing down a rate of which a digital or graphical timer mechanism proceeds based on real-time input by the user associated with special effects while recording is in progress or from an existing video feed. Particularly, the present technology relates to an interface associated with a system and method of decoding and altering a speed rate of video data with an automatically adjusting compensating timer display corresponding to the altered speed rate.

Background Description

Modern video formats utilize a variety of frame rates. Film, which was almost universally shot at 24 frames per second, could not be displayed at its native frame rate, which required pulldown conversion, often leading to "judder". For example, to convert 24 frames per second into 60 frames per second, every odd frame is doubled and every even frame is tripled, which creates uneven motion. Other conversions have similar uneven frame doubling. Newer video standards support 120, 240, or 300 frames per second, so frames can be evenly multiplied for common frame rates such as 24 frames per second (fps) film and 30 fps video, as well as 25 and 50 fps video in the case of 300 fps displays. These standards also support video that is natively in higher frame rates, and video with interpolated frames between its native frames.

Native camera applications (app) in devices running on electronic devices, such as smartphones, can record in regular time and then process the video data stream to create slow motion and in speed up time or time-lapse. However, these known systems or methods do not utilize a user interface where the user can manually control the "time special effects" within the video in real time while recording. For example, the native camera app in the Samsung Galaxy S9+® has a special effect feature where the camera changes the frames per second capture rate when the app detects that the an object has crossed inside a portion of the screen, as indicated with a box outline in the middle of the screen in this case.

Third party apps like Instagram®, Facebook® and Snapchat® uses cameras from mobile devices, but these apps have no feature that allows the user of the app to modify the slowing down or speeding up of the recording speed in real time while recording is in progress.

With higher end feature-rich camera apps like FILMiC Pro®, users can pre-set the recording frame rate speed and playback frame rate speed independently of each other, thus, creating slow motion and speed up effects in the final produced video.

Time remapping of optical flow is known like with Premiere Pro CC 2015, which enables users to achieve smooth speed and framerate changes by interpolating missing frames. Optical Flow interpolation modifies the speed of clips containing objects with no motion blur that are moving in front of a mostly static background that contrasts highly with the object in motion.

Motion interpolation or motion-compensated frame interpolation (MCFI) is a form of video processing in which intermediate animation frames are generated between existing ones by means of interpolation, in an attempt to make animation more fluid and to compensate for display motion blur.

It can be appreciated that the use of motion interpolation as it reduces motion blur produced by camera pans and shaky cameras and thus yields better clarity of such images. It may also be used to increase the apparent framerate of video game software for a more realistic feel, though the addition of input lag may be an undesired side effect. This "video look" is created deliberately by the Video Field Interpolation Restoration Effect (VidFIRE) technique to restore archive television programs that only survive as film telerecordings. VidFIRE is a restoration technique intended to restore the video-like motion of footage originally shot with television cameras now existing only in formats with telerecording as their basis. The main differences between an artificially and naturally high framerate (via interpolation versus in-camera), are that the latter is not subject to any of the aforementioned artifacts, contains more accurate (or "true to life") image data, and requires more storage space and bandwidth since frames are not produced in real time.

Motion compensation is an algorithmic technique used to predict a frame in a video, given the previous and/or future frames by accounting for motion of the camera and/or objects in the video. It is employed in the encoding of video data for video compression, for example in the generation of MPEG-2 files. Motion compensation describes a picture in terms of the transformation of a reference picture to the current picture. The reference picture may be previous in time or even from the future. When images can be accurately synthesized from previously transmitted/stored images, the compression efficiency can be improved.

Motion compensation exploits the fact that, often, for many frames of a movie, the only difference between one frame and another is the result of either the camera moving or an object in the frame moving. In reference to a video file, this means much of the information that represents one frame will be the same as the information used in the next frame.

Using motion compensation, a video stream will contain some full (reference) frames; then the only information stored for the frames in between would be the information needed to transform the previous frame into the next frame.

Frame Blending may be another technique known to those skilled in the art. In some footage, using Optical Flow for creating smoother motion may not produce the desired results. In such scenarios, you can use one of the other time interpolation options—Frame Sampling or Frame Blending. Frame Sampling repeats or removes frames as needed to reach the desired speed. Frame Blending repeats frames, and it also blends between them as needed to help smooth out the motion.

It can be appreciated that using known video speed manipulation techniques can include a disadvantage of not providing to the user the current speed rate or a proximity of cursor or touch input in changing to a next speed rate. It is difficult for the user to "eyeball" the distance their fingers are from one an on-screen actuatable operation to a next on-screen actuatable operation when the user moves their finger across a touch screen. The user's finger could have a tendency to drift right or left as they zoom in and out, or during other gesture operations, thereby accidentally crossing over to an adjacent on-screen actuatable icon, button or region. This disadvantage in known techniques is readily apparent when the user's finger accidentally moves to the left or right, thereby unwittingly activating an operation associated with sliding or drifting of the user's finger or pointing device.

Digital timers are known to be utilized in modern camera apps having the capability to record and/or play video. Some of these camera apps can include a digital timer that displays the time elapsed since recording started, and some camera apps can have a digital timer that displays the time left until the end of the pre-determined recording length. Even further, some known camera apps can have a graphical display of the time elapsed during recording by a different colored outline circumscribing the record button at a constant rate while the record button is touched. When the outline finishes circumscribing the entirety of the record button, the recording automatically stops or can continue recording with another lap of the outline being circumscribed. However, these known camera apps have many disadvantages, and are incapable or have critical issues with being utilized with video that is recording and/or playing at varying speed rates.

While the above-described devices fulfill their respective, particular objectives and requirements, the aforementioned patents do not describe a real time video special effects system and method that allows creating special effects in video recordings while recording is in progress.

SUMMARY

In view of the foregoing disadvantages inherent in the known types of video speed rate changing systems and methods now present in the prior art, the present technology provides a novel real time video special effects system and method, and overcomes one or more of the mentioned disadvantages and drawbacks of the prior art. As such, the general purpose of the present technology, which will be described subsequently in greater detail, is to provide a new and novel real time video special effects system and method and method which has all the advantages of the prior art mentioned heretofore and many novel features that result in a real time video special effects system and method which is not anticipated, rendered obvious, suggested, or even implied by the prior art, either alone or in any combination thereof.

According to one aspect of the present technology, there can be provided a compensating timer system for video data. The compensating timer system can include an electronic device including at least one processing unit in operable communication with a display and at least one memory. A user interface can be associated with the electronic device and displayable on the electronic device. The user interface can include a video display region configured or configurable to display video data, and an animated time indicator. The animated time indicator can be in part dependent on a modified playing speed of the video data that changes between a first speed rate and a second speed rate different to the first speed rate.

According to another aspect of the present technology, there can be provided a video interface and compensating timer system. The system can include an electronic device including at least one processing unit operably connected or connectable to a camera, and at least one memory. A graphical user interface can be operably implemented or implementable on the electronic device and executable by the processing unit. The graphical user interface can be configured or configurable to provide one or more affordances to a user, where the affordances can each be configured or configurable to provide one or more inputs to at least one operation executed or executable by the processing unit of the electronic device. The graphical user interface can be configured or configurable to display at normal speed the video being captured. The system can be configured or configurable to change a video playing speed on the graphical interface of the video being captured from the normal playing speed to a modified playing speed in response to at least one of the inputs received by the graphical user interface. The graphical user interface can include a video display region configured or configurable to display video data, and an animated time indicator. The animated time indicator can be in part dependent on the modified playing speed that changes between a first speed rate and a second speed rate different to the first speed rate.

According to still another aspect of the present technology, there can be provided a video interface and compensating timer system. The system can include a camera configured to capture video of a real world scene, a graphical user interface, and at least one processing unit operably connected or connectable to the camera and the graphical user interface. The at least one processing unit can configured to play on the graphical user interface at normal speed the video being captured, and to change the video playing speed on the graphical interface of the video being captured from the normal playing speed to a modified playing speed in response to a user input received by the graphical user interface. The graphical user interface can include a video display region configured or configurable to display video data, and an animated time indicator. The animated time indicator can be in part dependent on the modified playing speed that changes between a first speed rate and a second speed rate different to the first speed rate.

According to yet another aspect of the present technology, there can be provided an interface and compensating timer system utilizable with controlling a special effects operation of video data. The system can include an electronic device including at least one processing unit in operable communication with a display and at least one memory. A user interface can be associated with the electronic device and displayable on the electronic device. The user interface can include a display region, and one or more affordances configured or configurable to provide an input utilizable in changing a speed rate of video data. One or more guidelines can be displayable in the display region, and at least one of the guidelines can include a parameter associated with the input. The user interface can include an animated time indicator that can be in part dependent on a modified playing speed that changes between a first speed rate and a second speed rate different to the first speed rate.

According to still yet another aspect of the present technology, there can be provided a non-transitory computer readable medium with an executable program stored thereon including instructions for execution by at least one processing unit for applying a compensating timer to video data. The instructions when executed by the at least one processing unit can causes the at least one processing unit to display video data on a user interface that is being displayed on a display of an electronic device. The video data can be displayed at a modified speed including a first speed rate and a second speed rate different to the first speed rate. The processing unit can be caused to calculate an adjusted total time recorded value utilizable with an animated time indicator. The adjusted total time recorded value can be dependent on the first speed rate and the second speed rate. The processing unit can be caused to display on the user interface the animated time indicator.

According to even still another aspect of the present technology, there can be provided a non-transitory computer readable medium with an executable program stored thereon including instructions for execution by at least one processing unit for controlling a special effects operation of live video recording data in real time. The instructions when executed by the at least one processing unit can cause the at least one processing unit to receive, by the at least one processing unit, video data from a camera or a real time video feed, where the video data can at least be in part corresponding to images being captured by the camera in real time or from the real time video feed. The processing unit can be further caused to display on a graphical user interface at a native speed rate the video data being captured in real time or the real time video feed. The processing unit can be further caused to receive, by the processing unit, at least one input from an affordance of the graphical user interface upon activation of the affordance by a user. The graphical user interface can be displayable on a display operably associated with an electronic device including at least one processing unit and at least one memory in operable communication with the processing unit. The processing unit can be further caused to modify, by the processing unit, the video data to create modified video data at one or more modified speed rate that are different to the native speed rate in real time while receiving the video data. The processing unit can be further caused to change, by the at least one processing unit, the playing speed of the video data being displayed on the graphical user interface from the native speed rate to the modified speed rate in response to at least one of the inputs being received by the processing unit. The processing unit can be further caused to display video data on a user interface that is being displayed on a display of an electronic device. The video data can be displayed at a modified speed including a first speed rate and a second speed rate different to the first speed rate. The processing unit can be caused to calculate an adjusted total time recorded value utilizable with an animated time indicator. The adjusted total time recorded value can be dependent on the first speed rate and the second speed rate. The processing unit can be caused to display on the user interface the animated time indicator.

According to another aspect, the present technology can include a non-transitory computer readable medium with an executable program stored thereon comprising instructions for execution by at least one processing unit for controlling a special effects operation of video data, such that the instructions when executed by the at least one processing unit causes the at least one processing unit to display video data on a user interface displayed on a display of an electronic device. The instructions when executed can further cause the at least one processing unit to receive an input from an affordance of the user interface upon activation of the affordance by a user. The input can be utilizable in changing a speed rate of the video data. The user interface can be executable by the at least one processing unit and displayable on the display. The instructions when executed can further cause the at least one processing unit to display on the user interface one or more guidelines, with at least one of the guidelines including a parameter associated with the input. The processing unit can be further caused to display video data on a user interface that is being displayed on a display of an electronic device. The video data can be displayed at a modified speed including a first speed rate and a second speed rate different to the first speed rate. The processing unit can be caused to calculate an adjusted total time recorded value utilizable with an animated time indicator. The adjusted total time recorded value can be dependent on the first speed rate and the second speed rate. The processing unit can be caused to display on the user interface the animated time indicator.

According to still another aspect, the present technology can include a method for applying a video compensating timer to video data. The method can include the steps of providing video data at a modified speed including a first speed rate and a second speed rate different to the first speed rate. Establishing a predetermined maximum recording time. Displaying a user interface including the video data, an affordance and an animated time indicator on a display operably associated with an electronic device including at least one processing unit and at least one memory in operable communication with the processing unit. Calculating an adjusted total time recorded value of the video data in part dependent on the first speed rate and the second speed rate. Updating the animated time indicator in part based on the adjusted total time recorded value until receipt of a stopping input or until the adjusted total time recorded value equals the predetermined maximum recording time.

According to yet another aspect, the present technology can include a method for controlling a special effects operation of live video recording data in real time. The method can include the steps of displaying a graphical user interface including at least one affordance on a display operably associated with an electronic device including at least one processing unit and at least one memory in operable communication with processing unit. Receiving, by the processing unit, video data at a native speed rate from a camera or a video feed, the video data at least in part corresponding to images being captured by the camera or from the video feed in real time. Receiving, by the processing unit, at least one input from the affordance upon activation of the affordance by a user. Determining, by the processing unit, if the input is associated with changing the native speed rate of the video data and if so modifying the video data to create modified video data at one or more modified speed rate that are different to the native speed rate in real time while receiving the video data. Displaying at least a first region of the graphical user interface, by the processing unit, output video recording data to the display. The output video recording data can be any one or any combination of the following: the video data at the native speed rate, and the modified video data at the modified speed rate. Establishing a predetermined maximum recording time. Displaying an animated time indicator in the graphical user interface. Calculating an adjusted total time recorded value of the video data in part dependent on a first speed rate and a second speed rate. Updating the animated time indicator in part based on the adjusted total time recorded value until receipt of a stopping input or until the adjusted total time recorded value equals the predetermined maximum recording time.

According to still yet another aspect, the present technology can include a method for controlling a special effects operation of video data. The method can include steps of displaying a user interface including a speed rate affordance on a display operably associated with an electronic device including at least one processing unit and at least one memory in operable communication with processing unit. Receiving, by the processing unit, an input associated with the speed rate affordance based upon activation by a user, the input being associated with changing a speed rate of video data. Displaying, by the processing unit, output video data to the display. Displaying one or more guidelines on the graphical user interface, at least one of the guidelines including a parameter associated with the input. Establishing a predetermined maximum recording time. Displaying an animated time indicator in the graphical user interface. Calculating an adjusted total time recorded value of the video data in part dependent on a first speed rate and a second speed rate. Updating the animated time indicator in part based on the adjusted total time recorded value until receipt of a stopping input or until the adjusted total time recorded value equals the predetermined maximum recording time.

According to still yet another aspect, the present technology can include a client-side electronic system for applying a compensating timer to video. The system can include a memory and a processor that are respectively configured to store and execute software instructions, including instructions that can be organized into a video data receiving and displaying component configured or configurable to receive a request to acquire video data and to display the video data on a user interface that is being displayed on a display of an electronic device at a modified speed including a first speed rate and a second speed rate different to the first speed rate. The instructions can further be organized into a total time recorded calculation component configured or configurable to calculate an adjusted total time recorded value utilizable with an animated time indicator. The adjusted total time recorded value can be dependent on the first speed rate and the second speed rate. The instructions can further be organized into a timer display component configured or configurable to display the animated time indicator on the user interface.

Some or all embodiments of the present technology can include a speed rate determination component configured or configurable to receive at least one request to change the first speed rate of the video data to one or more second speed rates that are different to the first speed rate.

Some or all embodiments of the present technology can include a frame modification component configured or configurable to, upon receiving a request to change the first speed rate, identify at least one frame in the video data to be modified, and modifying the at least one frame to create modified video data at the second speed rates while receiving the video data; and In some or all embodiments of the present technology, the video is live video recording data in real time.

In some or all embodiments of the present technology, the first speed rate can be a first recording speed rate associated with a first section of the video data and the second speed rate can be a second recording speed rate associated with a second section of the video data different to the first section.

In some or all embodiments of the present technology, the animated time indicator can be in part based on an adjusted total time recorded value equal to a total time recorded value of the video data added with a time value.

In some or all embodiments of the present technology, the animated time indicator can be in part based on while the video data is being recorded, and while the total time recorded value or the adjusted total time recorded value is less than a maximum recording time value of the video data.

In some or all embodiments of the present technology, the time value can be a time increment divided by the second speed rate when the second speed rate is greater than the first speed rate.

In some or all embodiments of the present technology, the time value can be a time increment multiplied by the second speed rate when the second speed rate is less than the first speed rate.

In some or all embodiments of the present technology, the animated time indicator can be an animated affordance including a total length radially incremented into time per degree, wherein the time per degree is equal to a maximum recording time value divided by 360.

In some or all embodiments of the present technology, the animated time indicator can be an animated affordance including a total length radially incremented into time per degree, wherein the time per degree is equal to a time per lap value divided by 360. The time per lap value can be a maximum recording time value or a default time per lap value.

In some or all embodiments of the present technology, the animated affordance can include a first section with a first section length that increases along the total length based in part by the adjusted total time recorded value or the total time recorded value minus by a resultant of the time per lap value multiplied by a number of laps, divided by a resultant of the time per lap value multiplied by 360.

In some or all embodiments of the present technology, the animated affordance can include a first section with a first section length that increases along the total length based in part on the adjusted total time recorded value or the total time recorded value divided by the maximum recording time value with a resultant thereof multiplied by 360.

In some or all embodiments of the present technology, the animated affordance can be a record affordance configured or configurable to provide a first input receivable and usable by the processing unit in starting or stopping a recording operation of the video data by the electronic device. The record affordance can be moveable on the user interface to provide a second input receivable and usable by the processing unit in changing the first speed rate of the video data to the second speed rate.

In some or all embodiments of the present technology, the animated time indicator can be an animated progress bar including a total length in part based on the adjusted total time recorded value or the total time recorded value divided by a maximum recording time value of the video data with a resultant thereof multiplied by a length value in pixels of the animated progress bar.

In some or all embodiments of the present technology, the animated time indicator can be an animated progress bar including a total length in part based on the adjusted total time recorded value or the total time recorded value divided by a time per lap value. The time per lap value can be a maximum recording time value or a default time per lap value of the video data.

In some or all embodiments of the present technology, the animated progress bar can include a first section with a first section length that increases along the total length.

In some or all embodiments of the present technology, the first section length that increases along the total length can in part be based on the adjusted total time recorded value or the total time recorded value multiplied by a length value in pixels.

In some or all embodiments of the present technology, the first section length that increases along the total length can in part be based on the adjusted total time recorded value or the total time recorded value minus by a resultant of the maximum recording time value multiplied by a number of laps, divided by a resultant of the time per lap value multiplied by the length value in pixels.

In some or all embodiments of the present technology, the first section is of a color different to that of a remaining section of the progress bar.

In some or all embodiments of the present technology, the first section is of a shape pattern, thickness, flashing or brightness, different to that of a remaining section of the progress bar.

In some or all embodiments of the present technology, the first section can be a solid bar, and the remaining section can be a different type including a semi-transparent bar, solid dots, dashes or any other type that is different from the first section.

In some or all embodiments of the present technology, the animated time indicator can be any one or any combination of a time elapsed clock configured or configurable to count up numerically to the maximum recording time value, and a time remaining clock configured or configurable to count down numerically from the maximum recording time value.

In some or all embodiments of the present technology, the processing unit can be further caused to calculate the adjusted total time recorded value while the video data is being recorded, and while the total time recorded value is less than a maximum recording time value of the video data.

In some or all embodiments of the present technology, the processing unit can be further caused to calculate the time value by dividing a time increment with the second speed rate when the second speed rate is greater than the first speed rate.

In some or all embodiments of the present technology, the processing unit can be further caused to calculate the time value by multiplying the time increment with the second speed rate when the second speed rate is less than the first speed rate.

In some or all embodiments of the present technology, the animated time indicator can be selected from any one or any combination of: an animated affordance configured or configurable to provide a first input receivable and usable by the processing unit in starting or stopping a recording operation of the video data by the electronic device, and wherein the animated affordance is moveable on the user interface to provide a second input receivable and usable by the processing unit in changing the first speed rate of the video data to the second speed rate; an animated progress bar including a total length in part based on a maximum recording time, and a first section with a first section length that increases along the total length based on the adjusted total time recorded value or the total time recorded value divided by the maximum recording time value of the video data with a resultant thereof multiplied by a length value in pixels; a time elapsed clock configured or configurable to count up numerically to the maximum recording time value; and a time remaining clock configured or configurable to count down numerically from the maximum recording time value.

In some or all embodiments of the present technology the animated time indicator changes color when a predetermined time value of the maximum recording time value or the total time recorded is reached.

In some or all embodiments of the present technology, a parameter of the animated time indicator can be selected from the group consisting any one or any combination of color, pattern, length, thickness, flashing, brightness, shape, orientation, and display time.

Some or all embodiments of the present technology can include one or more speed rate indicators displayable in the video display region of the user interface.

Some or all embodiments of the present technology can include one or more guidelines displayable in the video display region, where the guidelines can be configured or configurable to associate with one or more of the speed rate indicators.

In some or all embodiments of the present technology, the guidelines can be displayed upon activation of at least one of one or more affordances or while at least one of the one or more affordances is in an activated state.

In some or all embodiments of the present technology, the guidelines are not displayed upon deactivation of at least one of one or more affordances or while at least one of the one or more affordances is in a deactivated state.

In some or all embodiments of the present technology, the guidelines can be vertically oriented in the display region with each of the guidelines extending from or being associated with a speed rate indicator displayed on the user interface.

In some or all embodiments of the present technology the guidelines can be multiple guidelines, and a color of at least one of the guidelines can be changed to a different color to that of at least one other of the guidelines based in part on the input.

In some or all embodiments of the present technology, at least one of the guidelines displayed on the user interface can be activated, modified or deactivated automatically based on a distance of the speed rate affordance with one or more speed rate indicators displayed on the user interface.

Some or all embodiments of the present technology can include one or more affordances that can be a speed rate affordance associated with changing the speed rate of the video data.

In some or all embodiments of the present technology, the speed rate affordance or at least one of the guidelines on the user interface can be activated, modified or deactivated based on a touch input on the display.

In some or all embodiments of the present technology the input can be associated with a gesture on the display of the electronic device, the gesture being selected from the group consisting any one or any combination of a tap, a multiple tap, a touch holding, a sliding, a pinch, and a touch holding and sliding.

Some embodiments of the present technology can include a video playing speed of the video data that can be changed from a first speed rate to a modified playing speed rate in response to the input. The changing of the video playing speed can be accomplished by the processing unit of the electronic device or a remote processing unit of a remote device in communication with the processing unit of the electronic device.

In some or all embodiments of the present technology, the speed rate of the video data can be changed from a first speed rate to a modified speed rate when a finger touches the display, and then revert from the modified speed rate to the first speed rate when the finger is removed from the display.

In some or all embodiments of the present technology, the speed rate of the video data can be changed from a first speed rate to a modified speed rate upon a first finger tap on the display, and then revert from the modified speed rate to the first speed rate upon a second finger tap on the display.

In some or all embodiments of the present technology at least one of the affordances can be movable on the user interface to provide a movable affordance.

In some or all embodiments of the present technology, the movable affordance can be configured or configurable in determining a change in zoom factor of the video data based on vertical movement of the movable affordance on the user interface.

In some or all embodiments of the present technology, the movable affordance can be a speed rate affordance associated with changing the speed rate of the video data.

In some or all embodiments of the present technology, the user interface is a graphical user interface.

In some or all embodiments of the present technology, the one or more affordances can include a slide bar associated with changing the speed rate of the video data.

In some or all embodiments of the present technology, the guidelines can be two or more guidelines, with at least part of each of the two or more guidelines can be displayed in the video display region in a spaced apart relationship. The spaced apart guidelines can be configured or configurable on the graphical user interface to represent a field-of-view of the video data.

In some or all embodiments of the present technology, the graphical user interface can be configured or configurable by the processing unit to seamlessly change a playing speed on the graphical user interface of the video data from the first speed rate to the modified speed rate.

Some or all embodiments of the present technology can include one or more cameras that can be configured to capture video of a real world scene. The camera and the graphical user interface can be incorporated in the electronic device or the camera can be remote from the electronic device.

In some or all embodiments of the present technology, the processing unit can modify the video data by adding at least one new frame to the video data or removing at least one frame from the video data to create the modified video data.

In some or all embodiments of the present technology, the graphical user interface can be configured or configurable by the processing unit to seamlessly change a playing speed on the graphical user interface of the video data from the first speed rate to the modified speed rate.

In some or all embodiments of the present technology, the graphical user interface can include a current speed rate indicator that is configured or configurable to indicate a playing speed rate of the video data being displayed in real time.

Some or all embodiments of the present technology can include one or more cameras that can be configured to capture video of a real world scene. The camera and the graphical user interface can be incorporated in the electronic device or the camera can be remote from the electronic device.

In some or all embodiments of the present technology, the one or more affordances can include a zoom affordance configured or configurable in determining a change in zoom factor of the video data. The zoom affordance can be associated with at least one of the guidelines.

In some or all embodiments of the present technology, the guidelines can be displayed on the graphical user interface in an orientation different to an orientation of a speed rate slide bar, a speed rate affordance or a speed rate indicator.

In some or all embodiments of the present technology, the processing unit can modify the video data by adding at least one new frame to the video data or removing at least one frame from the video data to create the modified video data.

In some or all embodiments of the present technology, the processing unit can modify a first or native speed rate of the video data to a modified speed rate when a finger touches the graphical user interface, and then revert from the modified speed rate to the first or native speed rate when the finger is removed from the graphical user interface.

Some or all embodiments of the present technology can include determining if the modified speed rate is less than a native or first speed rate, and if so then modifying the raw video data can include adding at least one new frame to the raw or original video data to create the modified video data.

Some or all embodiments of the present technology can include adding the new frame by copying at least one raw frame to create the new frame, and adding the new frame to the raw or original video data adjacent to the raw frame.

In some or all embodiments of the present technology, the new frame to be added can be a plurality of new frames each being a copy of at least one raw frame from the raw video data, with the new frames being added to the raw or original video data adjacent to the raw frame that was copied.

Some or all embodiments of the present technology can include adding the new frame by frame blending at least two raw frames to create the new frame, and adding the new frame to the raw video data between the two raw frames.

In some or all embodiments of the present technology, the new frame(s) to be added can be a plurality of new frames each being a blend of at least two raw frames from the raw video data, with the new frames being added to the raw or original video data between the raw frames that was blended.

In some or all embodiments of the present technology, the new frames can be added to the raw video data adjacent to the raw frame or adjacent to a second raw frame of the raw or original video data.

Some or all embodiments of the present technology can include determining if the modified speed rate is greater than the native speed rate, and if so then modifying the raw or original video data can include removing at least one first raw frame from the raw or original video data to create the modified video data.

In some or all embodiments of the present technology, the first raw frame can include selecting the first raw frame to be removed, and then removing the first raw frame from the raw or original video data to create the modified frame.

In some or all embodiments of the present technology, the processing unit can be configured or configurable to receive an input from an affordance of the user interface upon activation of the affordance by a user. The input can be utilizable in applying a special effect to the video data. The user interface can be executable by the at least one processing unit and displayable on the display. The instructions can cause the at least one processing unit to display on the user interface a frame display region including frames of the video data. One or more of the frames can be selectable to provide selected frames. The instructions can cause the at least one processing unit to split the video data into a selected segment including the selected frames and one or more original segments including any non-selected frames. The instructions can cause the at least one processing unit to apply the special effect to the selected frames to create a special effect segment. The instructions can cause the at least one processing unit to combine the special effect segment and the original segments to create a continuous resultant video data stream.

There are, of course, additional features of the present technology that will be described hereinafter and which will form the subject matter of the claims attached.

BRIEF DESCRIPTION OF THE DRAWINGS

The present technology will be better understood and objects other than those set forth above will become apparent when consideration is given to the following detailed description thereof. Such description makes reference to the annexed drawings wherein, with the phantom lines depicting environmental structure and forming no part of the claimed present technology:

FIG. 67 is a flow chart of an example of case 1 of call function 1 where the live Boomi button or affordance is activated at the start of the recording.

FIG. 68 is a flow chart of an example of case 2 of call function 1 where the live Boomi button or affordance has been activated while in the middle of the recording.

FIG. 69 is a flow chart of an example of case 3 of call function 1 where the live Boomi button or affordance has been previously activated and the camera stream is in the middle of a Boomi segment.

The same reference numerals refer to the same parts throughout the various figures.

DETAILED DESCRIPTION OF THE PREFERRED EMBODIMENTS

Figure 1:
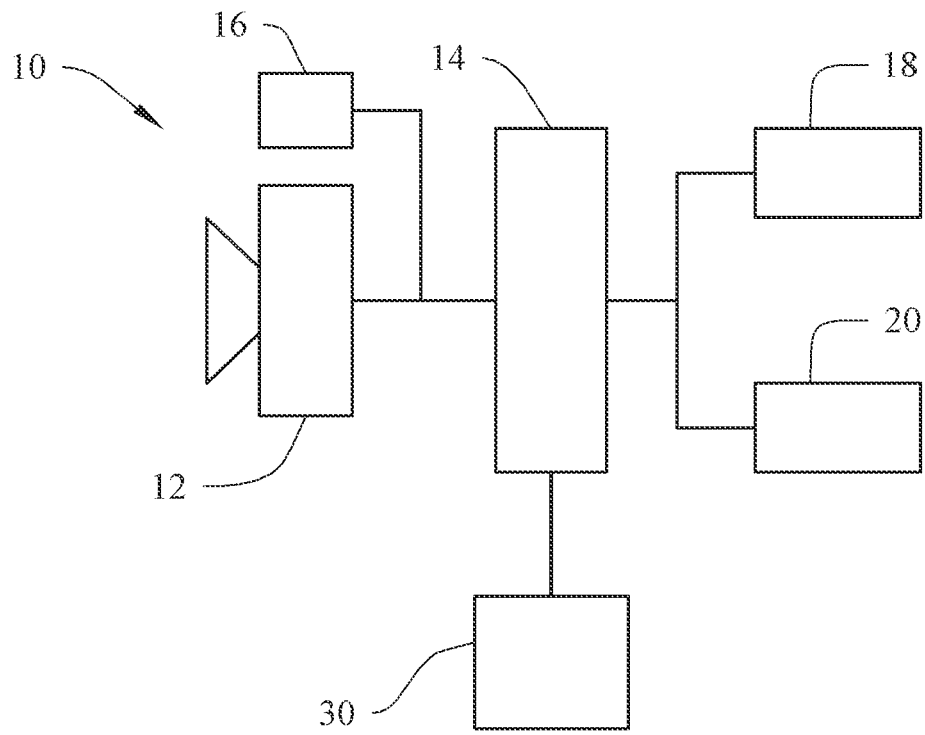
FIG. 1 is a block diagram of an embodiment of the real time video special effects system constructed in accordance with the principles of the present technology.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

It is known that video recordings are made up a series of frames or group of pictures displayed at a speed rate to create motion. These frames of images or video can be characterized as digital frame data, which can be buffered in the playing back of the video. The frame rate (expressed in frames per second or fps) is the frequency (rate) at which these consecutive frames appear on a display. This can be applied equally to film and video cameras, computer graphics, and motion capture systems. Frame rate may also be called the frame frequency, and be expressed in hertz.

Real-time recording and/or playback of video is typically performed at a rate of thirty (30) fps. It is desirable in several situations to speed up or slowdown the playback of the video. This is typically conducted while keeping the recording and playback frames per second at 30 fps in order to maintain compatibility with the existing components, such as the display devices, etc. For example, if a viewer wanted to speed up the playback of a video by a certain percentage from the standard real-time playback speed while keeping 30 fps, the information or data of a specific number of frames is required to be played back in a time segmented for 30 frames. A scheme to create this is to skip one frame, from the recorded video, out of every predetermine number of frames so that the appropriate number of frames of video are displayed at 30 fps. It is noted that these known systems and methods are provided as a post-recording process, which skips frames from a 30 fps recording. The recording is initially written to memory in real time at 30 fps, with no special effects.

The present technology solves the problem of requiring "post production editing" to insert the time modification special effects, which can be time and resource costly, especially for amateur filmmakers.

Furthermore, the present technology solves the problem of pre-setting the motion recording speed to either fast motion or slow motion where user cannot adjust the motion recording speed in real time during the recording process.

Even still further, the present technology solves the problem of presetting the motion recording speed where a user cannot adjust the motion recording speed continuously and vary from fast motion to slow motion in real time during the recording process.

The present technology alleviates and solves the issue requiring hardware support for every device. By using the software algorithm to simulate slow motion, it is not device dependent and the resulting file is much smaller than hardware supported slow motion video.

While the above-described devices fulfill their respective, particular objectives and requirements, the aforementioned devices or systems do not describe a real time video special effects system and method that allows creating special effects in video recordings while recording is in progress. The present technology additionally overcomes one or more of the disadvantages associated with the prior art by adding or removing frames from the frame strip provided by the camera in real time.

Still further, there is no known interface for the user to change the speed of recording and the duration to apply the special effects in real time while recording is in progress. Furthermore, the scene has to be relatively fixed, with the camera not panning or following the action. The algorithm associated with this known system uses a motion sensor while the camera remains steadily fixed on a scene and the subject has to traverse the scene while the rest of the scene remains fixed.

The present technology can utilize a graphical user interface associated with the electronic device that modifies the frames from a camera in real time prior to recording or saving.

A need exists for a new and novel real time video special effects system and method that can be used for creating special effects in video recordings while recording is in progress. In this regard, the present technology substantially fulfills this need. In this respect, the real time video special effects system and method according to the present technology substantially departs from the conventional concepts and designs of the prior art, and in doing so provides an apparatus primarily developed for the purpose of creating special effects in video recordings while recording is in progress.

Users of the present technology can in "real time" produce videos that contain the special effect of user controlled variable time modification, aka fast motion or slow motion, by using the user interface programmed into the device's apps that run on their supported operating systems, and other embedded devices. The produced video is taken in one-shot, with all of the time modification commands entered in real time while recording.

For exemplary purposes, the present technology can utilizes a set video frame rate to 30 fps, resulting in 30 frames per second while recording.

In some or all embodiments of the present technology, a user can utilize a fast forward option of the present technology, which results in dropping frames according to the set fast forward rate (like 1×, 2×, 3×, etc.). If the user sets 2× fast forward video then the present technology can append the 1st frame in writer and skips the 2nd frame, then write the 3rd frame, and then skip the 4th frame and so on. The resultant video that is recorded is at the predefined fast forward speed in real time while retaining a 30 fps.

In some or all embodiments, a user can utilize a slow motion option of the present technology, which results in appending a same frame twice thereby repeating this frame so the final video that is recorded is in slow motion. For example, if the user sets 2× slow video then the present technology can append the 1st frame in writer, and the same frame append to the next time/frame slot. The resultant video that is recorded is at the predefined slow motion speed in real time while retaining a 30 fps.

The present technology allows the user to control the recording device's (and any other video recording device) recording speed and other camera settings while recording through the use of the custom user interface, such that when the user plays the video immediately after the present technology algorithm has processed the commands, the playback speed of the scenes correspond with the commands during recording. The present technology accomplishes this with software simulation without having to increase the recording device's frame rate and is not device dependent and works across all platforms.

An additional aspect of the present technology can be to increase the frame rate of the recording device while recording is in progress. This requires application programming interface (API) access to limited number of supported hardware and there is no industry standard API, which limits the number of supported devices. The display shows the current time recording rate, from normal speed to 3× faster, or −3× slower (can be 4×, 5× or more). The user can control the recording rate by utilizing the interface.

Numerous advantages exist with the present technology, such as an easy to use custom user interface, wherein the user can add special effects of time modification into the video in real time while recording is in progress. This is an advantage over existing technology because the user can produce a video with the special effects (variable fast and slow motion recording speeds) while recording of that video is in progress. This reduces the time and costs to produce videos with these kinds of special effects by not requiring a separate video editing software and or paying a video editor to edit and produce a comparable video. User can enjoy viewing the videos they created with the special effects immediately once they have completed recording and brief processing time for the device to process adding the special effects and automatically producing a new video with the special effects implemented.

Another advantage of user's manual control of the special effect in real time is that the user can pan along with the movement of the scene, and capture the peak moment of the action and use continuously variable slow/fast motion at just the right time and for as long as desired, and then return back to normal speed as the user is recording.

Still another advantage is that the present technology is not hardware dependent for the slow or fast motion special effect to work. The software algorithm simulates the slow or fast motion.

Even still another advantage is that with the manual user interface, the camera does not have to remain stationary while pointing at a stationary scene for an AI software to determine the "action" to apply the special effects thereto.

Another advantage is that the present technology can accept input from, but not limited to, a remote camera feed, a joystick, a retina scanner, a body suit controller, on-screen subject gestures and a tactile user interface.

In some or all embodiments, the present technology can also be applied to add time modifying special effects to pre-existing videos. The user can control the time variable in the playback by using the same familiar easy to use left-right on a compatible device, such as a smartphone or tablet, to control and modify the values for the playback time value, from −3× to 4× in this case. It can be appreciated that there are additional abilities to the factor of time modification once digital processing technology has advanced sufficiently to be able to interpolate data and images in between frames captured one the video.

When the user slides towards the 4×, the recorded speed is played back faster than normal, up to 4× faster. When the user slides towards the −3×, the recorded speed is played back slower than normal, up to 3× slower.

In some or all embodiments, the raw video data can include data such as, but not limited to, streaming video data, video, audio, depth, object identification, histogram, and combination thereof.

In some or all aspects, the processing unit can be configured or configurable to preclude the raw video data from being written to the memory unit from the camera, such that the present technology can intercept the raw video data.

In some or all embodiments, the input can be one or more desired speed rate values that the modified speed rate is based on. Where the modified speed rates can be one of less than the native speed rate or greater than the native speed rate.

If the modified speed rate is less than the native speed rate, then the processing unit can be configured or configurable to add at least one frame to the raw video data to create the modified video data.

If the modified speed rate is greater than the native speed rate, then the processing unit can be configured or configurable to remove at least one frame from the raw video data to create the modified video data.

If the input is not a request to change the native speed, then the processing unit can be configured or configurable to keep all the frames from the raw video data and write the raw video data to memory.

In some or all embodiments, the interface can be a graphical user interface including a portion configured or configurable to generate the input that is associated with the native speed rate or the modified speed rate. The graphical user interface can be configured or configurable to display the output video recording data in real time with receiving the raw video data from the camera. The output video recording data can be configured or configurable to include a combination of the raw video data and the modified video data, with a transitioning between the raw video data and the modified video data being dependent on the input. It can be appreciated that the interface can be a joystick or can utilize a joystick.

In yet another aspect, the interface can be operable associated with at least one computer-readable storage media storing instructions that, when executed by the processing unit or a processor of a computer system, causes the processing unit to direct the raw video data from the camera to the processing unit and as well as to the memory unit in real time with receiving the raw video data from the camera, and to write the raw video data from the processing unit to the memory unit or apply at least one algorithm to the raw video data to create the modified video data and write the modified video data from the processing unit to the memory unit.

According to yet another aspect of the present technology, the present technology can be a method of recording a video at one or more speed rates in real time with receiving the raw video data from the camera. The method can include the steps of receiving, by at least one processing unit, raw video data at a native speed rate from a camera in real time with capturing images at least in part corresponding with the raw video data from the camera, and receiving an input from at least one interface that is operably associated with the processing unit. The method can include determining, by the processing unit, if the input is associated with changing the native speed rate of the raw video data and if so modifying the raw video data to create modified video data at one or more modified speed rates that are different to the native speed rate in real time with receiving the raw video data from the camera. The method can further include writing, by the processing unit, output video recording data to at least one memory, wherein the output video recording data is one of the raw video data at the native speed rate, the modified video data at the modified speed rate, and a combination of the raw video data and the modified video data.

Some or all embodiments of the present technology can include determining if the modified speed rate is less than the native speed rate, and if so then modifying the raw video data can include adding at least one new frame to the raw video data to create the modified video data.

In some or all embodiments, the method can include adding the new frame by copying at least one raw frame to create the new frame, and adding the new frame to the raw video data adjacent to the raw frame.

In some or all embodiments, the new frame to be added can be a plurality of new frames each being a copy of at least one raw frame from the raw video data, with the new frames being added to the raw video data adjacent to the raw frame that was copied.

In some or all embodiments, the method can include adding the new frame by frame blending at least two raw frames to create the new frame, and adding the new frame to the raw video data between the two raw frames.

In some or all embodiments, the new frame(s) to be added can be a plurality of new frames each being a blend of at least two raw frames from the raw video data, with the new frames being added to the raw video data between the raw frames that was blended.

In some or all embodiments, each of the new frames can be added to the raw video data adjacent to the raw frame or adjacent to a second raw frame of the raw video data.

Some or all embodiments can include the step of determining if the modified speed rate is greater than the native speed rate, and if so then modifying the raw video data can include removing at least one first raw frame from the raw video data to create the modified video data.

In some or all embodiments, the removing of the first raw frame can include selecting the first raw frame to be removed, and then removing the first raw frame from the raw video data to create the modified frame.

In some or all embodiments, the interface can be a graphical user interface including a portion configured or configurable to generate the input that is associated with the native speed rate or the modified speed rate, and wherein the interface is configured or configurable to display the output video recording data.

Some or all embodiments can include the output video recording data being a combination of the raw video data and the modified video data. With the modified video data configured or configurable to include multiple subsets each having a speed rate dependent on the input. Where a transitioning between the raw video data and any one of the subsets or between any of the subsets is dependent on the input, and wherein the output video recording data is displayed in the graphical user interface in real time with receiving the raw video data from the camera.

In some or all embodiments, the present technology can include an extreme slow motion subroutine at constant high recoding fps. This subroutine can be utilized for slow motion speed ranges greater than or equal to −8×, by passing through an unchanged video stream or make copies of each frame a predetermined number of times.

In some or all embodiments, the present technology can include a segment time compression and expansion subroutine that provides an algorithm for slow motion and fast motion by speeding up or slowing down the playback time during video processing after the recording has stopped. This subroutine can set the device's recording and/or playback fps, and set video segment playback fps to equal the recording fps using an algorithm that utilizes in part the segment playback fps and record fps.

In some or all embodiments, the present technology can include a variable playback speed record subroutine that provides an algorithm for slow motion and fast motion by speeding up or slowing down the playback frame rate while video recording is in progress. This algorithm can produce a normal video with the fast/slow motion commands embedded in the video's metadata.

In some or all embodiments, the present technology can include a variable playback speed playback subroutine that provides an algorithm for playing a video file with slow motion and fast motion special effects by speeding up or slowing down the playback frame rate while video playback is in progress.

Some or all embodiments can include the graphical user interface being configured or configurable by the processing unit to revert from playing at the modified playing speed on the graphical user interface the video being captured to playing the video being captured at the normal speed.

In some or all embodiments, the graphical user interface can be configured or configurable by the processing unit to revert from playing at the modified speed on the graphical user interface the video being captured to playing the video being captured at the normal playing speed in response to a user input received by the graphical user interface.

In some or all embodiments, the graphical user interface can be configured or configurable by the processing unit to seamlessly change the playing speed on the graphical interface of the video being recorded from the normal playing speed to a modified playing speed.

In some or all embodiments, the graphical user interface can be displayed on a display of the electronic device, and the graphical user interface can include multiple regions with a first region being configured or configurable to display the video being captured at the normal playing speed, and a second region being configured or configurable to display the video being captured at the modified playing speed.

Some or all embodiments of the graphical user interface can include a first affordance including at least one selectable value from a plurality of values.

In some or all embodiments, the selectable value can be selected by a gesture on the display of the electronic device selected from the group consisting of a tap, a multiple tap, a touch holding, a sliding, a pinch, and a touch holding and sliding.

In some or all embodiments, the plurality of values of the first affordance can include varying speed rates associated with slow motion speed, fast motion speed and normal speed.

In some or all embodiments, the graphical user interface can include a second affordance configured or configurable to provide a second input to the processing unit and usable in determining a change in zoom factor of the raw video data.

In some or all embodiments, the first affordance can be a slide bar associated with the varying speed rates, or the second affordance can be a slide bar indicating associated with varying zoom factors.

In some or all embodiments, the second affordance can be displayed in the graphical user interface in an orientation different to an orientation of the first affordance.

In some or all embodiments, at least one of the first affordance and the second affordance is in part arranged over the video display region.

Some or all embodiments of the graphical user interface can include a second video display region configured to display a second video feed that can be different to the video feed displayed in the display region and can be one of the raw video data at the native speed rate, the modified video data at the modified speed rate, and a combination of the raw video data and the modified video data.

In some or all embodiments, the graphical user interface can include a record affordance configured or configurable to provide at least one record input receivable and usable by the processing unit in at least determining if a recording operation is to be started or stopped. The record affordance can have a generally circular configuration with a first annular region configured or configurable to display a time lapse indication of the captured raw video data.

Some or all embodiments of the graphical user interface can include one or more additional affordances configured or configurable to provide at least one additional input receivable and usable in initiating additional operations by the processing unit.

In some or all embodiments, the additional operations are selected from the group consisting of a flash, a hands free operation, a timer, a mute operation, a rear camera operation, a setting operation associated with the electronic device, a setting operation associated with the camera, an editing operation, a scene filter operation, an "Augmented Reality" (AR) filter operation, adding music operation, a filter operation, a writing operation, and a transmission operation.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

Even still another object of the present technology is to provide a real time video special effects system and method for creating special effects in video recordings while recording is in progress. This allows a user to control the speed rate of the video prior to and while recoding is in progress in real time while acquiring the video from the camera.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some or all embodiments of the present technology may meet only one such object or none at all.

Figure 92:
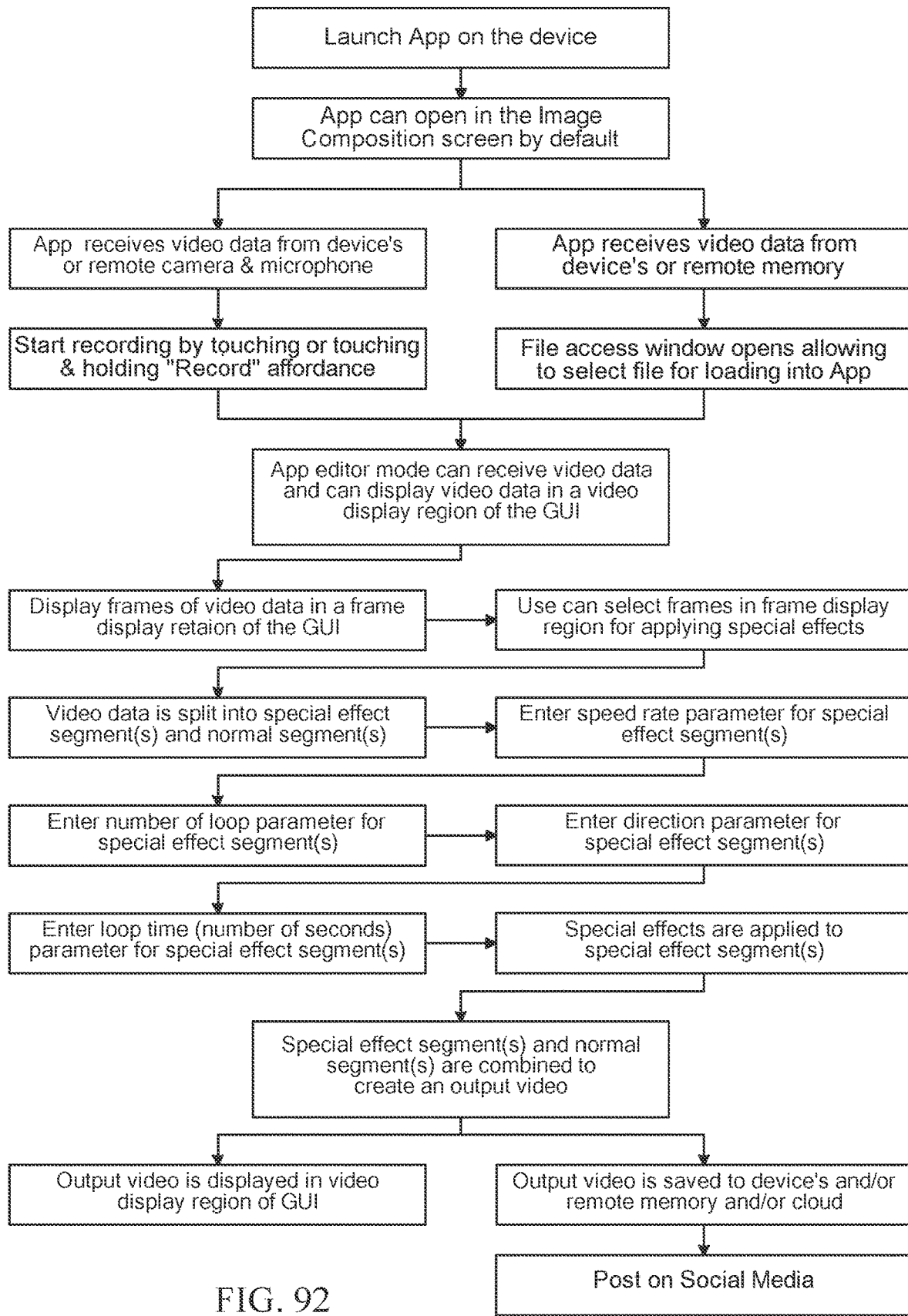
FIG. 92 is a flow chart of an example a possible process by a user utilizing the user interface associated with the Boomi effect of the present technology.

Referring now to the drawings, and particularly to FIGS. 1-92, some or all embodiments of the real time video special effects system and method of the present technology are shown and generally designated by the reference numeral 10. As a general outline, the system comprises a camera configured to capture video of a real world scene or any video remote video feed, including video games, a graphical user interface, at least one memory; and at least one processing unit operably connected or connectable to the camera, the graphical user interface and the at least one memory. The at least one processing unit is configured to: play on the graphical user interface at normal speed the video being captured; and change the video playing speed on the graphical interface of the video being captured from the normal playing speed to a modified playing speed in response to a user input received by the graphical user interface.

Referring now to some or all embodiments in more detail, new and novel real time video special effects system and method 10 of the present technology for creating special effects in video recordings while recording is in progress is illustrated and will be described with reference to FIG. 1. More particularly, the real time video special effects system and method 10 can include a camera 12, an image processor or processing unit 14, a user interface 30 associated with the processing unit, a storage or memory unit 18, a display unit 20. At least one RAM memory and/or at least one non-volatile long term memory can be operably connected or connectable with the processing unit 14. It can be appreciated that the camera 12 can be any device capable of capturing images and/or video, and can be associated or integrated with a microphone 16. The image processing unit 14 is in operable communication with the camera 12, microphone 16, the memory unit 18 and/or the display unit 20. The image processing unit 14 intercepts the raw video data from the camera 12 and/or microphone 16, processes the raw video data in real time in possible accordance with at least one algorithm, and then records output/final video recording data in the memory unit 18 and/or displays the output/final video recording data in the display unit 20.

It can be appreciated that the system 10 can be configured or configurable as a complete video system of an electronic device having one or more video cameras 12, one or more display devices 20, and one or more integrated circuits or processors. Alternatively, it can be appreciated that the imaging processing unit 14 can be configured or configurable as a module or integrated circuit chip embedded in the electronic device or with a component of the electronic device. Further in the alternative, the system 10 can be configured or configurable as a video data processing device such as, but not limited to, a graphics processing unit (GPU), digital signal processor (DSP), Active Server Pages (ASP), central processing unit (CPU), accelerated processing unit (APU), Application Specific Integrated Circuit (ASIC). Even further in the alternative, the system 10 can be configured or configurable as software or programming code as part of an operating system or application running on or controlling the electronic device or camera.

The electronic device including the camera 12, microphone 16 and display unit 20 can be, but not limited to, smart phones, smart watches, tablets, notebooks, desktop computers, laptops, DVD players, televisions digital cameras (point and shoot, single-lens reflex, video cameras, high end audio/visual gear), eyewear, drones, gimbals and other stabilizers, selfie sticks, closed circuit video monitoring system, dash cam for cars, endoscopes, microscopes, telescopes, camera and/or display embedded circuits, wearables, "Internet of Things" (IoT), and the like.

Figure 2:
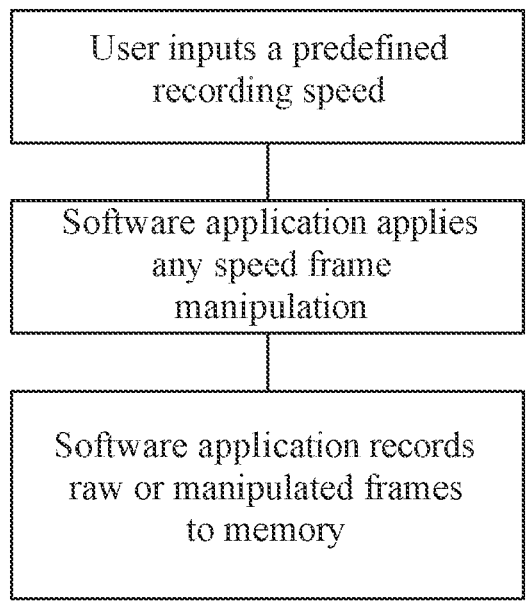
FIG. 2 is a block diagram view of the real time recording speed control method of the present technology.

With reference to FIG. 2, the processing unit 14 can be configured or configurable to receive an input of a user selection of a requested recording speed. The raw video data from the camera 12 can be diverted to the imaging processing unit 14, where the program and/or algorithm modifies or retains the raw frames contained in the raw video data from the camera 12. The raw frames in the data stream are either modified or retained by the imaging processing unit 14 in real time, and then passed to the memory unit 18 and/or display unit 20.

Figure 3A:
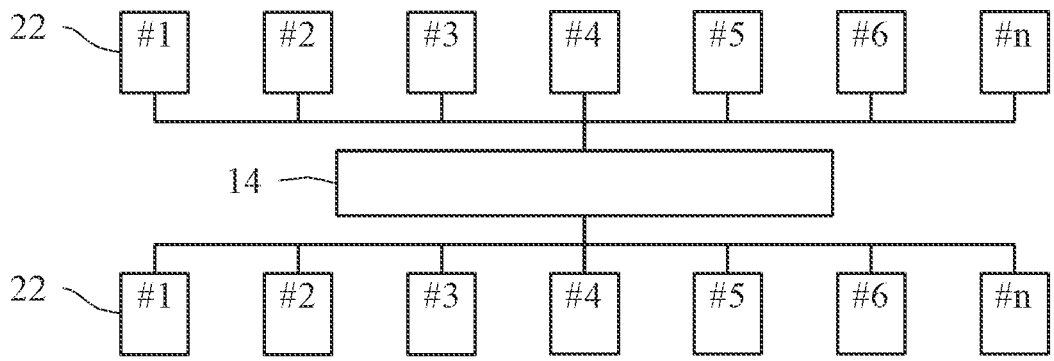
FIG. 3A is a representation of a series of video frames indicating an example of a native frame rate in accordance with the teachings of the present technology.

Examples of operations of the imaging process unit using frame adding, frame blending and frame dropping are illustrated in FIGS. 3A-G. When actuated or while in operation, the imaging processing unit 14 intercepts the raw video data 22 from the camera 12, which includes a series of frames #1-#n at a native frame rate for proper presentation by the display unit 20. For exemplary purposes, the frame rate shown in FIG. 3A can be 30 fps. The imaging processing unit 14 receives the raw frames 22 and then can modify or retain the raw frames dependent on one or more inputs signals received by the imaging processing unit 14. If the imaging processing unit 14 receives no input signals requesting an adjustment of the frame speed rate, then all the raw frames contained in the raw video data 22 are passed through to other components such as the memory unit of the electronic device, as best illustrated in FIG. 3A.

Figure 3B:
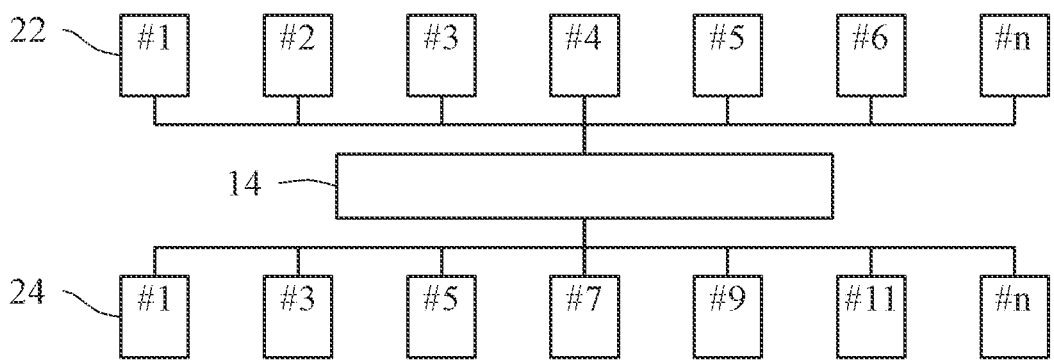
FIG. 3B is a representation of a series of video frames indicating an example of frame dropping in accordance with a fast motion speed at 2× the native frame rate.

In some or all embodiments, if the imaging processing unit 14 receives a special effect input signal associated with a fast motion recording operation, which represents a speed up or fast forward displaying at 2× the native frame rate, then the imaging processing unit 14 appropriately modifies the raw video data 22. Upon which, the raw frames 22 are processed using algorithm wherein every second frame is dropped, as best illustrated in FIG. 3B. Raw frame #1 can be appended in writer, raw frame #2 can be skipped/dropped, then raw frame #3 can be written, and then raw frame #4 can be skipped/dropped, and so on until a modified or output video recording data 24 is generated in 2× fast motion speed. This process is conducted in real time, and the fast motion output video is recorded in place of the raw video data 22, and/or displayed in real time.

Figure 3C:
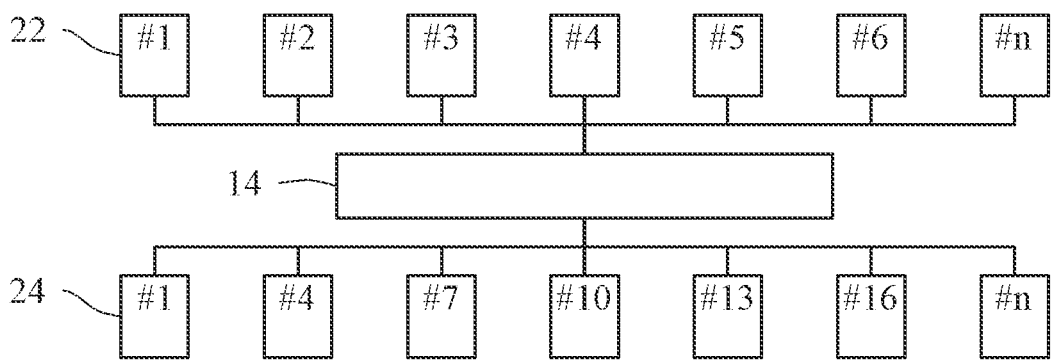
FIG. 3C is a representation of a series of video frames indicating an example of frame dropping in accordance with a fast motion speed at 3× the native frame rate.

In some or all embodiments, if the imaging processing unit 14 receives a special effect input signal associated with a fast motion recording operation, which represents a speed up or fast forward displaying at 3× the native frame rate, then the imaging processing unit 14 appropriately modifies the raw video data 22. Upon which, the raw frames 22 are processed using algorithm wherein every second and third frames are dropped, as best illustrated in FIG. 3C. Raw frame #1 can be appended in writer, the raw frames #2 and #3 can be skipped/dropped, then raw frame #4 can be written, then raw frames #5 and #6 can be skipped/dropped, and then raw frame #7 can be written, and so on until a modified or output video recording data 24 is generated in 3× fast motion speed. This process is conducted in real time, and the fast motion output video is recorded in place of the raw video data 22, and/or displayed in real time.

Figure 3D:
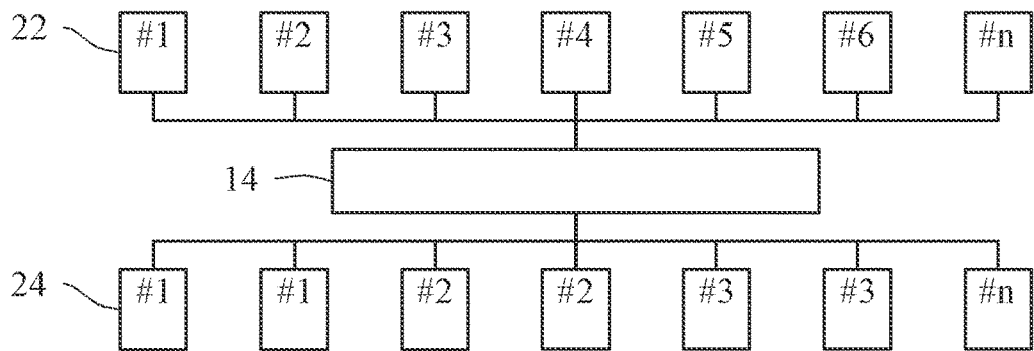
FIG. 3D is a representation of a series of video frames indicating an example of frame adding using frame copying in accordance with a slow motion speed at −2× the native frame rate.

For example, if the imaging processing unit 14 receives a special effect input signal associated with a slow motion recording operation, which represents a slowdown or slow motion displaying at −2× the native frame rate. Upon which, the raw frames 22 are processed using algorithm wherein every frame is duplicated/repeated, as best illustrated in FIG. 3D. Raw frame #1 can be appended in writer, then raw frame #1 is duplicated and written, then raw frame #2 is written, then raw frame #2 is duplicated and written, then raw frame #3 is written, and then raw frame #3 is duplicated and written, and so on until a modified or output video recording data 24 is generated in −2× slow motion speed. This process is conducted in real time, and the slow motion output video is recorded in place of the raw video data 22, and/or displayed in real time or immediately after recording has stopped and the post recording algorithm has completed processing the commands entered while recording.

Figure 3E:
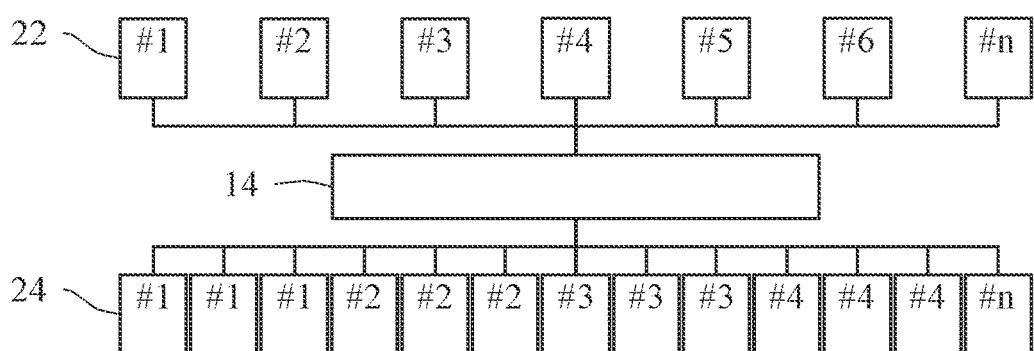
FIG. 3E is a representation of a series of video frames indicating an example of frame adding using frame copying in accordance with a slow motion speed at −3× the native frame rate.

In some or all embodiments, if the imaging processing unit 14 receives a special effect input signal associated with a slow motion recording operation, which represents a slowdown or slow motion displaying at −3× the native frame rate, then the imaging processing unit 14 appropriately modifies the raw video data 22. Upon which, the raw frames are processed using algorithm wherein every frame is duplicated/repeated at least twice, as best illustrated in FIG. 3E. Raw frame #1 can be appended in writer, then raw frame #1 is duplicated twice and each is written, then raw frame #2 is written, then raw frame #2 is duplicated twice and each is written, then raw frame #3 is written, and then raw frame #3 is duplicated twice and each written, and so on until a modified or output video recording data 24 is generated in −3× slow motion speed. This process is conducted in real time, and the slow motion output video is recorded.

Figure 3F:
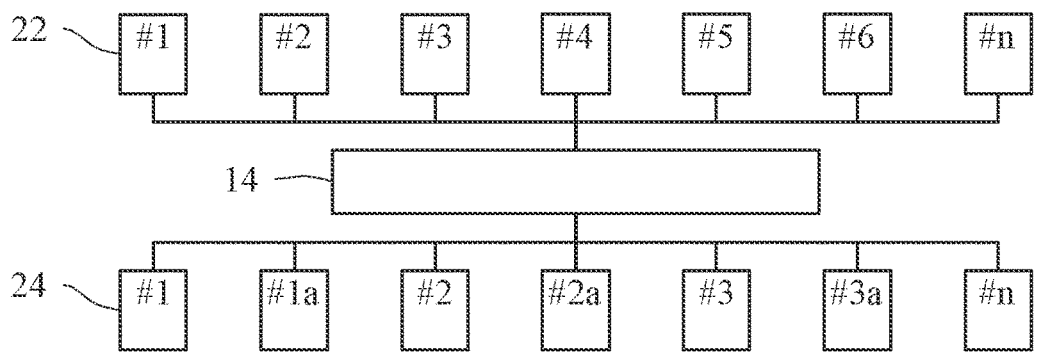
FIG. 3F is a representation of a series of video frames indicating an example of frame adding using frame blending in accordance with a slow motion speed at −2× the native frame rate.

In some or all embodiments, if the imaging processing unit 14 receives a special effect input signal associated with a slow motion recording operation, which represents a slowdown or slow motion displaying at −2× the native frame rate. Upon which, the raw frames 22 are processed using algorithm wherein new frames are created as a result of "blending" of two adjacent frames, as best illustrated in FIG. 3F. Raw frame #1 can be appended in writer, then raw frame #1 is "blended" with raw frame #2 to create 1 new frame, #1a, and then #1a is written, then raw frame #2 is written, then raw frame #2 is "blended" with raw frame #3 to create 1 new frame, #2a, and then #2a is written, then raw frame #3 is written, then raw frame #3 is "blended" with raw frame #4 to create 1 new frame, #3a, and then #3a is written, and so on until a modified or output video recording data 24 is generated in −2× slow motion speed. This process is conducted in real time, and the slow motion output video is recorded in place of the raw video data 22, and/or displayed in real time or immediately after recording has stopped and the post recording algorithm has completed processing the commands entered while recording.

Figure 3G:
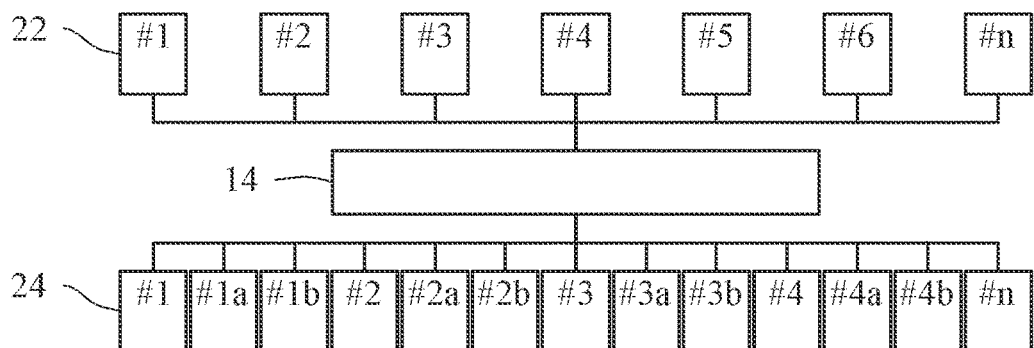
FIG. 3G is a representation of a series of video frames indicating an example of frame adding using frame blending in accordance with a slow motion speed at −3× the native frame rate.

In some or all embodiments, if the imaging processing unit 14 receives a special effect input signal associated with a slow motion recording operation, which represents a slowdown or slow motion displaying at −3× the native frame rate. Upon which, the raw frames 22 are processed using algorithm wherein new frames are created as a result of "blending" of two adjacent frames, as best illustrated in FIG. 3G. Raw frame #1 can be appended in writer, then raw frame #1 is "blended" with raw frame #2 to create 2 new frame, #1a & 1b, and then #1a & #1b are written, then raw frame #2 is written, then raw frame #2 is "blended" with raw frame #3 to create 2 new frame, #2a & #2b, and then #2a & #2b are written, then raw frame #3 is written, then raw frame #3 is "blended" with raw frame #4 to create 2 new frame, #3a & #3b, and then #3a & #3b are written, and so on until a modified or output video recording data 24 is generated in −3× slow motion speed. This process is conducted in real time, and the slow motion output video is recorded in place of the raw video data 22, and/or displayed in real time or immediately after recording has stopped and the post recording algorithm has completed processing the commands entered while recording.

It can be appreciated that additional fast and/or slow motion operations can be performed with greater fast motion or slow motion speeds than those described above. It can further be appreciated that a combination of fast motion and slow motion speeds can be implemented to a single raw video data in real time. Thus creating output/final video recording data containing portions of native speed rate, fast motion speed, slow motion speed or any combination thereof.

Figure 4:
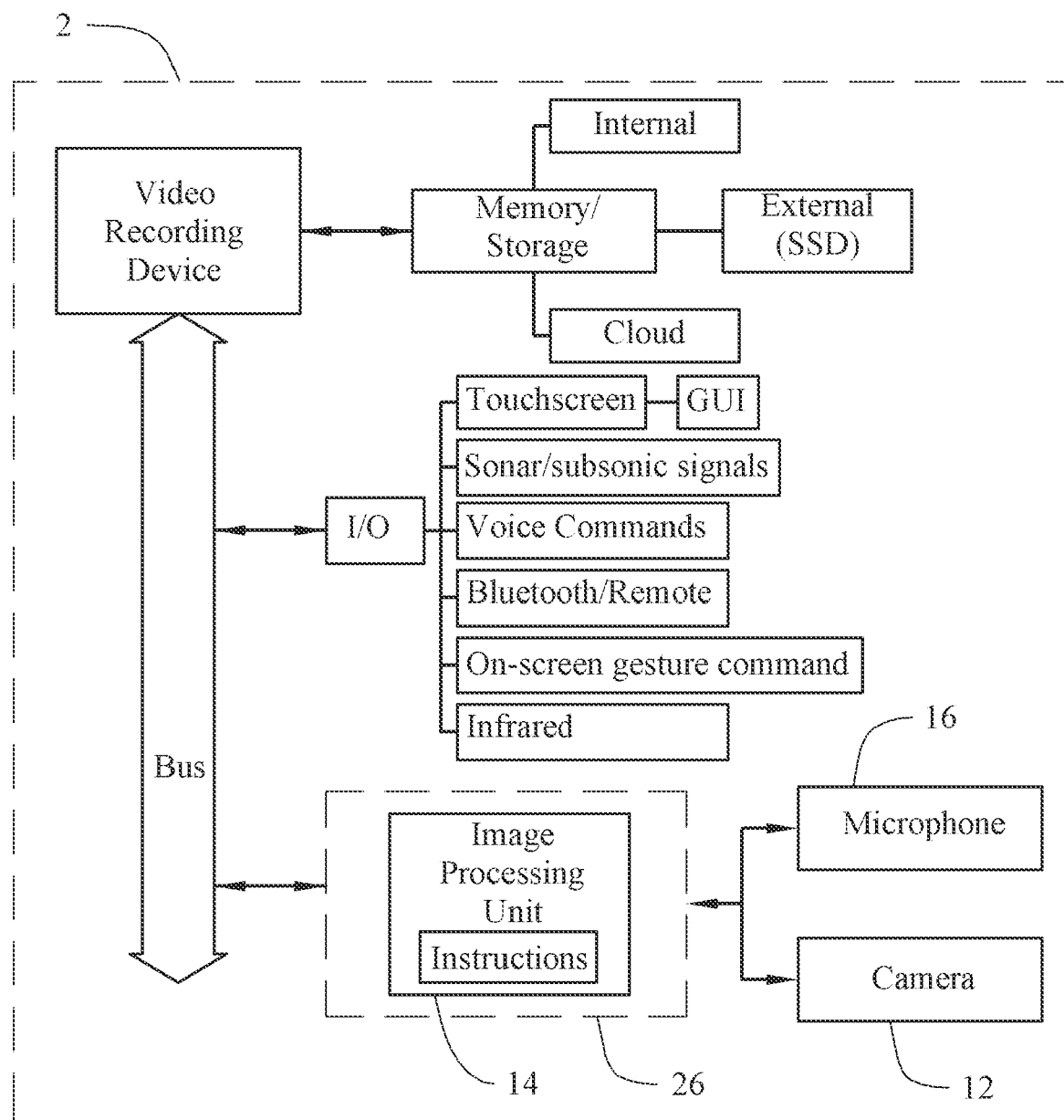
FIG. 4 illustrates an exemplary integrated circuit chip embedded in an electronic computing device that may be used to implement an embodiment of the present technology.
Figure 5:
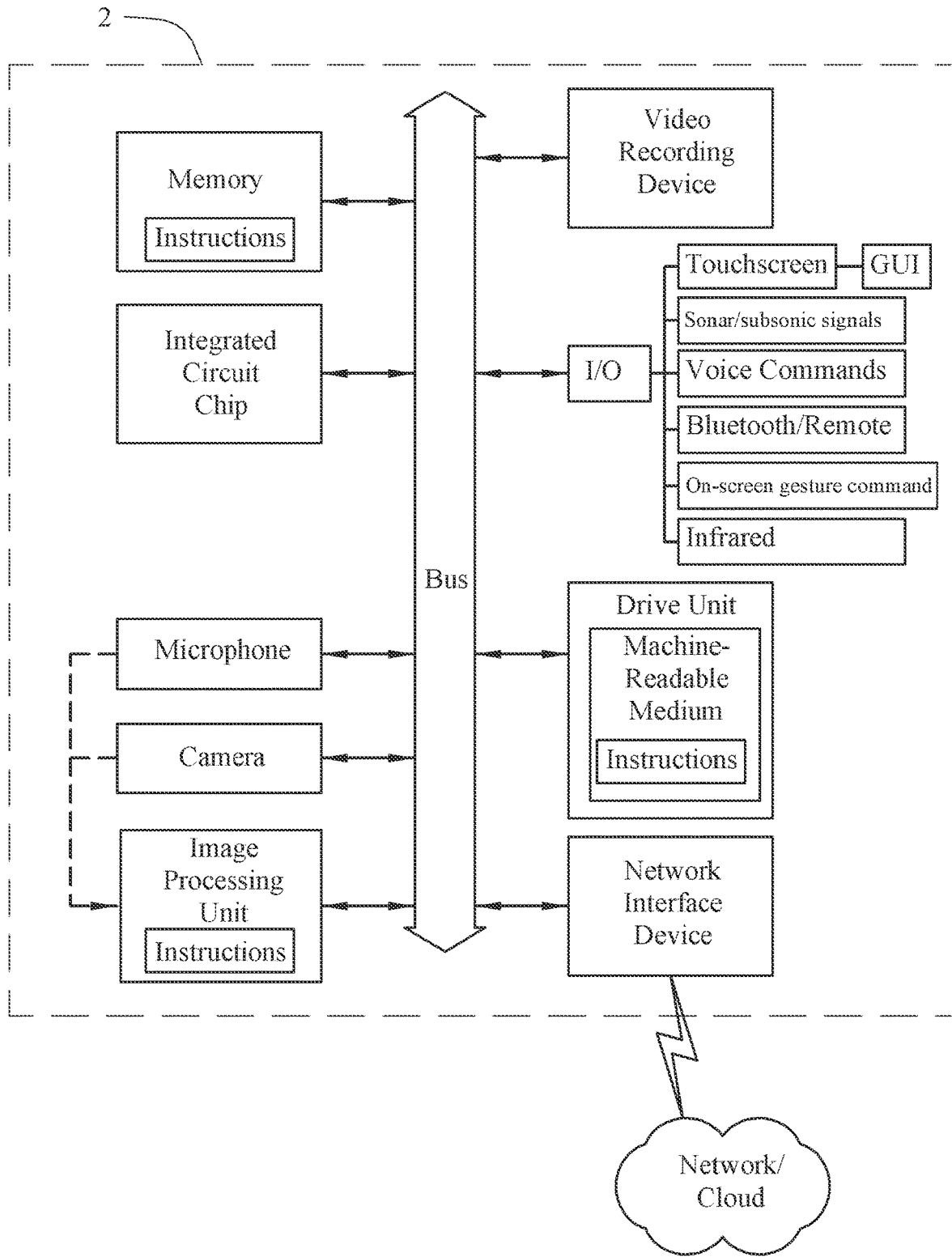
FIG. 5 illustrates an exemplary electronic computing device that may be used to implement an embodiment of the present technology.

With reference to FIGS. 4 and 5, a companion software application can be associated with and/or executed by the image processing unit 14 or an electronic computing device, machine or system 2 that is operably associated with the image processing unit 14. FIG. 4 is a diagrammatic representation of the image processing unit 14 incorporated with an integrated circuit chip 26, which can be embedded with an example machine or component thereof, such as the camera 12, in the form of the electronic device 2, within which a set of instructions for causing the component or electronic device to perform any one or more of the methodologies discussed herein may be executed. Integrated circuit chip 26 containing the image processing unit 14 can be configured or configurable to include firmware for its operation. It can be appreciated that the integrated circuit chip 26 can be embedded with the camera 12, the display unit 20, or other components of the electronic device 2. It can be appreciated that remote controls connected to the electronic device or camera through Bluetooth® or other protocols can be utilized.

The integrated circuit chip 26 can include a computer or machine-readable medium on which is stored one or more sets of instructions and data structures (e.g., instructions) embodying or utilizing any one or more of the methodologies or functions described herein. The instructions are configured or configurable for operation of the image processing unit 14, which can receive operational instructions from the interface or GUI.

The device 2 can further include a number of different input (including simultaneous input from multiple feeds) and/or output (I/O) systems such as, but not limited to, a touchscreen and GUI, sonar or subsonic transmitter, receiver and/or transceiver, voice command, Bluetooth®, remote controller, on-screen gesture command or infrared. The device 2 can further record video or images from the video recording device to a memory/storage system such as, but not limited to, an internal memory, an external memory, external solid-state drive (SSD) or the cloud.

FIG. 5 is a diagrammatic representation of the image processing unit 14 incorporated with the electronic device 2 within which a set of instructions for causing the electronic device to perform any one or more of the methodologies discussed herein may be executed.

In various example embodiments, the electronic device 2 operates as a standalone device or may be connected (e.g., networked) to other devices. In a networked deployment, the electronic device may operate in the capacity of a server or a client machine in a server-client network environment, or as a peer machine in a peer-to-peer (or distributed) network environment. The electronic device may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that device. Further, while only a single electronic device is illustrated, the term "device" shall also be taken to include any collection of devices that individually or jointly execute a set (or multiple sets) of instructions to perform any one or more of the methodologies discussed herein.

The example electronic device 2 includes a processor or multiple processors (e.g., CPU, GPU, or both), and a main memory and/or static memory, which communicate with each other via a bus. In other embodiments, the electronic device 2 may further include a video display (e.g., a liquid crystal display (LCD)). The electronic device 2 may also include an alpha-numeric input device(s)(e.g., a keyboard), a cursor control device (e.g., a mouse), a voice recognition or biometric verification unit (not shown), a drive unit (also referred to as disk drive unit), a signal generation device (e.g., a speaker), a universal serial bus (USB) and/or other peripheral connection, and a network interface device. In other embodiments, the electronic device 2 may further include a data encryption module (not shown) to encrypt data.

The image processing unit 14 can be a module operably associated with the drive unit, with the drive unit including a computer or machine-readable medium on which is stored one or more sets of instructions and data structures (e.g., instructions) embodying or utilizing any one or more of the methodologies or functions described herein. The instructions may also reside, completely or at least partially, within the memory and/or within the processors during execution thereof by the electronic device 2. The memory and the processors may also constitute machine-readable media.

The instructions may further be transmitted or received over a network via the network interface device utilizing any one of a number of well-known transfer protocols (e.g., Extensible Markup Language (XML)). While the machine-readable medium is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the device and that causes the device to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

It is appreciated that the software application is configured or configurable to be stored in any memory of the electronic device 2 or on a remote computer in communication with the electronic device 2. The software application is configured or configurable to include the interface capable of allowing a user to define a custom frame speed rate of the video to be recorded without changing the default frame speed rate by the camera 12.

Referring now in more to methods for controlling a special effects operation of live video capturing data in real time. As outline, in some or all embodiments, the methods comprise capturing a video of real world scene with the camera; playing at normal speed on a graphical user interface the video being captured; changing the playing speed on the graphical user interface of the video being recorded from the normal playing speed to a modified playing speed in response to a user interface input received by the graphical user interface. Reference will now be made in more detail to specific processes according to some or all embodiments for controlling special effects operations of live video capturing data in real time.

Figure 6:
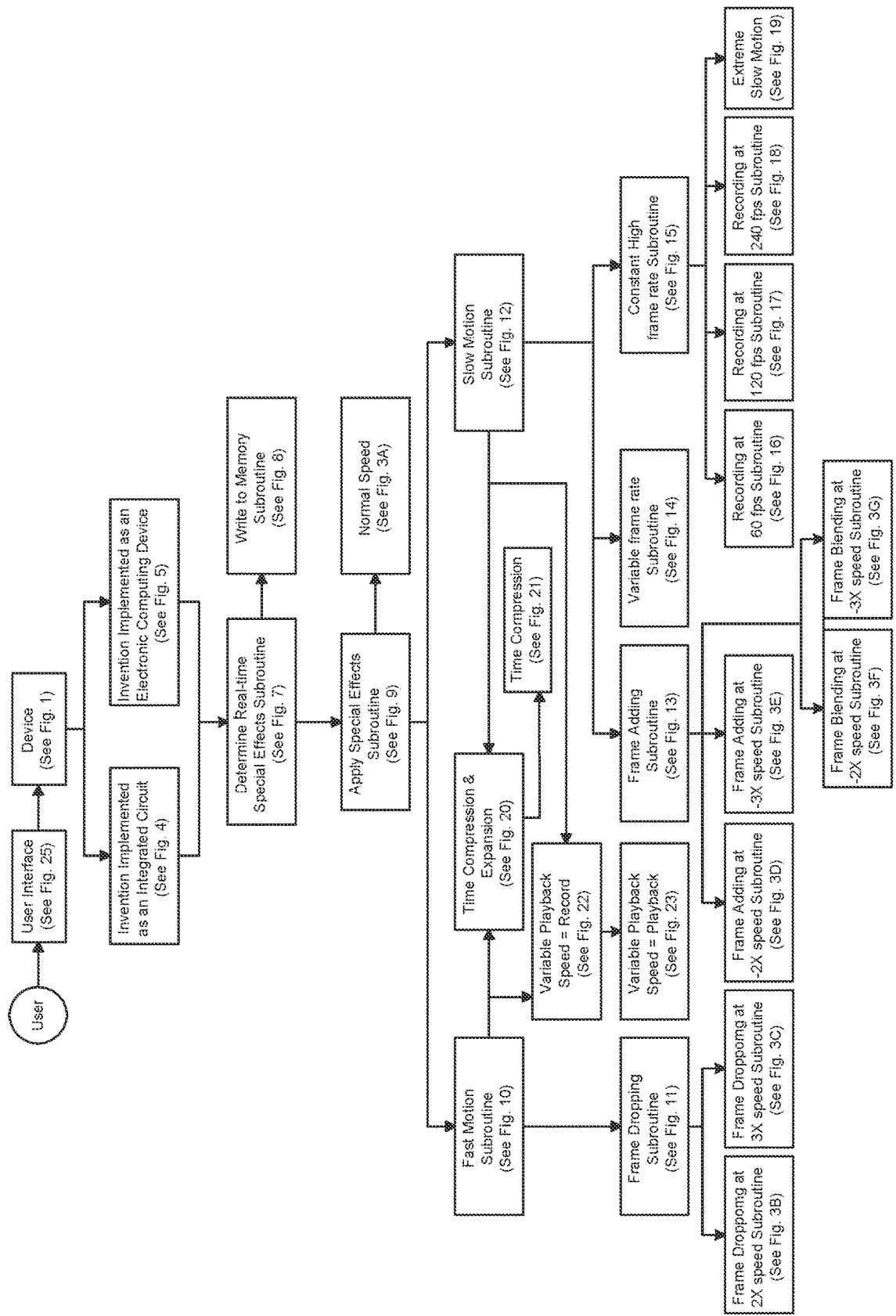
FIG. 6 is a flow chart of an example of the overall process including subroutines that can be utilized.
Figure 7:
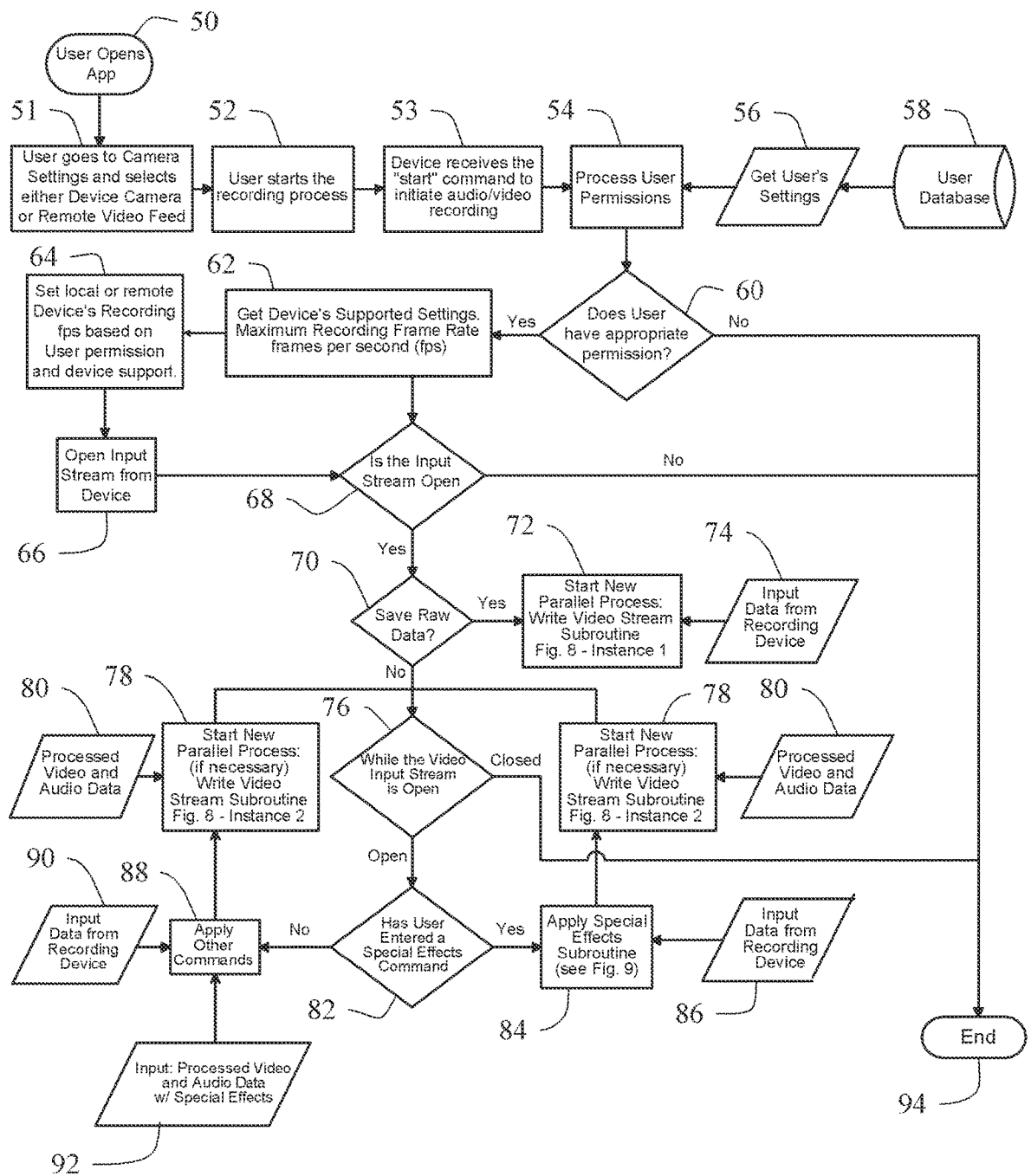
FIG. 7 is a flow chart of an example of a main process that initially determines if a speed up and/or slowdown special effects should be utilized in real time.
Figure 24:
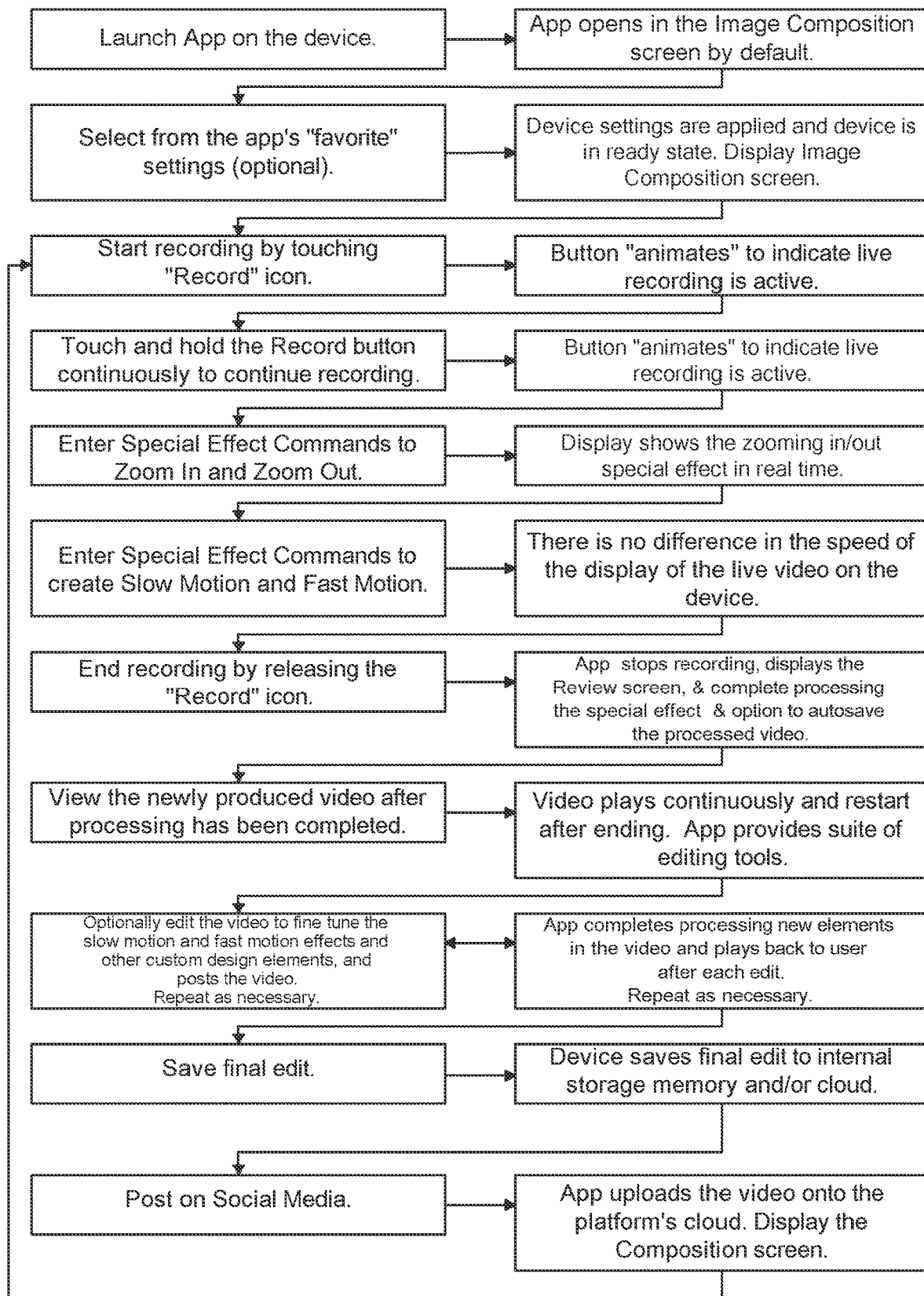
FIG. 24 is a flow chart of an example a possible process by a user utilizing the user interface associated with the present technology.

A possible process of the software application or interface is illustrated in FIGS. 6, 7 and 24. The interface and/or software application allows the user to select a predefined video recording speed rate in real time, without altering the raw speed rate provided by the camera. This makes the present technology not camera or device dependent. FIG. 6 illustrates an overall process of the present technology including the user interface, the device, and the subroutines associated with the overall process.

Referring to FIG. 7, the process of the present technology is described which determines if any special effects option has been requested for raw video data stream from the camera. For exemplary purposes, the special effects can be the changing of video speed rate by modifying of frames in the raw video data. The process can be configured or configurable to initiate subroutines and/or subprocesses to assist in the overall process.

The present technology software application is initiated and the user interface is provided to the user. An initial step can be for the user to opens the App 50. After which, step 51 allows the user to go into Camera Settings and selects either to use the electronic device's camera or a remote video feed. The process then proceeds to step 52 wherein the user starts the recording process. The camera or electronic device receives a "start" command 53 to initiate audio/video recording. It can be appreciated that the camera "start" command can be initiated by the present technology software application, a camera application, any other application associated with the electronic device or with a remote device in communication with the electronic device or camera.

Step 54 in the process can be to determine if the user has appropriate permission to proceed with the process. At step 56, permission attributes can be obtained from separate user settings, profiles, databases, keys, accounts, and the like. The permission attributes can be obtained from a user database 58.

Step 60 determines if the user has the appropriate permission, and if the user does not have the appropriate permission, then the process is stopped or ends (step 94). If the user does have appropriate permission then the process proceeds to step 62, which will get the device's supported settings, including a maximum recording frame rate frames per second (fps). Then the process sets the local or remote device's recording fps based on user permission and device support in step 64, and then opens an input stream from the device in step 66.

Once the raw data input stream from the camera is communicated to the image processing unit, then the process will then determine if the video data stream from the camera is opened in step 68, while receiving information from step 62. This request can be utilized to check if image processing unit is receiving the raw video data from the camera. The raw video data stream may include an integral or peripheral microphone, and can be passed to the image processing unit and not to the memory unit or video recording device. If the process determines that the input stream is not opened, then the process is stopped or ends (step 94).

If the input stream is open, then the process proceeds to step 70 to determine if the raw video data should be saved/recorded. If the raw video data is to be saved, then the process proceeds to step 72 to initiate a new parallel process utilizing the write video stream subroutine as illustrated in instance 1 in FIG. 8. Additional input data from the recording device (step 74) can be saved with the raw video data.

Figure 9:
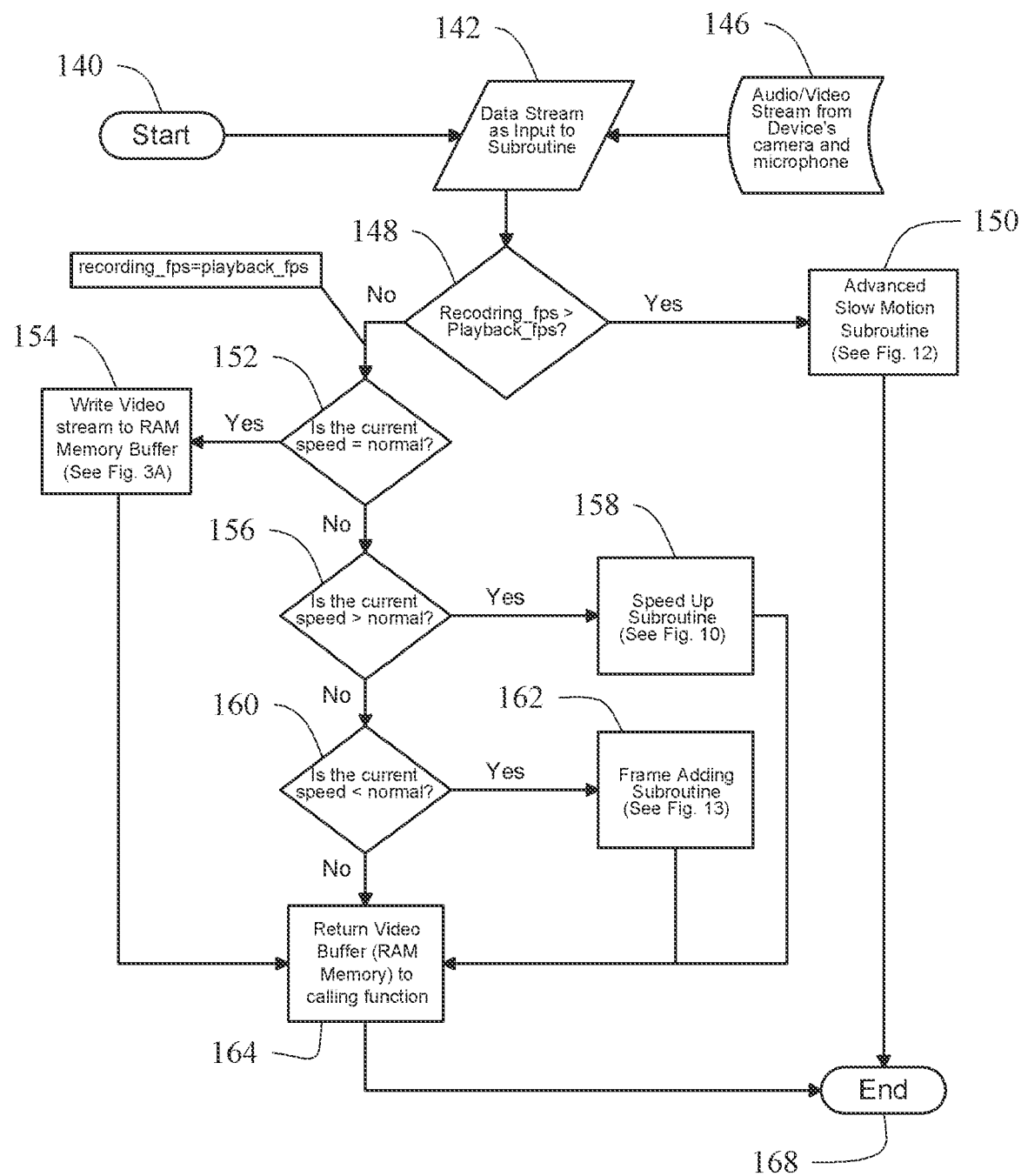
FIG. 9 is a flow chart of an example of the apply special effects subroutine associated with the present technology.

If it was determined in step 70 that the raw video data is not to be saved, then process proceeds to step 76 to determine if while the video input stream is open, and if it is open then the process proceeds to step 76 to determine if a special effect command has been entered by the user (step 82). The special effect command can be entered in this process by way of the interface. If the user entered a special effect command, then step 84 is initiated to apply a special effect subroutine, as best illustrated in FIG. 9. Additional input data from the recording device (step 86) can be included with the application of special effects in step 84.

If the user has not entered a request for a special effect in step 82, such as a change in video speed rate, then step 88 is initialized which applies other commands, such as input data from the recording device (step 90) and/or input processed video and audio data with special effects (step 92). Step 88 can include other information from step 84.

If the video input stream is determined to be closed in step 76, then the process precedes stops or ends (step 94).

Figure 8:
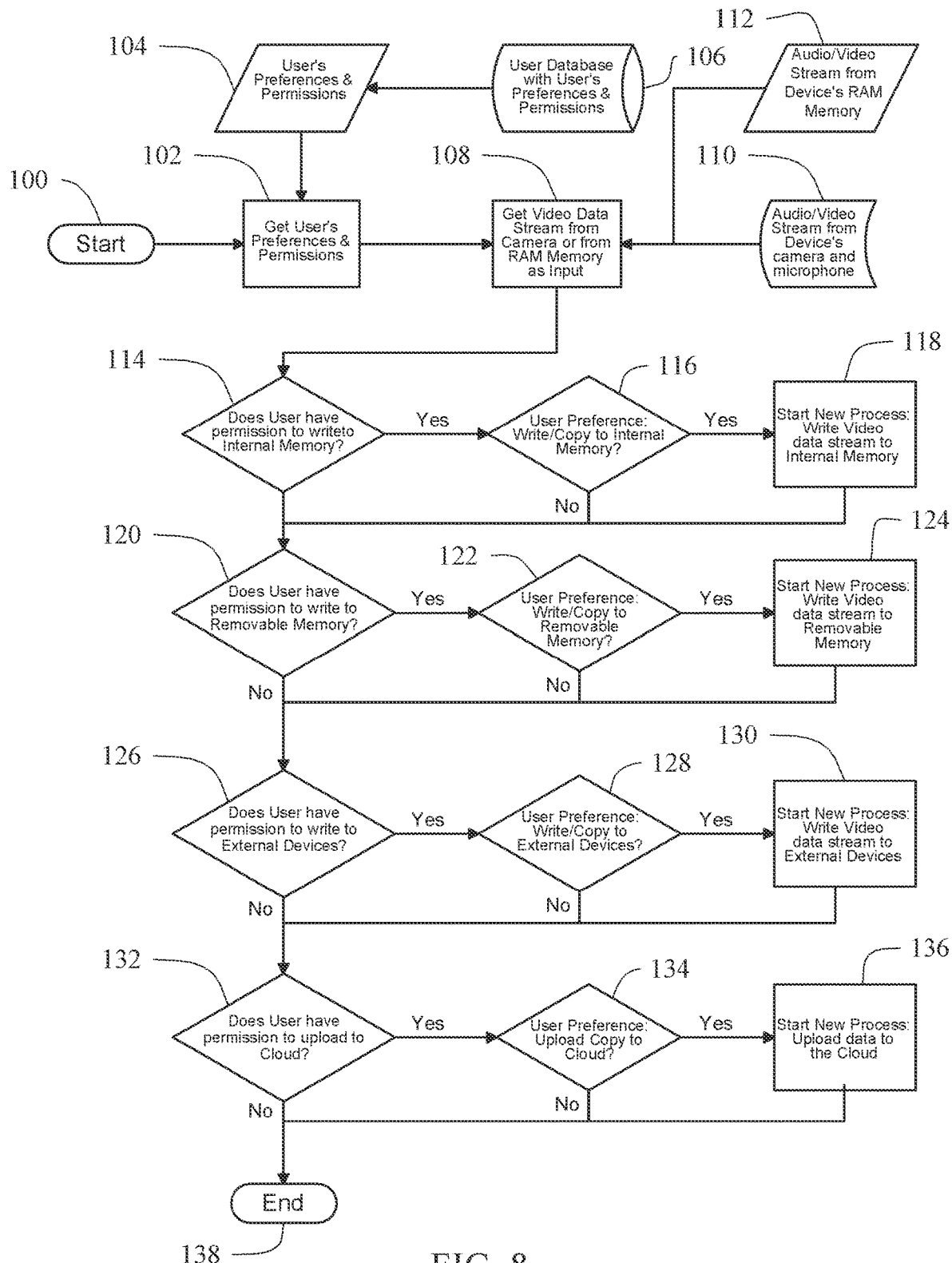
FIG. 8 is a flow chart of an example of the write video stream subroutine associated with the present technology.

If necessary, step 78 can initiate a new parallel process utilizing the write video stream subroutine as illustrated in instance 2 in FIG. 8. Additional processed video and audio data (step 80) can be saved with the video data from step 78. The new parallel process of step 78 can be initiated separately and independently from steps 84 and/or 88. After step 78 the process proceeds back to step 76.

This process can write the raw video stream using the write video stream subroutine after the raw video data stream has been either processed using apply special effect subroutine or has retained the raw video data stream.

Referring to FIG. 8, the write video stream subroutine is describe which provides the process to write/save/record the video data stream to one or more internal memory, to one or more removable memory in communication with the electronic device, to one or more external devices, and/or to upload to one or more cloud devices or accounts.

The present technology process determines in sequence which device or devices is the video data stream to be written to, and if the user has appropriate permission for each of the steps associated with the write video stream subroutine. If the user does have the appropriate permission to write to that particular device or devices, then the process writes the video data stream to that particular device or devices in accordance with any user preferences.

This subroutine starts (step 104) upon initiation by a command from the process in FIG. 7. This subroutine then proceeds to obtain user's preferences and permissions (step 102) from the process in FIG. 7 or a database (steps 104 and 106). After step 102, this subroutine acquires the raw video data stream from the camera as an input (step 108). The raw video data stream can be audio/video stream from the electronic device, the camera and/or the microphone, as per step 110 and/or audio/video stream from the device's RAM memory and/or non-volatile long term memory, as per step 112.

After acquisition of the raw video data stream, step 114 of this subroutine is initiated which determines if the user has permission to write to internal memory? If the user does have the appropriate permission and if the user preferences allows for a write/copy action to internal memory (step 116), then a new process is started at step 118 which writes the video data stream to the internal memory.

If the user does not have permission to write to the internal memory from step 114, or if the user preferences in step 116 do not allow the write/copy action in step 116, or after starting the process in step 118, then this subroutine continues to determine if the user has permission to write to removable memory (step 120). If the user does have the appropriate permission and if the user preferences allows for a write/copy action to removable memory (step 122), then a new process is started at step 124 which writes the video data stream to the removable memory.

If the user does not have permission to write to the removable memory from step 120, or if the user preferences in step 122 does not allow such an action, or after starting the process in step 124, then this subroutine continues to determine if the user has permission to write to external devices (step 126). If the user does have the appropriate permission and if the user preferences allows for a write/copy action to external devices (step 128) is requested, then a new process is started at step 130, which writes the video data stream to the external devices.

If the user does not have permission to write to the external devices from step 126, or if the user preferences in step 128 do not allow the write/copy action in step 128 does not allow such an action, or after starting the process in step 130 is completed, then this subroutine continues to determine if the user has permission to write to cloud (step 132). If the user does have the appropriate permission and if the user preferences allows for a write/copy action to the cloud (step 134), then a new process is started at step 136 which writes the video data stream to the cloud.

If the user does not have permission to write to the cloud from step 132, or if the user preferences from step 134 does not allow such an action, or after starting the process in step 136, then this subroutine stops or ends (step 138).

Referring to FIG. 9, the apply special effects subroutine is described which determines if a special effects option has been requested and to the specific operation of the special effects request. This subroutine starts (step 140) upon initiation by a command from the process in FIG. 7. After starting, this subroutine acquires the raw video data stream from the camera as an input (step 142). The raw video data stream can be audio/video stream from the electronic device, the camera and/or the microphone, as per step 146.

Figure 12:
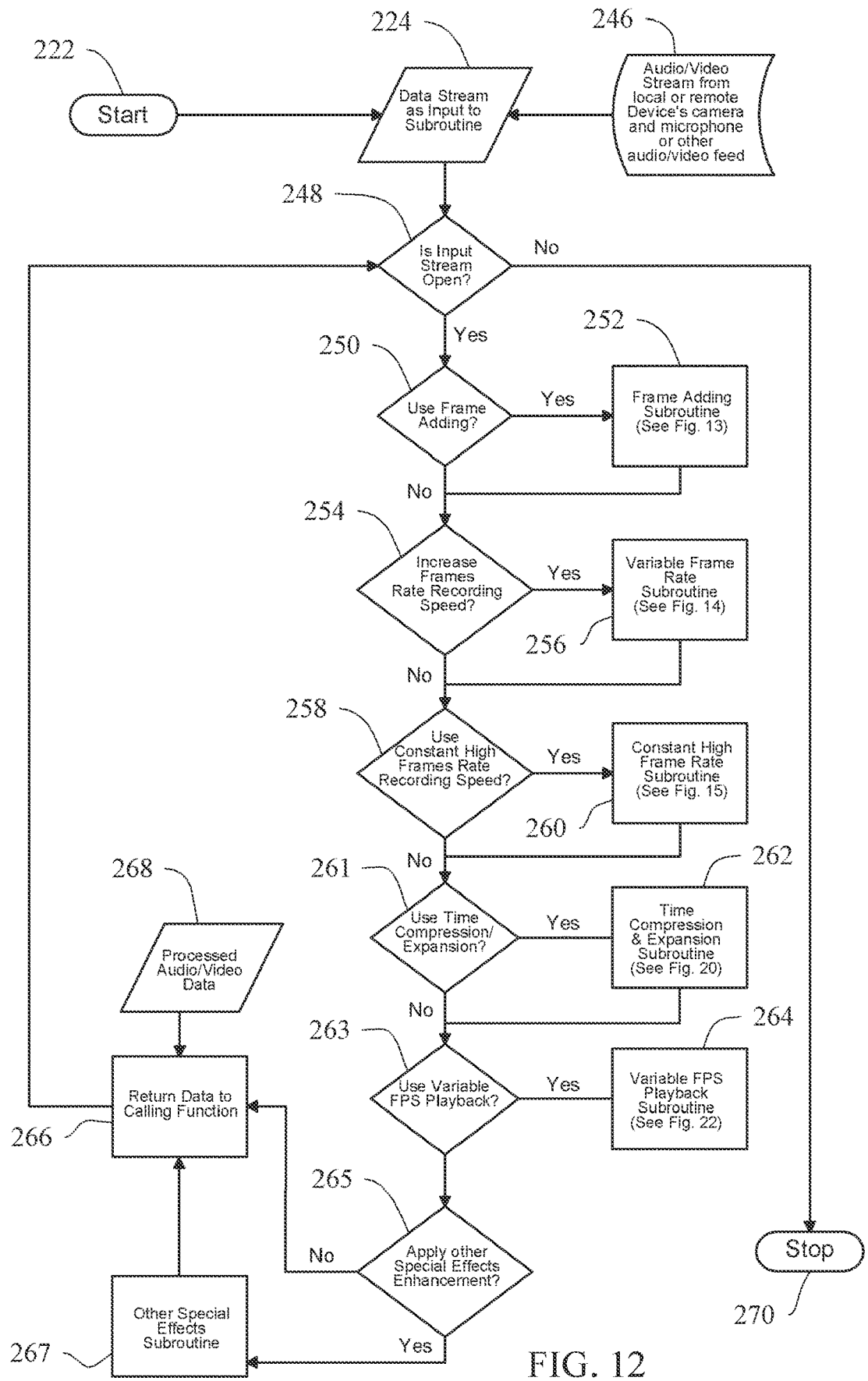
FIG. 12 is a flow chart of an example of the advanced slow motion subroutine associated with the present technology.

After acquisition of the raw video data stream, step 148 is initiated, which determines if the current speed is equal to the normal or native speed, such as but limited to Recording_fps is greater than the Playback_fps. If the user has made a speed change request, then step 150 initiates an advanced slow motion subroutine, as best illustrated in FIG. 12. After the completion of step 150, this subroutine stops or ends (step 168).

If the user has not made a speed change request such that the new speed is not set to normal, such as if the Recording_fps is not greater than the Playback fps or if the Recording_fps is equal to the Playback_fps, then this subroutine proceeds to step 152 which determines if the current speed is equal to the normal or native speed. If the user has made a speed change request or if user has set the speed back to normal from a previously modified speed setting, then this subroutine continues to step 154 to write video stream to RAM memory and/or non-volatile long term memory buffer, as per FIG. 3A. After step 154 is completed, the subroutine proceeds to step 164 to return video buffer (RAM memory and/or non-volatile long term memory) to a calling function, which can be as step to determine if the video stream is open or this subroutine stops or ends (step 168).

Figure 10:
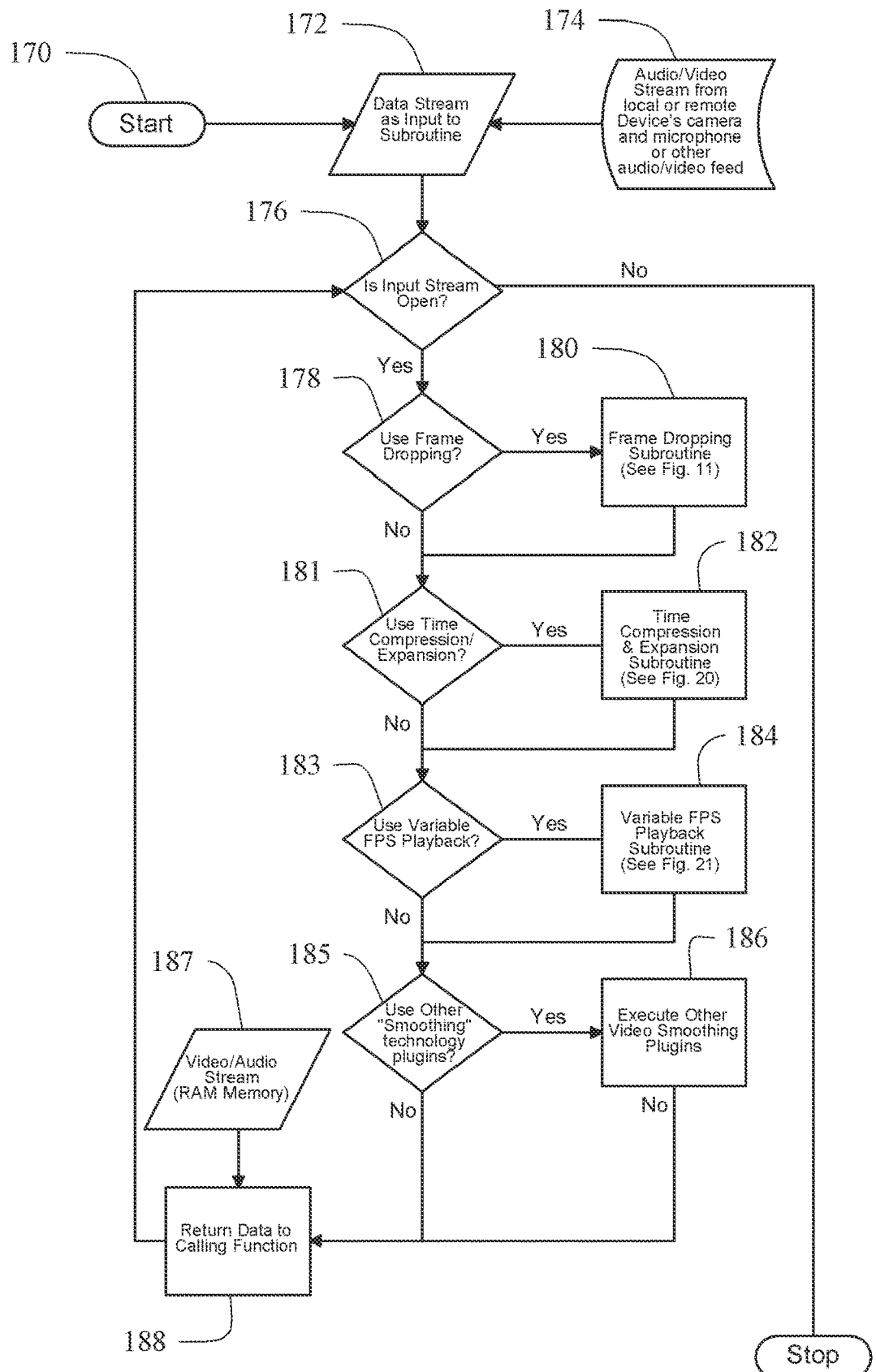
FIG. 10 is a flow chart of an example of the speed up subroutine associated with the present technology.

If the user has not made a speed change request such that the new speed is not set to normal, this subroutine will then proceed to step 156, which determines if the speed change request is faster or slower than the normal speed of the raw video data stream. This can be accomplished by determining if the current speed is greater than normal. If the current speed is greater than the normal spend, then this subroutine will initiate a speed up subroutine (step 158), as best illustrated in FIG. 10. After the speed up subroutine is completed, this subroutine will then initiate step 164 to return video buffer (RAM memory and/or non-volatile long term memory) to the calling function.

Figure 13:
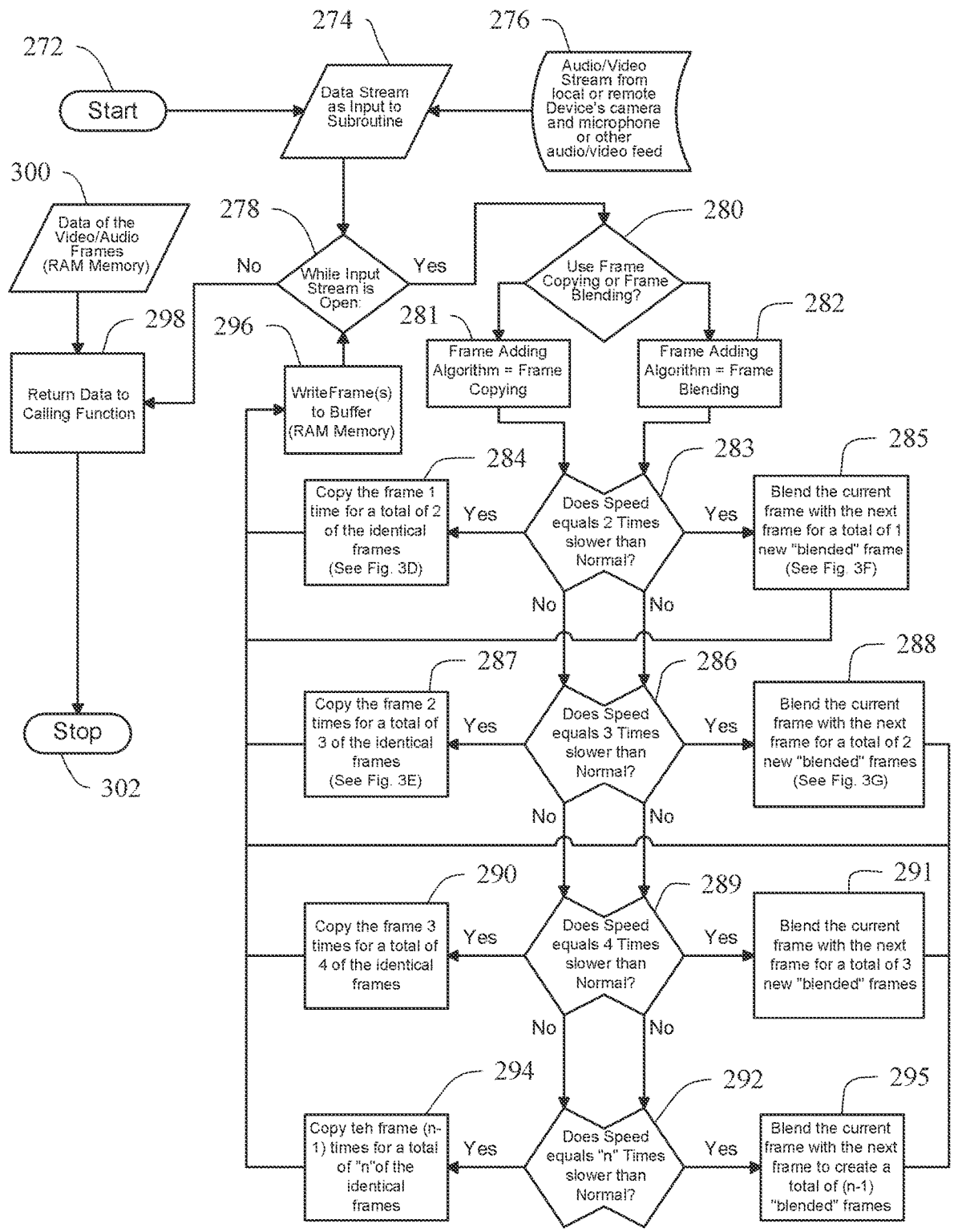
FIG. 13 is a flow chart of an example of the frame adding subroutine in simulating slow motion associated with the present technology.

If the requested current speed is not greater than the normal speed, then this subroutine continues to step 160 to determine if the current speed is to be less than normal. If the current speed is less than the normal spend, then this subroutine will initiate a slowdown subroutine (step 162), as best illustrated in FIG. 13. After the slowdown subroutine is completed or if the current speed is not to be less than normal, then this subroutine will initiate step 164 to return video buffer (RAM memory and/or non-volatile long term memory) to the calling function.

Referring to FIG. 10, the speed up subroutine is described which determines if a frame dropping option and/or other plugins are required. This subroutine starts (step 170) upon initiation by a command from the apply special effects subroutine (FIG. 9, step 158). After starting, this subroutine acquires the raw video data stream from the camera and/or from streamed input from a remote video feed as an input (step 172). The raw video data stream can be audio/video stream from the local electronic device including the camera and/or microphone, from a remote device including the camera and/or the microphone, or from other audio/video feeds, as per step 174.

After acquisition of the raw video data stream, step 176 of this subroutine is initiated which determines if the video data input stream from the camera is open. If it is not open then this subroutine proceeds to step 189, which stops or ends this subroutine.

Figure 11:
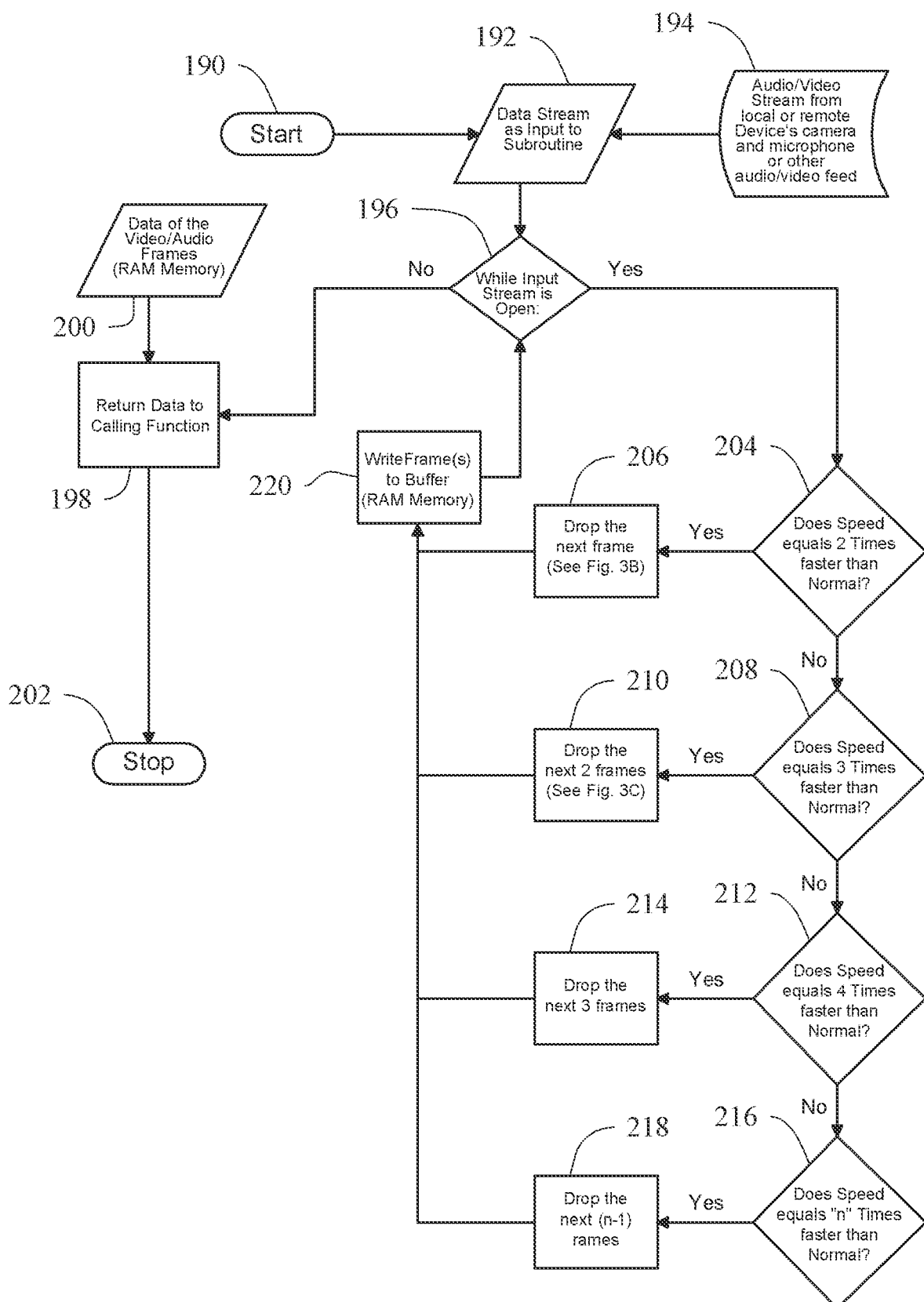
FIG. 11 is a flow chart of an example of the frame dropping subroutine in simulating fast motion associated with the present technology.

If the input stream is open then this subroutine determines if frame dropping is required (step 178), and if required then continues to step 180 that initiates a frame dropping subroutine as best illustrated in FIG. 11.

Figure 20:
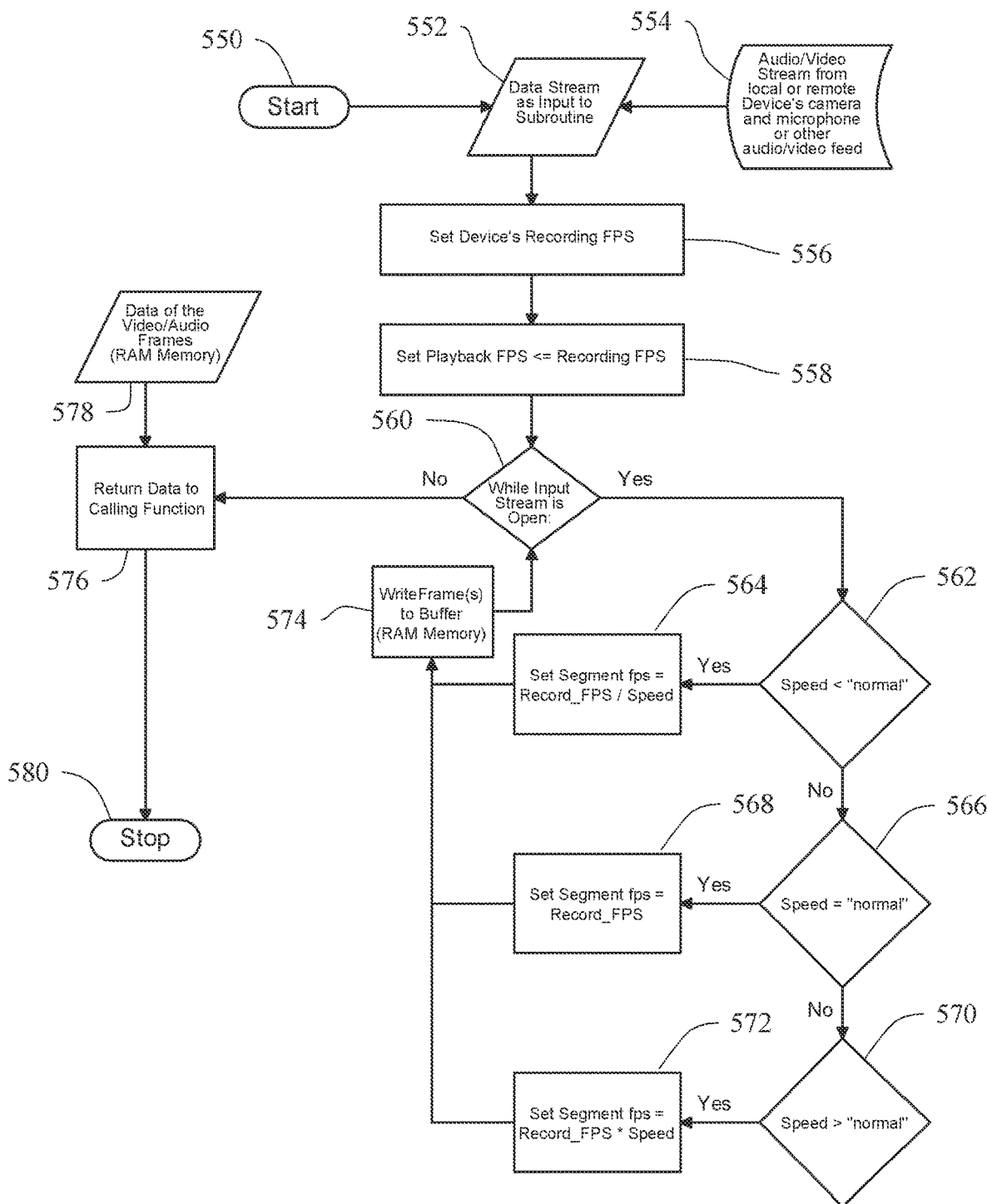
FIG. 20 is a flow chart of an example of time expansion and compression subroutine to simulate slow motion and fast motion associated with the present technology.

If frame dropping is not required from step 178 or after the frame dropping subroutine of step 180 is completed, then this subroutine proceeds to step 181 to determine if the use of time compression or expansion is requested, and if required then continues to step 182 that initiates a time compression and expansion subprocess as best illustrated in FIG. 20.

Figure 21:
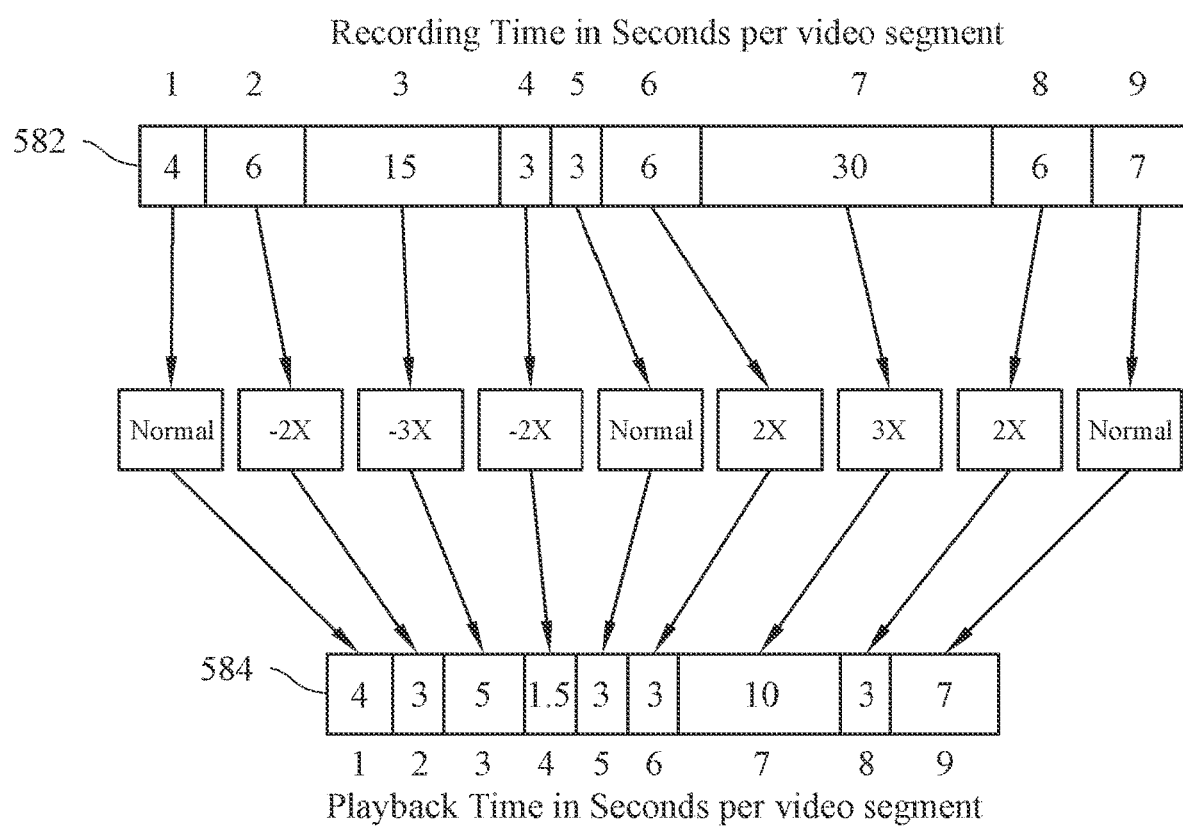
FIG. 21 is a representation of a series of associated recording and playback video segments per time in seconds indicating an example of a time compression of FIG. 20.

If frame time compression and/or expansion is not required from step 181 or after the time compression and/or expansion subprocess of step 182 is completed, then this subroutine proceeds to step 183 to determine if the use of variable FPS playback is requested, and if required then continues to step 184 that initiates a variable FPS playback subprocess as best illustrated in FIG. 21.

If frame variable FPS playback is not required from step 183 or after the variable FPS playback subprocess of step 184 is completed, then this subroutine proceeds to step 185 to determine if other plugins or applications are requested.

In the case that other plugins or application is requested, then this subroutine proceeds to step 186 to execute the other plugins or applications and apply their functions to the raw video stream from step 178 or modified video stream from any of steps 180, 182 and/or 184. For example, other plugins or applications can be, but not limited to, smoothing technology and the like. These other plugins or applications can be integrated with the present technology software application, or can be remote from the present technology but accessible and operable with present technology software application.

In the case the user does not request the use of other plugins or applications from step 185 or after the other plugin process of step 186 is completed, then this subroutine will continue to step 188 to return data to a calling function that loops back to step 176 to determine if the video input stream is open. Step 188 can receive video/audio streams from RAM memory and/or non-volatile long term memory (step 187).

It can be appreciated that this apply special effects subroutine includes a looped subprocess including steps 178, 180, 185, 186 and 188 until the input stream is determined to not be open in step 176.

With reference to FIG. 11, the frame dropping subroutine is described which determines if and which frames are dropped to simulate the requested fast motion video. An exemplary case for this subroutine can be if the Record_fps is equal to the Playback_fps. This subroutine starts (step 190) upon initiation by a command from the speed up subroutine. After starting, this subroutine acquires the raw video data stream from the camera as an input (step 192). The raw video data stream can be audio/video stream from the local electronic device including the camera and/or microphone, from a remote device including the camera and/or the microphone, or from other audio/video feeds, as per step 194.

After acquisition of the raw video data stream, step 196 of this subroutine is initiated which determines if the video data input stream from the camera is open. If step 196 determines that the input stream is not open, then this subroutine proceeds to step 198, which returns data to a calling function being step 180 in FIG. 10. Step 198 can receive data of the video/audio frames from RAM memory and/or non-volatile long term memory (step 200). After the step 198 is completed, then this subroutine stops or ends (step 202).

While the input stream is open from step 196, this subroutine determines if the speed equals 2 times faster than normal (step 204). If so then step 206 is initialized which will drop the next frame, as per FIG. 3B. After which, this subroutine proceeds to step 220 to write frame(s) to buffer (RAM memory and/or non-volatile long term memory). After step 220, this subroutine returns to step 196.

If the speed does not equal 2 times faster than normal (step 204), then this subroutine determines if the speed equals 3 times faster than normal (step 208). If so then step 210 is initialized which will drop the next 2 frames, as per FIG. 3C. After which, this subroutine proceeds to step 220 and then returns to step 196.

If the speed does not equal 3 times faster than normal (step 208), then this subroutine determines if the speed equals 4 times faster than normal (step 212). If so then step 214 is initialized which will drop the next 3 frames. After which, this subroutine proceeds to step 220 and then returns to step 196.

If the speed does not equal 4 times faster than normal (step 212), then this subroutine will sequentially continue to determine if the speed equals "n" times faster than normal (step 216). If so then each "nth" step will initialize a drop the next (n-1) frames action (step 218). After which, this subroutine proceeds to step 220 and then returns to step 196.

It can be appreciated that this frame dropping subroutine determines if a frame should or should not be dropped on a frame-by-frame basis. The result is a modified video stream with specific frames removed to simulate a fast motion video of predetermined speed. This modified video stream is then written/saved to memory in real time.

It can be appreciated that this frame dropping subroutine includes a looped subprocess including steps 204-220 until the input stream is determined to not be open in step 196.

Referring to FIG. 12, the advanced slow motion subroutine is described which determines if a frame adding option or other plugins are required. This subroutine starts (step 222) upon initiation by a command from the apply special effects subroutine. After starting, this subroutine acquires the raw video data stream from the camera as an input (step 224). The raw video data stream can be audio/video stream from the local electronic device including the camera and/or microphone, from a remote device including the camera and/or the microphone, or from other audio/video feeds, as per step 246.

After acquisition of the raw video data stream, step 248 of this subroutine is initiated which determines if the video data input stream from the camera is open. If step 248 determines that the input stream is not open, then this subroutine proceeds to step 270, which stops this subroutine.

While the input stream is open from step 248, this subroutine determines if frame adding is required (step 250), and if required then continues to step 252 that initiates a frame adding subroutine, as best illustrated in FIG. 13.

Figure 14:
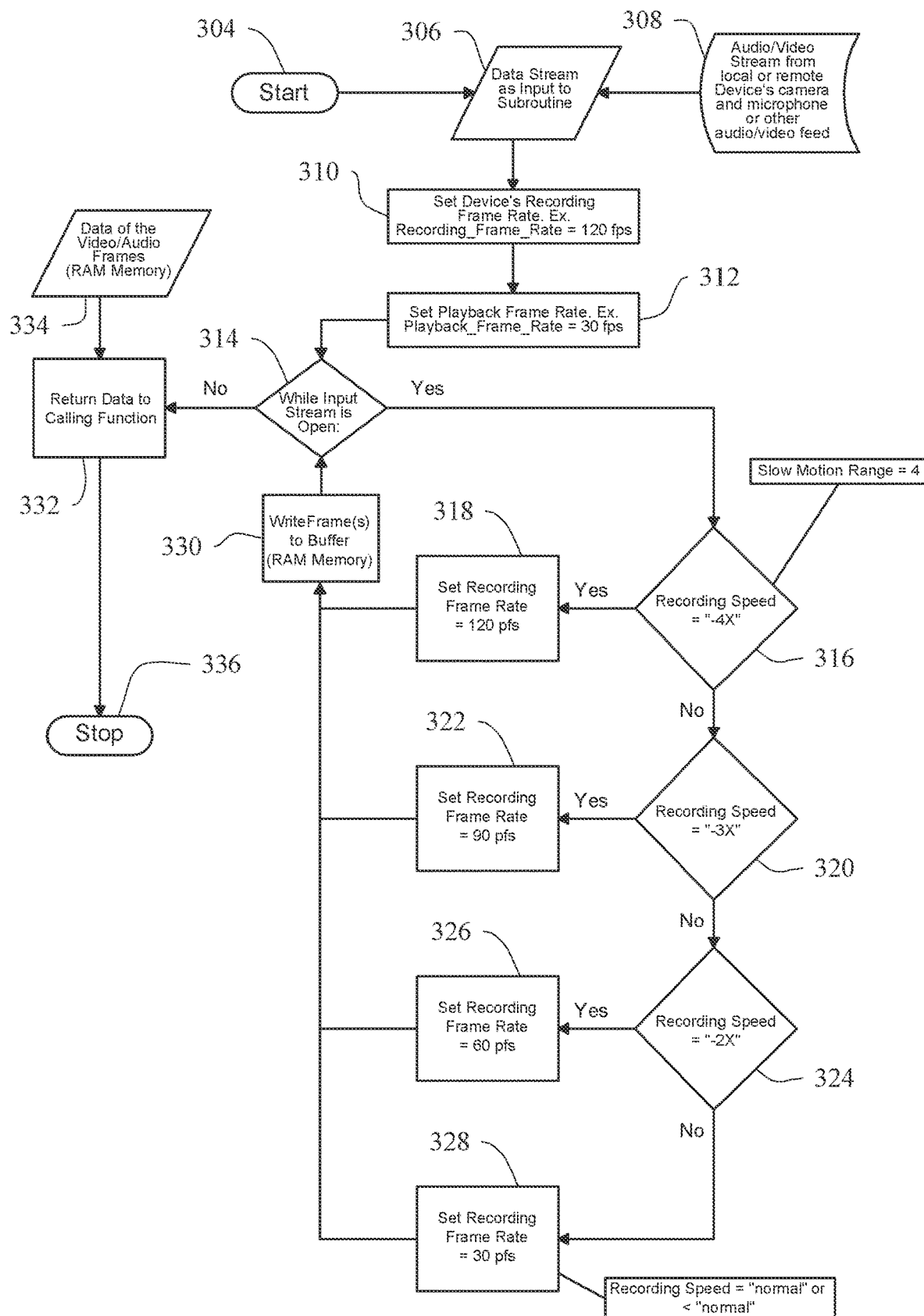
FIG. 14 is a flow chart of an example of the variable high recording fps subroutine (120 fps) in simulating slow motion associated with the present technology.

If frame adding is not required from step 250 or after the frame adding subroutine from step 252 is completed, then this subroutine proceeds to step 254 to determine if an increase in frames rate recording speed is required. If so, then this subroutine continues to step 256, which initiates a variable frame rate subroutine or an increase frame rate subroutine, as best illustrated in FIG. 14.

Figure 15:
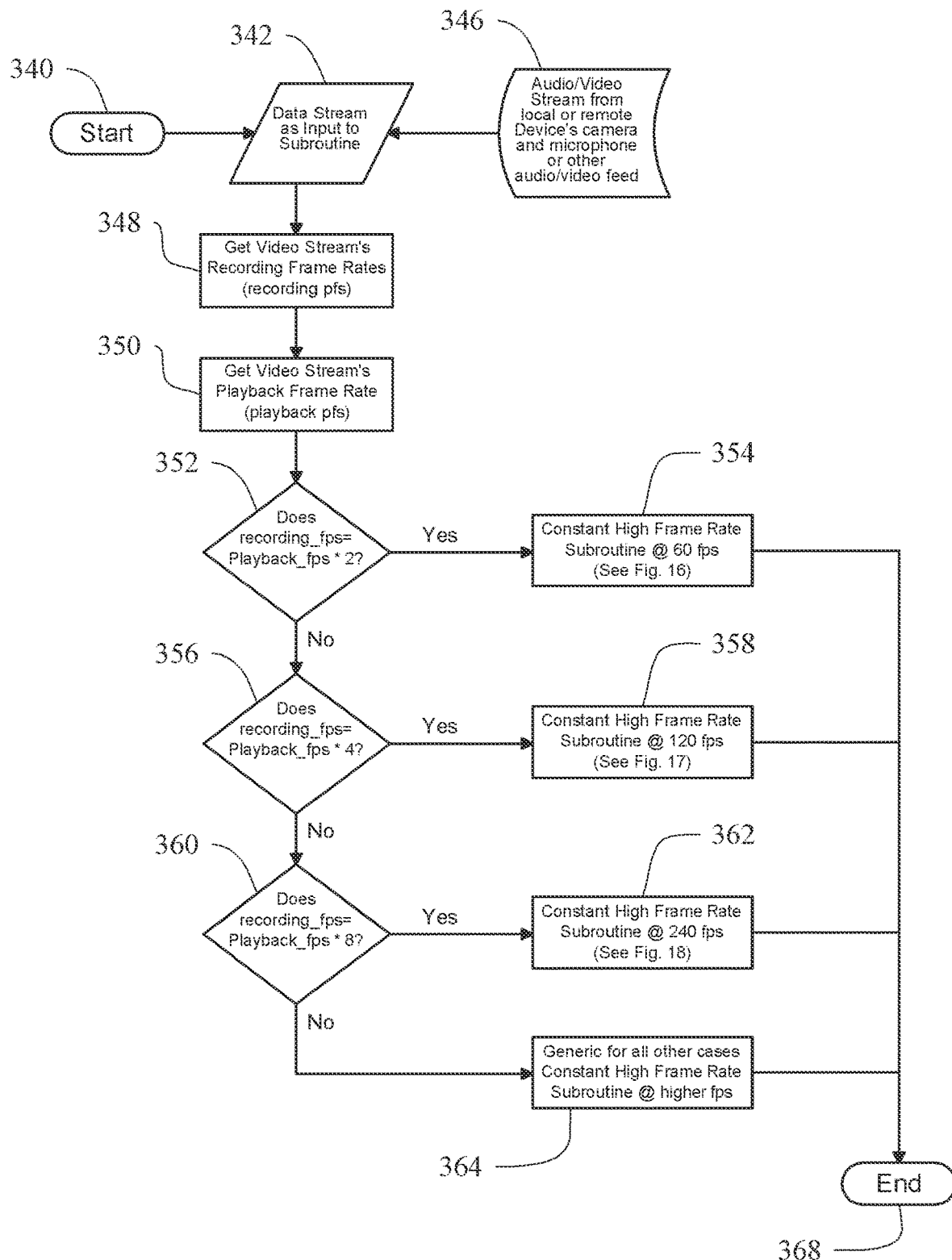
FIG. 15 is a flow chart of an example of the constant frame rate slow motion subroutine associated with the present technology.

If increase in frames rate recording speed is not required from step 254 or after the variable frame rate subroutine from step 256 is completed, then this subroutine proceeds to step 258 to determine if a constant high frames rate recording speed is to be used. If so, then this subroutine proceeds to step 260, which initiates a constant high frame rate subroutine, as best illustrated in FIG. 15.

If frame constant high frames rate recording speed is not required from step 258 or after the constant high frames rate recording speed subroutine of step 260 is completed, then this subroutine proceeds to step 261 to determine if the use of time compression or expansion is requested, and if required then continues to step 262 that initiates a time compression and expansion subprocess as best illustrated in FIG. 20.

Figure 22:
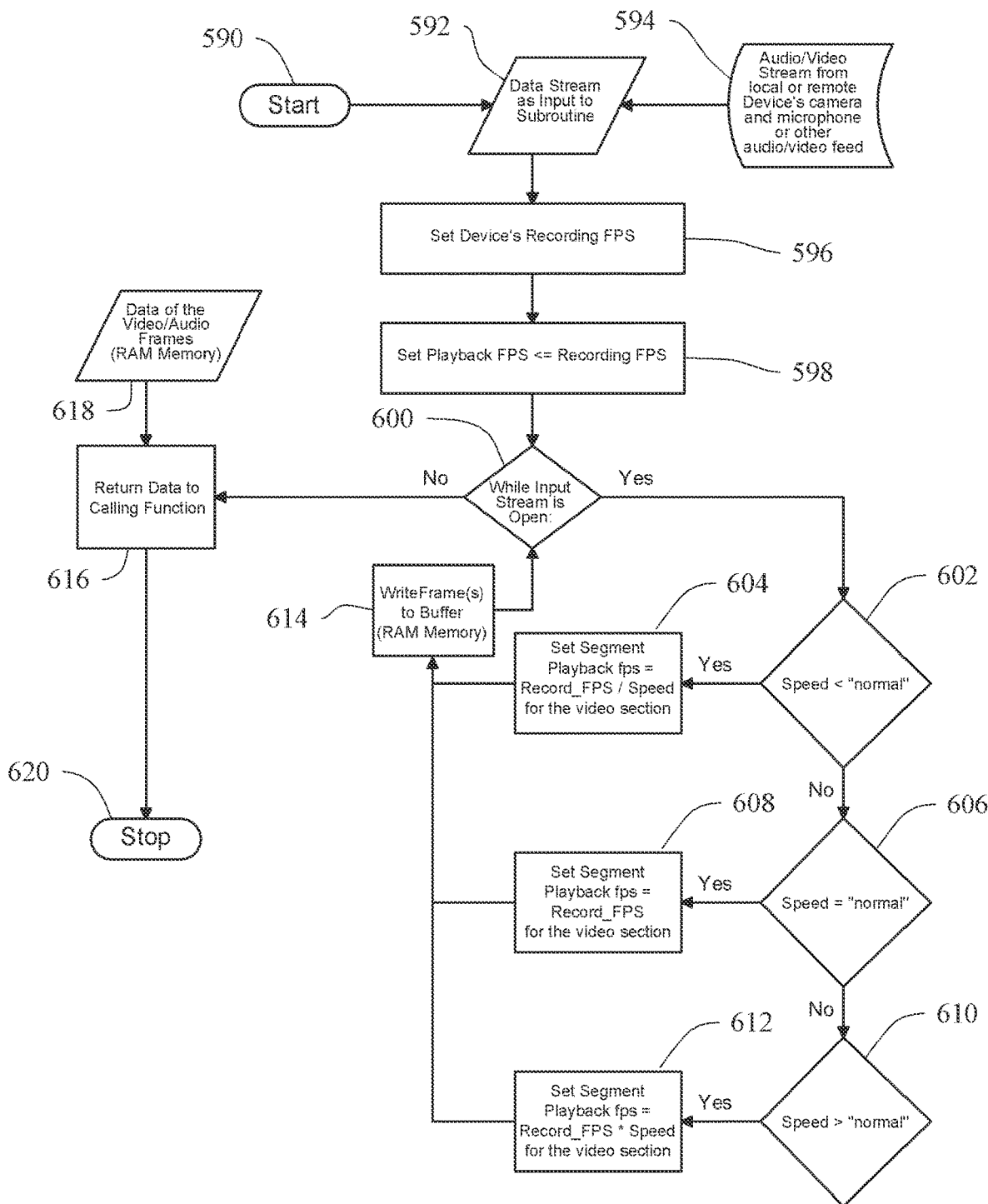
FIG. 22 is a flow chart of an example of a recording using a variable playback rate to simulate slow motion and fast motion associated with the present technology.

If frame time compression and/or expansion is not required from step 261 or after the time compression and/or expansion subprocess of step 262 is completed, then this subroutine proceeds to step 263 to determine if the use of variable FPS playback is requested, and if required then continues to step 264 that initiates a variable FPS playback subprocess as best illustrated in FIG. 22.

If frame variable FPS playback is not required from step 263 or after the variable FPS playback subprocess of step 264 is completed, then this subroutine proceeds to step 265 to determine if other special effects enhancement is requested. In the case that other special effects enhancement is requested, then this subroutine proceeds to step 267, which can execute the other special effects subroutine and apply their functions to the raw or modified video stream. This other special effects subroutine can be integrated with the present technology software application, or can be remote from the present technology but accessible and operable with present technology software application.

In the case the user does not request the use of other special effects enhancement from step 265 or after the other special effects subroutine from step 267 is completed, then this subroutine will continue to step 266 to return data to a calling function that loops back to step 248 to the determine if the video input stream is open. It can be appreciated that other processed audio/video data can be part of the data returned to the calling function, as per step 268.

It can be appreciated that this advanced slow motion subroutine includes a looped subprocess including steps 250-266 until the input stream is determined to not be open in step 248.

With reference to FIG. 13, the frame adding subroutine associated with the slowdown subroutine of FIG. 12 is described which determines if and which frames are added to simulate the requested slow motion video. This subroutine assumes that recording fps=playback fps. This subroutine starts (step 272) upon initiation by a command from the slowdown subroutine. After starting, this subroutine acquires the raw video data stream from the camera as an input (step 274). The raw video data stream can be audio/video stream from the local electronic device including the camera and/or microphone, from a remote device including the camera and/or the microphone, or from other audio/video feeds, as per step 276.

After acquisition of the raw video data stream, step 274 of this subroutine is initiated which determines if the video data input stream from the camera is open. If step 278 determines that the input stream is not open, then this subroutine proceeds to step 298, which returns data to a calling function being step 252 in FIG. 12. Step 298 can receive data of the video/audio frames from RAM memory and/or non-volatile long term memory (step 300). After step 298 is completed, then this subroutine stops or ends (step 302).

While the input stream is open from step 278, this subroutine determines the type of frame adding to utilize in step 280, either simple frame copying (step 281) or a more CPU intensive frame blending (step 282). If the user has selected frame copying, then the process proceeds to step 281 and the algorithm and its description are unchanged. However, if the user selected "Frame Blending" and their hardware supports it, then the process proceeds to step 282 and the algorithm can include new or additional steps.

It can be appreciated that if frame copying was selected during step 280 then for each of the speed "checks", logically, the process will proceed along the left algorithm path. It can be further appreciated that if frame blending was selected during step 280 then for each of the speed "checks", logically, the process will proceed along the right algorithm path.

The subroutine continues to determine if the speed equals 2 times slower than normal (step 283). If so, for the frame copying path, then step 284 is initialized which will copy the frame 1 time for a total of 2 of the identical frames, as per FIG. 3D. After which, this subroutine proceeds to step 296 to write frame(s) to buffer (RAM memory and/or non-volatile long term memory). After step 296, this subroutine returns to step 278. For the frame blending path, then step 285 is initialized which will blend the current frame with the next frame for a total of 1 new "blended" frame, as per FIG. 3F. After which, this subroutine proceeds to step 296.

If the speed does not equal 2 times slower than normal (step 283), then this subroutine determines if the speed equals 3 times slower than normal (step 286). If so, for the frame copying path, then step 287 is initialized which will copy the frame 2 times for a total of 3 of the identical frames, as per FIG. 3E. After which, this subroutine proceeds to step 296 and then returns to step 278. For the frame blending path, then step 288 is initialized which will blend the current frame with the next frame for a total of 2 new "blended" frames, as per FIG. 3G. After which, this subroutine proceeds to step 296.

If the speed does not equal 3 times slower than normal (step 286), then this subroutine determines if the speed equals 4 times slower than normal (step 289). If so, for the frame copying path, then step 290 is initialized which will copy the frame 3 times for a total of 4 of the identical frames. After which, this subroutine proceeds to step 296 and then returns to step 278. For the frame blending path, then step 291 is initialized which will blend the current frame with the next frame for a total of 3 new "blended" frames. After which, this subroutine proceeds to step 296.

If the speed does not equal 4 times slower than normal (step 289), then this subroutine will continue to determine if the speed equals "n" times slower than normal (step 292). If so, for the frame copying path, then each "nth" step will copy the frame (n−1) times for a total of "n" of the identical frames. After which, this subroutine proceeds to step 296 and then returns to step 278. For the frame blending path, then step 295 is initialized which will blend the current frame with the next frame for a total of (n−1) new "blended" frames. After which, this subroutine proceeds to step 296.

It can be appreciated that this frame adding subroutine includes a looped subprocess including steps 280-296 until the input stream is determined to not be open in step 278.

With reference to FIG. 14, an example of the variable high recording fps subroutine (120 FPS) associated with the variable frame rate subroutine of FIG. 12 is described. This variable frame rate subroutine can be utilized for simulating slow motion, such as but limited to, slow motion range=recording speed/playback fps=120 fps/30 fps=4.

This subroutine starts (step 304) upon initiation by a command from the slowdown subroutine. After starting, this subroutine acquires the raw video data stream from the camera as an input (step 306). The raw video data stream can be audio/video stream from the electronic device, the camera and/or the microphone, as per step 308.

After acquisition of the raw video data stream, step 310 of this subroutine is initiated to set the device's recording frame rate, for example to Recording_Frame_Rate=120 fps. After which, step 312 sets the device's playback frame rate, for example to Playback_Frame_Rate=30 fps.

Step 314 of this subroutine is initiated which determines if the video data input stream from the camera is open. If step 314 determines that the input stream is not open, then this subroutine proceeds to step 332, which returns data to a calling function being step 256 in FIG. 12. Step 332 can receive data of the video/audio frames from RAM memory and/or non-volatile long term memory (step 334). After step 332 is completed, then this subroutine stops or ends (step 336).

While the input stream is open from step 314, this subroutine determines if the recording speed equals "−4×" (step 316), which can be a slow motion range of 4. If so then step 318 is initialized which sets the recording frame rate to 120 fps. After which, this subroutine proceeds to step 330 to write frame(s) to buffer (RAM memory and/or non-volatile long term memory). After step 330, this subroutine returns to step 314.

If the recording speed does not equal "−4×" (step 316), then this subroutine determines if the recording speed equals "−3×" (step 320). If so then step 322 is initialized which sets the recording frame rate to 90 fps. After which, this subroutine proceeds to step 330 to write frame(s) to buffer (RAM memory and/or non-volatile long term memory). After step 330, this subroutine returns to step 314.

If the recording speed does not equal "−3×" (step 320), then this subroutine determines if the recording speed equals "−2×" (step 324). If so then step 326 is initialized which sets the recording frame rate to 60 fps. After which, this subroutine proceeds to step 330 to write frame(s) to buffer (RAM memory and/or non-volatile long term memory). After step 330, this subroutine returns to step 314.

If the recording speed does not equal "−2×" (step 324), then this subroutine will set the recording frame rate to 30 fps (step 328), which can be a recording speed equal to or less than "normal". After which, this subroutine proceeds to step 330 to write frame(s) to buffer (RAM memory and/or non-volatile long term memory). After step 330, this subroutine returns to step 314.

It can be appreciated that this variable high recording fps subroutine includes a looped subprocess including steps 316-330 until the input stream is determined to not be open in step 314.

With reference to FIG. 15, an example of the constant frame rate slow motion subroutine associated with the constant high frame rate subroutine of FIG. 12 is described. This constant frame rate slow motion subroutine can be utilized for simulating slow motion.

This subroutine starts (step 340) upon initiation by a command from the slowdown subroutine. After starting, this subroutine acquires the raw video data stream from the camera as an input (step 342). The raw video data stream can be audio/video stream from the local electronic device including the camera and/or microphone, from a remote device including the camera and/or the microphone, or from other audio/video feeds, as per step 346.

After acquisition of the raw video data stream, step 348 of this subroutine is initiated which gets the video stream's recording frame rates (recording fps), and then continues to step 350 that gets the video stream's playback frame rates (playback fps).

Figure 16:
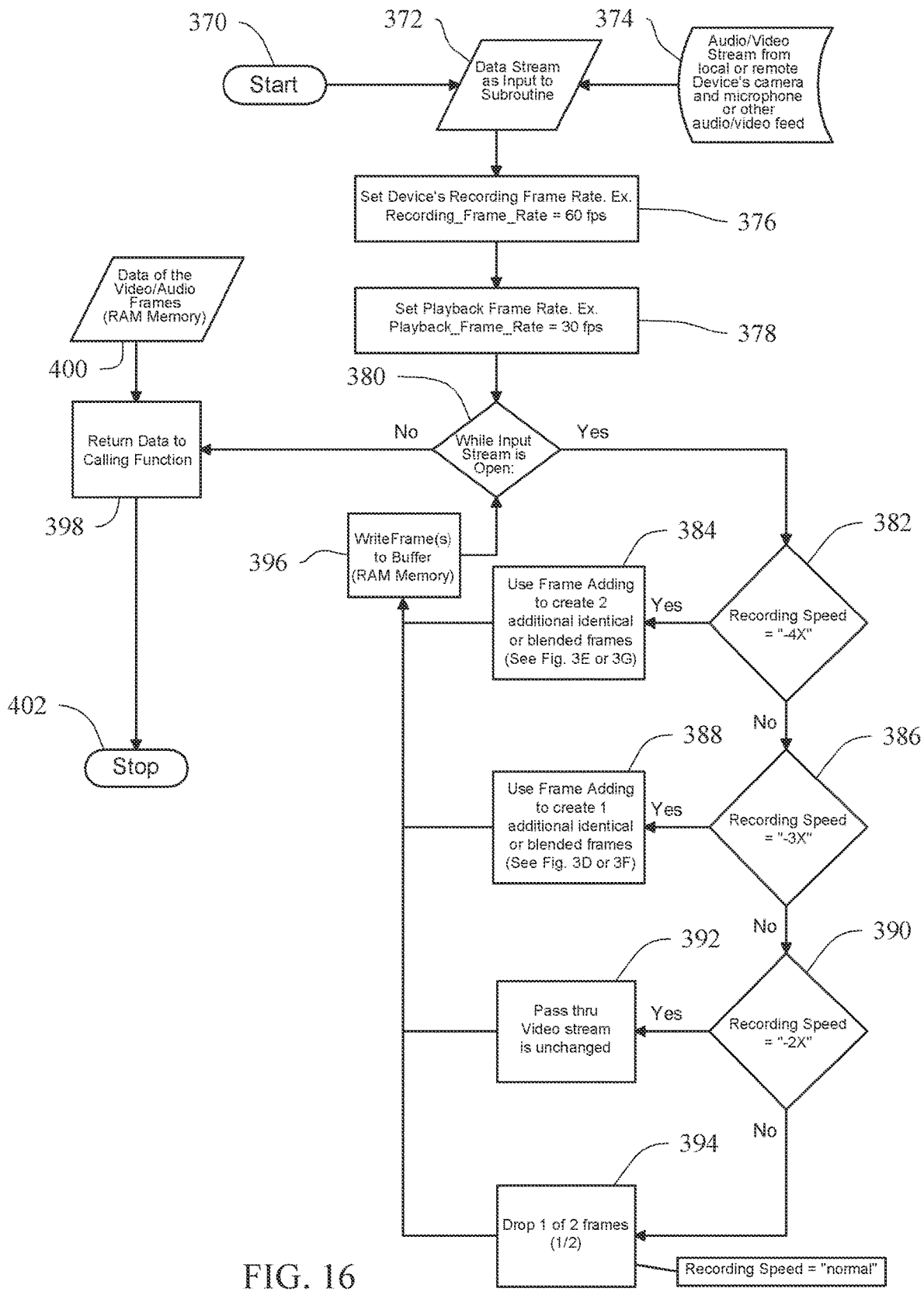
FIG. 16 is a flow chart of an example of the constant high recording fps subroutine (60 fps) in simulating slow motion associated with the present technology.

With the recording and playback frame rates acquired, this subroutine then determines if the recording_fps=playback fps*2 (step 352). If so, then it proceeds to step 354 to initiate a constant high frame rate subroutine at 60 fps, as best illustrated in FIG. 16. After which, this subroutine stops or ends (step 368).

Figure 17:
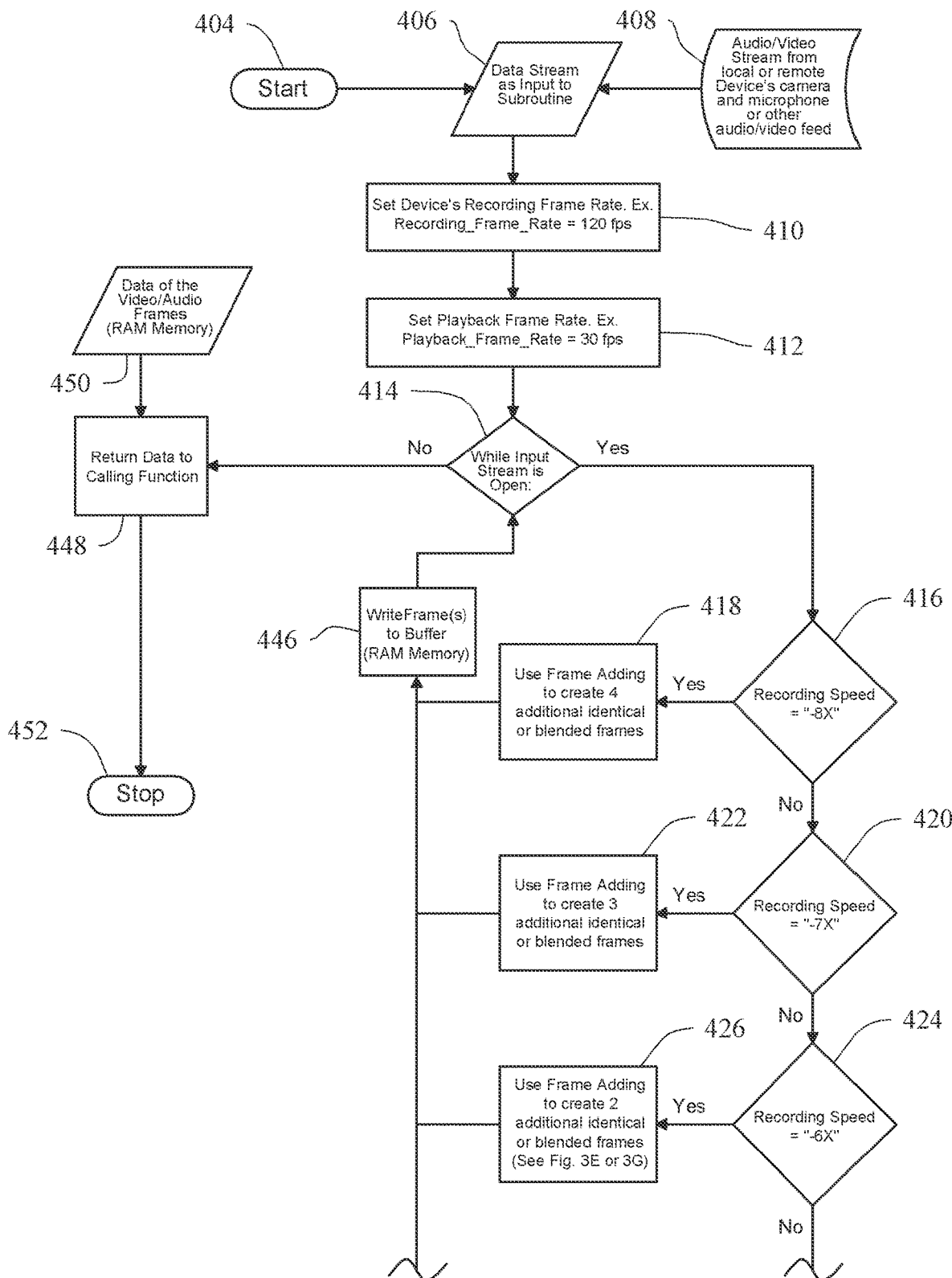
FIG. 17 is a flow chart of an example of the constant high recording fps subroutine (120 fps) in simulating slow motion associated with the present technology.

If is not found that the recording_fps=playback_fps*2, then this subroutine proceeds to step 356 to determine if the recording_fps=playback_fps*4. If so, then it proceeds to step 358 to initiate a constant high frame rate subroutine at 120 fps, as best illustrated in FIG. 17. After which, this subroutine stops or ends (step 368).

Figure 18:
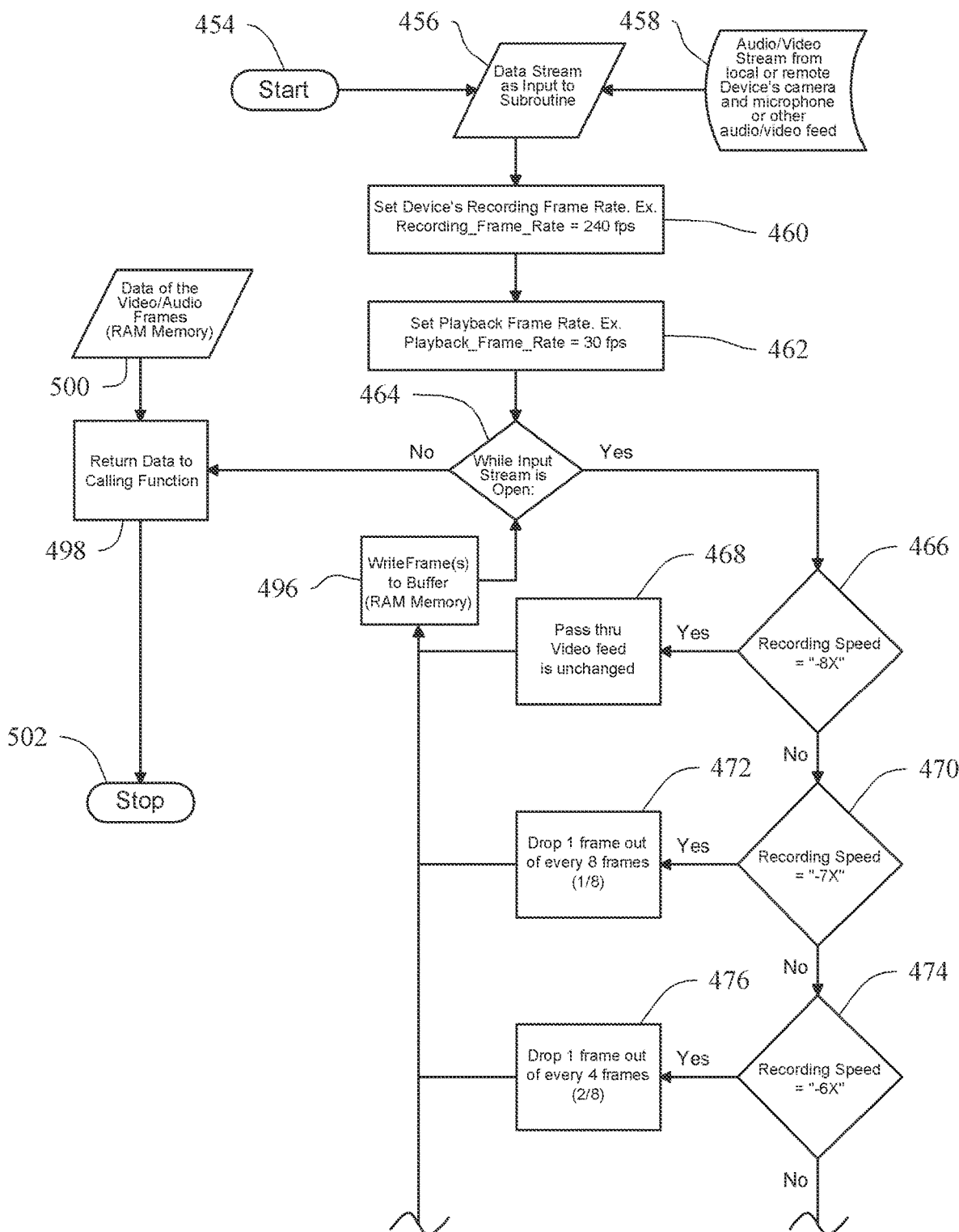
FIG. 18 is a flow chart of an example of the constant high recording fps subroutine (240 fps) in simulating slow motion associated with the present technology.

If is not found that the recording_fps=playback_fps*4, then this subroutine proceeds to step 360 to determine if the recording_fps=playback_fps*8. If so, then it proceeds to step 362 to initiate a constant high frame rate subroutine at 240 fps, as best illustrated in FIG. 18. After which, this subroutine stops or ends (step 368).

If is not found that the recording_fps=playback_fps*8, then this subroutine proceeds to step 364, which is generic for all other cases and initiates a constant high frame rate subroutine at higher fps. After which, this subroutine stops or ends (step 368).

With reference to FIG. 16, an example of the constant high recording fps subroutine (60 FPS) associated with the constant high frame rate subroutine of FIG. 15 is described. This constant high frame rate subroutine can be utilized for simulating slow motion, such as but limited to, slow motion range=recording speed/playback fps=60 fps/30 fps=2. "Slow motion range" is defined as the multiple factor that a slow motion effect can be created with the record and playback fps settings such that the algorithm does not have to use "frame adding" of any type.

This subroutine starts (step 370) upon initiation by a command from the slowdown subroutine. After starting, this subroutine acquires the raw video data stream from the camera as an input (step 372). The raw video data stream can be audio/video stream from the local electronic device including the camera and/or microphone, from a remote device including the camera and/or the microphone, or from other audio/video feeds, as per step 374.

After acquisition of the raw video data stream, step 376 of this subroutine is initiated which set the device's recording frame rate, for example to Recording_Frame_Rate=60 fps. After which, step 378 sets the device's playback frame rate, for example to Playback_Frame_Rate=30 fps.

Step 380 of this subroutine is initiated which determines if the video data input stream from the camera is open. If step 380 determines that the input stream is not open, then this subroutine proceeds to step 398, which returns data to a calling function being step 354 in FIG. 15. Step 398 can receive data of the video/audio frames from RAM memory and/or non-volatile long term memory (step 400). After step 398 is completed, then this subroutine stops or ends (step 402).

While the input stream is open from step 380, this subroutine determines if the recording speed equals "−4×" (step 382). If so then step 384 is initialized which copies each frame in the stream 2 times for a total 3 identical frames as per FIG. 3E or blended frames as per FIG. 3G. After which, this subroutine proceeds to step 396 to write frame(s) to buffer (RAM memory and/or non-volatile long term memory). After step 396, this subroutine returns to step 380.

If the recording speed does not equal "4×" (step 382), then this subroutine determines if the recording speed equals "−3×" (step 386). If so then step 388 is initialized which copies each frame in the stream 1 time for a total 2 identical frames as per FIG. 3D or blended frames as per FIG. 3F. After which, this subroutine proceeds to step 396 to write frame(s) to buffer (RAM memory and/or non-volatile long term memory). After step 396, this subroutine returns to step 380.

If the recording speed does not equal "−3×" (step 386), then this subroutine determines if the recording speed equals "−2×" (step 390). If so then step 392 is initialized which passes thru an unchanged video stream. After which, this subroutine proceeds to step 396 to write frame(s) to buffer (RAM memory and/or non-volatile long term memory). After step 396, this subroutine returns to step 380.

If the recording speed does not equal "−2×" (step 390), then this subroutine will drop 1 of 2 frames (1/2) (step 394) for a recording speed equal to "normal". After which, this subroutine proceeds to step 396 to write frame(s) to buffer (RAM memory and/or non-volatile long term memory). After step 396, this subroutine returns to step 380.

It can be appreciated that this constant high recording fps subroutine (60 FPS) includes a looped subprocess including steps 382-396 until the input stream is determined to not be open in step 380.

With reference to FIG. 17, an example of the constant high recording fps subroutine (120 FPS) associated with the constant high frame rate subroutine of FIG. 15 is described. This constant high frame rate subroutine can be utilized for simulating slow motion, such as but limited to, slow motion range=recording speed/playback fps=120 fps/30 fps=4.

This subroutine starts (step 404) upon initiation by a command from the slowdown subroutine. After starting, this subroutine acquires the raw video data stream from the camera as an input (step 406). The raw video data stream can be audio/video stream from the local electronic device including the camera and/or microphone, from a remote device including the camera and/or the microphone, or from other audio/video feeds, as per step 408.

After acquisition of the raw video data stream, step 410 of this subroutine is initiated which sets the device's recording frame rate, for example to Recording_Frame_Rate=120 fps. After which, step 412 sets the device's playback frame rate, for example to Playback_Frame_Rate=30 fps.

Step 414 of this subroutine is initiated which determines if the video data input stream from the camera is open. If step 414 determines that the input stream is not open, then this subroutine proceeds to step 448, which returns data to a calling function being step 358 in FIG. 15. Step 448 can receive data of the video/audio frames from RAM memory and/or non-volatile long term memory (step 450). After step 448 is completed, then this subroutine stops or ends (step 452).

While the input stream is open from step 414, this subroutine determines if the recording speed equals "-8×" (step 416). If so then step 418 is initialized which copies the frame 4 times for a total 5 identical frames or blended frames. After which, this subroutine proceeds to step 446 to write frame(s) to buffer (RAM memory and/or non-volatile long term memory). After step 446, this subroutine returns to step 414.

If the recording speed does not equal "-8×" (step 416), then this subroutine determines if the recording speed equals "-7×" (step 420). If so then step 422 is initialized which copies the frame 3 times for a total 4 identical frames or blended frames. After which, this subroutine proceeds to step 446 to write frame(s) to buffer (RAM memory and/or non-volatile long term memory). After step 446, this subroutine returns to step 414.

If the recording speed does not equal "-7×" (step 420), then this subroutine determines if the recording speed equals "-6×" (step 424). If so then step 426 is initialized which copies the frame 2 times for a total 3 identical frames as per FIG. 3E or blended frames as per FIG. 3G. After which, this subroutine proceeds to step 446 to write frame(s) to buffer (RAM memory and/or non-volatile long term memory). After step 446, this subroutine returns to step 414.

If the recording speed does not equal "-6×" (step 424), then this subroutine determines if the recording speed equals "-5×" (step 428). If so then step 430 is initialized copies the frame 1 time for a total 2 identical frames as per FIG. 3D or blended frames as per FIG. 3F. After which, this subroutine proceeds to step 446 to write frame(s) to buffer (RAM memory and/or non-volatile long term memory). After step 446, this subroutine returns to step 414.

If the recording speed does not equal "-5×" (step 428), then this subroutine determines if the recording speed equals "-4×" (step 432). If so then step 434 is initialized which passes thru an unchanged video stream. After which, this subroutine proceeds to step 446 to write frame(s) to buffer (RAM memory and/or non-volatile long term memory). After step 446, this subroutine returns to step 414.

If the recording speed does not equal "-4×" (step 432), then this subroutine determines if the recording speed equals "-3×" (step 436). If so then step 438 is initialized which drops 1 of 4 frames (1/4) (step 438). After which, this subroutine proceeds to step 446 to write frame(s) to buffer (RAM memory and/or non-volatile long term memory). After step 446, this subroutine returns to step 414.

If the recording speed does not equal "-3×" (step 436), then this subroutine determines if the recording speed equals "-2×" (step 440). If so then step 442 is initialized which drops 2 of 4 frames (2/4) (step 442). After which, this subroutine proceeds to step 446 to write frame(s) to buffer (RAM memory and/or non-volatile long term memory). After step 446, this subroutine returns to step 414.

If the recording speed does not equal "-2×" (step 440), then this subroutine will drop 3 of 4 frames (3/4) (step 444) for a recording speed equal to "normal". After which, this subroutine proceeds to step 446 to write frame(s) to buffer (RAM memory and/or non-volatile long term memory). After step 446, this subroutine returns to step 414.

It can be appreciated that this constant high recording fps subroutine (120 FPS) includes a looped subprocess including steps 416-446 until the input stream is determined to not be open in step 414.

With reference to FIG. 18, an example of the constant high recording fps subroutine (240 FPS) associated with the constant high frame rate subroutine of FIG. 15 is described. This constant high frame rate subroutine can be utilized for simulating slow motion, such as but limited to, slow motion range=recording speed/playback fps=240 fps/30 fps=8.

This subroutine starts (step 454) upon initiation by a command from the slowdown subroutine. After starting, this subroutine acquires the raw video data stream from the camera as an input (step 456). The raw video data stream can be audio/video stream from the local electronic device including the camera and/or microphone, from a remote device including the camera and/or the microphone, or from other audio/video feeds, as per step 458.

After acquisition of the raw video data stream, step 460 of this subroutine is initiated which set the device's recording frame rate, for example to Recording_Frame_Rate=240 fps. After which, step 462 sets the device's playback frame rate, for example to Playback_Frame_Rate=30 fps.

Step 464 of this subroutine is initiated which determines if the video data input stream from the camera is open. If step 464 determines that the input stream is not open, then this subroutine proceeds to step 498, which returns data to a calling function being step 362 in FIG. 15. Step 498 can receive data of the video/audio frames from RAM memory and/or non-volatile long term memory (step 500). After step 498 is completed, then this subroutine stops or ends (step 502).

While the input stream is open from step 464, this subroutine determines if the recording speed equals "-8×" (step 466). If so then step 468 is initialized which passes thru an unchanged video stream. After which, this subroutine proceeds to step 496 to write frame(s) to buffer (RAM memory and/or non-volatile long term memory). After step 496, this subroutine returns to step 464.

If the recording speed does not equal "-8×" (step 466), then this subroutine determines if the recording speed equals "-7×" (step 470). If so then step 472 is initialized which drops 1 frame out of every 8 frames (1/8). After which, this subroutine proceeds to step 496 to write frame(s) to buffer (RAM memory and/or non-volatile long term memory). After step 496, this subroutine returns to step 464.

If the recording speed does not equal "-7×" (step 470), then this subroutine determines if the recording speed equals "-6×" (step 474). If so then step 476 is initialized which drops 1 frame out of every 4 frames (2/8). After which, this subroutine proceeds to step 496 to write frame(s) to buffer (RAM memory and/or non-volatile long term memory). After step 496, this subroutine returns to step 464.

If the recording speed does not equal "-6×" (step 474), then this subroutine determines if the recording speed equals "-5×" (step 478). If so then step 480 is initialized which drops 3 frame out of every 8 frames (3/8). After which, this subroutine proceeds to step 496 to write frame(s) to buffer (RAM memory and/or non-volatile long term memory). After step 496, this subroutine returns to step 464.

If the recording speed does not equal "−5×" (step 478), then this subroutine determines if the recording speed equals "−4×" (step 482). If so then step 484 is initialized which drops 1 frame out of every 2 frames (4/8). After which, this subroutine proceeds to step 496 to write frame(s) to buffer (RAM memory and/or non-volatile long term memory). After step 496, this subroutine returns to step 464.

If the recording speed does not equal "−4×" (step 482), then this subroutine determines if the recording speed equals "−3×" (step 486). If so then step 488 is initialized which drops 5 frame out of every 8 frames (5/8). After which, this subroutine proceeds to step 496 to write frame(s) to buffer (RAM memory and/or non-volatile long term memory). After step 496, this subroutine returns to step 464.

If the recording speed does not equal "−3×" (step 486), then this subroutine determines if the recording speed equals "−2×" (step 490). If so then step 492 is initialized which drops 3 frame out of every 4 frames (6/8). After which, this subroutine proceeds to step 496 to write frame(s) to buffer (RAM memory and/or non-volatile long term memory). After step 496, this subroutine returns to step 464.

If the recording speed does not equal "−2×" (step 490), then this subroutine will drop 7 frame out of every 8 frames (7/8) (step 494). After which, this subroutine proceeds to step 496 to write frame(s) to buffer (RAM memory and/or non-volatile long term memory). After step 496, this subroutine returns to step 464.

It can be appreciated that this constant high recording fps subroutine (240 FPS) includes a looped subprocess including steps 466-496 until the input stream is determined to not be open in step 464.

Figure 19:
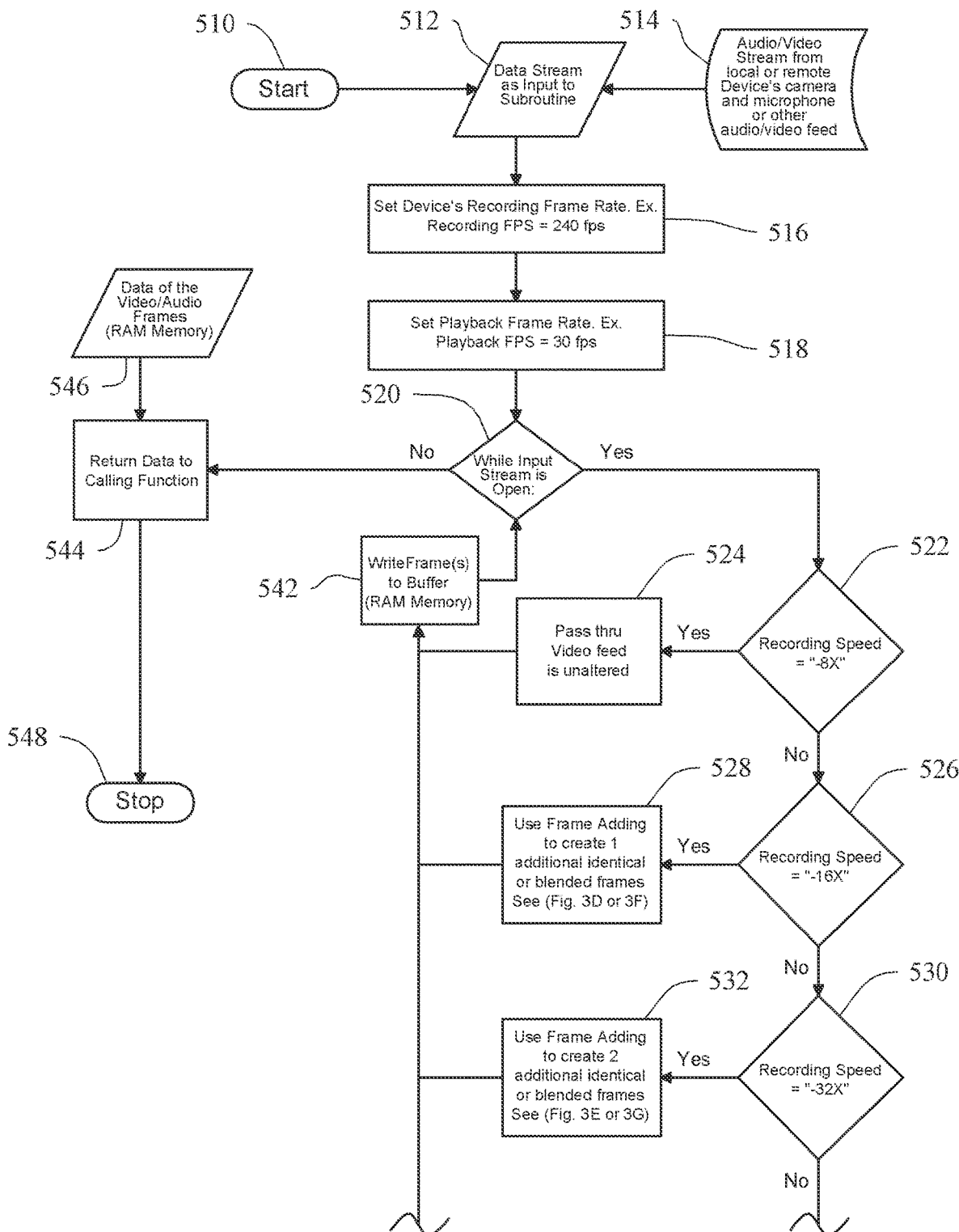
FIG. 19 is a flow chart of an example of extreme slow motion subroutine associated with the present technology.

With reference to FIG. 19, an example of an extreme slow motion at constant high recording fps subroutine (240 FPS) associated with the constant high frame rate subroutine of FIG. 15 is described. This constant high frame rate subroutine can be utilized for simulating extreme slow motion, such as but limited to, slow motion range of −8× to −128× speed. Constant High Recording FPS with Frame Adding Subroutine of FIG. 19 illustrates an exemplary flow chart algorithm for the combination of high frames per second recording rate, "normal" playback frames per seconds, and frame adding to boost the slow motion special effect. This subroutine further illustrates speeds that are >=−8× and perfect multiples of 2, with speeds slower than −8× being best illustrated in FIG. 18.

This subroutine starts (step 510) upon initiation by a command from the slowdown subroutine. After starting, this subroutine acquires the raw video data stream from the camera as an input (step 512). The raw video data stream can be audio/video stream from the electronic device, the camera and/or the microphone, as per step 514.

After acquisition of the raw video data stream, step 516 of this subroutine is initiated which set the device's recording frame rate, for example to Recording Frame Rate=240 fps. After which, step 518 sets the device's playback frame rate, for example to Playback Frame Rate=30 fps.

Step 520 of this subroutine is initiated which determines if the video data input stream from the camera is open. If step 520 determines that the input stream is not open, then this subroutine proceeds to step 544, which returns data to a calling function being step 358 in FIG. 15. Step 544 can receive data of the video/audio frames from RAM memory and/or non-volatile long term memory (step 546). After step 544 is completed, then this subroutine stops or ends (step 548).

While the input stream is open from step 520, this subroutine determines if the recording speed equals "−8×" (step 522). If so then step 524 is initialized which passes thru an unaltered/unchanged video stream. After which, this subroutine proceeds to step 542 to write frame(s) to buffer (RAM memory and/or non-volatile long term memory). After step 542, this subroutine returns to step 520.

If the recording speed does not equal "−8×" (step 522), then this subroutine determines if the recording speed equals "−16×" (step 526). If so then step 528 is initialized which copies each frame 1 times for a total of 2 identical frames as per FIG. 3D or blended frames as per FIG. 3F. After which, this subroutine proceeds to step 542 to write frame(s) to buffer (RAM memory and/or non-volatile long term memory). After step 542, this subroutine returns to step 520.

If the recording speed does not equal "−16×" (step 526), then this subroutine determines if the recording speed equals "−32×" (step 530). If so then step 532 is initialized which copies each frame 2 times for a total of 3 identical frames as per FIG. 3E or blended frames as per FIG. 3G. After which, this subroutine proceeds to step 542 to write frame(s) to buffer (RAM memory and/or non-volatile long term memory). After step 542, this subroutine returns to step 520.

If the recording speed does not equal "−32×" (step 530), then this subroutine determines if the recording speed equals "−64×" (step 534). If so then step 536 is initialized which copies each frame 3 times for a total of 4 identical frames or blended frames. After which, this subroutine proceeds to step 542 to write frame(s) to buffer (RAM memory and/or non-volatile long term memory). After step 542, this subroutine returns to step 520.

If the recording speed does not equal "−64×" (step 534), then this subroutine determines if the recording speed equals "−128×" (step 538). If so then step 540 is initialized which copies each frame 4 times for a total of 5 identical frames or blended frames. After which, this subroutine proceeds to step 542 to write frame(s) to buffer (RAM memory and/or non-volatile long term memory). After step 542, this subroutine returns to step 520.

It can be appreciated that this constant high recording fps subroutine (240 FPS) includes a looped subprocess including steps 520-542 until the input stream is determined to not be open in step 520.

With reference to FIG. 20, an example of a segment time compression and expansion subroutine is illustrated and will be described, which provides a flow chart algorithm for slow motion and fast motion by speeding up or slowing down the playback time during video processing after the recording has stopped. Frame adding/dropping can be performed in the time compression/expansion algorithm to simulate the slow motion special effect.

Video files that are created with this algorithm/subroutine can be played normally in all video players and requires no metadata. This is in alternative to other video files created in the present technology.

This subroutine starts (step 550) upon initiation by a command from the slowdown subroutine. After starting, this subroutine acquires the raw video data stream from the camera as an input (step 552). The raw video data stream can be audio/video stream from the local electronic device including the camera and/or microphone, from a remote device including the camera and/or the microphone, or from other audio/video feeds, as per step 554.

After acquisition of the raw video data stream, step 556 of this subroutine is initiated which set the device's recording FPS. After which, step 558 sets the playback FPS to less than or equal to (<=) the recording FPS.

Step 560 of this subroutine is initiated which determines if the video data input stream from the camera is open. If step 560 determines that the input stream is not open, then this subroutine proceeds to step 576. Step 576 can receive data of the video/audio frames from RAM memory and/or non-volatile long term memory (step 578). After step 576 is completed, then this subroutine stops or ends (step 580).

While the input stream is open from step 560, this subroutine determines if the speed is less than "normal" (step 562). If so then step 564 is initialized which sets video segment fps to equal the recording fps divided by the speed (Segment FPS=Record_FPS/Speed). After which, this subroutine proceeds to step 574 to write frame(s) to buffer (RAM memory and/or non-volatile long term memory). After step 574, this subroutine returns to step 560.

If the speed is not less than "normal" (step 562), then this subroutine determines if the speed equals "normal" (step 566). If so then step 568 is initialized which sets video segment fps to equal the recording fps (Segment FPS=Record_FPS). After which, this subroutine proceeds to step 574 to write frame(s) to buffer (RAM memory and/or non-volatile long term memory). After step 574, this subroutine returns to step 560.

If the recording speed does not equal "normal" (step 566), then this subroutine determines if the speed is greater than "normal" (step 570). If so then step 572 is initialized which sets video segment fps to equal the recording fps times the speed (Segment FPS=Record_FPS*Speed). After which, this subroutine proceeds to step 574 to write frame(s) to buffer (RAM memory and/or non-volatile long term memory). After step 574, this subroutine returns to step 560.

It can be appreciated that this segment time compression and expansion subroutine includes a looped subprocess including steps 560-574 until the input stream is determined to not be open in step 560.

An example of the segment time compression and expansion subroutine is best illustrated in FIG. 21, which illustrates the results of the algorithm in FIG. 20. The top bar represents the video segments 582 in seconds per video segment in a continuous recording. The recording video segments 582, in seconds, are process by the segment time compression and expansion subroutine. The segments 582 are created when the user/AI changes the speed variable. The time special effects are applied to the raw video segment, and written into the processed video stream RAM, where each segment is either compressed, expanded or unchanged. The resultant playback video segments 584 are then provided in seconds per video segment corresponding to the recording segments time in seconds.

With reference to FIG. 22, an example of a variable playback speed record subroutine is illustrated and will be described, which provides a flow chart algorithm for slow motion and fast motion by speeding up or slowing down the playback frame rate while video recording is in progress. This algorithm can produce a normal video with the fast/slow motion commands embedded in the video's metadata. The metadata is data embedded in the video file that does not show up in the video recording.

This subroutine starts (step 590) upon initiation by a command from the slowdown subroutine in FIG. 12 (step 264). After starting, this subroutine acquires the raw video data stream from the camera as an input (step 592). The raw video data stream can be audio/video stream from the local electronic device including the camera and/or microphone, from a remote device including the camera and/or the microphone, or from other audio/video feeds, as per step 594.

After acquisition of the raw video data stream, step 596 of this subroutine is initiated which set the device's recording FPS. After which, step 598 sets the playback FPS to less than or equal to (<=) the recording FPS.

Step 600 of this subroutine is initiated which determines if the video data input stream from the camera is open. If step 600 determines that the input stream is not open, then this subroutine proceeds to step 616. Step 616 can receive data of the video/audio frames from RAM memory and/or non-volatile long term memory (step 618). After step 616 is completed, then this subroutine stops or ends (step 620).

While the input stream is open from step 600, this subroutine determines if the speed is less than "normal" (step 602). If so then step 604 is initialized which sets the segment playback_fps to equal the recording fps divided by the speed for that video section (Segment FPS=Record_FPS/Speed). After which, this subroutine proceeds to step 614 to write frame(s) to buffer (RAM memory and/or non-volatile long term memory). After step 614, this subroutine returns to step 600.

If the speed is not less than "normal" (step 602), then this subroutine determines if the speed equals "normal" (step 606). If so then step 608 is initialized which sets the segment playback fps to equal the recording fps for that video section (Segment FPS=Record_FPS). After which, this subroutine proceeds to step 614 to write frame(s) to buffer (RAM memory and/or non-volatile long term memory). After step 614, this subroutine returns to step 600.

If the recording speed does not equal "normal" (step 606), then this subroutine determines if the speed is greater than "normal" (step 610). If so then step 612 is initialized which sets the segment playback_fps to equal the recording fps times by the speed for that video section (Segment FPS=Record_FPS*Speed). After which, this subroutine proceeds to step 614 to write frame(s) to buffer (RAM memory and/or non-volatile long term memory). After step 614, this subroutine returns to step 600.

It can be appreciated that this segment time compression and expansion subroutine includes a looped subprocess including steps 600-614 until the input stream is determined to not be open in step 600.

Figure 23:
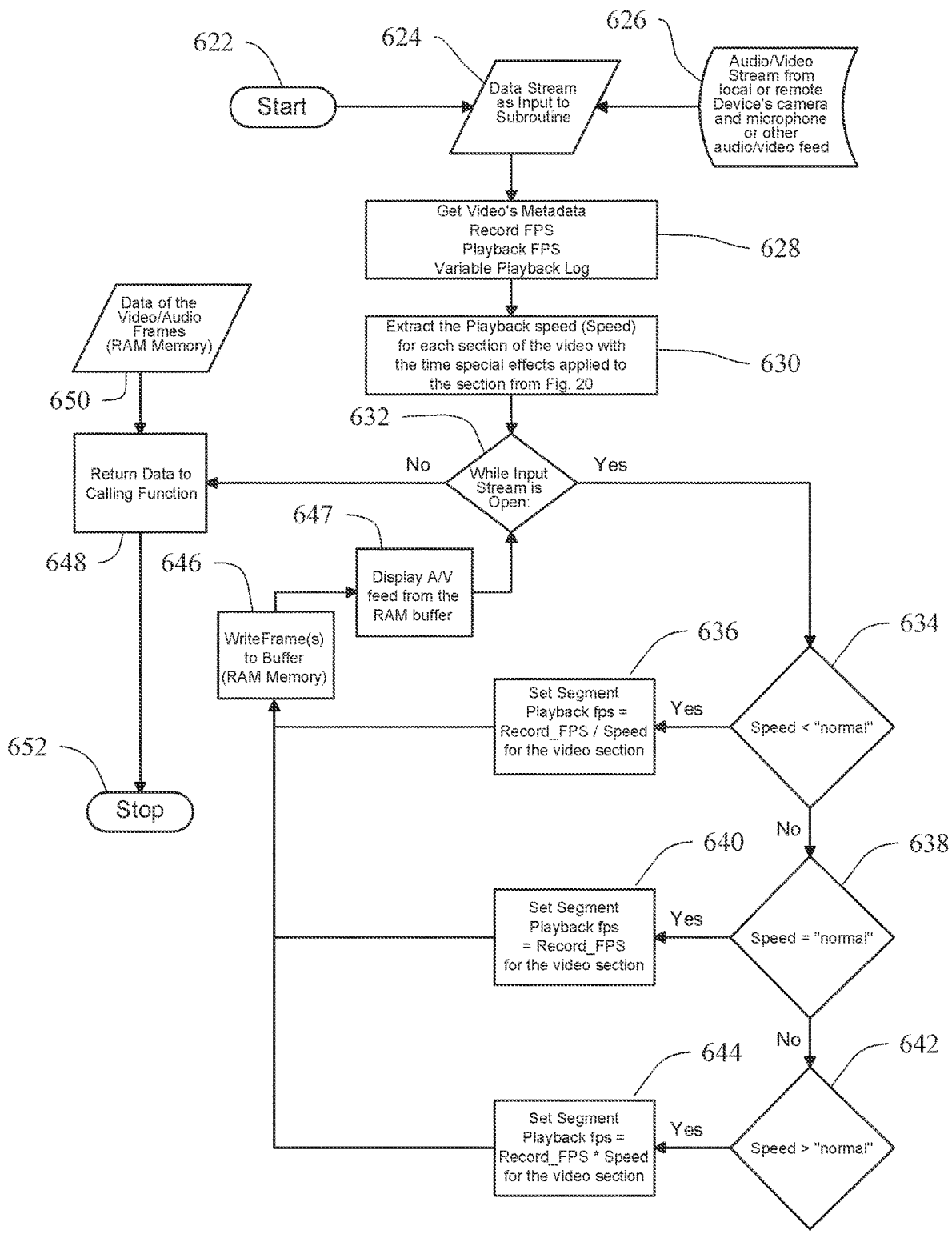
FIG. 23 is a flow chart of an example of a playback device playing a video file created by an application employing the algorithm in FIG. 22 to simulate slow motion and fast motion associated with the present technology.

With reference to FIG. 23, an example of a variable playback speed playback subroutine is illustrated and will be described, which provides a flow chart algorithm for playing a video file with slow motion and fast motion special effects by speeding up or slowing down the playback frame rate while video playback is in progress. An application employing the algorithm in FIG. 23 is required to play a video produced by the algorithm in FIGS. 20 and 21. This application must be capable of decoding the information in the metadata and/or an accompanying "video project file" and applying the speed up and slowdown commands to the playback frame rate while the video is playing. A video project contains the video file plus an accompanying file that has the special effects commands to be executed, that a custom player can decode and apply in real-time playback.

If the video is played with an incompatible player, then the speed up and slowdown special effects commands in the metadata are ignored and the video plays continuously in the same speed.

This subroutine starts (step 622) upon initiation by a command from the slowdown subroutine. After starting, this subroutine acquires the raw video data stream from the video project file residing in device's memory as an input (step 624). The raw video data stream can be audio/video stream in the video project file from the electronic device, or remote video project files, as per step 626.

After acquisition of the raw video data stream, step 628 of this subroutine is initiated which gets the video's metadata, record FPS, playback FPS and variable playback log. After which, step 630 extracts the playback speed (Speed) for each section of the video with the time special effects applied to the section from FIG. 20.

Step 632 of this subroutine is initiated which determines if the video data input stream from the camera is open. If step 632 determines that the input stream is not open, then this subroutine proceeds to step 648. Step 648 can receive data of the video/audio frames from RAM memory and/or non-volatile long term memory (step 650). After step 648 is completed, then this subroutine stops or ends (step 652).

While the input stream is open from step 632, this subroutine determines if the speed is less than "normal" (step 634). If so then step 636 is initialized which sets the segment playback fps to equal the recording fps divided by the speed for that video section (Segment FPS=Record_FPS/Speed). After which, this subroutine proceeds to step 646 to write frame(s) to buffer (RAM memory and/or non-volatile long term memory). The subroutine then proceeds to step 647, which displays the Audio/Video feed from the RAM butter, and after which continues to step 632.

If the speed is not less than "normal" (step 634), then this subroutine determines if the speed equals "normal" (step 638). If so then step 340 is initialized which sets the segment playback fps to equal the recording fps for that video section (Segment FPS=Record_FPS). After which, this subroutine proceeds to step 646 to write frame(s) to buffer (RAM memory and/or non-volatile long term memory). After step 646, this subroutine returns to step 632.

If the recording speed does not equal "normal" (step 638), then this subroutine determines if the speed is greater than "normal" (step 642). If so then step 644 is initialized which sets the segment playback fps to equal the recording fps times by the speed for that video section (Segment FPS=Record_FPS*Speed). After which, this subroutine proceeds to step 646 to write frame(s) to buffer (RAM memory and/or non-volatile long term memory). After step 646, this subroutine continues to step 647 to display the audio/video (A/V) feed from the RAM buffer, and then returns to step 632.

It can be appreciated that this segment time compression and expansion subroutine includes a looped subprocess including steps 632-647 until the input stream is determined to not be open in step 632.

A possible method of using the present technology is illustrated in FIG. 24. A user can launch an application software (App) on a device capable of running the App, utilizing a user interface of the present technology. The App can open in an image composition screen, which can be as a default setting. Favorite or predetermined settings can optionally be selectable by the user. Device settings are applied and the device is in a ready state, while optionally still in the image composition screen.

The user can the start recording, utilizing the device's camera, a remote camera or a remote video stream, by touching or activating a "Record" icon associated with the App or user interface. Optionally, the user can touch and hold the Record icon or button continuously to continue recording. One aspect can be that the icon or a button associated with the icon can be animated to indicate a live recording is active.

While the recording is in progress, the user can enter special effect commands being to zoom in or zoom out. The video being displayed by the device is configured or configurable to show the zooming in or out special effect associated with the video in real time.

While the recording is in progress, the user can enter special effect commands being to create slow motion and/or fast motion. One aspect is that there is no difference in the speed of the display of the live video on the device.

The user can end recording by releasing or removing the touching of the Record icon or button. After which, the App stops recording, displays a "Review" screen, completes processing the special effect, and provides an option to save or autosave the processed video.

After saving, the newly produced video can be viewed by the device or a remote device after the processing has been completed. The video can play continuously and restart after ending. The App can provide a suite of editing tools that can be utilized to further edit or modify the raw or processed video. Optionally, the video can be edited to fine tune the slow motion and fast motion effects, along with other custom design elements, and post the video. This process can be repeated until a desired video result is created.

The App completes processing any new elements in the video and play back to the user after each edit is completed. This process can be repeated until a desired video result is created.

After processing the video and/or any additional editing to the video is complete, the App can save a final video or edit. The App can save the final video to the device's internal memory, to an external memory and/or to the cloud.

The App can further provide an option allowing the user to post the final video to social media platform. The App can upload the final video onto additional platforms and/or clouds, and display the composition screen allowing the user to start recording a new video.

Figure 25:
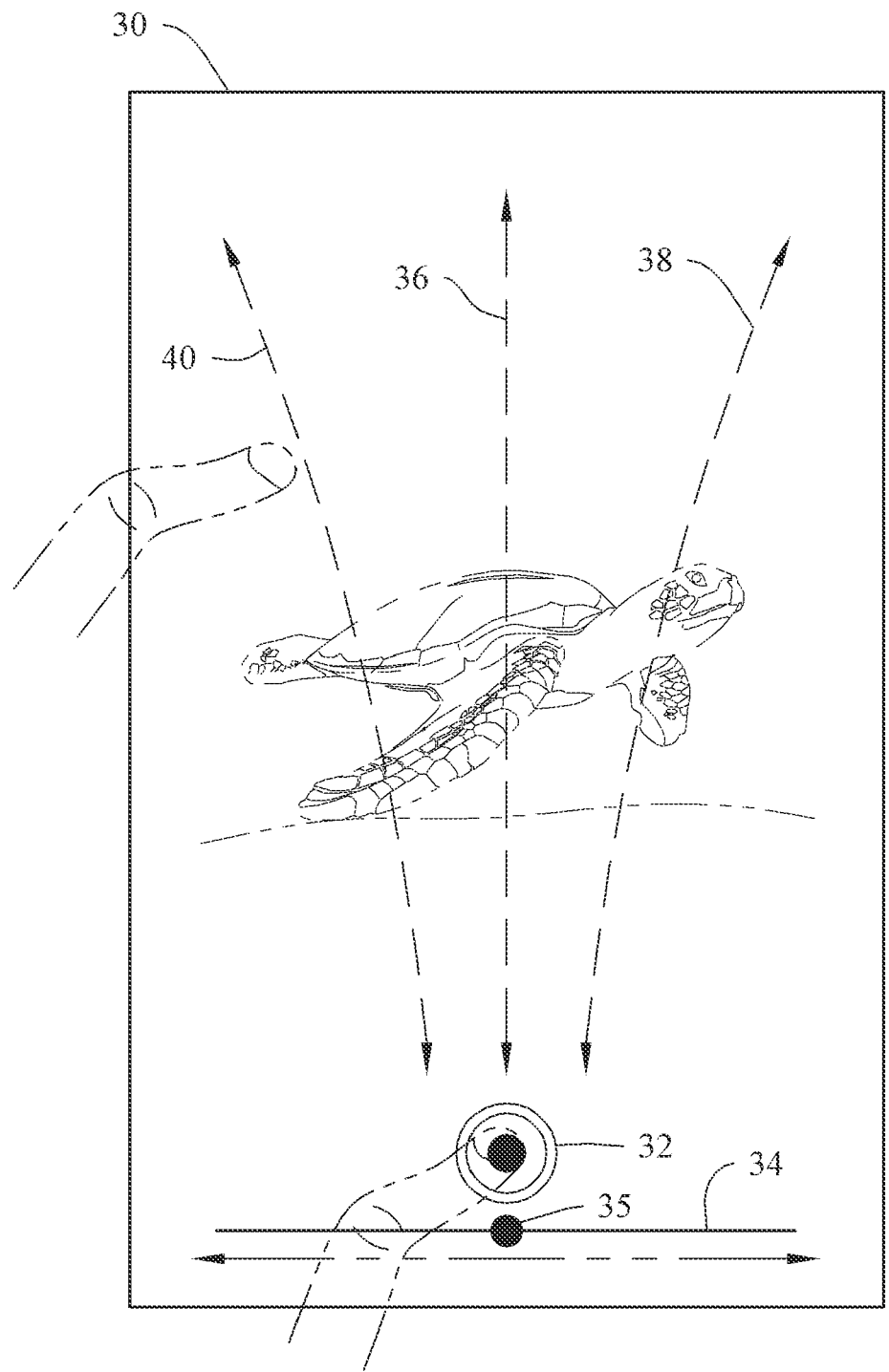
FIG. 25 is a sample graphical user interface (GUI) screenshot of the interface system of the present technology.

With reference to FIG. 25, at least a portion of the interface 30 is described. The interface 30 can be, but not limited to, a GUI interface capable of providing a screen for device optimized parameters or variables. The GUI 30 can be configured or configurable to include a recording start/stop control 32 provided anywhere on the screen, and a speed selection region 34 provided anywhere on the screen that can provide a default or predefined frame rate speed that is used to manipulate the frame in the raw video data from the camera 12. The speed selection region 34 can include a speed selection affordance or control indicator 35 that can travel along the speed selection region 34 via control by the user to indicate the current or selectable speed. The GUI interface 30 can also include regions anywhere on the screen for controlling zoom 36, zoom and fast motion speed rate 38, and/or zoom and slow motion speed rate 40.

In some or all embodiments, a user can touch and/or hold the recording start/stop control 32 to initiate, stop or pause the recording function of the camera. Additionally, a user can interact with the speed selection region 34 by touching the region with a finger or stylus-like device, and making a sliding motion along the region in any direction. The processing unit can be configured or configurable to interpret this sliding movement as a special effect input command. For example, sliding from a central area of the speed selection region 34 toward the right could change the speed rate from the native speed rate to 2×, 3×, 4×, "n"× the native speed rate, depending on how far right the sliding motion travels on the speed selection region 34. Sliding from the central area of the speed selection region 34 toward the left could change the speed rate from the native speed rate to −2×, −3×, −4×, −"n"× the native speed rate, depending on how far left the sliding motion travels on the speed selection region 34.

In some or all embodiments, a user could control the zoom function of the camera by making a vertical sliding motion from a lower region of the GUI toward an upper region. A user could further control a combination of zoom and speed rate by making a curving vertical sliding motion from a lower region of the GUI toward an upper right or left region, depending if a zoom and fast motion or slow motion effect is desired.

Alternatively, the GUI interface 30 can be configured or configurable to include areas, icons or windows where functions, attributes, operations, settings and/or characteristics of the camera and/or display can be controlled. Examples of these functions, attributes, operations, settings and/or characteristics can be, but not limited to, flash, hands free, timer, mute, selfie, broadcast, sharing, filters, media, stop/start recording, and the like. The GUI interface 30 can be configured or configurable to be used to preset a minimum, a maximum or a range of the speed rate of the raw video.

Still further and optionally, the GUI interface 30 can be configured or configurable to include areas, icons or windows providing editing options to the video data stream. The editing options can include, but not limited to, adding text, adding drawings, adding sounds, face filters, adding decorations, creating a video loop, adding a cover, and the like.

The GUI interface 30 can be configured or configurable to include a display of the output video recording data, which can be the raw video data and/or the modified video data, or the edited video data stream can be displayed. It can be appreciated that the output video recording data displayed by the GUI interface 30 can be dynamically changing in real time due to changes in the input. Thus, the present technology can display, in real time, a seamless transition between the raw video data, any number of the modified video data or subsets thereof, while the camera acquires the video and while recording is in progress. The modified video data can include any number of fast to slow motion subsets, and these subsets can be in combination with subsets of the raw video data. The displaying of the raw video data and/or any number of modified video data is accomplished live or in real time as the camera is capturing images associated with the raw video data. It can be appreciated that the present technology renders the displayed output video data as the camera captures the images and while the output video is written to memory. Consequently, allowing the user to move, pan, zoom, etc. the camera while still capturing the video and at the same time applying and displaying any number of special effects to the raw video data.

In some or all embodiments, the user of the device implementing the present technology and GUI 30 is able to access operational functions of the present technology and/or device and/or camera and/or saved video by entering login credentials associated with a user account.

Figure 26:
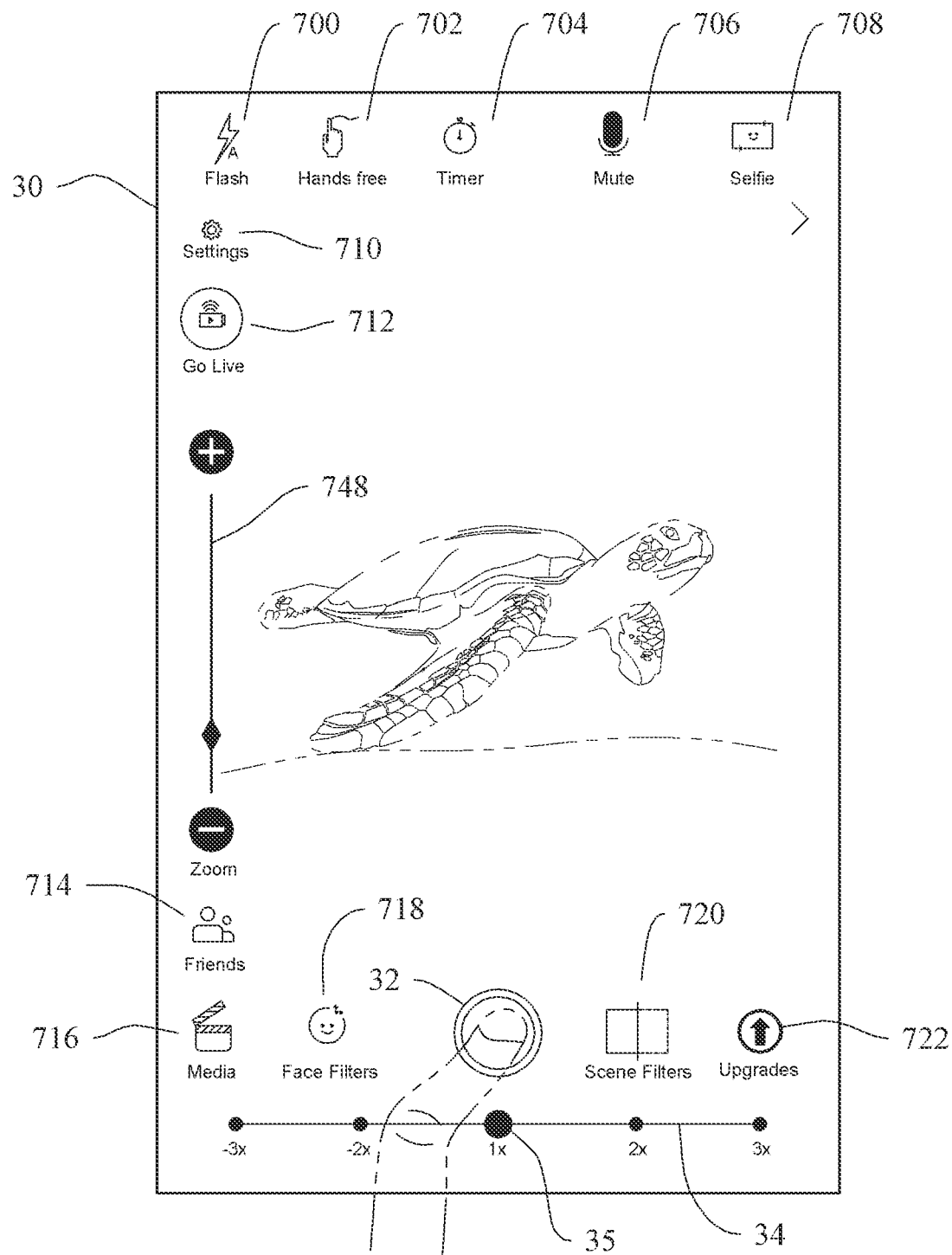
FIG. 26 is a sample GUI screenshot of a "Camera View" of the device employing the GUI while recording in normal "1x" speed utilizing the process of the present technology.

FIG. 26 illustrates an embodiment of the GUI 30 of the present technology utilized on an electronic device displaying an implementation of GUI of the present technology on a touch screen. FIG. 26 is an exemplary "Camera View" of the device employing the GUI 30 while recording in normal "1×" speed. In this normal speed setting, the raw video stream from the camera is not changed and displayed in real time in the GUI 30.

In some or all embodiments of the present technology, the screen shot or GUI 30 can include a number of icons or actuatable elements representing various functions or affordances that the user can select. These affordances change icons as different "states" settings are selected for each affordance by the user. Affordances utilizable in the present technology or GUI 30 can be object's properties that show the possible actions users can take with it, thereby suggesting how they may interact with that object. Affordances can be deliberately constrained to enable only the correct or desired actions when actuated. The affordances utilized in the present technology can include cues to suggest actions that are possible by an interface element. The affordances utilizable in the present technology or GUI 30 can be, but not limited to, any actuatable element in the realm of icons, buttons, dropdown menus, actuatable regions, images, cursor actuatable elements, or touch dependent inputs. In some or all embodiments of the present technology, any of the affordances can be displayed, activated, manipulated, deactivated or hidden depending on a touch or touch release by the user on the display, which can be a touch sensitive screen or pad.

These affordances can be, but not limited to: a "Flash" affordance 700, which when activated (e.g. via a tap gesture), enables the user of the device to select a flash or light of the device to be on, off or automatically activated depending on light levels detected by or inputted into the device implementing the present technology; a "Hands Free" affordance 702, which when activated (e.g. via a tap gesture), enables the user of the device to control aspects of the present technology utilizing gestures on the device, remote control units, speech recognition, and/or a preprogrammed sequence or scheme so that the user can initiate continuously recording without requiring the user to constantly touch with the device (A "Hands-On" mode means the user must touch the record button continuously to continue recording. Once the user releases the record button, recording stops); a "Timer" affordance 704, which when activated (e.g. via a tap gesture), enables the user of the device to start and/or stop recording at a predetermined time(s) of day and/or for a predetermined time duration(s); a "Mute" affordance 706, which when activated (e.g. via a tap gesture), enables the user of the device to mute or deactivate a microphone associated with the device and/or camera; a "Selfie" or "Rear" affordance 708, which when activated (e.g. via a tap gesture), enables the user of the device to switch to a rearward facing or secondary camera associated with the device implementing the present technology; a "Setting" affordance 710, which when activated (e.g. via a tap gesture), enables the user of the device to control operational settings of the GUI, device and/or camera; a "Go Live" affordance 712, which when activated (e.g. via a tap gesture), enables the user of the device to transmit the video feed from the present technology to a remote device or server; a "Friend" affordance 714, which when activated (e.g. via a tap gesture), enables the user of the device to search and/or invite friends or contacts to make a social connection; a "Media" affordance 716, which when activated (e.g. via a tap gesture), opens a media folder that enables the user of the device to open and load videos from a folder created in memory of the device or a remote device or a cloud storage; a "Face Filters" affordance 718, which when activated (e.g. via a tap gesture), enables the user of the device to initiate a subprocess or a third-party application that applies filtering with "Augmented Reality" (AR) functions to the video; a "Scene Filters" affordance 720, which when activated (e.g. via a tap gesture), enables the user of the device to initiate a subprocess or a third-party application that applies filtering functions to the video; and/or an "Upgrades" affordance 722, which when activated (e.g. via a tap gesture), enables the user of the device to upgrade aspects of the present technology and/or memory storage. It can be appreciated that additional icons, functions or affordances can be implemented with or on the GUI. Any number of the icons or affordances 700-722 can be positioned or positionable in predetermined or customizable locations in the GUI 30.

The recording start/stop control 32 can be provided as a button anywhere on the screen that allows the user to start, stop and/or pause the recording of video (e.g. via a tap or touch holding gesture), and the speed selection region which can be a slide bar 34 can be provided anywhere on the screen as a slide bar with circles and/or other shapes and markers indicating selectable playback speeds of the portion of the video in playback. The slide bar 34 enables the user to control the special effects aspect of the video (e.g. via a sliding gesture). The current speed indicator in FIG. 26 is set at "1×" indicating the record speed is "normal". This speed factor is inputted into step 82 of the process illustrated in FIG. 7. In this example, since the user has not entered a special effects command (speed factor "1×" or "normal"), then the process would proceed to step 88, dependent in part of preceding steps.

If the user activated any of the additional operation functions 700-722, then these inputs are determined by step 88, and the appropriate or corresponding parallel processes are initiated in step 78. The record button 32, the speed selection button 35, the speed selection region 34, the zoom level indicator/controller 748, and any icons can be activated utilizing the touchscreen of the user device.

In FIG. 26, the video feed displayed in a first region of the GUI 30 is a live video feed from the respective camera or a remote video feed. Any editing or modified video stream from any initiated operation functions 700-722 can be displayed in one or more additional regions of the GUI 30. These display regions in the GUI 30 can be separate and independent regions, can in part overlap, or can be overlaid. In some or all implementations, the video feed displayed in any of the regions may be previously recorded video footage. In other implementations, the video displayed in any of the regions of the GUI 30 can be, for example, any position on an event timeline associated with the displayed video feed. The timeline can be manipulated by the user by sliding a timeline bar causing the present technology to display the video feed from that point in time forward in any of the regions.

Additionally, the raw video stream and/or editing video stream can be saved to an appropriate memory indicated by the user using the GUI 30. The memory or memory devices selected by the user using the GUI 30 is inputted into the write video stream subroutine in FIG. 8 and the video stream(s) are written or copied appropriately.

Figure 27:
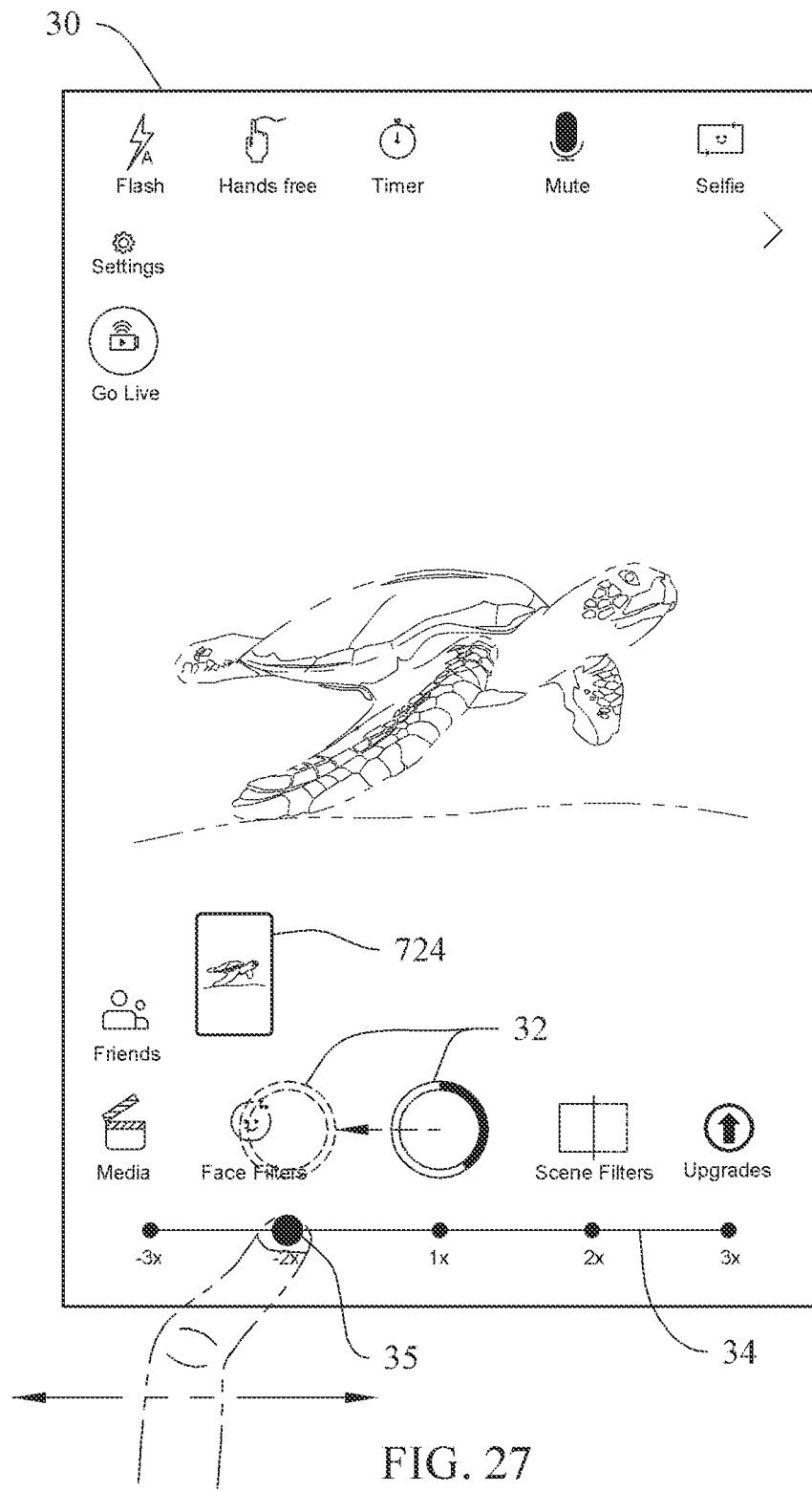
FIG. 27 is a sample GUI screenshot of a "Camera View" of the device employing the GUI while recording in slow motion "−2×" speed utilizing the process of the present technology.

FIG. 27 illustrates an exemplary embodiment "Camera View" of the electronic device employing the GUI 30 of the present technology while recording in slow motion "−2×" speed. In this slow motion speed setting, the frame adding subroutine is utilized and the apparent playback speed is twice as slow as a normal video. In the "Hands-Free" mode example, the user can tap a desired speed marker or slide an indicator to a desired speed marker located on the speed selection region 34. In "Hands-On" mode, the user can press and hold the "Record" button 32 and slide his finger to the left and the button follows directly under the user's finger, so that the button is vertically above the "−2×" affordance label in this example. It can be appreciated that the speed selection affordance or indicator 35 can automatically move along the speed selection region 34 to follow the movement of the "Record" button 32.

In some or all embodiments, a window 724 can be implemented in the GUI 30 that displays the raw video stream, while a majority of the GUI 30 displays the slow motion video stream. In the alternative, it can be appreciated that the window 724 can display the slow motion video stream, while the majority of the GUI 30 displays the raw video stream. In another alternative, it can be appreciated that the window 724 can display the slow motion video stream or a still frame "cover" image of the video stream, while the majority of the GUI 30 displays the live video stream.

The current speed indicator in FIG. 27 is set at "−2×" indicating the record speed is slow motion. This speed factor is inputted into step 82 of the process illustrated in FIG. 7. In this example, the user has entered a special effects command (speed factor "−2×" or "slow motion"), then the process would proceed to step 84 wherein the process would initiate the special effects subroutine in FIG. 9.

If the user activated any of the additional operation functions 700-722, then these inputs are determined and the appropriate or corresponding parallel processes are initiated in step 78.

With the speed factor set to "−2×" using the GUI 30, the apply special effects subroutine is initiated which determines if the input from the GUI 30 represents a fast motion command (step 156 in FIG. 9) or a slow motion command (step 160 in FIG. 9), or go to advanced slow motion subroutine command (step 150 in FIG. 9). The process then initiates the appropriate subroutines corresponding to the input by the user on the slide bar 34. In this example, the frame adding subroutine illustrated in FIG. 13 would be initiated.

As the raw video stream is modified per the initiated subroutine, the GUI 30 displays in real time the resultant slow motion video via the device's display. The raw video stream can also be displayed via the GUI 30, in conjunction with the resultant slow motion video. Additionally, the resultant slow motion video and/or the raw video stream can be saved to an appropriate memory indicated by the user using the GUI 30. The memory or memory devices selected by the user using the GUI 30 is inputted into the write video stream subroutine in FIG. 8 and the video stream(s) are written or copied appropriately.

Figure 28:
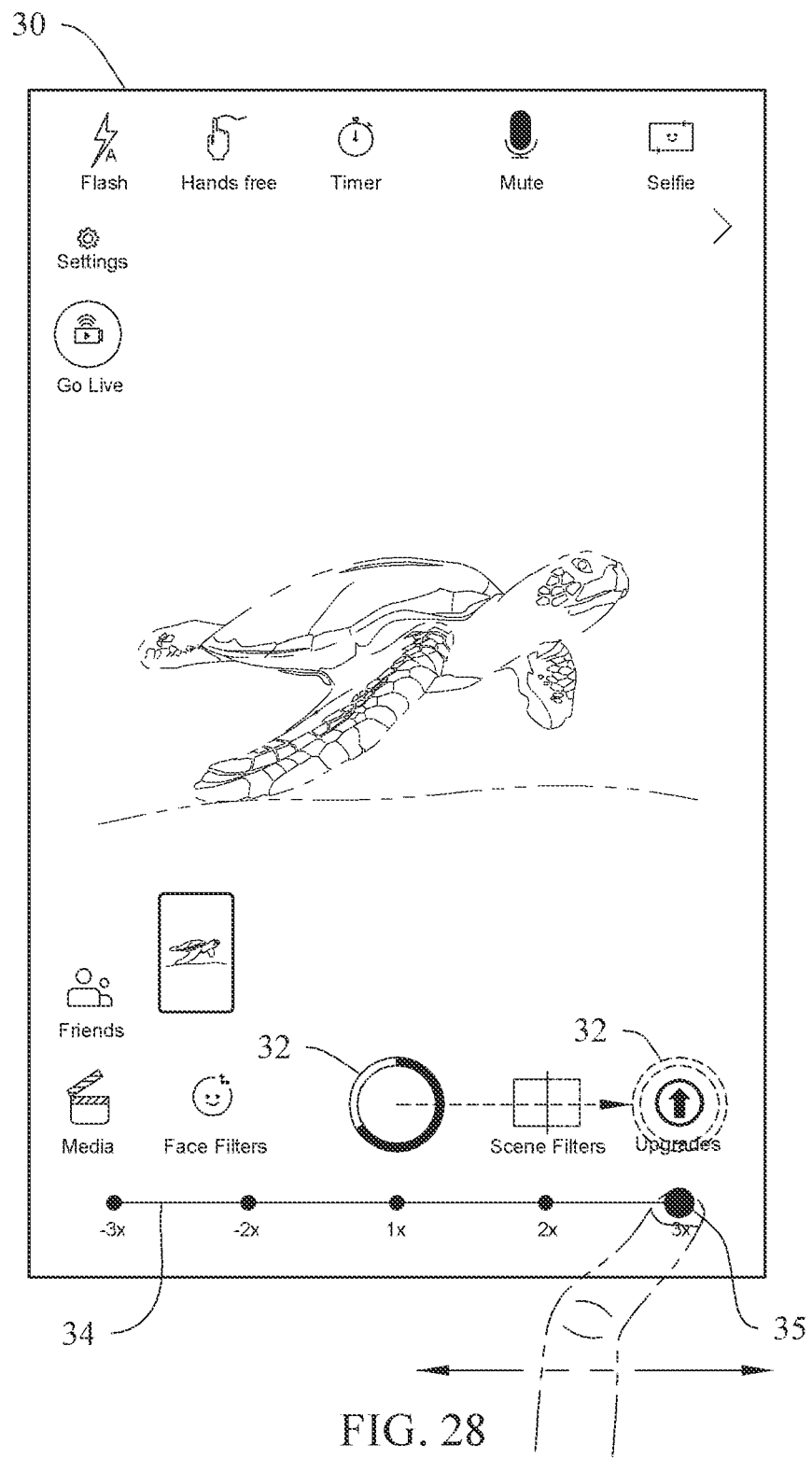
FIG. 28 is a sample GUI screenshot of a "Camera View" of the device employing the GUI while recording in fast motion "3×" speed utilizing the process of the present technology.

FIG. 28 illustrates an exemplary embodiment "Camera View" of the device employing the GUI 30 of the present technology while recording in fast motion "3×" speed. In this fast motion speed setting, the frame dropping subroutine or time compression subroutines is utilized and the apparent playback speed is three times as fast as a normal video without frame dropping. In this example, a "Hands-Free" mode can be utilized where the user can tap a desired speed marker or slide an indicator to a desired speed marker located on the speed selection region 34. In a "Hands-On" mode, the user can press and hold the record button 32 to record continuously and slide his finger left and right to indicate desired speed and the speed affordance or indicator 35 located on the speed selection region 34 moves accordingly.

In some or all embodiments, the user can utilize a "One-Touch" mode to manipulate the video's time. In this mode, recording operation can be initiated by touching the screen, and taking a finger off the screen will stop recording operation. Alternatively, recording is in operation while touching the screen. Exemplary operation can include: moving the touching finger to the left of a middle of the screen will slow down video's time; moving the touching finger to the middle of screen returns video's time to normal speed; moving the touching finger to the right left of the middle of the screen will speed up video's time; the touching finger can quickly go from extreme left to extreme right (and vice-versa); moving the touching finger up will initiate a zoom in (telephoto) operation; moving the touching finger down will initiate a zoom out (wide angle) operation; and adjusting other settings separately live, such as but not limited to, flash 700, mute 706, etc., with other finger while recording is in progress and while the touching finger is on the screen.

Still further, some or all embodiments can include a "Multiple Touch" mode that allows the user to individually select functions through user interface whilst video is being recorded is shown in the user interface.

In some or all embodiments, the window 724 can be implemented in the GUI 30 that displays the raw video stream, while the majority of the GUI 30 displays the fast motion video stream. In the alternative, it can be appreciated that the window 724 can display the fast motion video stream, while the majority of the GUI 30 displays the raw video stream. In another alternative, it can be appreciated that the window 724 can display the fast motion video stream, while the majority of the GUI 30 displays the live video stream. In another alternative, it can be appreciated that the window 724 can display the still frame "cover image" for the fast motion video stream, while the majority of the GUI 30 displays the live video stream.

The current speed indicator in FIG. 28 is set at "3×" indicating the record speed is fast motion. This speed factor is inputted into step 82 of the process illustrated in FIG. 7. In this example, the user has entered a special effects command (speed factor "3×" or "fast motion"), then the process would proceed to step 84 wherein the process would initiate the special effects subroutine in FIG. 9.

If the user activated any of the additional operation functions 700-722, then these inputs are determined and the appropriate or corresponding parallel processes are initiated in step 78.

With the speed factor set to "3×" using the GUI 30, the apply special effects subroutine is initiated which determines if record fps=playback fps and if the input from the GUI 30 represents a fast motion command (step 156 in FIG. 9) or a slow motion command (step 160 in FIG. 9). The process then initiates the appropriate subroutines corresponding to the input by the user on the slide bar 34. In this example, the speed up subroutine illustrated in FIG. 10 would be initiated. If record fps>playback fps and if the input from the GUI 30 represents a fast motion command or a slow motion command, the process then initiates the appropriate subroutines corresponding to the input by the user on the slide bar 34. In this case, the speed up subroutine illustrated in FIG. 12, step 262 initiates subroutine illustrated in FIG. 20.

As the raw video stream is modified per the initiated subroutine, the GUI 30 displays in real time the resultant fast motion video via the device's display. The raw video stream can also be displayed via the GUI 30, in conjunction with the resultant slow motion video. Additionally, the resultant fast motion video and/or the raw video stream can be saved to an appropriate memory indicated by the user using the GUI 30. The memory or memory devices selected by the user using the GUI 30 is inputted into the write video stream subroutine in FIG. 8 and the video stream(s) are written or copied appropriately.

Figure 29:
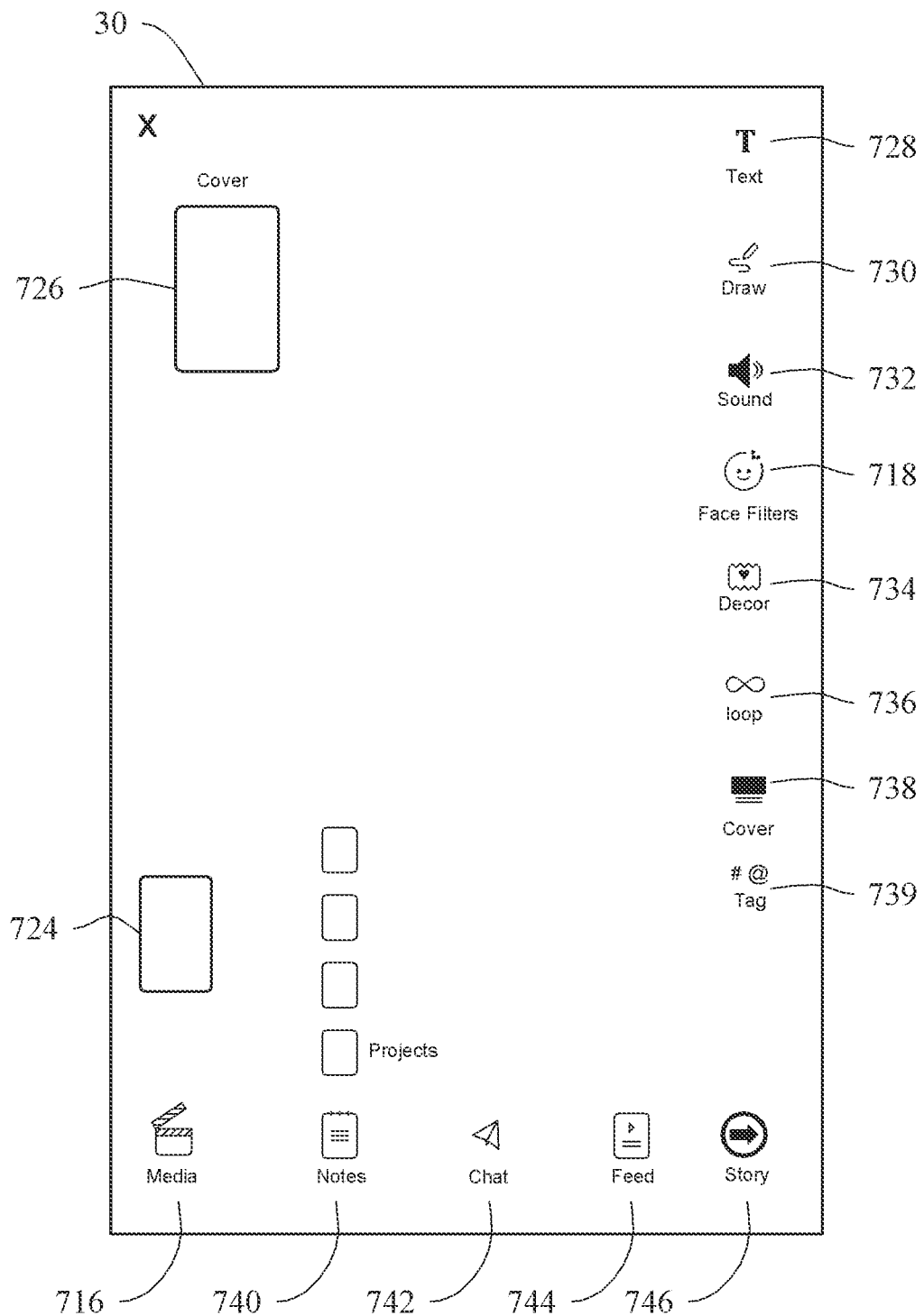
FIG. 29 is a sample GUI screenshot of a "Review Screen" of the device employing the GUI while the user has stopped recording utilizing the process of the present technology.

FIG. 29 illustrates an exemplary embodiment "Screen Shot" of the device employing the GUI 30 of the present technology while the user has stopped recording and the system displays a review screen for the user to review and edit the captured video. The GUI can highlight the icons by removing the background image example.

In some or all embodiments, the review screen can contain a number of icons representing various functions or affordances that the user can select. These icons, functions or affordances can be, but not limited to: a "Display Cover" affordance 726 which displays the still frame "cover image" of the video, a "Text" affordance 728, which when activated (e.g. via a tap gesture), enables the user of the device to add text to the video; a "Draw" affordance 730, which when activated (e.g. via a tap gesture), enables the user of the device to add images, clipart's and/or draw to the video; a "Sound" affordance 732, which when activated (e.g. via a tap gesture), enables the user of the device to add sound or music to the video; the "Face Filter" affordance 718: a "Decor" affordance 734, which when activated (e.g. via a tap gesture), enables the user of the device to add decorations such as stickers and emoji's to the video; a "Loop" affordance 736, which when activated (e.g. via a tap gesture), enables the user of the device to create loop sequence of a selected segment of the video; a "Cover" affordance 738, which when activated (e.g. via a tap gesture), enables the user of the device to use a frame or segment of the video as a cover page for the video a "Tag" affordance 739, which when (e.g. via a tap gesture), enables the user of the device to identify and tag other users who may nor may not appear in the video, and add "hashtags" for search engine optimization; a Media" affordance 716 which when activated (e.g. via a tap gesture), enables the user of the device to save the video to a folder on the device or in the cloud; a "Notes" affordance 740, which when activated (e.g. via a tap gesture), enables the user of the device to save the video to a "Notes" folder or application associated with the device; a "Project" affordance, which when activated (e.g. via long press "a touch and hold" gesture on the "Notes" affordance), enables the user of the device to save the video to a "Projects" folder or application associated with the device for collaboration between other users; a "Chat" affordance 742, which when activated (e.g. via a tap gesture), enables the user of the device to send the video to a contact or friend; a "Feed" affordance 744, which when activated (e.g. via a tap gesture), enables the user of the device to post the video to the user's channel's timeline in the social media aspect of the app, which can also be configured to post to the user's Web or RSS feed; and/or a "Story" affordance 746, which when activated (e.g. via a tap gesture), enables the user of the device to post the video to the user's story or social media page within the app or shared externally to other social media apps like Instagram®, Facebook®, Twitter®, etc. In some or all embodiments, when the Notes affordance 740 is pressed, a list of icons or "Projects" folders appear, each representing an available project the user can post the video to.

For example, the user can add decorations in the video, as well as set other properties for social media upload into the cloud. The user can elect to save the videos in the user's "Media" folder, save to the user's "Notes" location, save to the user's "Projects" location, send the video to a "Chat" contact or group, post to their "Feed", or post to their "Story". The system saves the story and takes appropriate action, utilizing any one of the subroutines and/or subprocesses associated with the present technology.

Figure 30:
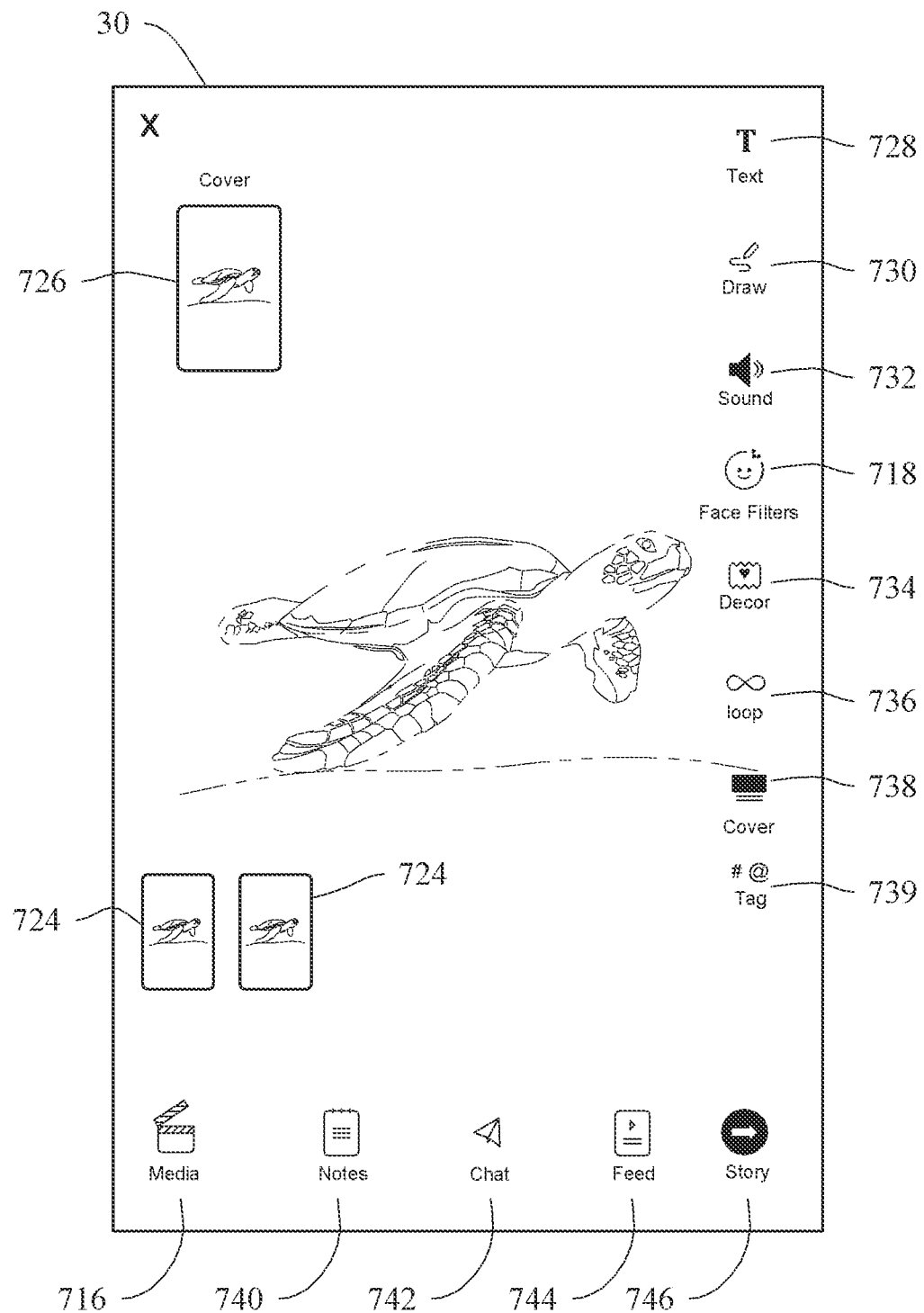
FIG. 30 is a sample GUI screenshot of the "Review Screen" of FIG. 29 to review the captured video utilizing the process of the present technology.

FIG. 30 illustrates an exemplary embodiment "Screen Shot" of FIG. 29 where the user has stopped recording and the system displays the review screen for the user to review the captured video. It can be appreciated that multiple windows 724 can be utilized, each displaying a different edited video stream or still frame cover image of the edited video stream.

Figure 31:
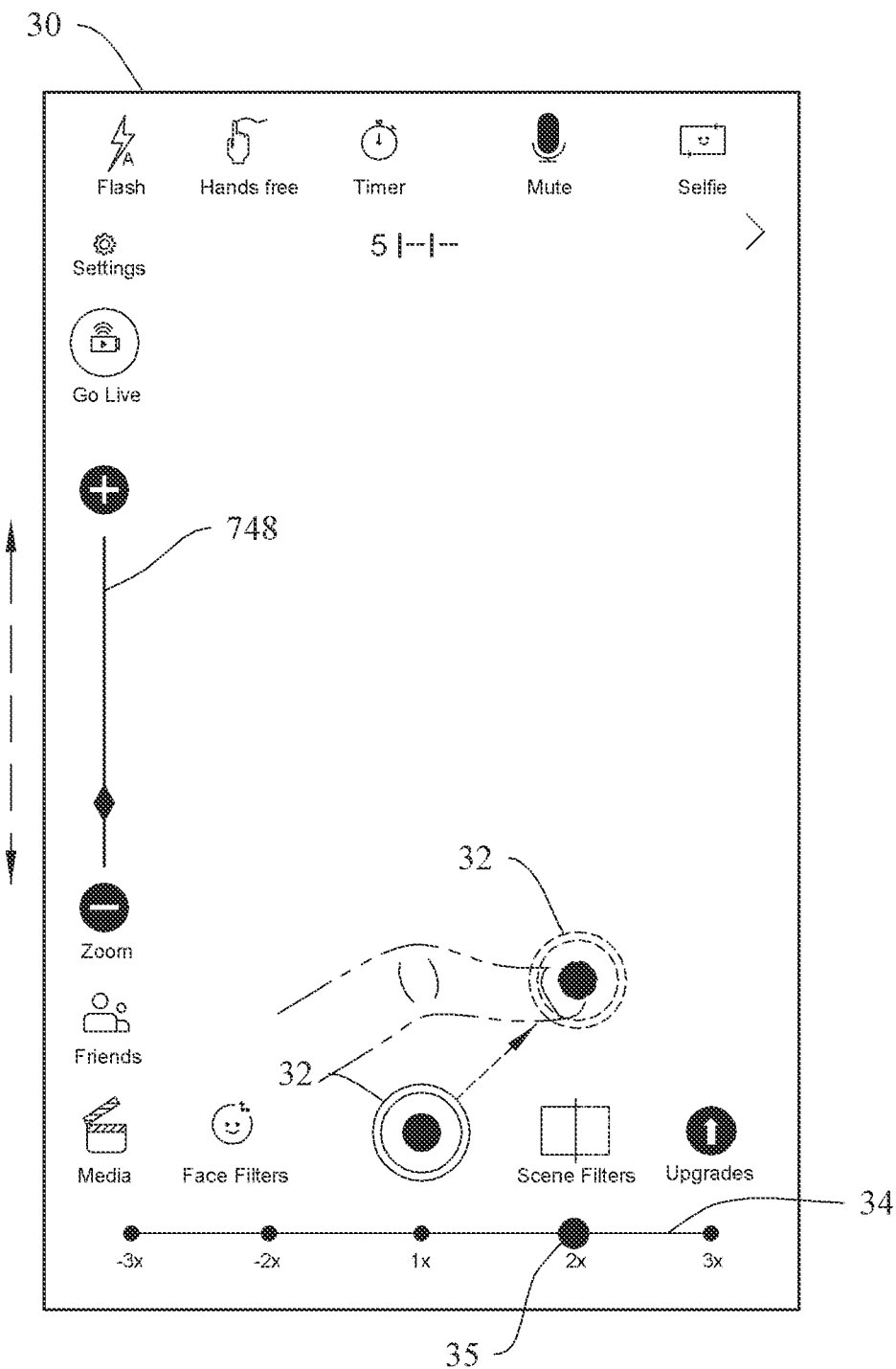
FIG. 31 is a sample GUI screenshot of a "Composition Screen" of the device employing the GUI before recording has started utilizing the process of the present technology.

FIG. 31 illustrates an exemplary embodiment "Screen Shot" of the device employing the GUI 30 of the present technology while the system displays a composition screen before recording has started. The speed range can be displayed from "−3×" to "3×" normal speed, but additional speeds and ranges can be utilized and displayed.

In some or all embodiments, the composition screen can include a zoom setting region 748, which can control a zoom function of the camera (e.g. via a sliding and/or tap gesture or pinch-to-zoom). The zoom setting region 748 can be a zoom slid bar having an indicator moveable by the user by way of touching and sliding the indicator to a desired zoom operation. For example, the zoom slid bar 748 can be a vertically orientated slide bar located on the left or right side of the GUI 30. It can be appreciated that any gesture interface can be utilized in place of the exemplary slide bar. As the user slides his finger from top to bottom and back on the zoom slide bar 748, the "zoom factor" adjusts zoom in and zoom out accordingly as illustrated. In another example, using the "pinch-to-zoom", the user uses a multi-touch gesture to quickly zoom in and out, while the "zoom factor" adjusts up and down accordingly.

The record button 32 can be located in a lower middle section of the GUI, with the "time speed" side bar 34 located therebelow. It is appreciated that the GUI 30 is not limited to specific locations of the record button 32, speed slide bar 34 and any of the icons as illustrated herewith. The record button 32, speed slide bar 34 and any of the icons can be located anywhere in the GUI, and can also be reconfigured, sized and/or moved by the user. For example, the user can provide a touch and hold gesture to any of the affordances, which thus enables the user to move or resize that selected affordance.

In FIG. 31, the user has tapped the "1×" speed marker or slid the indicated to the "1×" speed marker, which means the raw video is being displayed at normal speed with no special effects. It can be appreciated that the indicator "1×" can be substituted with other speed indicators such as, but not limited to, "Normal".

The user can selectively set the location of the record button 32 before recording commences, to set the zoom 748 and the speed factors 34 for the device once recording starts. As the user move the moveable record button, the zoom and speed factors move accordingly. As the user slides his finger side to side on the speed slide bar 34, the "time speed" adjust faster or slower accordingly as illustrated.

Figure 32:
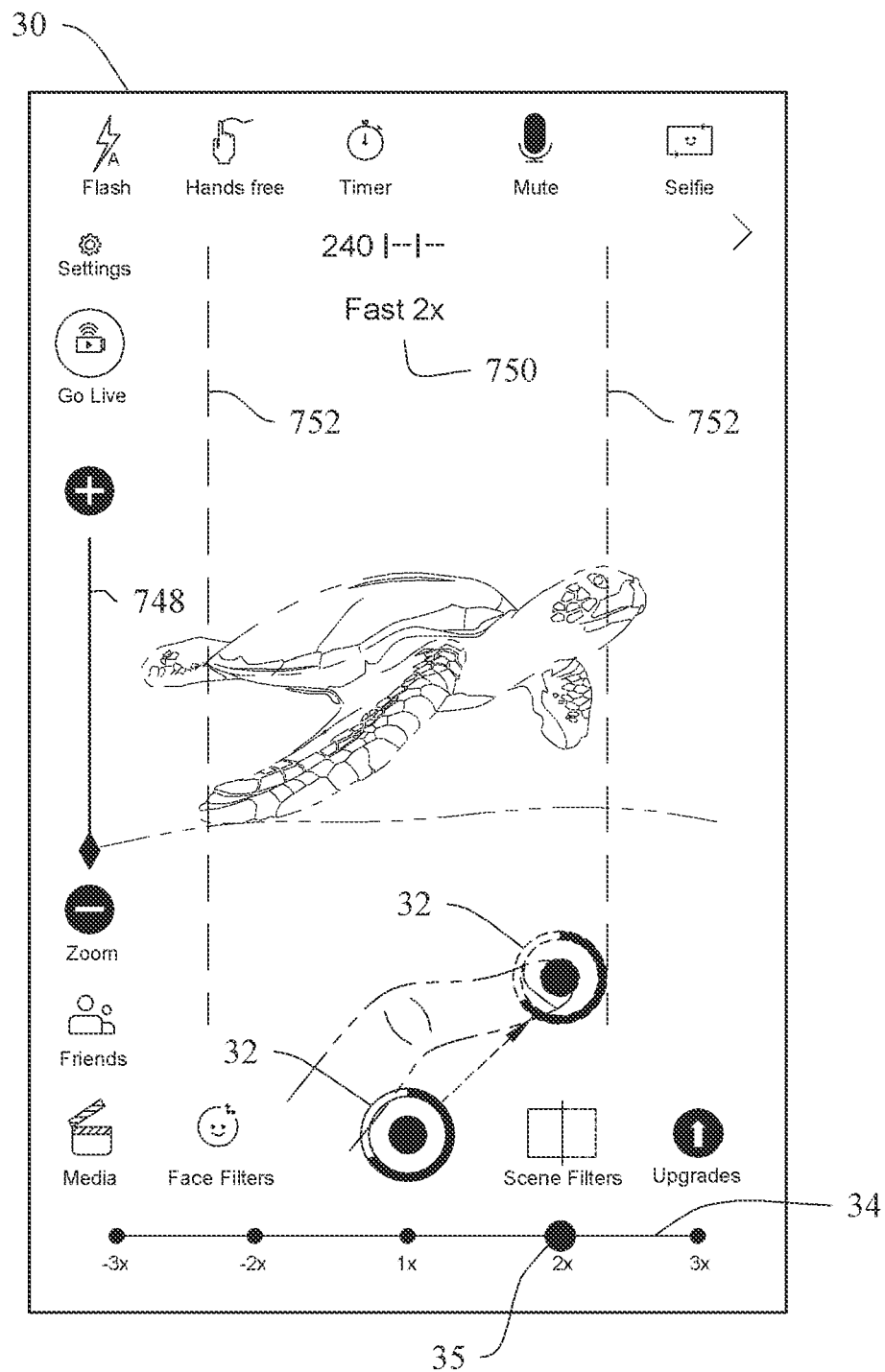
FIG. 32 is a sample GUI screenshot of a "Recording Screen" of the device employing the GUI while recording has started in fast motion "2×" speed utilizing the process of the present technology.

FIG. 32 illustrates an exemplary embodiment "Screen Shot" of the device employing the GUI 30 of the present technology while the system displays a recording screen while recording has started. In this example, the zoom factor is set to zero "0", and the speed factor is set to fast motion "2×" being two times faster than normal speed.

In some or all embodiments, while the recording operation is active, the present technology can enlarge the record button 32 to be visible even underneath the user's finger. A radial progressive bar can be utilized with the record button 32 to indicate recording has started and/or a time duration of the recording. The record button 32 can be colored inside to assist in viewing by the user, and it can be appreciated that the size, configuration and/or color of the record button 32 can be configurable by the user.

In the alternative, the record button 32 can be moved to a location adjacent to the selected speed factor (e.g. via a touch holding gesture). In this present example, above the highlighted "2×" in the "speed scale" 34. The record button 32 can be configurable to follow the user's finger movements as long as the user is touching the screen.

The selected recording FPS, playback FPS and/or speed factor can be displayed in the GUI, as illustrated by the indicator "240 I--I--" and "Fast 2×" 750 in the center near the top of the GUI. The FPS and/or speed factor indicator can be animated or blinking prominently to alert the user of the FPS and/or recording speed. In another embodiment, the indicator 750 is the maximum time length for the video segment.

In some or all embodiments, the GUI 30 can also include "speed guidelines" 752 utilized and displayed vertically in dashed lines. The guidelines 752 are configured or configurable to guide the user's finger or pointing device to indicate when the user's touch point is approaching and then crossing the boundary for speed change.

Upon the user sliding or tapping to the desired speed factor, the application program of the present technology initiates the appropriate subroutine and/or necessary algorithm to create the fast or slow motion special effect associated with the selected speed factor received by the GUI.

Figure 33:
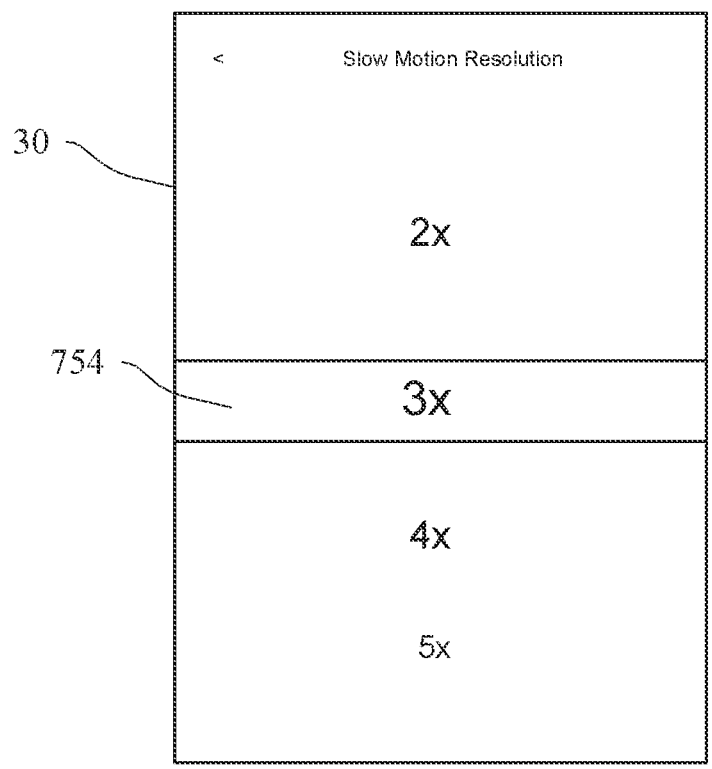
FIG. 33 is a sample GUI screenshot of a "Slow Motion Resolution" screen of the device employing the GUI including scrollable sections utilizing the process of the present technology.

FIG. 33 illustrates an exemplary embodiment "Screen Shot" of the device employing the GUI 30 of the present technology while the system displays a "Slow Motion Resolution" settings screen. In this example, the slow motion resolution is the slow motion factor supported by hardware, without frame adding.

In some or all embodiments, the GUI 30 can include a scrollable selection 754 of multiple speed factor values. The selectable speed factor values in scrollable selection 754 (e.g. via a slide gesture) are the settings for the maximum video quality that the device supports. The selected speed factor can be highlighted to indicated which speed factor selected.

Figure 34:
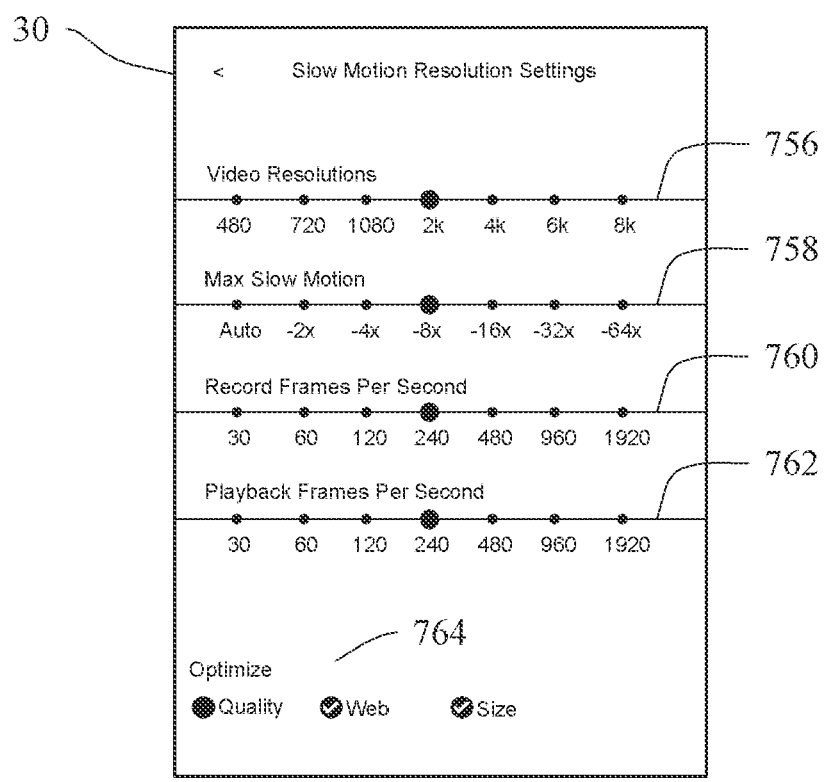
FIG. 34 is a sample GUI screenshot of a "Slow Motion Resolution" screen of the device employing the GUI including slide bars utilizing the process of the present technology.

FIG. 34 illustrates an exemplary embodiment "Screen Shot" of the device employing the GUI 30 of the present technology while the system displays an alternative advanced "Slow Motion Resolution" settings screen. In this example, the GUI 30 can display and utilize multiple slide bars, each controlling a different aspect or operation (e.g. via a slide gesture). When the value of one of the slides is adjusted, the corresponding values of the other slides change accordingly.

In some or all embodiments, the slide bars can be horizontally stacked or vertically spaced. The slide bars can be associated with a "Video Resolution" affordance 756, which when activated (e.g. via a slide gesture), enables the user to set a resolution size of the resulting video. The higher the resolution, the bigger the file, and the larger the bandwidth required to serve the files. Revenue can be received by charging users a fee relating to the desired resolution. With higher video resolution, higher rates can be charged for hosting and bandwidth costs.

Another slide bar can be associated with a "Max Slow Motion" affordance 758, which when activated (e.g. via a slide gesture), enables the user to set the maximum slow motion speed factor. As Video Resolution increases, the Maximum Slow Motion Effect (Max SlowMo) decreases and the Record Frames Per Second (Record FPS) decreases proportionally. Playback Frames Per Second (Playback FPS) is an independent variable and remains unchanged.

Another slide bar can be associated with a "Record Frames Per Second" affordance 760, which when activated (e.g. via a slide gesture), enables the user to set the recording FPS. The record FPS is the rate of which frames are captured by the camera. The higher the frame rate, the higher the slow motion effect with respect to a constant Playback FPS. As Record FPS increases, Max SlowMo increases and Video Resolution decreases proportionally.

As Record FPS decreases, Max SlowMo decreases and Video Resolution increases proportionally. As the user adjust the Record FPS 758 higher and lower, the values for the Max SlowMo and Video Resolution automatically adjust accordingly. Playback Frames Per Second (Playback FPS) is unchanged. The user can manually override and adjust the Video Resolution and Max SlowMo to lower the maximum selected by the software.

Still another slide can be associated with a "Playback Frames Per Second" affordance 762, which when activated (e.g. via a slide gesture), enables the user to set the playback FPS. The Playback FPS is the rate of which frames are played by the device. The higher the Playback FPS, the lower the slow motion effect with respect to a constant Record FPS.

The Playback FPS can be independent set without affecting either Recording Frames Per Second or Video Resolution.

As Playback FPS increases, Max SlowMo decreases proportionally.

As Playback FPS decreases, Max SlowMo increases proportionally.

As the user adjust the Playback FPS 762 higher and lower, the values for the Max SlowMo automatically adjust accordingly. Record FPS and Video Resolution are unchanged.

As Video Resolution decreases, the Max SlowMo increases and the Record FPS increases proportionally. Playback Frames Per Second (Playback FPS) is unchanged.

As the user adjust the Video Resolution 756 higher and lower, the values for the Max SlowMo and Record FPS automatically adjust accordingly. Playback FPS is unchanged.

User can select to create the original footage in high resolution but upload a lower resolution video to save on bandwidth and storage costs. The user has the option to save the high resolution original video to the local device, and/or upload to cloud for storage. Once uploaded, video files of high resolution can be resized into the proper format to optimize speed and size for the viewing device.

The maximum slow motion effect (Max Slow Motion 758) is a ratio of Record FPS to Playback FPS. The maximum slow motion effect uses existing frames only to create the slow motion effect when played in "real time" given the Playback FPS. It does not use frame adding or other digital enhancements or interpolated and extrapolated frames.

Max SlowMo is the maximum end of the range of usable slow motion effect that is available for the user. The user may choose to use a smaller slow motion range that is less than the Max SlowMo value.

Max SlowMo=Record FPS/Playback FPS

The user can set the Playback FPS 762 independently of all other variables. In this example, keeping the Playback FPS constant illustrates the function of the feature.

As the Max SlowMo increases, Record FPS increases and Video Resolution decreases proportionally.

As the Max SlowMo decreases, Record FPS decreases and Video Resolution increases proportionally.

As the user adjust the Max SlowMo 758 higher and lower, the values for the Record FPS and Video Resolution automatically adjust accordingly. Playback Frames Per Second (Playback FPS) is unchanged.

For example, recording fps=120, playback fps=30.

Maximum slow motion effect=4 times slower than normal speed.

The GUI 30 can further include an "Optimize" affordance 764, which when activated (e.g. via a slide gesture), enables the user to optimize the camera and/or playback settings to maximize the best video quality that the device can deliver. The user can select to optimize for video quality, file size, maximum slow motion effect, and combinations thereof.

The values in the Optimize 764 operations can be the settings for the maximum video quality and minimum size that the device supports. These are the "limits" for the range of values that are available for the user to select from.

To assist in understanding the utilization of the GUI 30 implementing at least in part some of the subroutines of the present technology, the following examples are provided, assume the following device supported recording frame rates:

8K at 240 fps
4 k at 480 fps
2K at 960 fps
1080 at 1920 fps

The UI automatically selects the values from the sets of values based on optimize routine selected. Optionally, the selected values are automatically highlighted and aligned vertically (left, middle, right) side of the screen.

Example 1

User sets the following values:
Video Resolution=8K
Playback FPS=30
Optimize for Quality
The UI automatically selects:
Max SlowMo=8×
Record FPS=240

Example 2

User sets the following values:
Video Resolution=4K.
Playback FPS=30
Optimize for Quality
The UI automatically selects:
Max SlowMo=16 selected from set of selectable values {16×, 32×}
Record FPS=480 {240, 480}
While Video Resolution is "locked in" at 4K:
If user selects Record FPS=240 then Max SlowMo automatically sets to 32×.
If user selects Record FPS=480 then Max SlowMo automatically sets to 16×.
If user selects Max SlowMo=32×, then Record FPS automatically sets to 240.
If user selects Max SlowMo=16×, then Record FPS automatically sets to 480. User can manually override and set Record FPS to 240 to decrease file size but with a 50% loss in frame resolution.

Example 3

User sets the following values:
Video Resolution=4K.
Playback FPS=30
Optimize for Size
The UI automatically selects:
Max SlowMo=32 selected from set of selectable values {16×, 32×}
Record FPS=240 {240, 480}

While Video Resolution is "locked in" at 4K:

If user selects Record FPS=480 then Max SlowMo automatically sets to 16×.

If user selects Record FPS=240 then Max SlowMo automatically sets to 32×.

If user selects Max SlowMo=16×, then Record FPS automatically sets to 480.

If user selects Max SlowMo=32×, then Record FPS automatically sets to 240. User can manually override and set Record FPS to 480 to increase frame resolution but increase file size by 100% before compression.

Example 4

User sets the following values:
Max SlowMo=32×
Playback FPS=30
Optimize for Quality
The UI automatically selects:
Video Resolution=2K {480, 720, 1080, 2 k}
Record FPS=240 {240, 480, 960}

Example 5

User sets the following values:
Max SlowMo=64×
Playback FPS=30
Optimize for Quality
The UI automatically selects
Video Resolution=1080 {480, 720, 1080}
Record FPS=1920 {240, 480, 960, 1920}

Example 6: Continuing with Example 5

User sets the following values:
Playback FPS=60
Optimize for Quality
The UI automatically selects
Max SlowMo=32×
Video Resolution=1080 {480, 720, 1080}
Record FPS=1920 {240, 480, 960, 1920}

Example 7: Continuing with Example 6

User sets the following values:
Playback FPS=120
   Optimize for Quality
The UI automatically selects
Max SlowMo=16×
Video Resolution=1080 {480, 720, 1080}
Record FPS=1920 {240, 480, 960, 1920}

Example 8: Continuing with Example 7

User sets the following values:
Playback FPS=240
Optimize for Quality
The UI automatically selects
Max SlowMo=8×
Video Resolution=1080 {480, 720, 1080}
Record FPS=1920 {240, 480, 960, 1920}

Figures 35, 36:
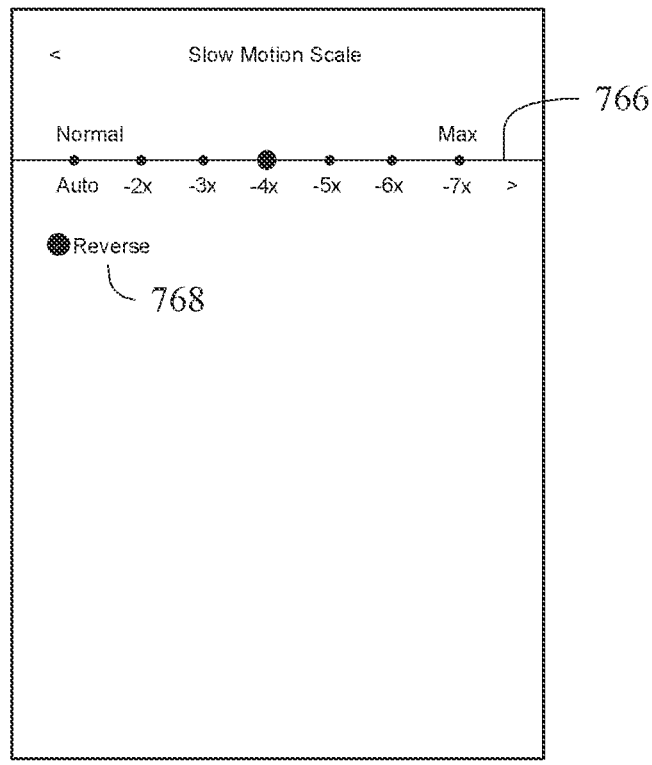
FIG. 35 is a sample GUI screenshot of an alternative "Slow Motion Resolution" screen of the device employing the GUI including scrollable sections utilizing the process of the present technology.
FIG. 36 is a sample GUI screenshot of a "Slow Motion Scale" screen of the device employing the GUI including a slide bar in setting a slow motion factor levels utilizing the process of the present technology.

FIG. 35 illustrates an exemplary embodiment "Screen Shot" of the device employing the GUI 30 of the present technology while the system displays an alternative "Slow Motion Resolution" settings screen. In this example, the GUI 30 has all of the same features as the embodiment illustrated in FIG. 34. The difference is in the presentation of the controls to the end user. All functions are accessible through both embodiments.

In some or all embodiments, the UI automatically selects the values from the sets of values based on optimize routine selected. Optionally, the selected values are automatically highlighted and aligned in the same row at the top, middle or bottom of the screen.

In this example in FIG. 35, the GUI 30 can display and utilize multiple scrollable sections, with each being associated with "Video Resolutions", "Max Slow Motion", "Record FPS" and "Playback FPS" affordances. Each affordance can be activated by moving the scroll to the desired value (e.g. via an up-down slide gesture). The slide bars can be horizontally stacked or vertically spaced. The scrollable sections can highlight the selected value, respectively.

FIG. 36 illustrates an exemplary embodiment "Screen Shot" of the device employing the GUI 30 of the present technology while the system displays a "Slow Motion Scale" screen. In some or all embodiments, the user can set custom settings for how the Slow Motion Scale control appears on the app and it's programmatic behavior in response to the user's input (e.g. via a left-right slide gesture).

In this example, a slide bar or number line 766 represents the slow motion factor levels available for the user. The range displayed is from "Normal" to "7×". There can be a ">" symbol besides the last scale value, in this case "7×", to represent that there are additional slow motion multipliers available but not displayed. The user can then scroll through the available slow motion multipliers and select how much or how little to limit the range of slow motion factor while recording.

The user can pinch at the number line and include more of the range of the slow motion to include in the live recording screen.

The user can set the orientation of the button to move right or left on the line 766 to control the speed. As exemplary illustrated, "Normal" is on the left and "Max" is on the right. The user would then slide his/her finger on the recording control from left to right to increase the slow motion factor.

A "Reverse" affordance 768 can be utilized and displayed on the GUI, which when activated (e.g. via a tap gesture), enables the user to reverse the display of the slide bar 766. If the user selects the "Reverse" option, then "Normal" would be on the right side, and "Max" is on the left. The user's motion is to slide from right to left on the line 766 to increase the slow motion factor.

Figure 37:
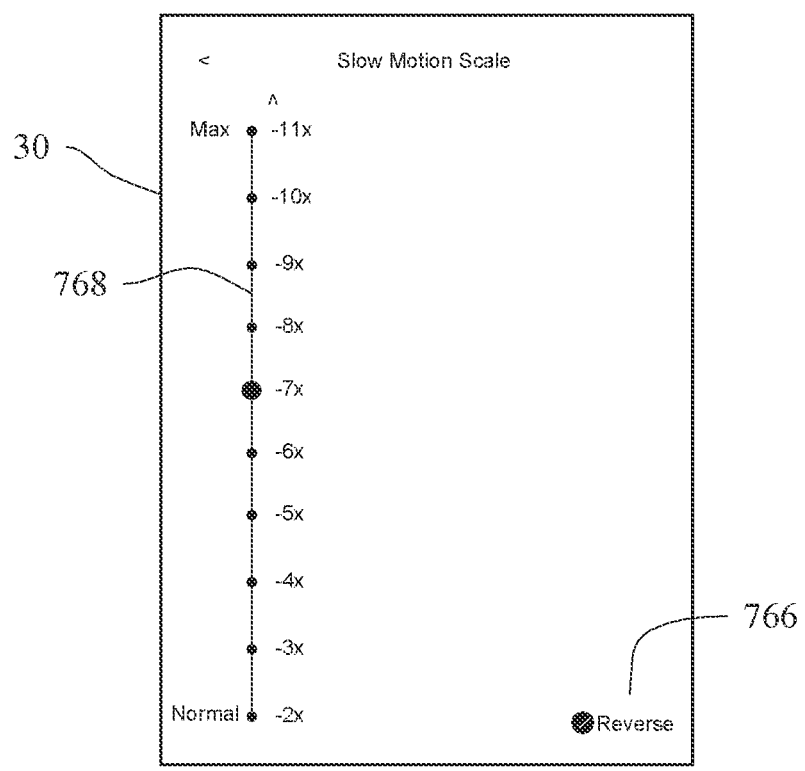
FIG. 37 is a sample GUI screenshot of an alternative "Slow Motion Resolution" screen of the device employing the GUI including a vertical slide bar utilizing the process of the present technology.

FIG. 37 illustrates an exemplary embodiment "Screen Shot" of the device employing the GUI 30 of the present technology while the system displays an alternative Slow Motion Scale screen. In this example, the GUI 30 has all of the same features as the embodiment illustrated in FIG. 36. The difference is in the presentation of the slide bar or line 766 to the end user. In this example, the slide bar 766 is orientated in a vertical configuration along a left or right side of the GUI 30. All functions are accessible through both embodiments. The user can set custom settings for how the Slow Motion Scale control appears on the app and it's programmatic behavior in response to the user's input.

In some or all embodiments, there can be a "A" symbol above the last scale value, in this case "11×", to represent that there are additional slow motion multipliers available but not displayed. The user can then scroll through the available slow motion multipliers and select how much or how little to limit the range of slow motion factor while recording.

Figure 38:
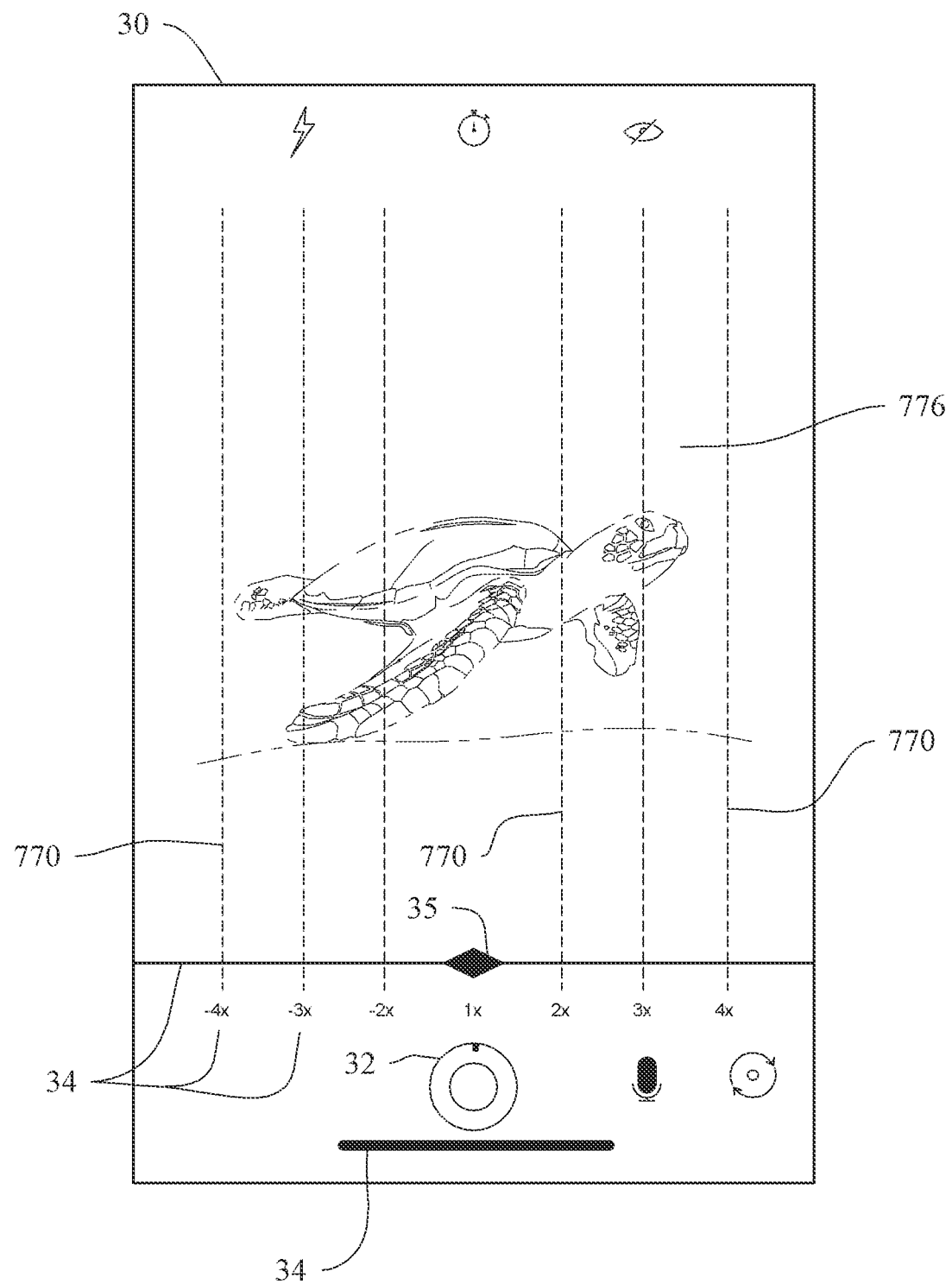
FIG. 38 is a sample GUI screenshot of a "Camera View" or "Editing View" of the device employing the GUI including the time guidelines displayed utilizing the process and/or of the present technology.

FIG. 38 illustrates an exemplary embodiment "Screen Shot" of the device employing the GUI 30 of the present technology while the system displays a "Camera View" or an "Editing View" screen. The GUI 30 can be configured or configurable to include a recording start/stop affordance or control 32 provided anywhere on the screen, and a speed selection region 34 provided anywhere on the screen that can provide a default or predefined frame rate speed that is used to manipulate the frame in the raw video data from the camera or from recorded video. The speed selection region 34 can include a speed rate/control affordance or indicator 35 that can travel along the speed selection region 34 via control by the user to indicate the current or selectable speed. The GUI interface 30 can also include regions anywhere on the screen for controlling zoom, zoom and fast motion speed rate, and/or zoom and slow motion speed rate.

The GUI 30 can include vertically oriented time guidelines 770 that extend vertically up from each of the speed rate indicators or the speed selection region 34 displayed on the GUI 30 or the display of the device utilizing the GUI. The speed rate indicators 34 can be, but not limited to, −2×, −3×, −4×, −"n"×, 1×, 2×, 3×, 4× or "n"×. It can be appreciated that the time guidelines 770 can, in the alternative, extend horizontally across a section of the GUI 30. The time guidelines 770 can be displayed while in camera live one-touch record mode or in-app one-touch edit mode.

The time guidelines 770 can be utilized to assist a user in determining which speed rate is currently be applied, which speed rate is next, which speed rate is nearest a finger touching the display, and/or as a composition guide for assisting in placing scene elements within a photo and video frame. The time guidelines 770 can be a different color, brightness and/or line type or line style from each other, thereby providing each speed rate a unique time guideline.

The GUI 30 can include a video display region 776, and one or more affordances configured or configurable to provide at least one input receivable and usable by the processing unit in operation of the present technology. The affordances can be a speed rate affordance associated with changing the speed rate of the video data. The speed rate affordances can be, but not limited to, associated with the recording start/stop affordance or control 32, the speed rate indicators 34, and/or the speed rate/control affordance 35. The GUI 30 or the processing unit of the present technology can determine if the input is associated with changing a first or native speed rate of the video data, and if so to modify at least one frame in the video data to create modified video data at a modified speed rate that is different to the first speed rate in real time.

It is difficult for the user to "eyeball" the distance their fingers are from the next speed rate indicator or setting as the user moves their finger left or right to engage the fast or slow motion one touch live recording and editing features of the present technology. The user's finger may have a tendency to drift right or left as they zoom in and out.

Without the on-screen time guidelines 770, the user must rely solely on their judgment on the placement of the main elements on the scenery of the photograph or video.

In any of the embodiments of the GUI of the present technology, the user can return to a previous screen or proceed to the next screen by a sliding gesture across the screen in a left or right direction, or by a tap gesture on an icon or affordance indicating the direction of screen progression. The time guidelines 770 can be a visual guide so the user knows how much further is required to slide the finger or pointing device to engage the next setting for fast and slow motion. The time guidelines 770 can also serve as a "track" for the user to slide the finger to zoom in and zoom out while recording a video.

The time guidelines 770 can always be on or displayed when the GUI 30 is operated, as illustrated in FIG. 38.

Figure 39:
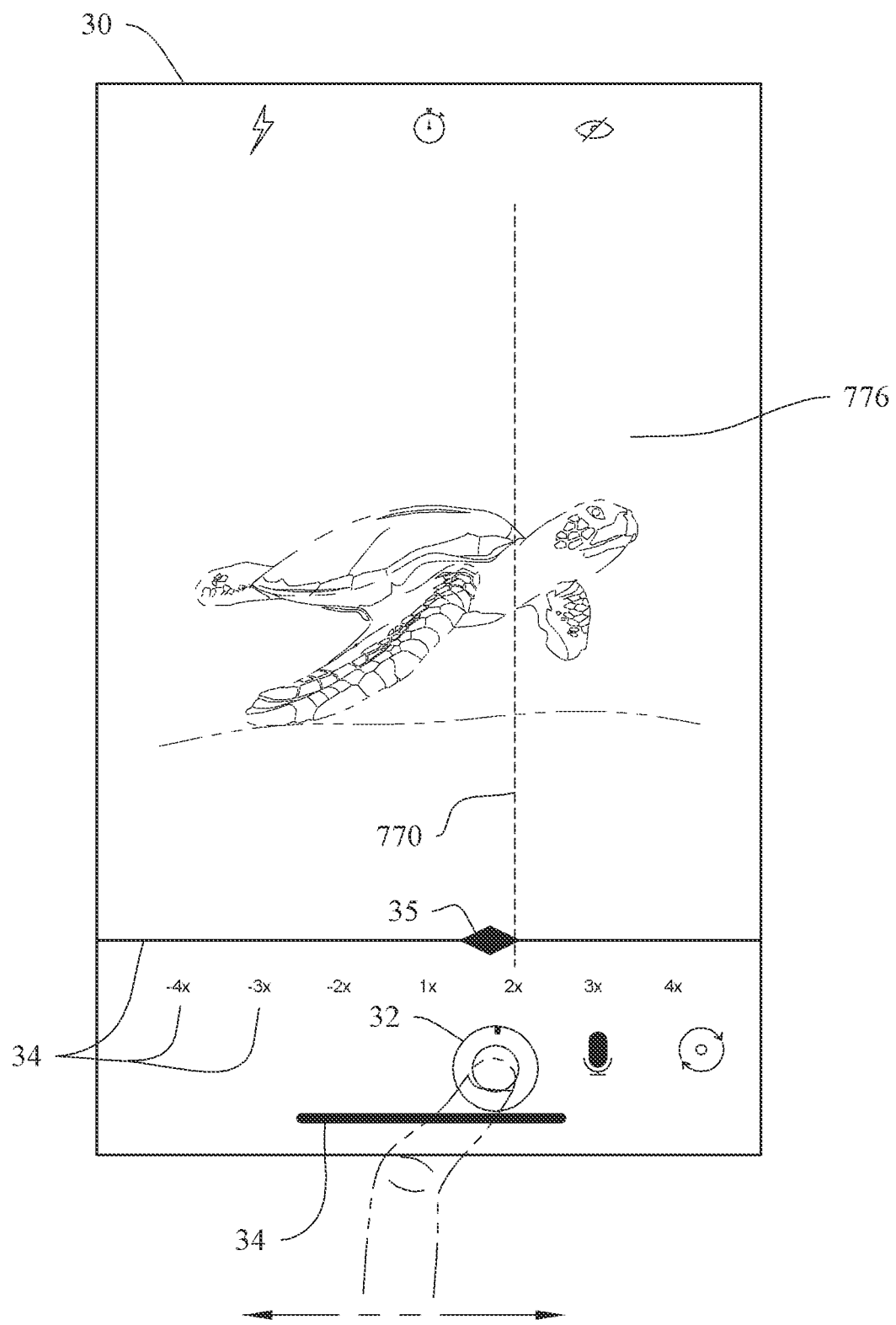
FIG. 39 is a sample GUI screenshot of a "Camera View" or "Editing View" of the device employing the GUI including the slide bar in setting a fast motion factor level with a fast motion time guideline nearest the finger or pointing device being displayed utilizing the process and/or system of the present technology.

Referring to FIG. 39, any of the time guidelines 770 can be activated, turned on, modified, displayed, deceived and/or turned off when recording starts, when a finger touches the display or a pointing device is activated, when the touching finger or pointing device is moved, when the speed rate affordance is moved, or when the speed rate/control affordance 35 is moved. It can be appreciated that the recording start/stop control 32 can be displayed anywhere in the GUI 30 at a location where the finger makes contact with the screen or the point device is activated, or can be always displayed. Still further, the time guidelines 770 can include at least one selectable value selected by a gesture on the display of the electronic device. The gesture can be any one or any combination of a tap, a multiple tap, a touch holding, a sliding, a pinch, and a touch holding and sliding In this exemplary operation as shown in FIG. 39, the present technology is recording at 1× or native speed rate. The user touches the screen with a finger, thereby displaying the recording start/stop control 32 at the point of finger contact. The time guideline 770 nearest the finger contact point is determined by the process of the present technology and its time guideline 770 is activated or displayed.

To engage the fast and slow motion operations of the present technology, the user can slides a finger or pointing device to the right and left, with the nearest time guideline 770 being displayed, thereby providing the user with a visual indication of how much further is required to slide the finger or pointing device to engage the next speed rate setting for fast and slow motion. The use of the time guidelines 770 can prevent the user from unwanted changing of the speed rate, or can confirm the changing of the speed rate.

In an exemplary operation, if the present technology is currently recorded at a slow motion speed rate of −2×, and the user slides a finger or moves a pointing device toward the left nearing the −3× speed rate indicator, then the time guideline 770 associated with the −3× speed rate will be displayed. The displaying of the −3× time guideline 770 can be displayed when the finger is at a predetermined distance to the −3× speed rate indicator and/or a predetermined distance away from the −2× speed rate indicator.

In the alternative, the GUI 30 or the processing unit can intuitively extend an imaginary line or region vertically from the speed rate indicator or the speed rate affordance on the slide bar 34. The time guideline 770 can be automatically displayed when a touch or pointing device input 32 is at predetermined distance from this imaginary line when the touch input 32 is anywhere on the display.

The user may slide the speed rate/control affordance 35 left or right along the slide bar or to a location associated with one of the speed rate indicators 34 to change the speed rate setting, or the user can touch the screen to activate the speed rate affordance 32 and then slide the finger and consequently the speed rate affordance 32 left or right to change the speed rat setting. During any of these instances, when the speed rate affordance is at a predetermined distance from one or more of the speed indicators alone or associated with the slide bar 34, or an imaginary line extending vertically from the speed indicators, then a time guideline 770 can be displayed for that speed indicator.

The present technology can calculate this value by determining the known coordinates of the speed rate indicators displayed in the GUI 30, determining the point of contact of the finger or point of activation by the pointing device, and then determining a linear or radial distance between the speed rate indicator coordinates and the finger contact point or the pointing device activation point. The process can then determine which speed rate indicator is nearest the finger contact point or the pointing device activation point, and then display that time guideline 770. The process may convert the speed rate coordinates, the finger contact point and/or the pointing device activation point into a common vector format.

Figure 40:
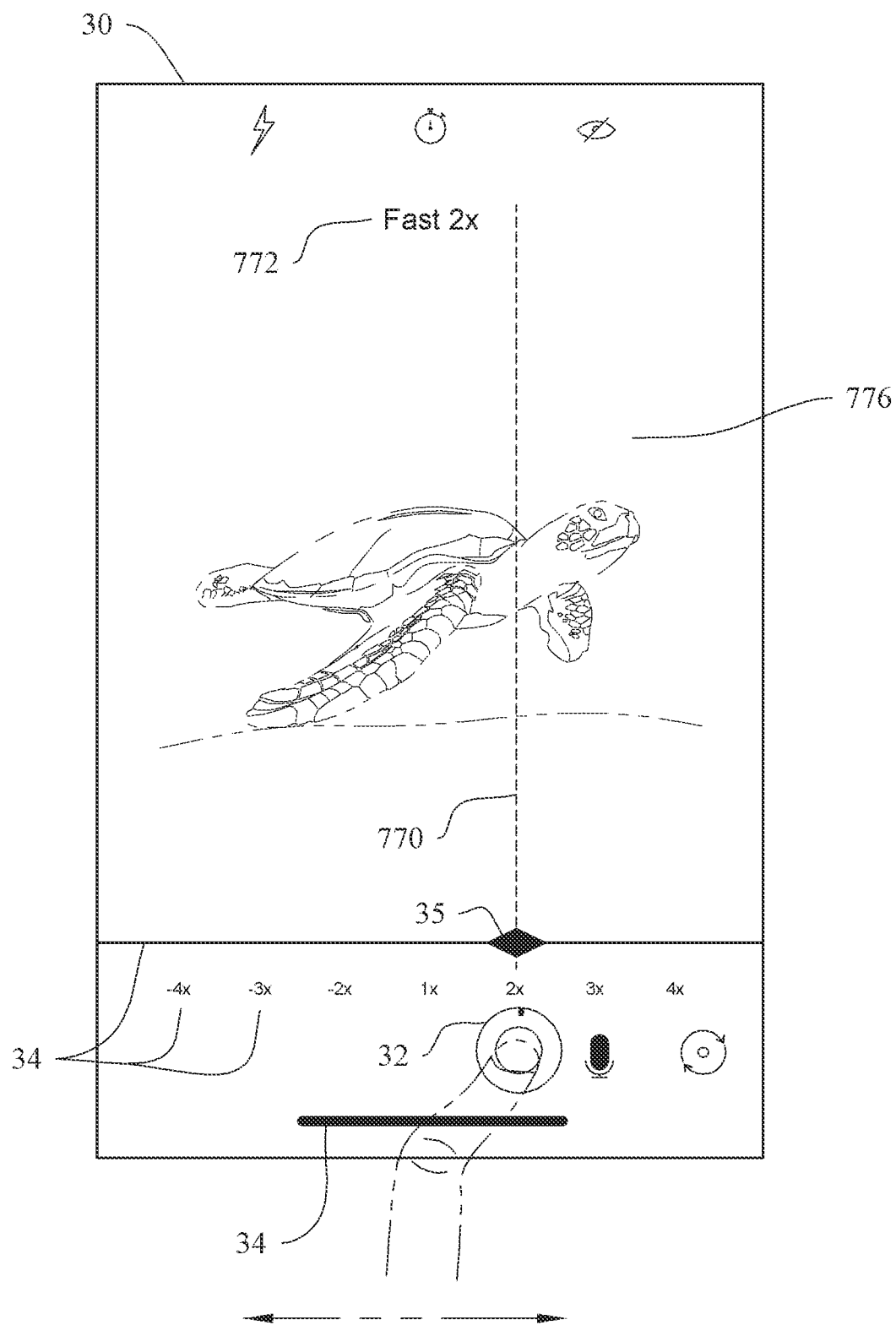
FIG. 40 is a sample GUI screenshot of a "Camera View" or "Editing View" of the device employing the GUI including the slide bar in setting a fast motion factor level with a fast motion time guideline nearest the finger or pointing device and the current fast motion factor level being displayed utilizing the process and/or system of the present technology.

Referring to FIG. 40, once a new speed rate has been set or activated, the GUI 30 can display the current speed rate with a current speed indicator 772 that appears on the screen. The current speed indicator 772 can be flashing, changing color, different color from the guidelines 770 and/or speed rate indicators, animated or any other characteristic to gain the user's attention. The current speed indicator 772 can be displayed anywhere on the screen or in the GUI 30, and can change to the speed rate currently being used. The current speed indicator 772 can also display a speed rate nearest the speed rate affordance 32, 35 being moved by a finger or pointing device, thereby providing additional visual indication or warning of a potential change in speed rate.

The time guideline 770 can further assist in the visual indication of how far the finger or pointing device is from the next time guideline 770, speed rate indicator or speed setting. This can be accomplished by displaying a distance between the nearest time guideline 770 and the speed rate affordance 32, 35. Another way to accomplish this is to have any one of the nearest time guideline 770 or the speed rate affordance 32, 35 flash at a rate dependent on the distance between the nearest time guideline 770 and the speed rate affordance 32, 35.

Figure 41:
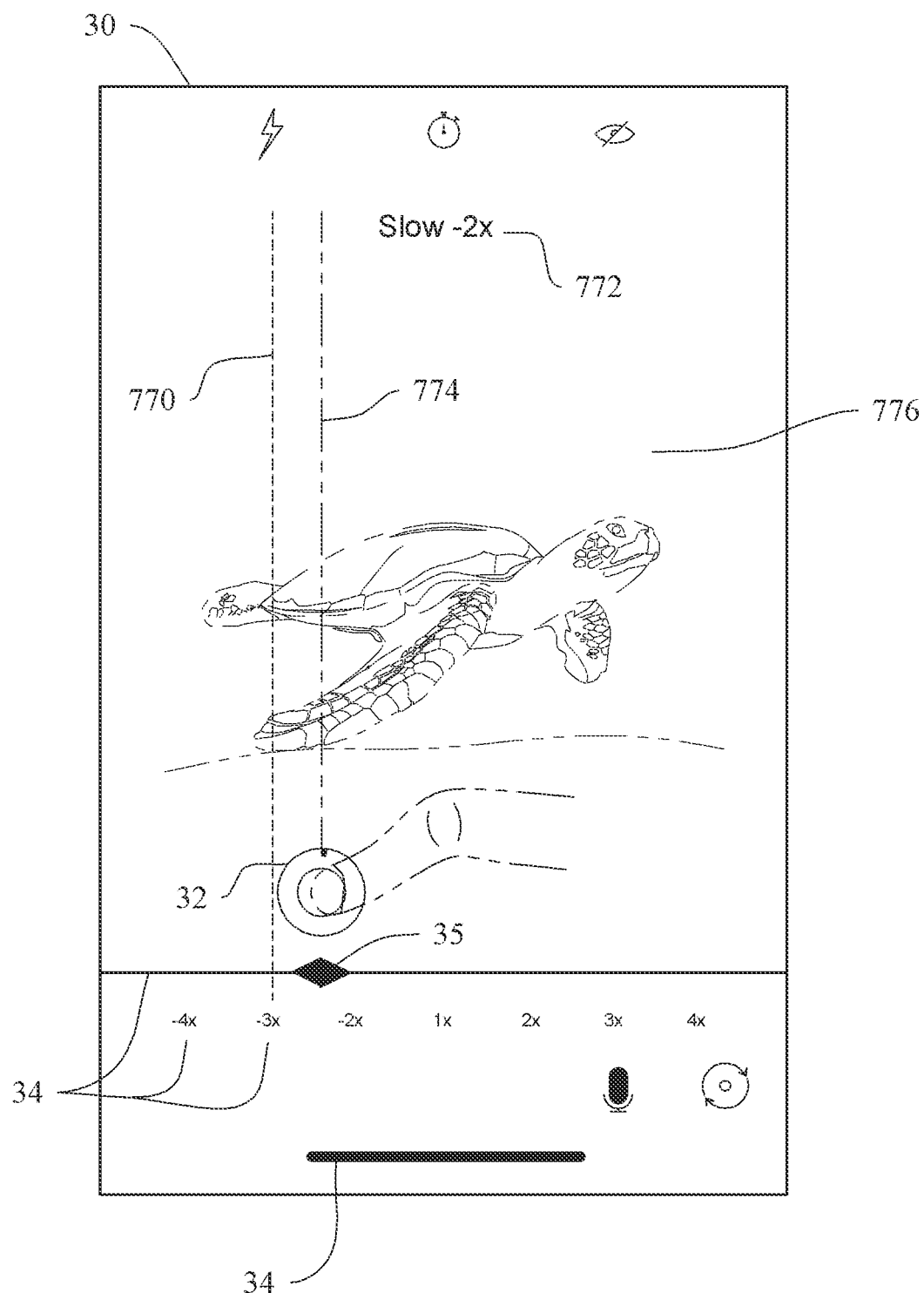
FIG. 41 is a sample GUI screenshot of a "Camera View" or "Editing View" of the device employing the GUI with a slow motion factor level being set remote from the slide bar, and with a slow motion time guideline nearest the finger or pointing device, a finger guideline and the current slow motion factor level being displayed utilizing the process and/or system of the present technology.

Referring to FIG. 41, a finger time guideline 774 can be displayed on the screen or the GUI 30. The finger time guideline 774 can extend vertically up from the finger contact point, the pointing device activation point, or the speed rate affordance 32, 35. The finger time guideline 774 can be a different characteristic, shape, color, brightness and/or line type or line style to that of the time guidelines 770.

The finger time guideline 774 can further assist in the visual indication of how far the finger or pointing device is from the next time guideline 770, speed rate indicator or speed setting. This can be accomplished by displaying a distance between the nearest time guideline 770 and the finger time guideline 774. Another way to accomplish this is to have any one of the nearest time guideline 770 or the finger time guideline 774 flash at a rate dependent on the distance between the nearest time guideline 770 and the finger time guideline 774.

Figure 42:
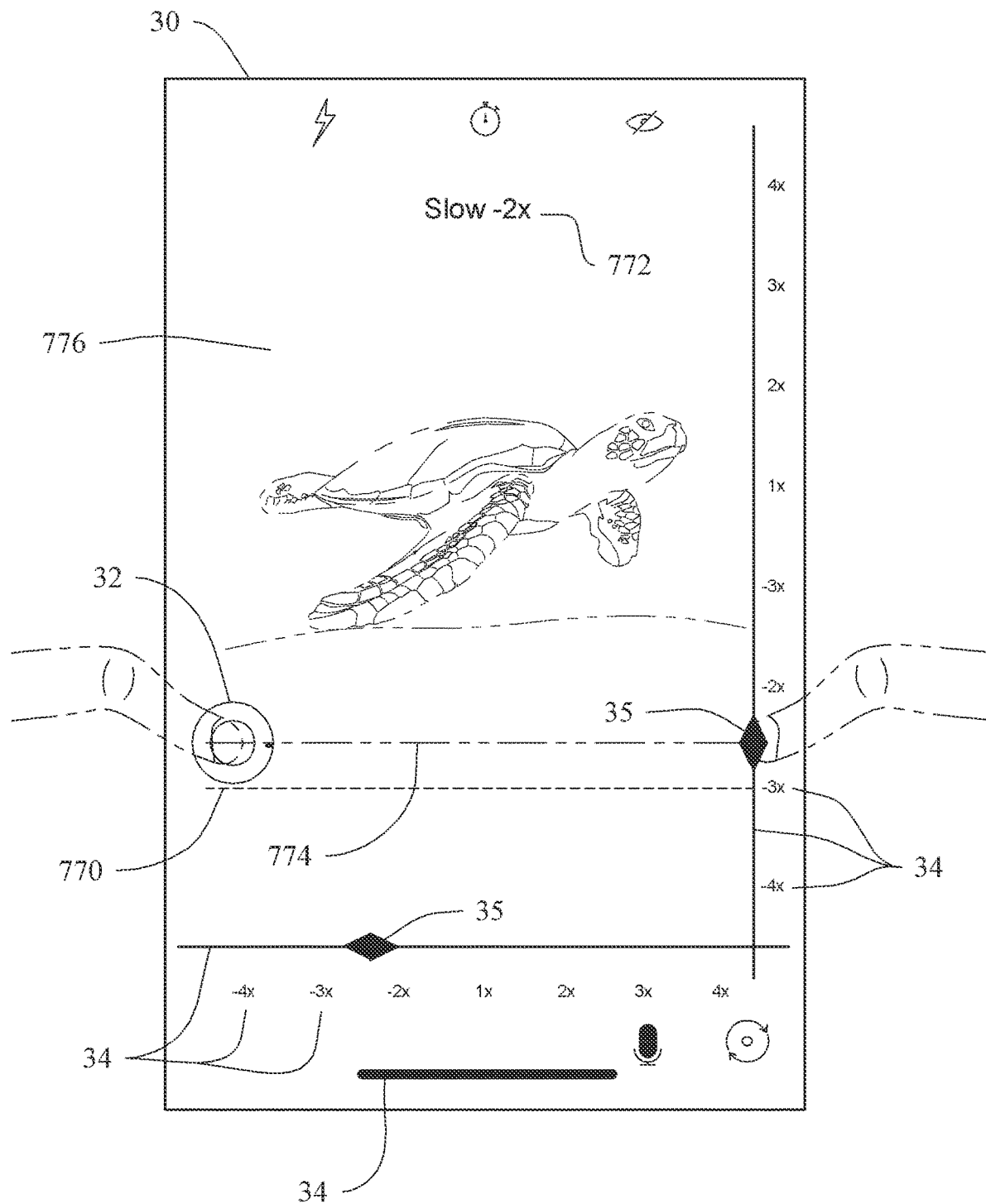
FIG. 42 is a sample GUI screenshot of a "Camera View" or "Editing View" of the device employing the GUI with the slide bar in a vertical orientation, and the activated time guideline nearest the finger or pointing device in a horizontal orientation utilizing the process and/or system of the present technology.

Referring to FIG. 42, in the alternative and exemplary, the time setting slide bar 34 can be vertically orientated, alone or in combination with a horizontally orientated slide bar 34. The user may slide a finger vertically along the vertically oriented slide bar 34 to change the time speed setting of the video being played. While utilizing the vertical slide bar 34, one or more horizontal time guidelines 770 can be displayed on the screen or the GUI 30.

It can be appreciated that the speed rate affordance 32 can be utilized in a vertical direction to control the speed rate setting, alone or in combination with the vertical slide bar 34. Still further, the finger time guideline 774 can extend horizontally from the finger contact point, the pointing device activation point, or the speed rate affordance 32, 35. The horizontal finger time guideline 774 can be a different characteristic, shape, color, brightness and/or line type or line style to that of the horizontal time guidelines 770.

Multiple horizontal time guidelines 770 can be displayed, alone or in combination with vertical time guidelines, to assist in positioning or centering the object in the video display region 776 or in a field-of-view.

It can be appreciated that the time guidelines 770 can be orientated at any angle on the GUI 30, and can even be arcuate to combine the changing of a time speed rate and a zoom function.

Figure 43:
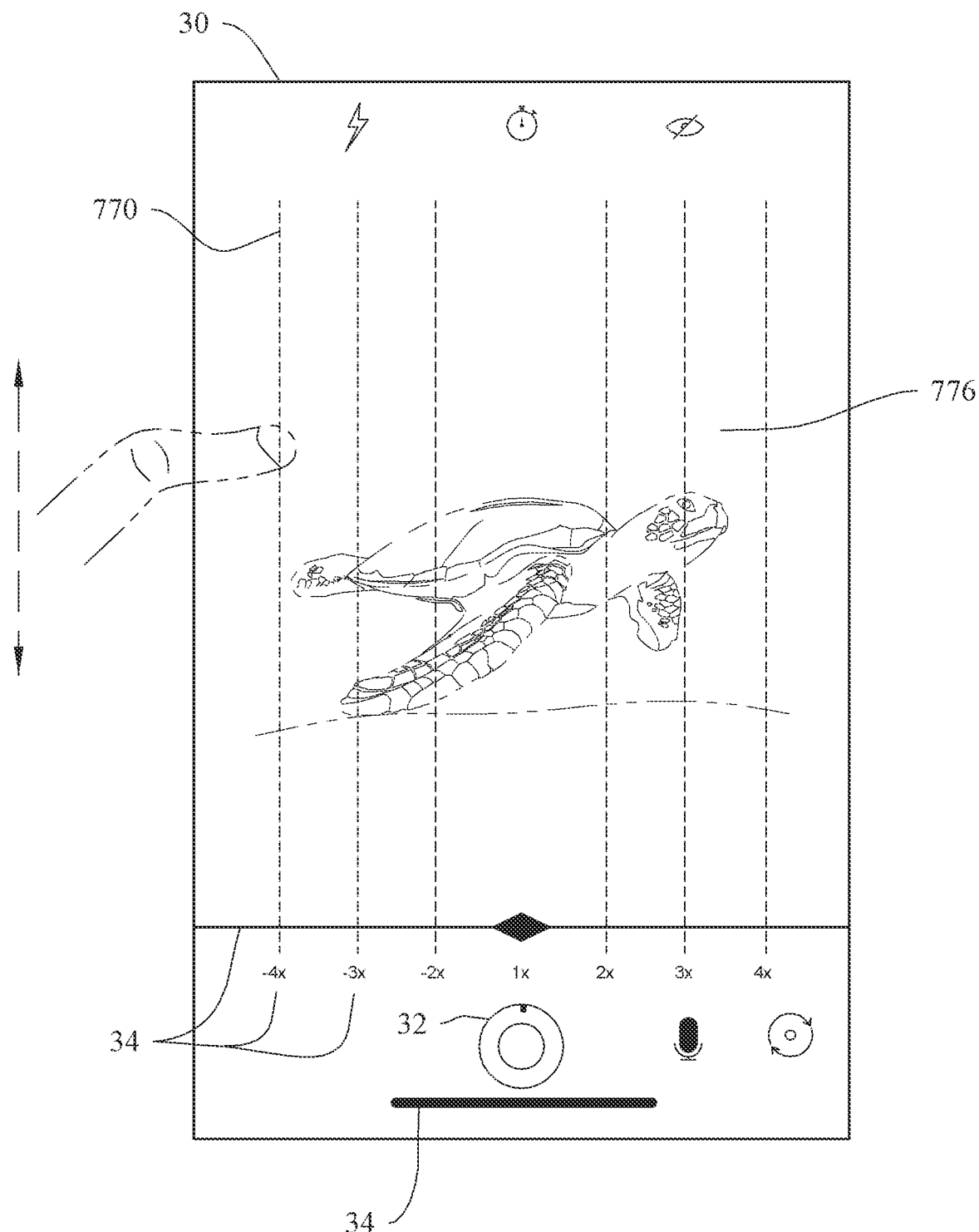
FIG. 43 is a sample GUI screenshot of a "Camera View" or "Editing View" of the device employing the GUI with the time guidelines being used to guide the finger or pointed device in a vertical sliding direction to control the zooming function utilizing the process and/or system of the present technology.

As illustrated in FIG. 43, in the alternative and exemplary, one or more zoom affordances can be associated, linked or utilized with one or more of the time guidelines 770. The zoom affordances can be usable in controlling or determining a change in zoom factor of the video data.

In this situation, the user can touch or point at any one of the time guidelines 770, and then slide the finger or move the pointing device up or down along the time guideline 770 to control a zoom-in or zoom-out function. During this up or down movement, if the finger or pointing device drifts off the time guideline 770 toward an adjacent new time speed setting region, then that time guideline associated with the adjacent time speed setting region can be activated. Thus, alerting the user that a change in time speed rate may be occur if the user keeps drifting toward that newly activated time guideline.

To avoid the time guidelines 770 and/or finger guideline 774 from becoming an annoyance or distraction, these guidelines can be configured to disappear after a predetermined time of being first displayed, when the finger contact point or pointing device activation point has moved a predetermined distance from along a horizontal or vertical axis, or if the finger or pointing device provides multiple sequential contacts or activations. Therefore, in a possible embodiment of the invention, the system further comprises processing means, e.g., a controller, for activating and deactivating the time guidelines 770 and/or finger guideline 774 on the GUI 30 or display of the electronic device depending on a threshold of the distance to or from a speed rate indicator or setting 34.

Any or all of the time guidelines 770 can be activated automatically when a user raises the camera or display from a horizontal to a vertical position, when the GUI 30 is in operation. Furthermore, any or all of the time guidelines 770 can be automatically rotated so they are substantially in a vertical orientation when the electronic device displaying the GUI 30 is rotated between a portrait and landscape orientation.

In some or all embodiments, the time guidelines 770 can be in any geometric shape, such as but not limited to, a square, a rectangle, an oval, a circle, a triangle or polygon. The guidelines 770 can be configured according to a parameter, which is configurable by a user. The parameter can be any one or any combination of color, pattern, length, thickness, flashing, brightness, shape, orientation, and display time.

The guidelines 770 and/or its geometric shape can be configured or configurable to represent a field-of-view of the camera associated with the GUI 30, thereby providing the user with a specific reference area for positioning the object being recorded or edited. In the exemplary, at least part of two or more guidelines 770 can be displayed in the video display region 776 of the GUI 30 in a spaced apart relationship, thereby assisting the user in centering an objected being recorded or viewed within a field-of-view of a camera or the video feed.

The guidelines 770 and/or the finger guideline 774 can be implemented or implementable in or with an electronic device, a video system, a computer system, a video interface system, a graphical user interface, a non-transitory computer readable medium and/or a method utilizing any of the above.

In the exemplary, some features of the guidelines 770, the current speed indicator 772 and/or the finger guideline 774 can be:

- in a utilization for composition aide;
- to display how close the software application of the present technology is to switching to the next time speed rate;
- in a utilization as a track to guide user while zooming;
- to display the current recording and/or playback speed indicator on-screen while in one-touch recording mode;
- to display the current recording and/or playback speed indicator on-screen while in one-touch editing mode;
- the user can "lock" the time speed rate while zooming to ensure no accidental change in the time speed rate;
- a wider device screen can display more time speed rate options with or without vertical bars, and/or
- the electronic device in landscape mode can display more time speed rate options with or without vertical bars.

In some or all embodiments, the present technology can include artificial intelligence (AI) to identify sections in the video that can be compressed or expanded the appropriate amounts so that viewing the resulting video is more discernible or indiscernible to the viewer from the original video to a) meet the project requirements; and b) "emotioneering" effect in the appropriate content category. Emotioneering refers to a vast body of techniques which can create, for a player or participant, a breadth and depth of emotions in a game or other interactive experience, and which can immerse a game player or interactive participant in a world or a role.

In some or all embodiments, the guidelines 770, the current speed indicator 772 and/or the finger guideline 774 can be displayed in 2-D or 3-D, and/or can be implemented and viewed in augmented reality or virtual reality mode.

In an exemplary Normal and/or 360 Live Record Mode, AI can in real-time scan and analyze the scene being recorded to make to higher accuracy of automatically adjusting the guidelines 770 in real time, moving them either closer together or further apart, or even bending the distance so that they are no longer parallel lines and may even intersect, depending on the scene's likelihood for the user to use more or less of the fast or slow motion speeds. This operation may be useful in 3-D Mode and/or/with the 360 Mode.

In Normal and/or 360 Edit Mode, the AI can pre-scan and analyze a previously recorded video to make to higher accuracy of automatically adjusting the guidelines 770 in real time, moving them either closer together or further apart, or even bending the distance so that they are no longer parallel lines and may even intersect, depending on the scene's likelihood for the user to use more or less of the fast or slow motion speeds. This operation may be useful in 3-D Mode and/or/with the 360 Mode.

The present technology can incorporate augmented reality, which can interact with the guidelines 770.

In some or all embodiments, the speed selection region 34 and/or the speed rate/control affordance or indicator 35 can be an artifact of an operating system utilizing the present technology that is displayed by default on certain electronic devices utilizing the operating system.

In some or all embodiments, the speed selection region 34 and/or the speed rate/control affordance or indicator 35 may be omitted or the functionality may be different.

For example, when a camera of a 360 video pans closely around a turn or an object, the relatively large size on the screen would actually display recognizable people's faces, especially as video resolutions continues to get higher with no practical limit in sight.

The present technology can be implemented as a premium feature in a mobile software application on the iOS and Android mobile platforms. Industry standard best practices software development operations, "Dev Ops", can be deployed to implement further embodiments of the present technology.

When in use, the guidelines 770 can appear as per the user setting for the camera live record mode and in-app edit mode screens. The guidelines 770 can be displayed in the screens while in camera live one-touch record mode or in-app one-touch edit mode.

The guidelines 770 can help the user as a composition guide for placing scene elements within the photo and video frame, like placement of the main subject in the center or using the rule of thirds and other compositional standards.

Figure 44:
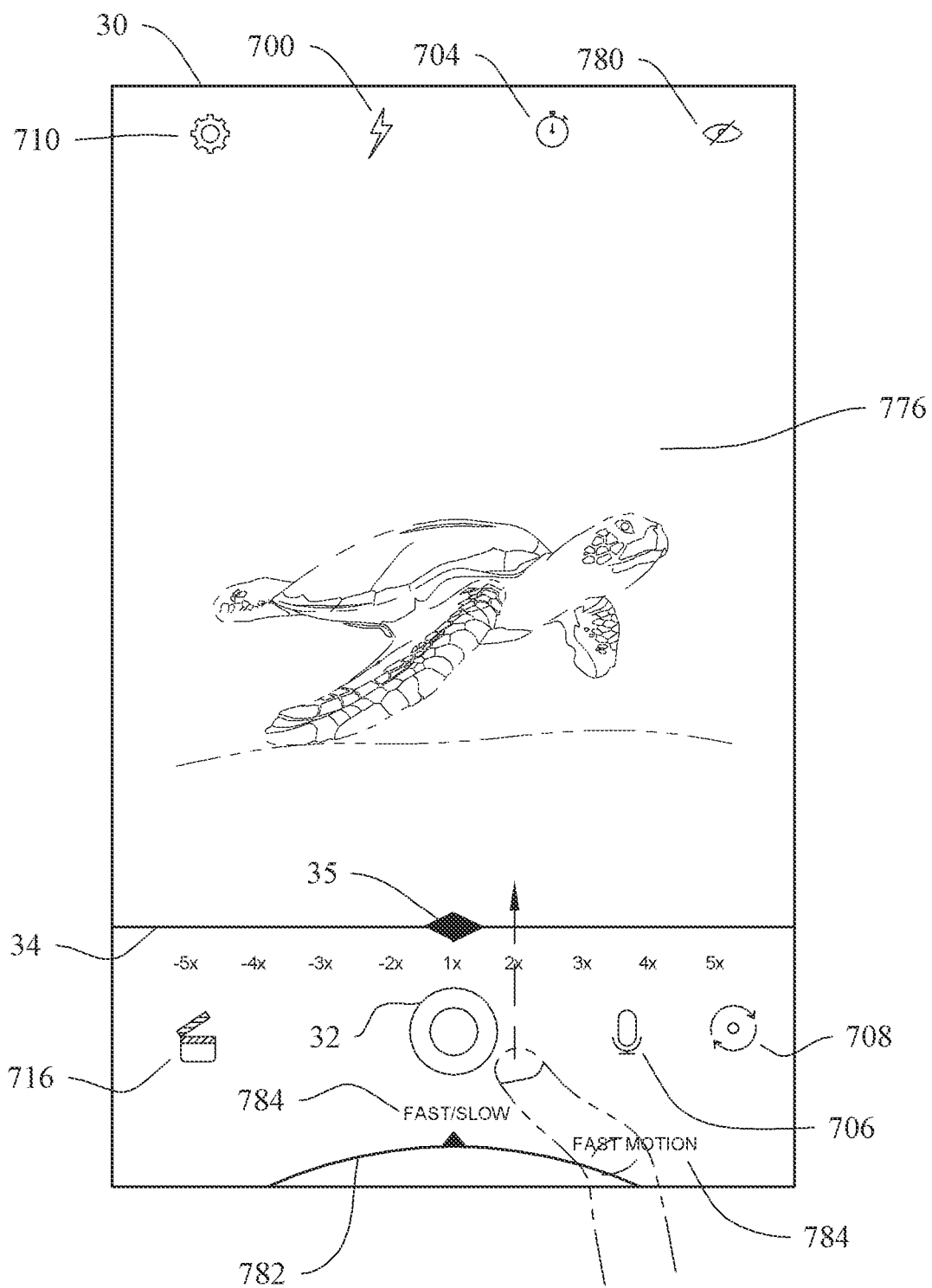
FIG. 44 is a sample GUI screenshot of a "Camera View" of the device employing the GUI with a vertical or upward finger swipe motion appearing the selectable options bar and with a "Fast/Slow Motion" option selected on the selectable options bar utilizing the process and/or system of the present technology.

FIG. 44 illustrates an exemplary embodiment "Screen Shot" of the device employing the GUI 30 of the present technology while the system displays a "Camera View" screen. The GUI 30 can be configured or configurable to include the recording start/stop affordance or control 32 provided anywhere on the screen, with a default position can be below the "1×" speed rate indicator. The speed selection region 34 can be provided anywhere on the screen for selecting a default or predefined frame rate speed that is used to manipulate one or more frames in video data or at least one image data. It can be appreciated that the video data can be obtained from the camera or from recorded video stored in the device or from a remote device. The speed rate/control affordance or indicator 35 can travel along the speed selection region 34 via control by the user to indicate the current or selectable speed. The speed rate affordance 35 can slide to different locations on the speed selection bar 34 to select a speed rate of the video. Alternatively to or in combination with sliding the speed rate affordance 35, a user can finger touch or select with a pointing device a location on the speed selection bar 34 to select a speed rate of the video. The GUI interface 30 can also include regions anywhere on the screen for controlling zoom, zoom and fast motion speed rate, and/or zoom and slow motion speed rate.

The GUI 30 can include a region adjacent to and/or below the speed selection bar 34 configured or configurable for receiving a vertical or upward finger swipe motion of a user's finger, as illustrated by the dashed arrowed line. Upon providing an upward finger swiping motion, a selectable options bar 782 can appear from a lower portion of the GUI 30 below the speed selection bar 34. The selectable options bar 782 can have a curved or arched configuration with at least one option indicator for providing a location on the selectable options bar 782 for selecting an option process 784 from a plurality of appearable option processes. A user can transition through the option processes 784 by, but not limited to, swiping left or right over the selectable options bar 782.

In the exemplary, FIG. 44 illustrates a default or first time viewing of the option processes 784 upon the selectable options bar 782 appearing into view. A first of the option processes 784 in the selected position can be a "FAST/SLOW" option process 784, with the next "FAST MOTION" option process 784 being viewable to the right of the selected "FAST/SLOW" option process 784. Accordingly, the next option process 784 either ahead of and/or behind the selected option process 784 can be displayed and viewable to the user.

One or more selectable affordances, such as but not limited to, the "Setting" affordance 710, the "Flash" affordance 700, the "Timer" affordance 704 or a "Hide" affordance 780 can be located in, but not limited to, an upper or top region of the GUI 30 or any other area of the GUI. The "Hide" affordance 780, when activated (e.g. via a tap gesture), can hide or display some or all of the affordances displayed on the GUI 30.

Once an option process 784 has been selected, the user can then initiate a video recording option, an image capture option or access stored video or images by operating the recording start/stop control 32.

A one touch taping gesture or touch holding gesture of the recording start/stop control 32 can initiate a recording operation, and a subsequent one touch taping gesture or removing of the touch holding gesture can stop the recording operation. Alternatively, the recording operation can automatically stop after a predetermined time period. During the recording operation, the time guidelines 770 can be displayed, and the user can slide the recording start/stop control 32 to the left or right to initiate a speed rate change operation utilizing the processes of the present technology. While touching and holding the recording start/stop control 32, the user can slide the recording start/stop control 32 vertically to change a zoom aspect of the video or image being displayed in the display region 776 while simultaneously sliding left or right to change a speed rate of a video.

Figure 45:
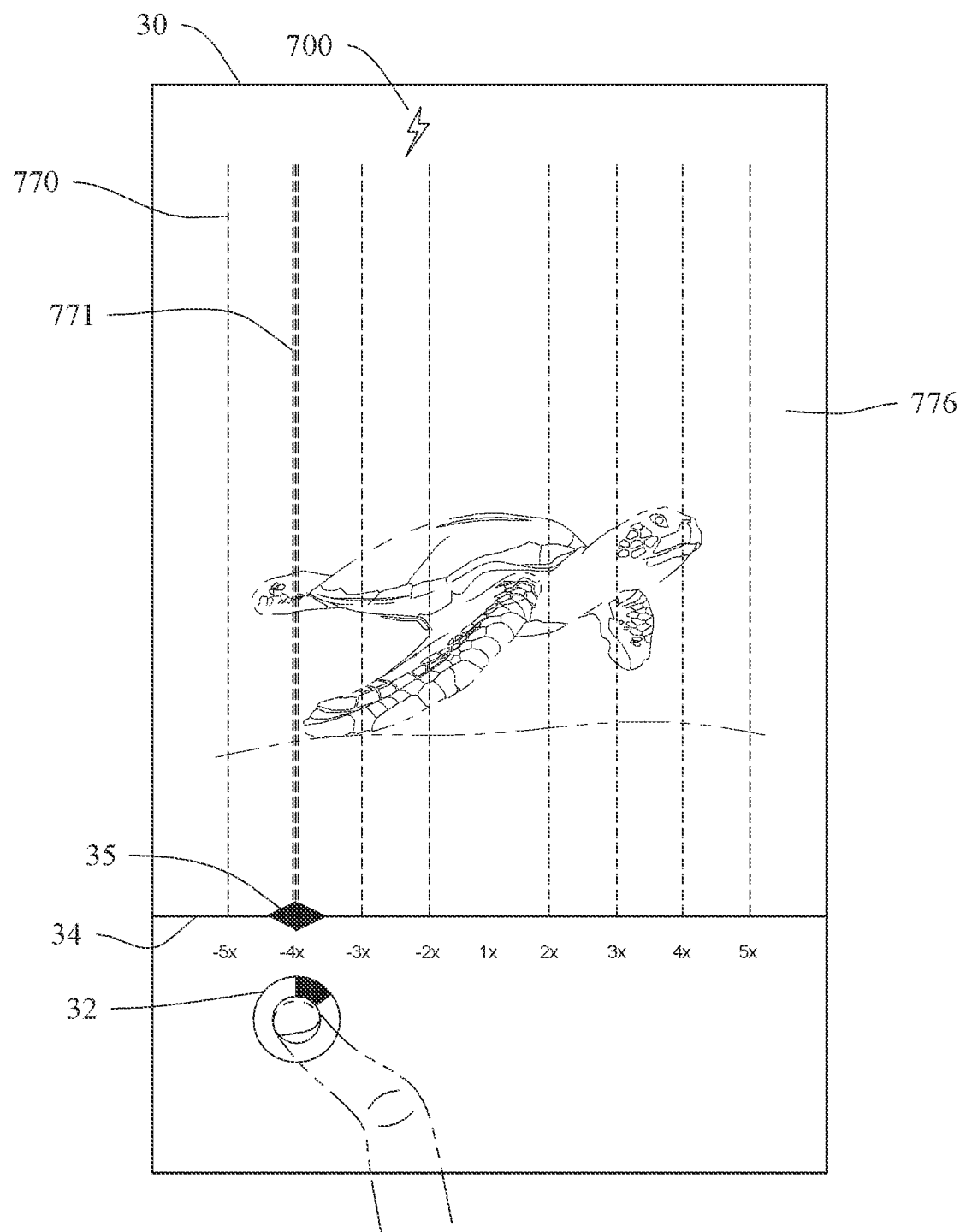
FIG. 45 is a sample GUI screenshot of a "Camera View" with a touch and hold finger operation selecting a "−4×" slow motion factor level with its corresponding slow motion time guideline nearest the touching finger being displayed in a different characteristic to that of the non-selected guidelines utilizing the process and/or system of the present technology.

For example and as illustrated in FIG. 45, the time guidelines 770 can vertically extend from all the displayed motion speed indicators other than the normal/raw speed rate "1×", thereby representing available speed rate changes. The time guidelines 770 can be in an inactive or an active state. The inactive time guidelines 770 can be, but not limited to, dimmer, thinner and/or a different color to that of an active time guideline 771. It can be appreciated that the time guidelines can be turned on (visible) or off (invisible) by the user, and the inactive and/or active characteristics of the time guidelines can be adjusted. Further, the time guidelines 770 can be on (visible) or off (invisible) before recording starts, and if off then turned on automatically by the present technology.

In the exemplary, the user can slide the recording start/stop control 32 toward the left toward the "−4×" speed rate indicator, and during its travel the inactive time guideline 770 nearest or at a predetermined distance from the recording start/stop control 32 can change to an active time guideline 771. The active time guideline 771 can have a characteristic that is different to the remaining inactive time guidelines 770. The characteristic of the active time guideline 771 that can change can be, but not limited to, visibility, color, line style, flashing, brightness and/or line weight.

For example, but not limiting, prior to moving the recording start/stop control 32, all the time guidelines 770 can be the same color. If the user slides the recording start/stop control 32 from the "1×" position to the "−4×" position, the time guideline 770 associated with the "−2×" speed rate indicator can change to an active time guideline 771 having a different color (e.g. to red) to that of the remaining inactive time guidelines 770. Then upon further sliding of the recording start/stop control 32, the time guideline associated with the "−3×" speed rate indicator can change to an active time guideline 771 while the time guideline associated with the "−2×" speed rate indicator change back to an inactive time guide line 770. This process can proceed during the travel of the recording start/stop control 32 until the user stops moving the recording start/stop control 32.

Alternatively, all the inactive time guidelines can be invisible and then visible when they become active. It can be appreciated that more than one time guideline can be active at the same time. Further, the user can choose the number of time guidelines displayed or displayable on the screen. The number of time guidelines available to the user can be limited by the user's subscription level permission. Optionally, an area below the speed rate bar 34 can be void of any affordances during the recording operation.

The present technology can further display additional speed rate indicators when the recording start/stop control 32 is moved to the far or extreme left or right of the screen. This motion can result in shifting the speed rate indicators 34 to the left or right to display more speed rate options. For example, moving or sliding the recording start/stop control 32 to the far or extreme right of the screen past the displayed "5×" fast motion speed indicator can result in shifting the fast motion speed rate indicators to the left allowing for the display of additional fast motion speed rate indicators (e.g. 6×, 7×, 8×, 9×, etc.).

Figure 46:
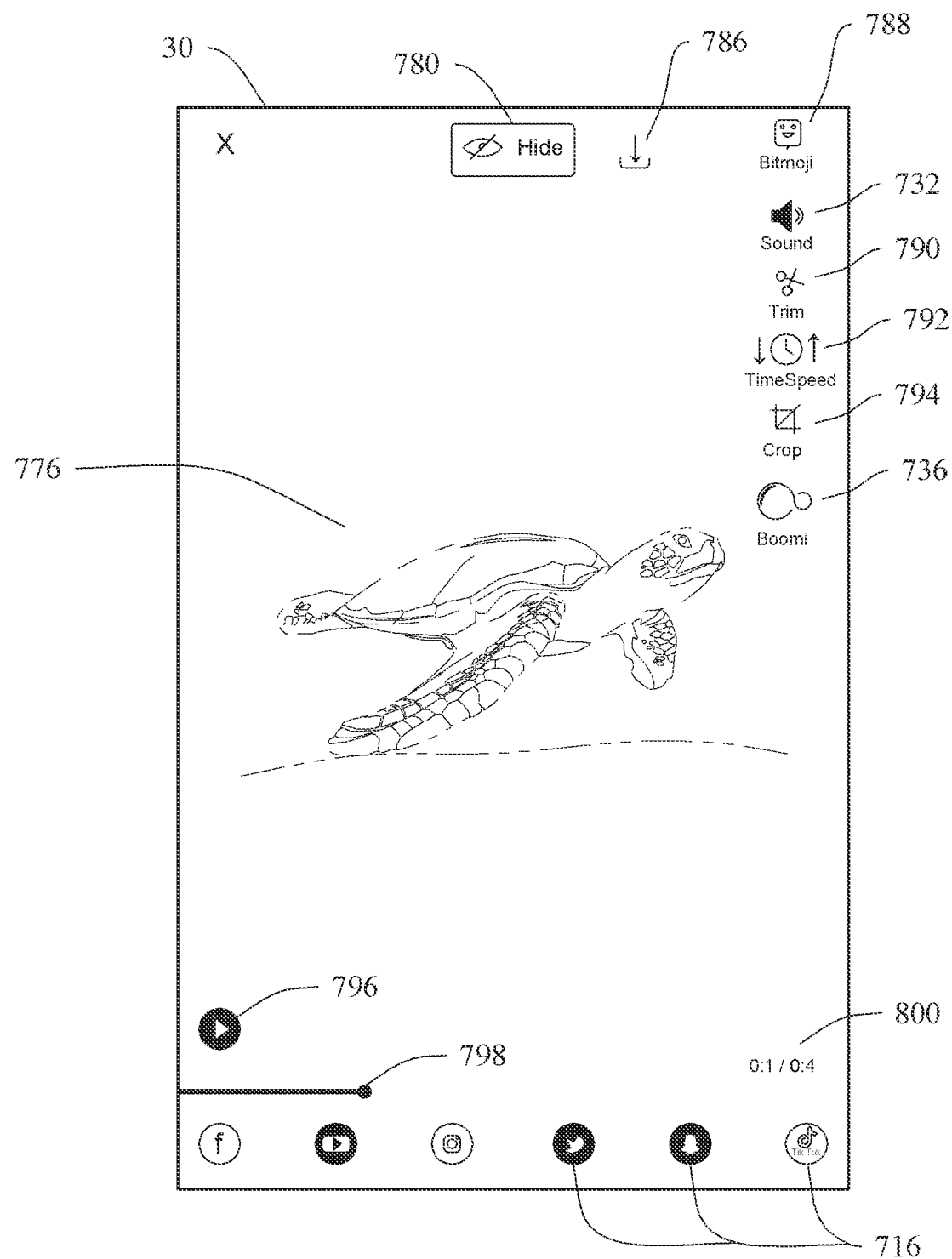
FIG. 46 is a sample GUI screenshot of an "Editing View" or "Review Screen" while the user has stopped video recording or image capturing utilizing the process and/or system of the present technology.

Further in the exemplary, once the recording operation is stopped by the user, any speed rate changes or other effect changes can be automatically implemented in real time or near real time utilizing the processes of the present technology, and displayed in an "Editing View" or "Review Screen", as illustrated in FIG. 46. If a video was captured or retrieved then the video can be played in a continuous loop manner. The GUI 30 can display an "X" affordance for closing the "Editing View" or "Review Screen" and returning back to the "Camera View" screen. Further affordances that can be displayed on the GUI 30 can be, but not limited to, a "Sound" affordance 732 activateable (e.g. via a tap gesture) for muting sound, a "Hide" affordance 780 activateable (e.g. via a tap gesture) for hiding or displaying some or all of the affordances displayed on the GUI 30, a "Save" affordance 786 activateable (e.g. via a tap gesture) for saving or accessing videos or images with the device or a remote device, a "Bitmoji" affordance 788 activateable (e.g. via a tap gesture) for adding or removing a personal emoji to the video or image, a "Trim" affordance 790 activateable (e.g. via a tap gesture) for initiating a video trimming operation, a "TimeSpeed" affordance 792 activateable (e.g. via a tap gesture) for initiating a "TimeSpeed" operation, a "Crop" affordance 794 activateable (e.g. via a tap gesture) for initiating a cropping operation, a Boomi affordance 736 activateable (e.g. via a tap gesture) for initiating a Boomi operation, a "Play/Pause" affordance 796 activateable (e.g. via a tap gesture) for starting or stopping the playing of the video, and one or more social media affordances 716. Each social media affordance 716 can be activateable (e.g. via a tap gesture) for opening a respective social media platform or app such as, but not limited to, Facebook®, YouTube®, Snapchat®, Twitter®, Instagram® or TikTok®. Activating any one of the social media affordances 716 can initiate its respective app or program, allowing the use to upload a video or image from the GUI 30 to that social media platform.

It can be appreciated that while the video is playing in the video display region 776, a time playing bar 798 can travel or slide across the GUI 30 indicating playing of the video and its corresponding time location. A tap or touch holding gesture can be applied to the time playing bar 798 to fast forward, rewind, pause and/or jump to a specific time of the video. The GUI 30 can further display a time stamp 800 of the video, which can include the present time of the playing video and the total time of the video.

Upon activation of the "Trim" affordance 790, a "Trim" editing mode or screen can be displayed on the GUI 30. In this "Trim" editing mode or screen, the frames of the video or images can be displayed, with a trimming line overlaid over the frames or images. A "Split" affordance can be displayed and activated (e.g. via a tap gesture) for cutting away frames from the video, and a "Merge" affordance can be displayed and activated (e.g. via a tap gesture) for merging frames. A cancel or close "X" affordance can be displayed and activated (e.g. via a tap gesture) for exiting the "Trim" editing mode or screen, and a "Save" affordance can be displayed and activated (e.g. via a tap gesture) for saving changes to the video data.

Upon activation of the "Crop" affordance 794, a "Crop" editing mode or screen can be displayed on the GUI 30. In this "Crop" editing mode or screen, a cropping window can be displayed including the video, one or more frames of the video or an image. The corners of the cropping window can be moved to adjust the size of the cropping window, and thus a viewable object in the video, one or more frames of the video or the image. The position, orientation and/or rotation of the viewable object in cropping in the window can be adjusted. A "Cancel" affordance can be displayed and activated (e.g. via a tap gesture) to exit the "Crop" editing mode or screen, a mirror affordance can be displayed and activated (e.g. via a tap gesture) for mirroring the viewable object in the cropping window, a rotation affordance can be displayed and activated (e.g. via a tap gesture) for rotating the viewable object in the cropping window, an undue affordance can be displayed and activated (e.g. via a tap gesture) for undoing a previous change, an orientation affordance can be displayed and activated (e.g. via a tap gesture) for displaying multiple selectable orientation options (e.g. Original, 1:1 Square, 2:3, 3:4, etc.), and a down affordance can be displayed and activated (e.g. via a tap gesture) for accepting any changes and returning to the previous "Reviewing Screen".

Figure 47:
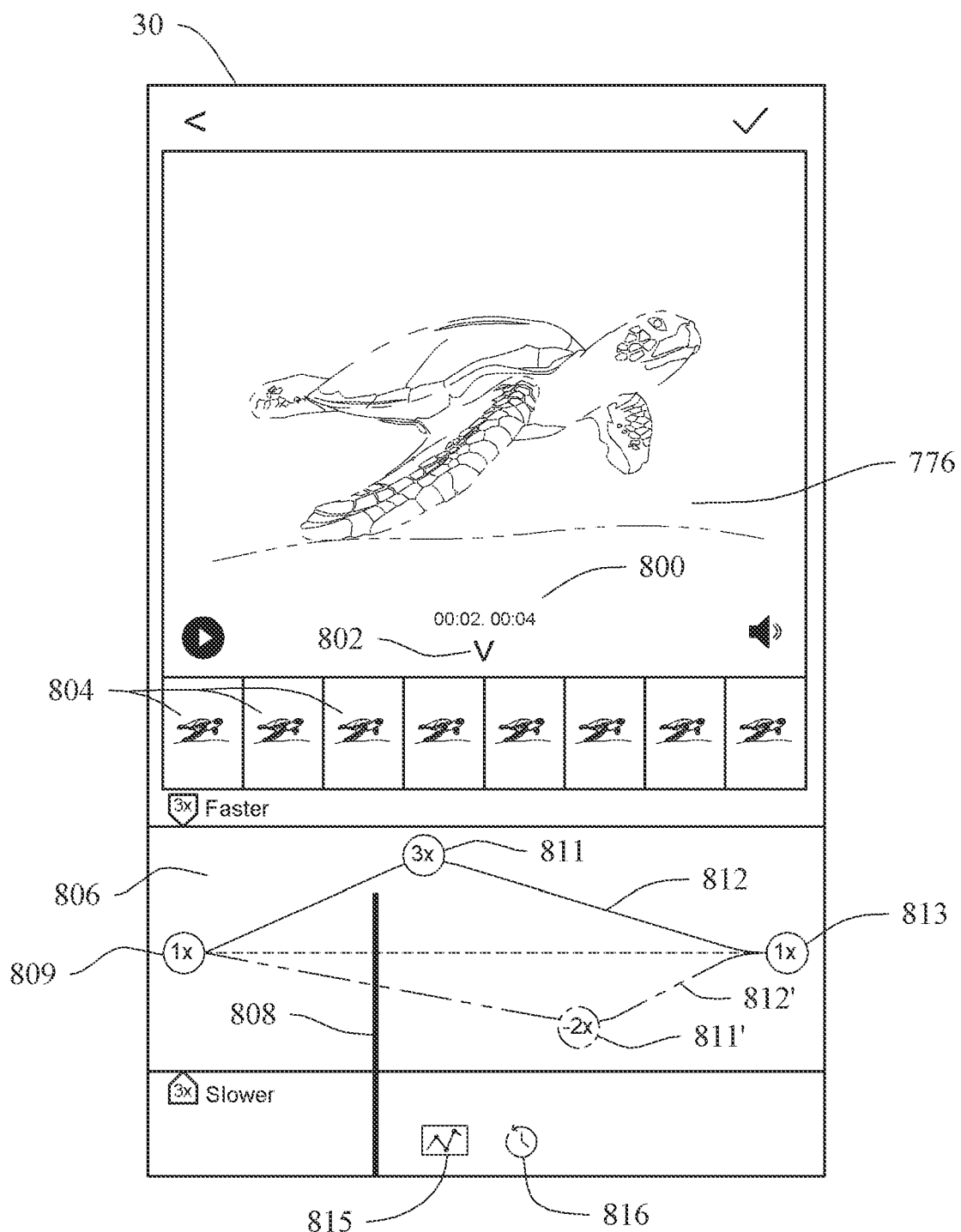
FIG. 47 is a sample GUI screenshot of an "Editing View" or "Review Screen" of the "TimeSpeed" option utilizing the process and/or system of the present technology.

Upon activation of the "TimeSpeed" affordance 792, a "TimeSpeed" editing mode or screen can be displayed on the GUI 30, as illustrated in FIG. 47. In this "TimeSpeed" editing mode or screen, a return "<" affordance can be displayed and activated to exit the "TimeSpeed" editing mode or screen, and an apply "checkmark" affordance can be displayed to accept effect changes. The video display region 776 can include the time stamp 800, the play/pause affordance, the speaker affordance, a video/image frame hide "v" affordance 802, and one or more video/image frames 804. Activation of the video/image frame hide affordance 802 (e.g. via a tap gesture) can hide or display the video/image frames 804.

The "TimeSpeed" editing mode or screen can further include a time/speed manipulation region 806. This region 806 can include a time playing bar 808 that can travel across the region 806 indicating playing of the video and its corresponding time location and frame location with the video/image frames 804. The time playing bar 808 can be moved to any position by a touching and holding gesture, resulting in the time of the video being displayed to correspond with the time location of the time playing bar 808.

An initial speed rate indicator 809 (e.g. "1×") can be located at one side of the region 806 and an ending speed rate indicator 813 (e.g. "1×") being located at another end thereof, with a baseline 810 connecting therebetween. The initial and ending speed rate indicators 809, 813 can represent a normal or raw speed rate of the video. A user can change a speed rate at any point in time of the video by tapping an area above or below the baseline at specific time location or by touching/holding a point on the baseline and sliding above or below the baseline. This operation can result in displaying a new speed rate indicator 811, 811' above or below the baseline 810 at that specific time, with a new altered baseline 812, 812' connecting the initial speed rate indicator 809 to the new speed rate indicator 811, 811' and then to an additional new speed rate indicator or to the ending speed rate indicator 813. It can be appreciated that the new speed rate indicator 811, 811' and/or the altered baseline 812, 812' can have a characteristic (e.g. color, line type, line weight, etc.) different to that of, but not limited to, the initial or ending speed rate indicators 809, 813 and/or the baseline 810.

It can be further appreciated that the user could adjust the speed rate at time zero of the baseline 810 at the initial speed rate indicator 809 thereby changing the initial speed rate at time zero to the new speed rate. Still further, it can be further appreciated that the user could adjust the speed rate at the end time of the baseline 810 at the ending speed rate indicator 813 thereby changing the ending speed rate at end time to the new speed rate.

Horizontal time speed guidelines 814 can be displayed to represent the upper and lower speed rate limits (e.g. fast motion limits and slow motion limits), or the time speed guidelines 814 can travel or move to represent the present location of the new speed rate indicator 811, 811'.

The "TimeSpeed" editing mode or screen can further display a "Chart" affordance 815 activateable (e.g. via a tap gesture) for initiating and displaying the time/speed manipulation region 806 and a "Time" affordance 816 activateable (e.g. via a tap gesture) for initiating and displaying a time line manipulation region including a horizontally moving time indictor traveling on a time line.

Figure 48:
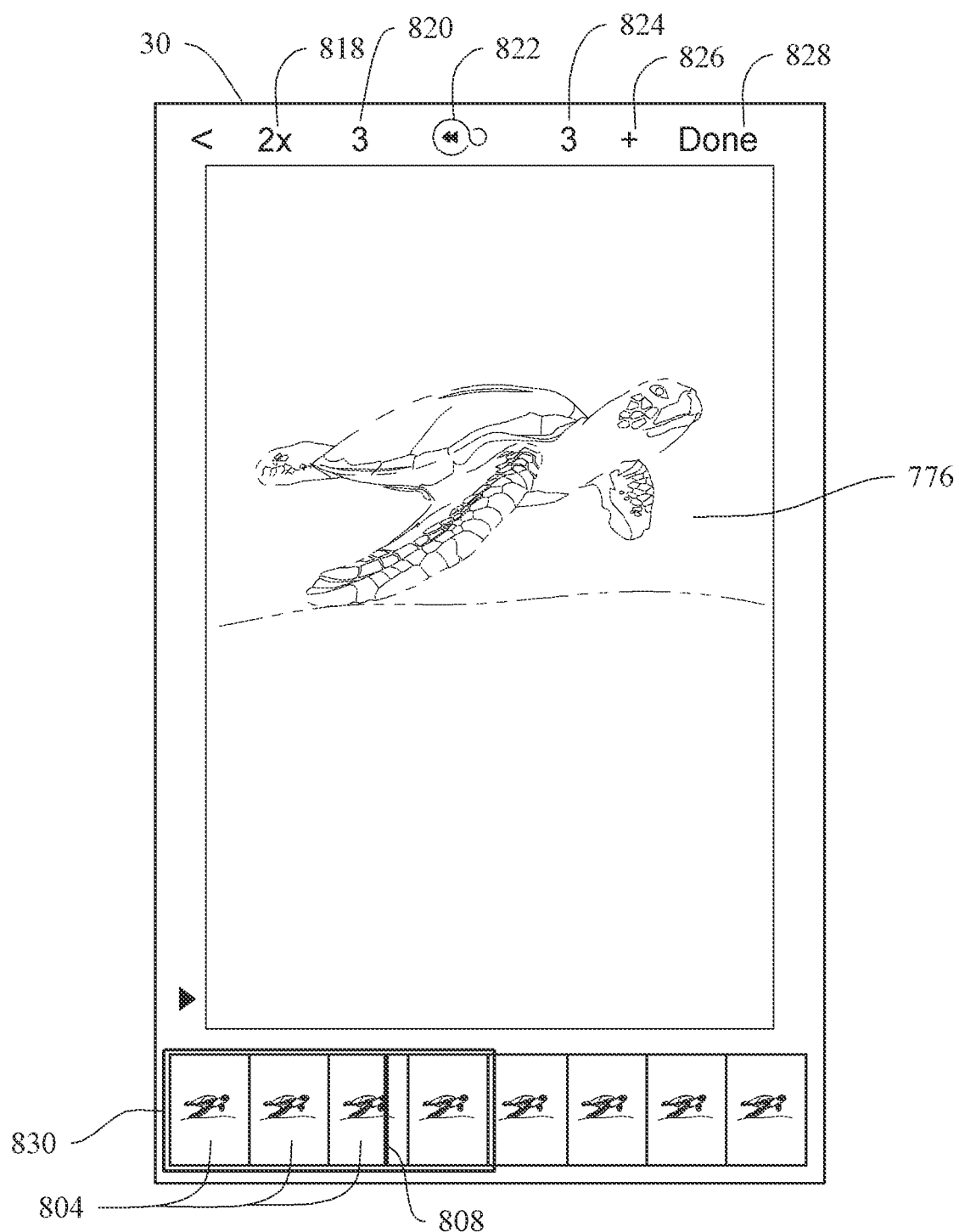
FIG. 48 is a sample GUI screenshot of an "Editing View" or "Review Screen" of the Boomi option utilizing the process and/or system of the present technology.

Upon activation of the Boomi affordance 736, a Boomi editing mode or screen can be displayed on the GUI 30, as illustrated in FIG. 48. In this Boomi editing mode or screen, a return "<" affordance can be displayed to exit the Boomi editing mode or screen, and a "Done" affordance 828 can be displayed to accept effect changes and return to a previous screen, the "Review Screen" or "Camera View". The Boomi editing mode or screen can further include a playback speed selector affordance 818 activateable (e.g. via a tap gesture) for bringing up a dropdown menu with selectable speed rates for changing the speed rate of the video or segment thereof, a loop affordance 820 activateable (e.g. via a tap gesture) for bringing up a dropdown menu with selectable number of loops for changing the number of loops or frames in the loops of the video or segment thereof, a forward/reverse affordance 822 activateable (e.g. via a tap gesture) for selecting a forward or reverse playing of the loop of the video or segment thereof, a number of seconds affordance 824 activateable (e.g. via a tap gesture) for bringing up a dropdown menu with selectable number of seconds or milliseconds for changing the number of seconds for the loop, and an add "+" affordance 826 activateable (e.g. via a tap gesture) for adding or creating a Boomi effect to multiple video segments or loops.

The Boomi editing mode or screen can include the frames from video or still images 804 in sequential order, with a traveling time playing bar 808, and an adjustable loop frame or box 830. The loop box 830 can surround the frames that are part of the loop, and size, length or configuration of the loop box 830 can be adjusted to remove from or add frame to the loop. Further, multiple loop boxes 830 can be displayed or utilized to represent multiple loops. The loop box 830 can have a characteristic (e.g. color, line type, line weight, etc.) different to that of, but not limited to, the time playing bar 808 or the frames 804.

In the Boomi editing/review mode or screen, the selected loop is played until it reaches the end of the loop and then it rewinds to the beginning of the loop and begins to play again. This forward and rewind/reverse playing cycle repeats until stopped or paused by the user.

In the exemplary, if the Boomi option process is utilized, then a Boomi subroutine can be initiated which utilizes a video stream or data including multiple frames or images in sequence. The video stream can be acquired from any of the previously described subroutines of the present technology, or the video stream altered by the Boomi subroutine can be provided to any of the previously described subroutines of the present technology. The user can utilize the Boomi subroutine to select specific frames in the video data, and change effects to those selected frames. The selected frames can then be played in sequence in a forward and/or reverse direction, and repeated in a play loop operation. The Boomi special effect whereby the video can play forward to a predetermined point in the video, then plays the video in reverse for a short duration (1-3 seconds), then plays forward again, and may or may not repeat. The Boomi special effect can include a Forward/Forward special effect whereby the video can play forward to a predetermined point in the video, then skips back several seconds in the video, then plays forward again, and may or may not repeat. It can be appreciated that the frames in the video can be multiple or a burst of images/photos.

The Boomi special effect can be applied to videos in real-time while recording with a camera device, or optionally while editing the video in an accompanying video editor in the same device or in other supported devices or by a remote server. The resulting video from the Boomi special effect can contain segments where the video playback is normal, as well as segments that has the Boomi special effect. The part of the video that has the Boomi special effect can be part of a continuous stream of video. The user can quickly re-edit and reapply the Boomi special effect to the same portion or other portions of the video. The user can apply the Boomi special effect in multiple sections of the video in real time (live recording), near real time or to saved video. The user can customize the Boomi special effect to change, but not limited to, the way the video plays, number of loops, number of seconds, and playback speed. It the user is using the Boomi special effect while recording in real time, the user can "mark" the location of the video to apply the Boomi special effect after recording has completed. The user can apply different special effects on each iteration of the loop in the Boomi special effect. The Boomi special effect can be applied to 360 degree videos, and/or while user is using Augmented Reality. The Boomi special effect can support real time or near real time fast and slow motion editing while recording.

It can be appreciated that the Boomi special effect or subroutine can be implemented as a standalone method, system, application or program on the same device or on a separate remote device.

Figure 49:
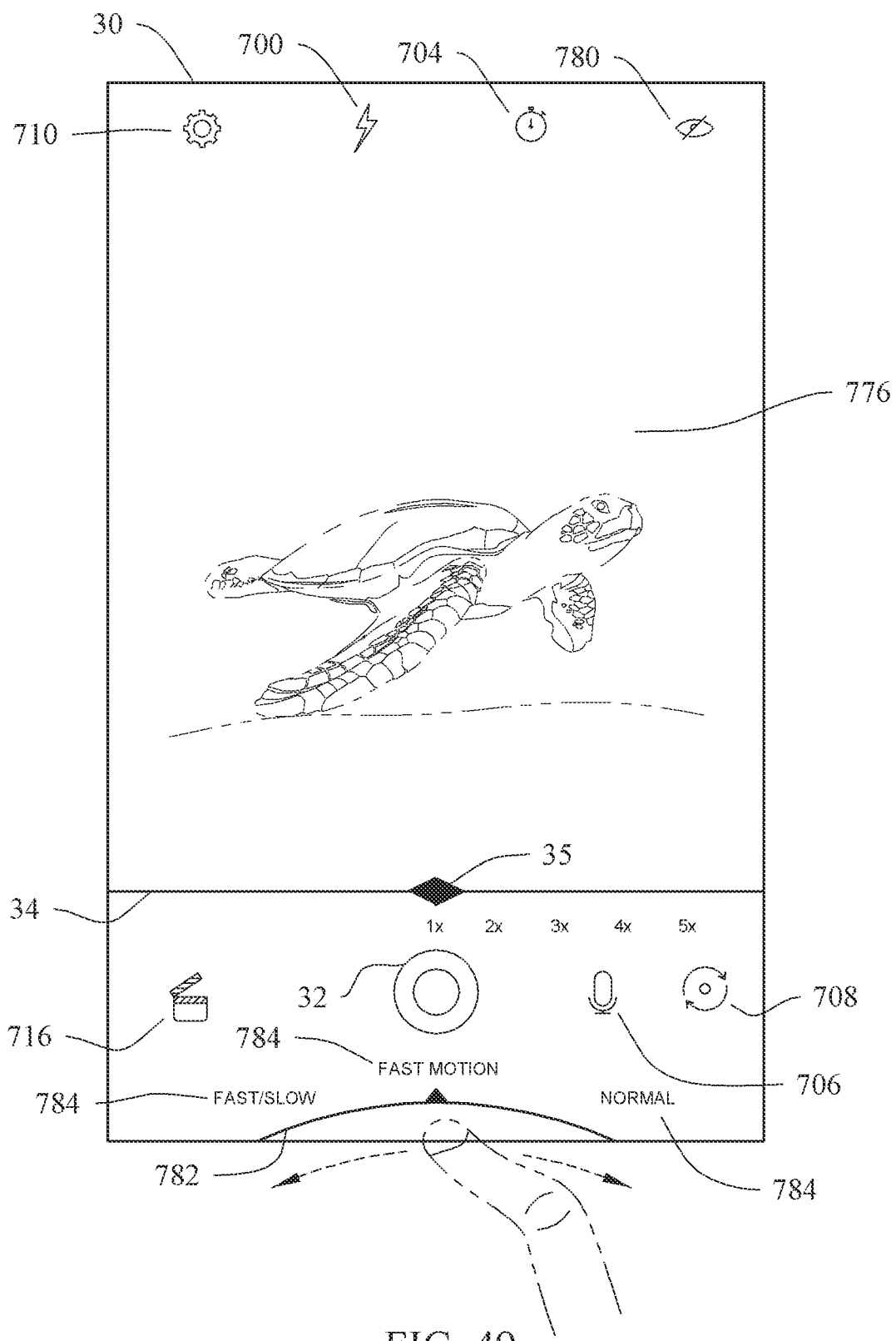
FIG. 49 is a sample GUI screenshot of a "Camera View" of the device employing the GUI with a "Fast Motion" option selected on the selectable options bar utilizing the process and/or system of the present technology.

In the exemplary, FIG. 49 illustrates a user swiping left across the or near the selectable options bar 782, thereby changing from the "FAST/SLOW" option process to a "FAST MOTION" process, with the previous "FAST/SLOW" option process and a next "NORMAL" option process being viewable to the left and right of the selected "FAST MOTION" option process 784, respectively. Accordingly, the next option process 784 either ahead of and/or behind the selected option process 784 can be displayed and viewable to the user.

Upon selecting the "FAST MOTION" option process 784, the GUI 30 can display the "Camera View", which is similar to the "FAST/SLOW" screen but with the slow motion speed indicators (−2×, −3×, 4×, −5×, −n$^{th}$×) omitted. Consequently, the normal/raw speed and fast motion speed rate indicators are displayed.

Figure 50:
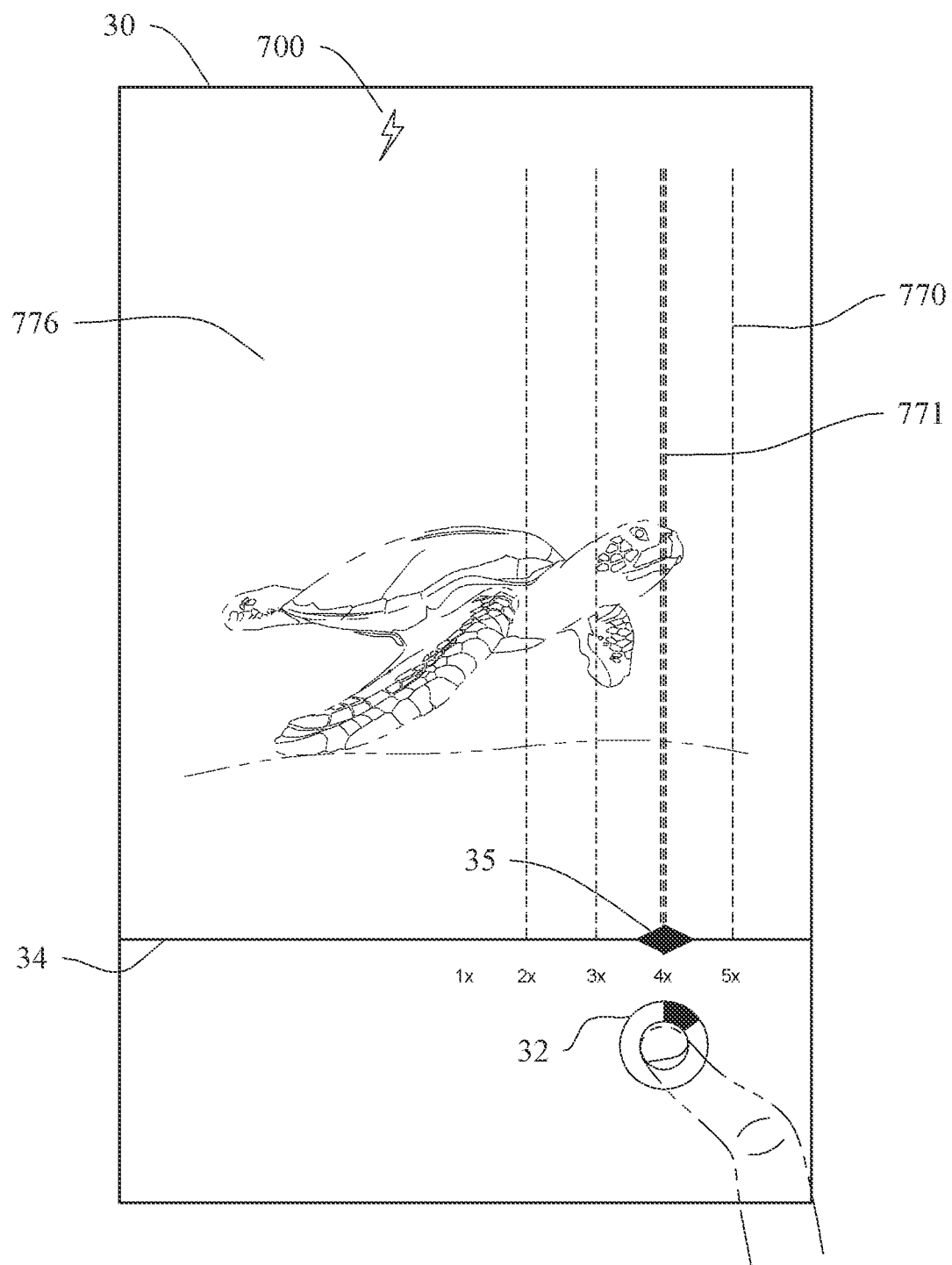
FIG. 50 is a sample GUI screenshot of a "Camera View" with a touch and hold finger operation selecting a "4×" fast motion factor level with its corresponding fast motion time guideline nearest the touching finger being displayed in a different characteristic to that of the non-selected guidelines utilizing the process and/or system of the present technology.

For example and as illustrated in FIG. 50, the time guidelines 770 can vertically extend from all the displayed fast motion speed indicators other than the normal/raw speed rate "1×", thereby representing available fast motion speed rate changes. The user can slide the recording start/stop control 32 toward the right toward the "4×" speed rate indicator, and during its travel, a characteristic of a time guideline 771 nearest or at a predetermined distance from the recording start/stop control 32 can change so that it is different to the remaining time guidelines 770. The characteristic of the nearest or selected time guideline 771 that can change can be, but not limited to, color, line style and/or line weight. In the exemplary, prior to moving the recording start/stop control 32, all the time guidelines 770 can be the same color. If the user slides the recording start/stop control 32 from the "1×" position to the "4×" position, the time guideline associated with the "2×" speed rate indicator can change to a different color first. Then upon further sliding of the recording start/stop control 32, the time guideline associated with the "3×" speed rate indicator can change color with the time guideline associated with the "2×" speed rate indicator changing back to its initial color. This process can proceed during the travel of the recording start/stop control 32 until the user stops moving the recording start/stop control 32.

Figure 51:
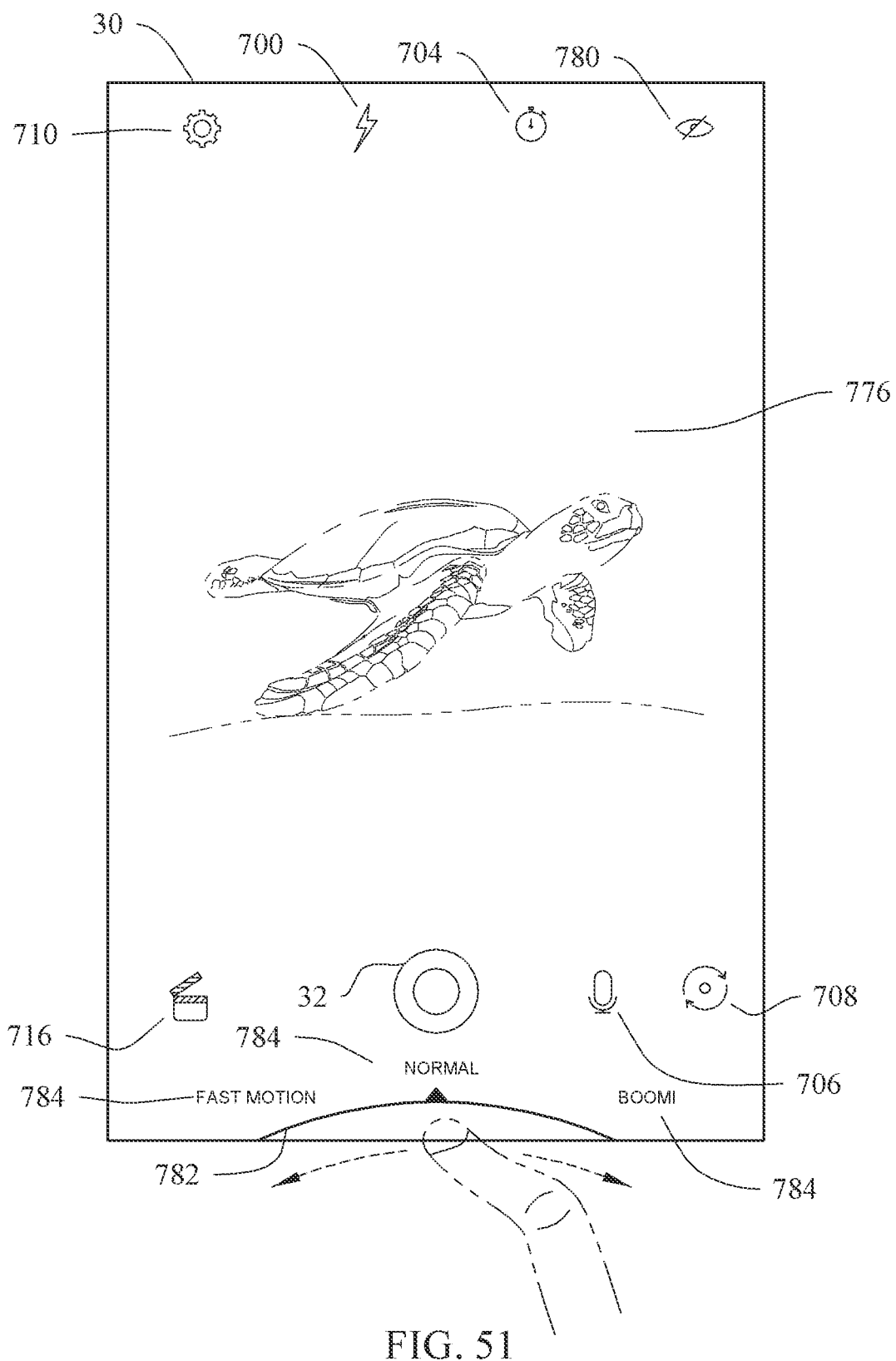
FIG. 51 is a sample GUI screenshot of a "Camera View" of the device employing the GUI with a normal option selected on the selectable options bar utilizing the process and/or system of the present technology.

In the exemplary, FIG. 51 illustrates a user swiping left across the or near the selectable options bar 782, thereby changing from the "FAST MOTION" option process to a "NORMAL" process, with the previous "FAST MOTION" option process and a next Boomi option process being viewable to the left and right of the selected "NORMAL" option process 784, respectively. Accordingly, the next option process 784 either ahead of and/or behind the selected option process 784 can be displayed and viewable to the user.

Upon selecting the "NORMAL" option process 784, the GUI 30 can display the "Camera View", which is similar to the "FAST/SLOW" screen but with the speed selection region 34 and all speed rate/control affordances or indicators 35 omitted.

In the "Editing View" or "Review Screen" under the "NORMAL" operation process, any or all affordances 716, 732, 736, 780, 786, 788, 790, 792, 794 can be displayed, provided to and utilized by the user for selection via the GUI 30.

Figure 52:
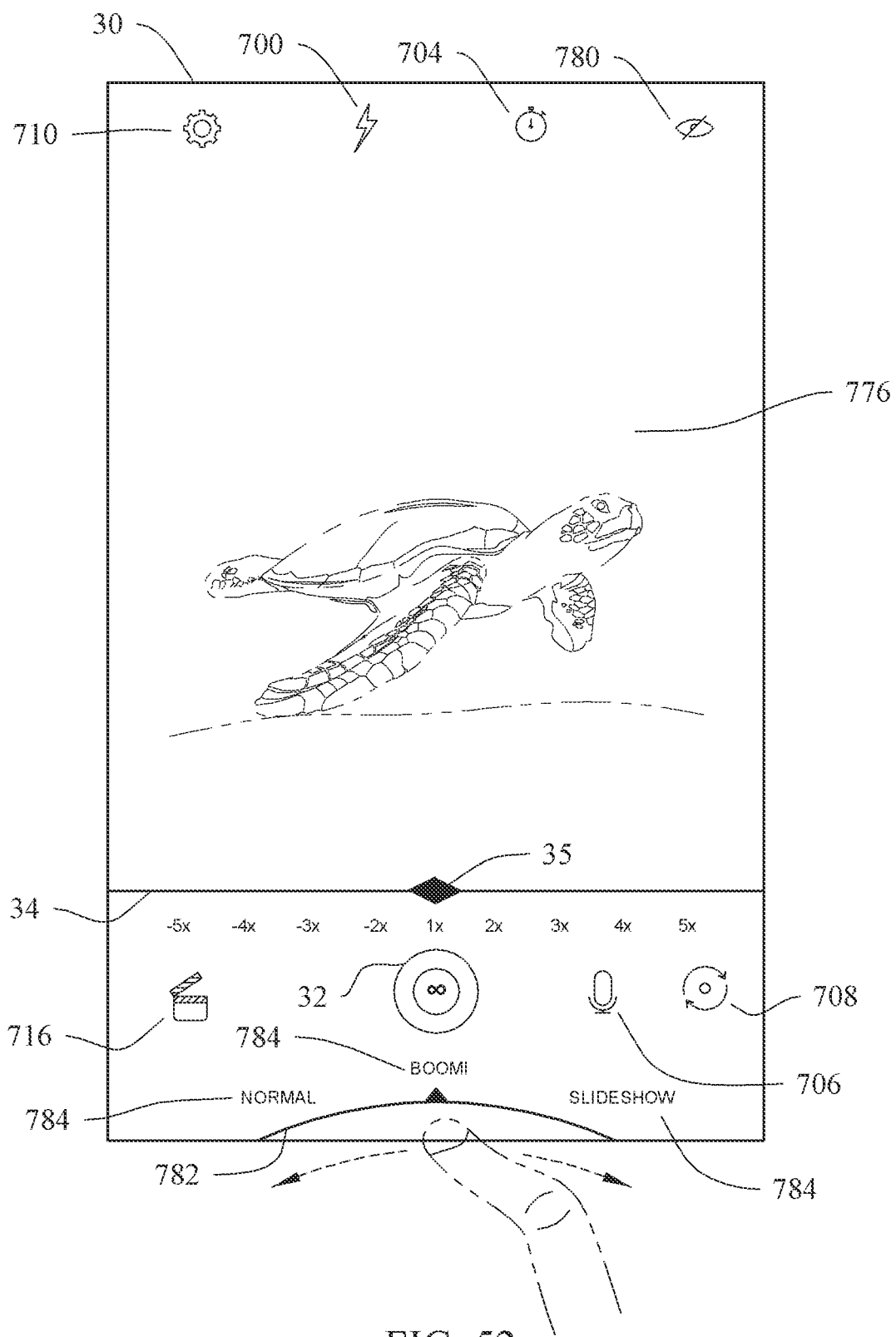
FIG. 52 is a sample GUI screenshot of a "Camera View" of the device employing the GUI with a Boomi option selected on the selectable options bar utilizing the process and/or system of the present technology.

In the exemplary, FIG. 52 illustrates a user swiping left across the or near the selectable options bar 782, thereby changing from the "NORMAL" option process to a Boomi process, with the previous "NORMAL" option process and a next "SLIDESHOW" option process being viewable to the left and right of the selected Boomi option process 784, respectively. Accordingly, the next option process 784 either ahead of and/or behind the selected option process 784 can be displayed and viewable to the user.

Upon selecting the Boomi option process 784, the GUI 30 can display the "Camera View", which is similar to the "FAST/SLOW" screen including the speed selection region 34 and all speed rate/control affordances or indicators 35.

The recording start/stop control 32 can include an image or icon representing that the Boomi option process is selected and in current operation. All speed rate and time guideline operations can be provided in the "Camera View" under the Boomi operation.

Figure 53:
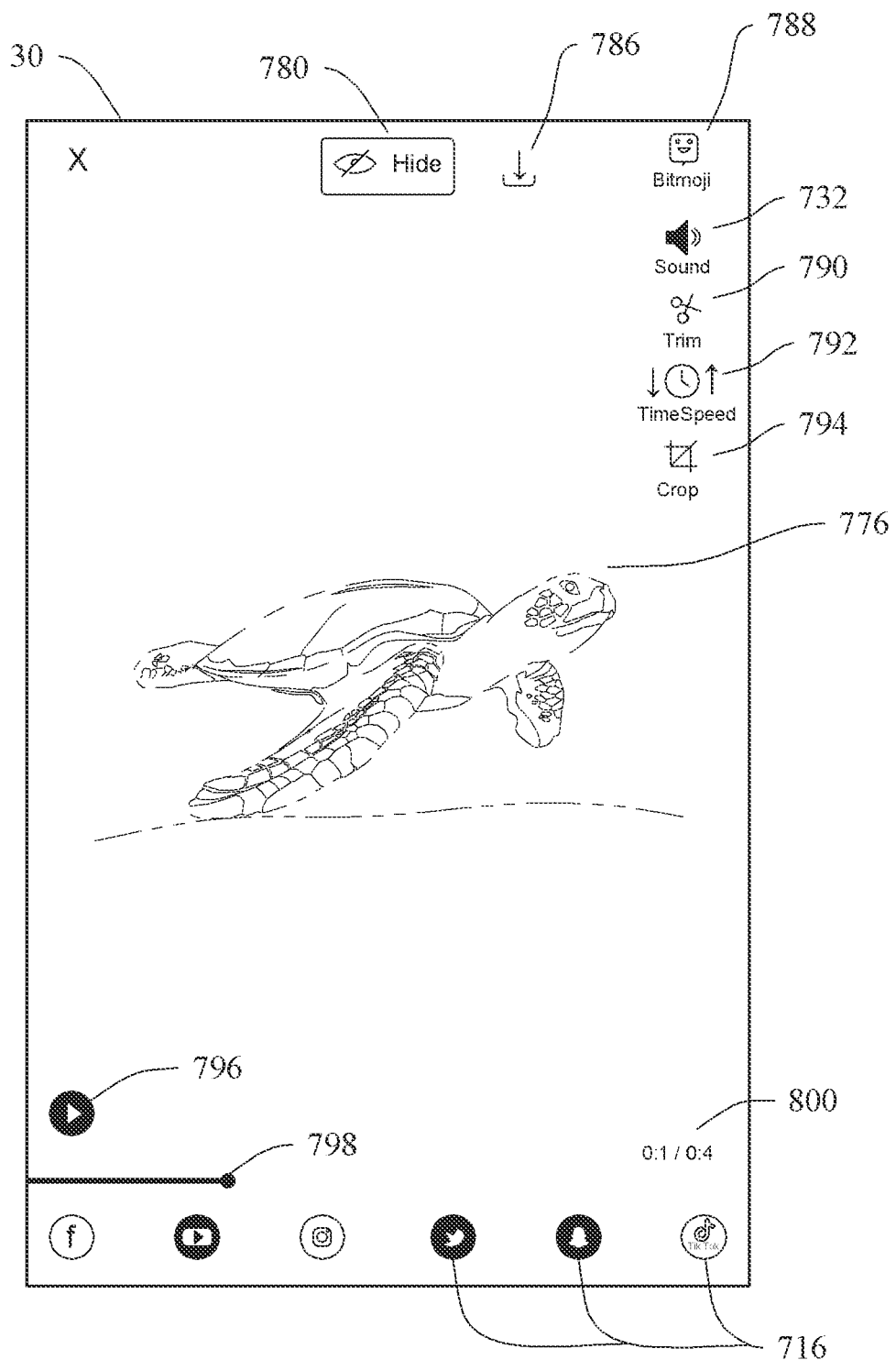
FIG. 53 is a sample GUI screenshot of an "Editing View" or "Review Screen" of the Boomi option utilizing the process and/or system of the present technology.

As illustrated in FIG. 53, in the "Editing View" or "Review Screen" under the Boomi operation process, any or all affordances 716, 732, 780, 786, 788, 790, 792, 794 can be displayed, provided to and utilized by the user for selection via the GUI 30, except for the Boomi affordance since the user is in the Boomi option process.

Once the recording operation has stopped, the "Camera View" changes to the "Editing View" or "Review Screen", as illustrated in FIG. 48, thereby providing all Boomi operations to the user as previously described.

Figure 54:
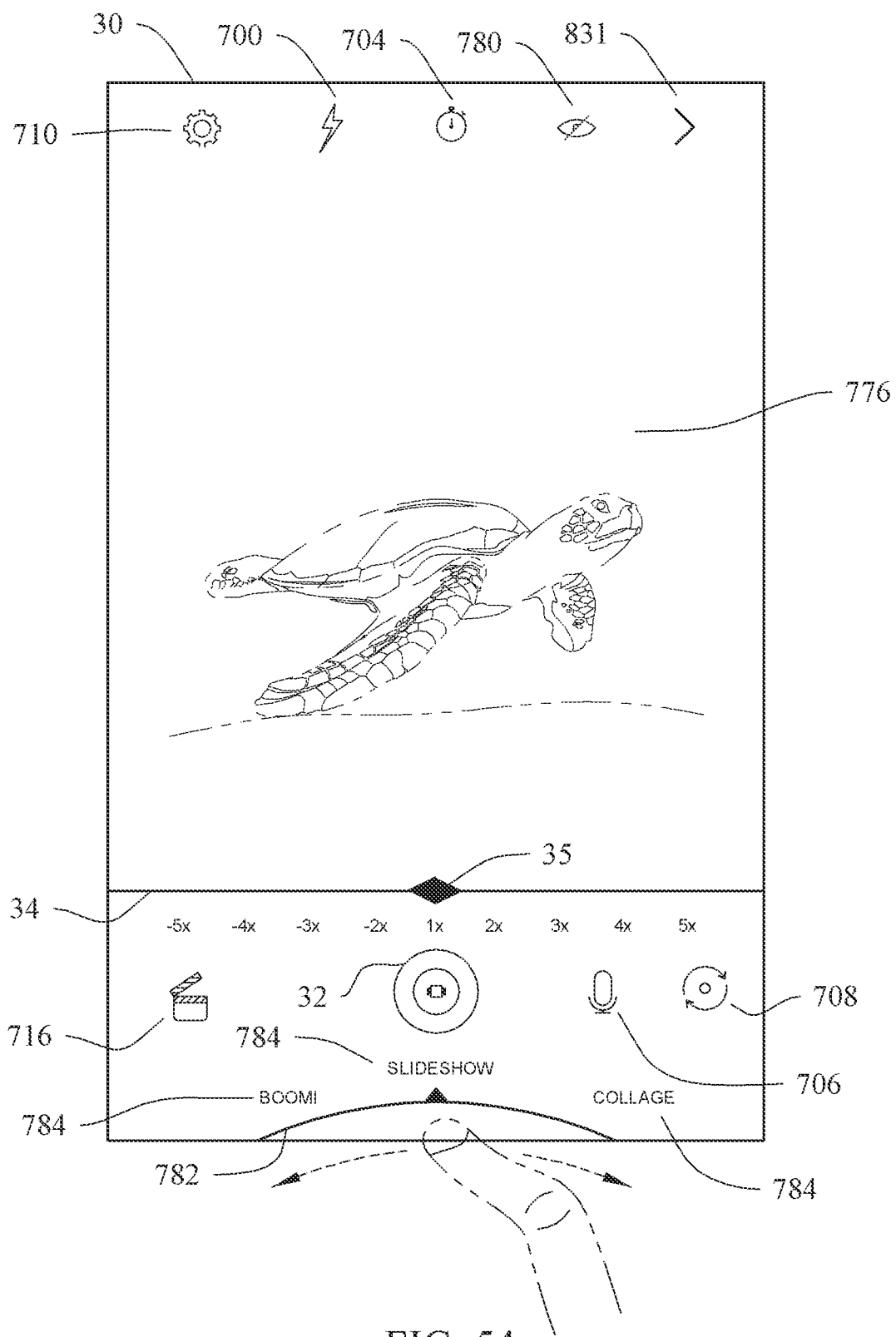
FIG. 54 is a sample GUI screenshot of a "Camera View" of the device employing the GUI with a "SlideShow" option selected on the selectable options bar utilizing the process and/or system of the present technology.

In the exemplary, FIG. 54 illustrates a user swiping left across the or near the selectable options bar 782, thereby changing from the Boomi option process to a "SLIDE-SHOW" process, with the previous Boomi option process and a next "COLLAGE" option process being viewable to the left and right of the selected "SLIDESHOW" option process 784, respectively. Accordingly, the next option process 784 either ahead of and/or behind the selected option process 784 can be displayed and viewable to the user.

When the "SLIDESHOW" option process 784 is in the selected position on the selectable options bar 782, a next ">" affordance 831 can be displayed and activated (e.g. via a tap gesture) to proceed to the "Editing View" or "Review Screen" of the "SLIDESHOW" operation process, after a predetermined number of images have been captured by activating (e.g. via a tap gesture) the recording start/stop control 32.

Upon selecting the "SLIDESHOW" option process 784, the GUI 30 can display the "Camera View", which is similar to the "FAST/SLOW" screen including the speed selection region 34 and all speed rate/control affordances or indicators 35. The recording start/stop control 32 can include an image or icon representing that the "SLIDESHOW" option process is selected and in current operation.

Figure 55:
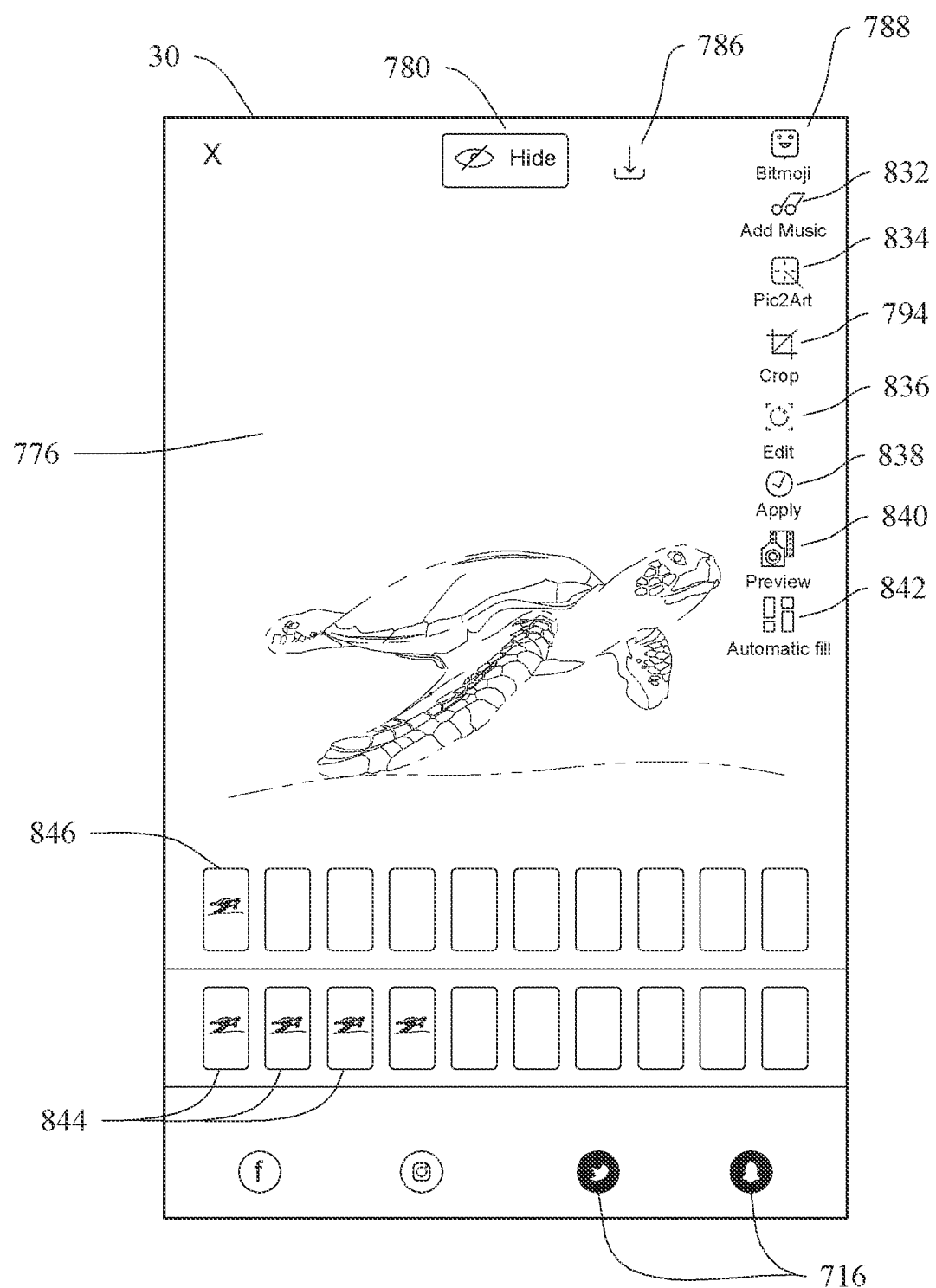
FIG. 55 is a sample GUI screenshot of an "Editing View" or "Review Screen" of the "SlideShow" option utilizing the process and/or system of the present technology.

Under the "SLIDESHOW" option process, video data may alternatively not be captured, with multiple images being captured for creating a slideshow effect. In "Camera View", the recording start/stop control 32 can be activated multiple times to capture multiple images, with each image being displayed in its own image window in sequential order. After a sufficient or predetermined number of images have been capture, the next ">" affordance 831 can be activated to proceed to the "Editing View" or "Review Screen" of the "SLIDESHOW" operation process, as illustrated in FIG. 55.

In the Editing View" or "Review Screen" of the "SLIDE-SHOW" operation process, all the images captured can be displayed in their own captured image window 844 in sequential order. Multiple slideshow image windows 846 are provided, wherein each window 846 can be initially empty. A user can select an image from the captured image window 844 and insert or provided it to one or more of the slideshow image windows 846. This process can be repeated until the desired captured images 844 are placed in the desired slideshow image windows 846. Placing the captured images 844 into a slideshow image window 846 can be accomplished by selecting (e.g. via a tap gesture) one or more captured images 844, thereby selecting them, and then selecting (e.g. via a tap gesture) the desired slideshow image windows 846. Resulting in the selected slideshow image windows 846 now including in the selected captured images 844. Alternatively, the captured images 844 can be placed into a slideshow image window 846 by selecting (e.g. via a touch and hold gesture) a captured image 844, and then moving the selected captured image (e.g. via a touch, hold and sliding gesture) to the desired slideshow image windows 846.

The Editing View" or "Review Screen" of the "SLIDE-SHOW" operation process, can include the following, but not limited to, affordances for providing effects to one or more of the images in the selected slideshow image windows 846: the social media affordances 716, the "Bitmoji" affordance 788, an "Add Music" affordance 832 activateable (e.g. via a tap gesture) for adding a music or sound track or file to the slideshow, a "Pic2Art" affordance 834 activateable (e.g. via a tap gesture) for changing a characteristic (e.g. color, tone, shade, shadow effect, etc.) to any one of the images, the "Crop" affordance 794, an "Edit" affordance 836 activateable (e.g. via a tap gesture) for a filter effect to any one of the images, an "Apply" affordance 838 activateable (e.g. via a tap gesture) for applying any changes made to the images, a "Preview" affordance 840 activateable (e.g. via a tap gesture) for previewing the slideshow of images with or without changes, and an "Automatic fill" activateable (e.g. via a tap gesture) for automatically selecting all the captured images 844 and placing in them in corresponding available slideshow image windows 846.

The slideshow, upon activation, would sequentially display the images of the slideshow image windows 846, with each image being displayed for a predetermined time before transitioning to the next image in the sequence.

The images can be one or more still images or one or more frames from video.

Figure 56:
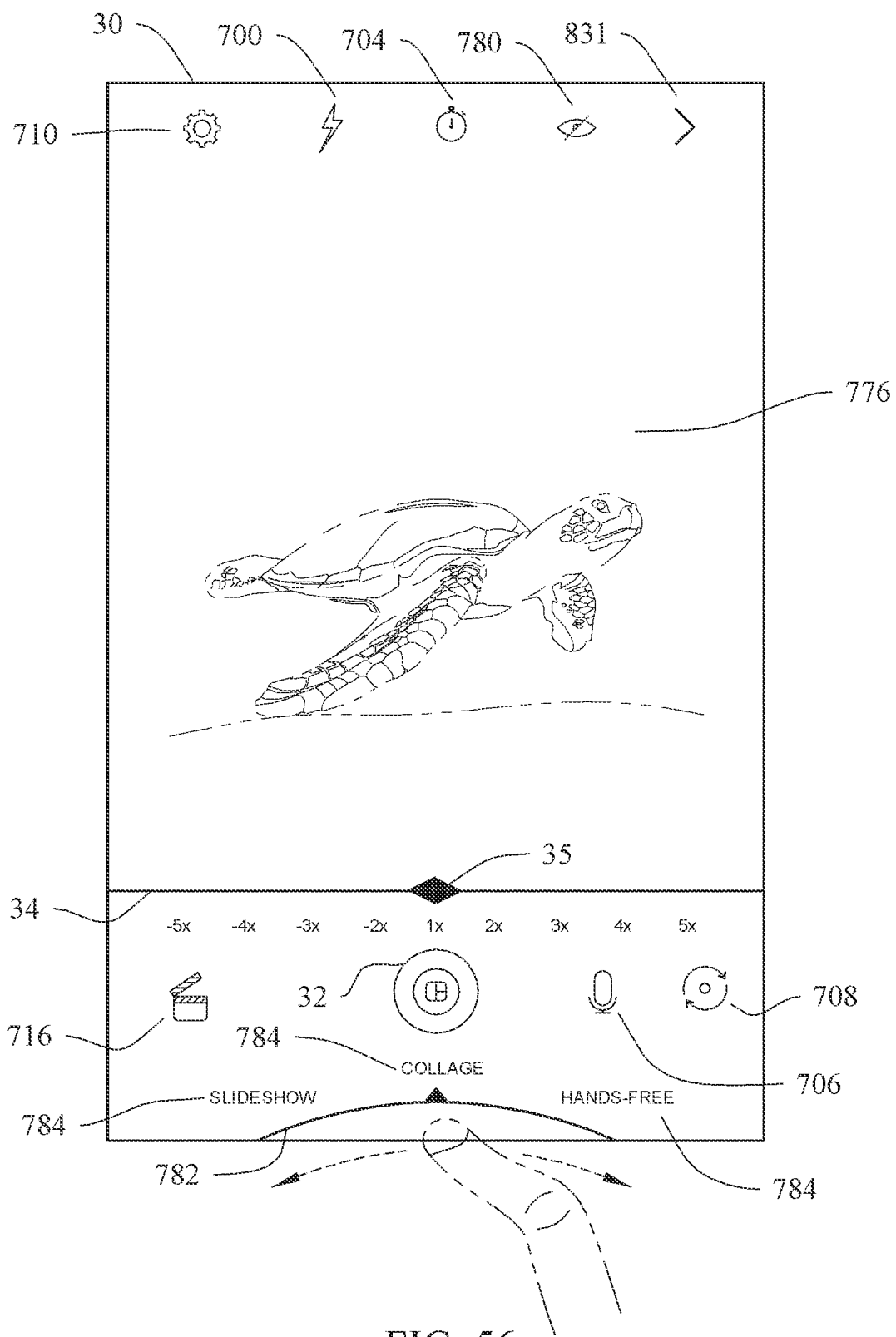
FIG. 56 is a sample GUI screenshot of a "Camera View" of the device employing the GUI with a "Collage" option selected on the selectable options bar utilizing the process and/or system of the present technology.

In the exemplary, FIG. 56 illustrates a user swiping left across the or near the selectable options bar 782, thereby changing from the "SLIDESHOW" option process to a "COLLAGE" process, with the previous "SLIDESHOW" option process and a next "HANDS-FREE" option process being viewable to the left and right of the selected "COLLAGE" option process 784, respectively. Accordingly, the next option process 784 either ahead of and/or behind the selected option process 784 can be displayed and viewable to the user.

When the "COLLAGE" option process 784 is in the selected position on the selectable options bar 782, a next ">" affordance 831 can be displayed and activated (e.g. via a tap gesture) to proceed to the "Editing View" or "Review Screen" of the "COLLAGE" operation process, after a predetermined number of images have been captured by activating (e.g. via a tap gesture) the recording start/stop control 32.

Upon selecting the "COLLAGE" option process 784, the GUI 30 can display the "Camera View", which is similar to the "FAST/SLOW" screen including the speed selection region 34 and all speed rate/control affordances or indicators 35. The recording start/stop control 32 can include an image or icon representing that the "COLLAGE" option process is selected and in current operation.

Figure 57:
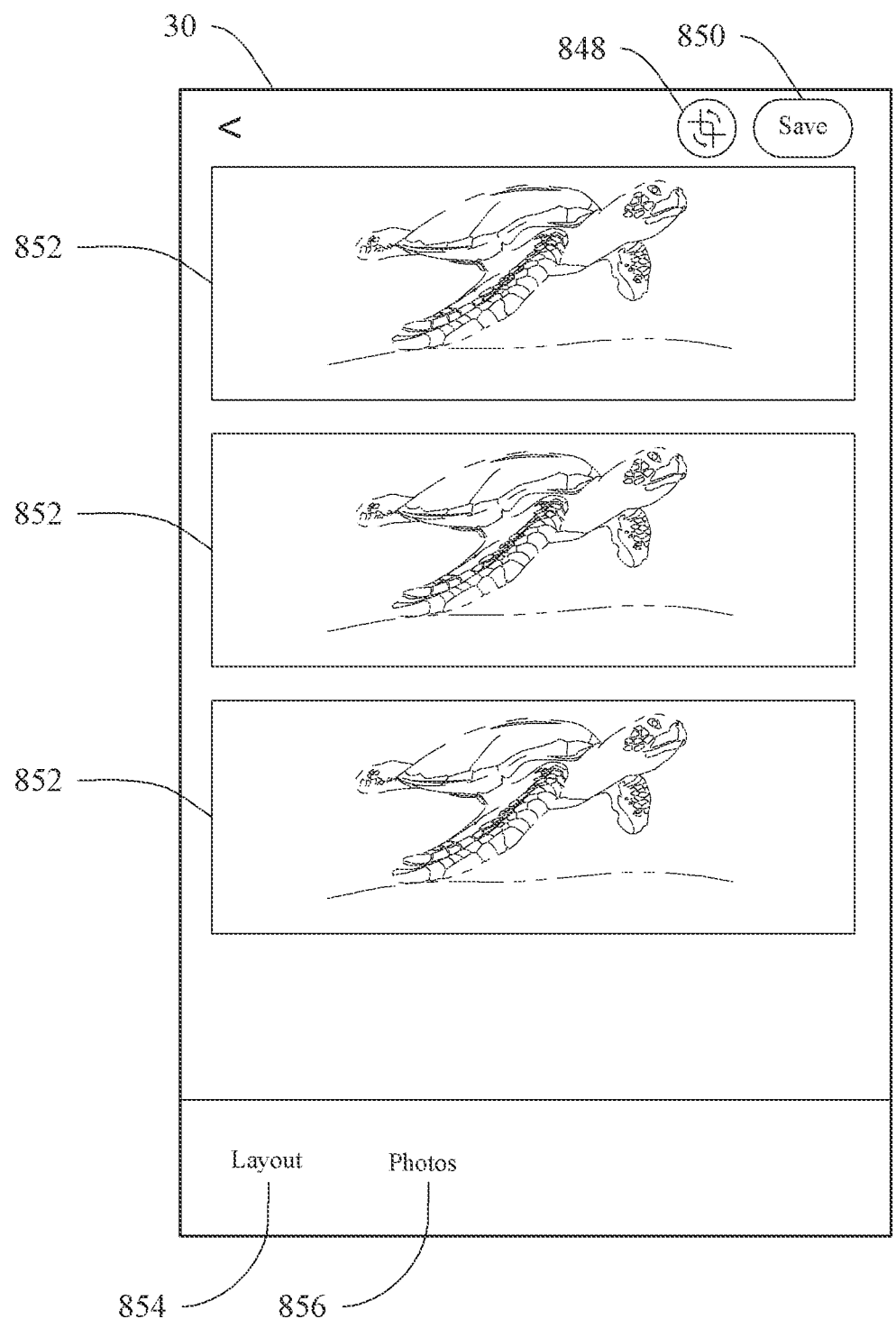
FIG. 57 is a sample GUI screenshot of an "Editing View" or "Review Screen" of the "Collage" option utilizing the process and/or system of the present technology.

Under the "COLLAGE" option process, video data may alternatively not be captured, with multiple images being captured for creating a slideshow effect. In "Camera View", the recording start/stop control 32 can be activated multiple times to capture multiple images, with each image being displayed in its own image window in sequential order. After a sufficient or predetermined number of images have been capture, the next ">" affordance 831 can be activated to proceed to the "Editing View" or "Review Screen" of the "COLLAGE" operation process, as illustrated in FIG. 57.

In the Editing View" or "Review Screen" of the "COLLAGE" operation process, all the images captured can be displayed in their own captured image window 852 in sequential order or automatically arranged so that all the captures image windows 852 are displayed. Further, the Editing View" or "Review Screen" of the "COLLAGE" operation process can include a "Layout" affordance 854 activateable (e.g. via a tap gesture) for adding a collage layout from multiple selectable layout formats or templates, a "Photos" affordance 856 activateable (e.g. via a tap gesture) for selecting or switching between the captured images for use in the selected layout, a rotation affordance 848 activateable (e.g. via a tap gesture) for rotating the selected image in a select part of the layout, and a "Save" affordance 850 activateable (e.g. via a tap gesture) for saving the layout.

It can be appreciated that the image in each part of the layout can be, but not limited to, repositioned or orientated within it respective layout part or window. The images can be one or more still images or one or more frames from video.

Figure 58:
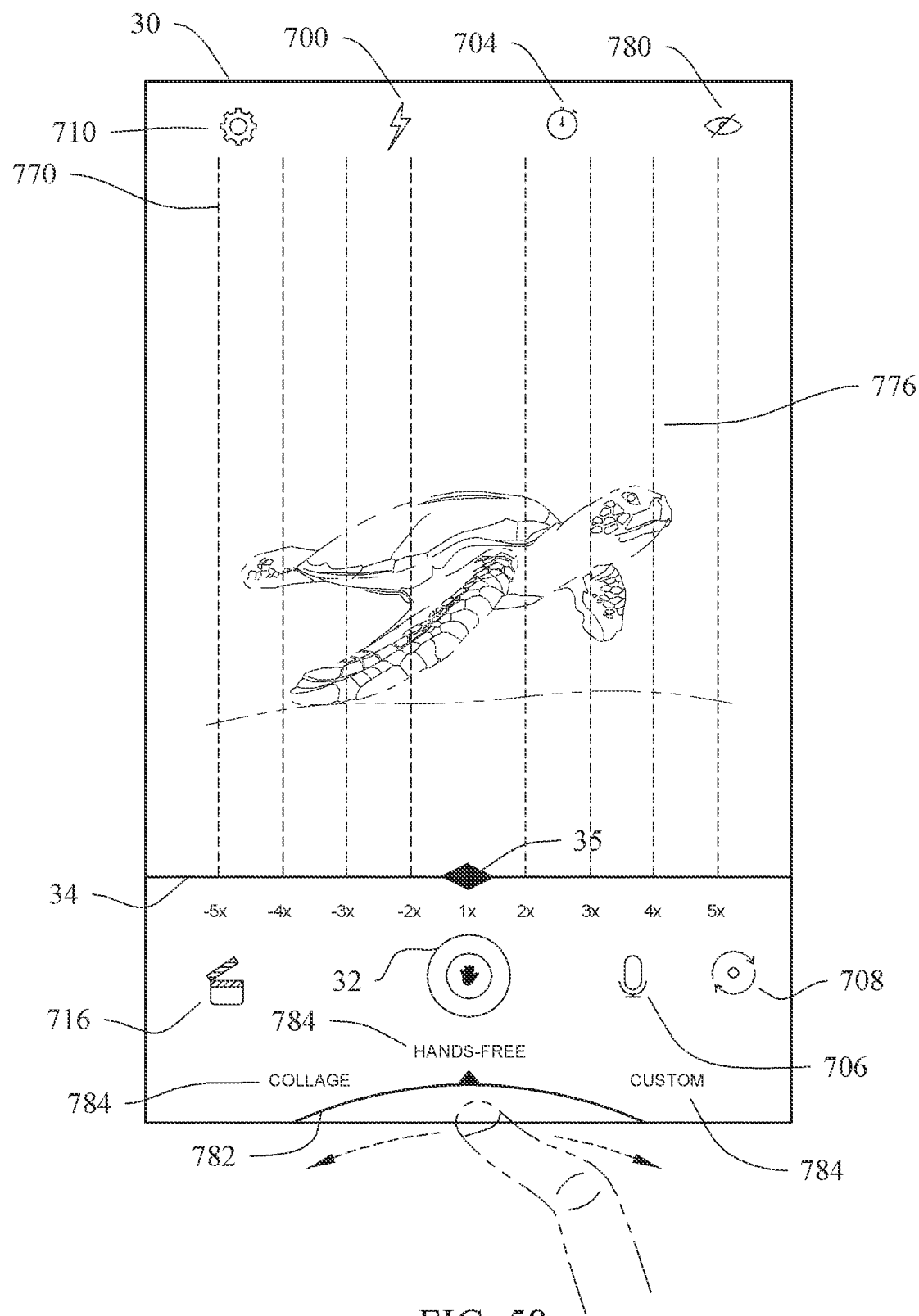
FIG. 58 is a sample GUI screenshot of a "Camera View" of the device employing the GUI with a "Hands-Free" option selected on the selectable options bar utilizing the process and/or system of the present technology.

In the exemplary, FIG. 58 illustrates a user swiping left across the or near the selectable options bar 782, thereby changing from the "COLLAGE" option process to a "HANDS-FREE" process, with the previous "COLLAGE" option process and a next "CUSTOM" option process being viewable to the left and right of the selected "HANDS-FREE" option process 784, respectively. Accordingly, the next option process 784 either ahead of and/or behind the selected option process 784 can be displayed and viewable to the user.

When the "HANDS-FREE" option process 784 is in the selected position on the selectable options bar 782, a next ">" affordance 831 can be displayed and activated (e.g. via a tap gesture) to proceed to the "Editing View" or "Review Screen" of the "HANDS-FREE" operation process, after a predetermined number of images have been captured by activating (e.g. via a tap gesture) the recording start/stop control 32.

Upon selecting the "HANDS-FREE" option process 784, the GUI 30 can display the "Camera View", which is similar to the "FAST/SLOW" screen including the speed selection region 34 and all speed rate/control affordances or indicators 35. The recording start/stop control 32 can include an image or icon representing that the "HANDS-FREE" option process is selected and in current operation.

In the "HANDS-FREE" option process, the recording operation can be initiated by a one touch taping gesture of the recording start/stop control 32, and a subsequent one touch taping gesture can stop the recording operation. Alternatively, the recording operation can automatically stop after a predetermined time period. During the recording operation, the time guidelines 770 can be displayed, and the user can tap (e.g. via a tap gesture) on the speed rate bar 34 or on the time guidelines 770 to change the speed rate. The changing of the speed rate can be accomplished before the recording operation starts or during recording operation in real time. Any change in the speed rate can be displayed by a changing of a characteristic (e.g. color, line type, line weight, etc.) of the selected speed rate 34, the speed rate indicator 35 and/or time guideline 770.

Figure 59:
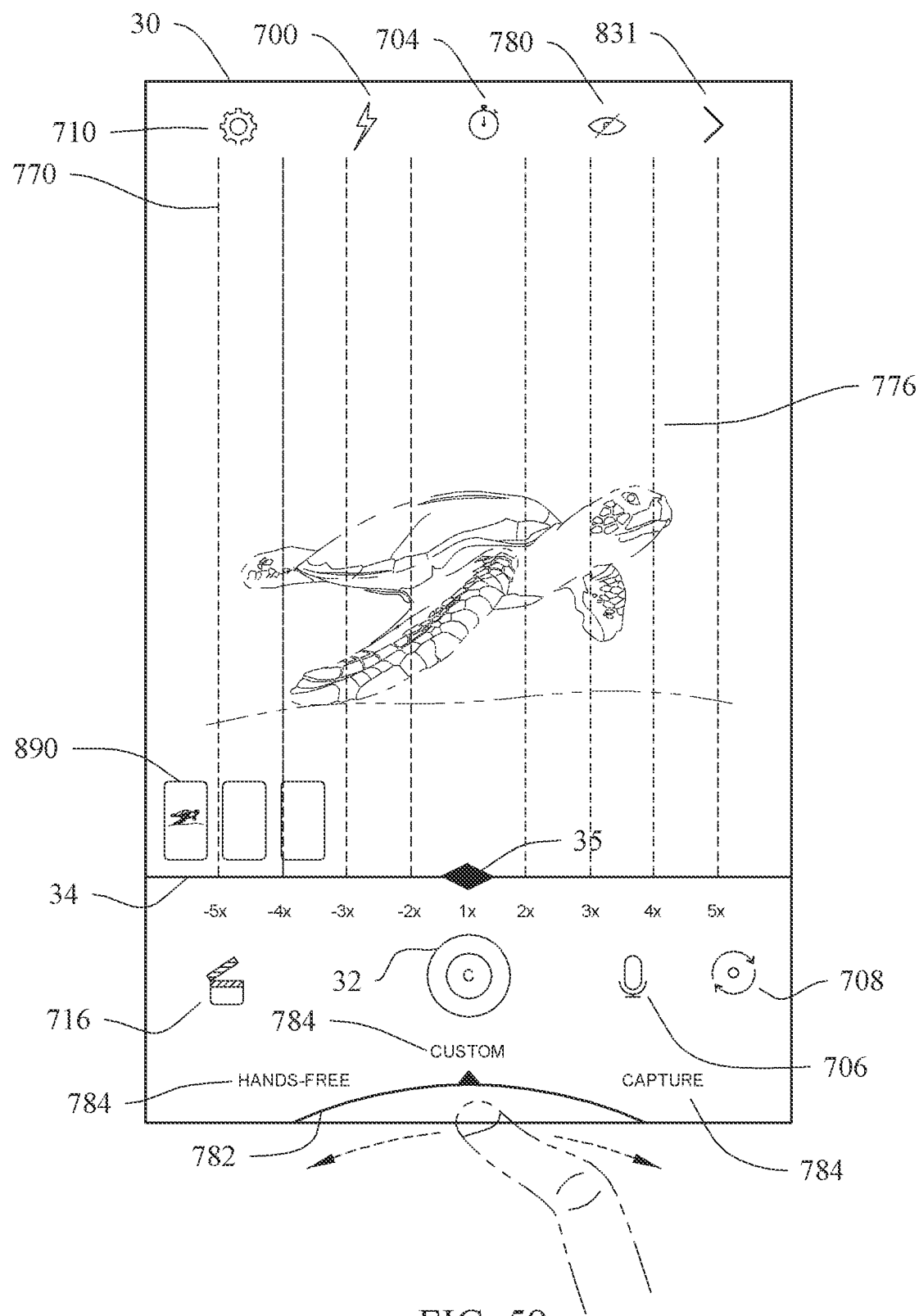
FIG. 59 is a sample GUI screenshot of a "Camera View" of the device employing the GUI with a "Custom" option selected on the selectable options bar utilizing the process and/or system of the present technology.

In the exemplary, FIG. 59 illustrates a user swiping left across the or near the selectable options bar 782, thereby changing from the "HANDS-FREE" option process to a "CUSTOM" process, with the previous "HANDS-FREE" option process and a next "CAPTURE" option process being viewable to the left and right of the selected "CUSTOM" option process 784, respectively. Accordingly, the next option process 784 either ahead of and/or behind the selected option process 784 can be displayed and viewable to the user.

When the "CUSTOM" option process 784 is in the selected position on the selectable options bar 782, a next ">" affordance 831 can be displayed and activated (e.g. via a tap gesture) to proceed to the "Editing View" or "Review Screen" of the "CUSTOM" operation process, after a predetermined number of images have been captured by activating (e.g. via a tap gesture) the recording start/stop control 32.

In the "Camera View" of the "CUSTOM" option process, the recording operation can be operated by a one touch taping gesture or a touch and holding gesture of the recording start/stop control 32, as previously described. During the recording operation, the time guidelines 770 can be displayed, and the user can tap (e.g. via a tap gesture) on the speed rate bar 34 or on the time guidelines 770, or slide the recording start/stop control 32 to change the speed rate, as previously described. The changing of the speed rate can be accomplished before the recording operation starts or during recording operation in real time. Any change in the speed rate can be displayed by a changing of a characteristic (e.g. color, line type, line weight, etc.) of the selected speed rate 34, the speed rate indicator 35 and/or time guideline 770.

This recording operation can be repeated multiple times to create multiple recordings or images, each of which can be identifiable by their one window 890 displayed in sequential order. After a sufficient or predetermined number of videos or images have been captured, the next ">" affordance 831 can be activated to proceed to the "Editing View" or "Review Screen" of the "CUSTOM" operation process, or a trash affordance can be activated to delete or remove all captured videos or images.

In the "Editing View" or "Review Screen" under the "CUSTOM" operation process, all the windows 890 can be displayed, and any or all affordances 716, 732, 736, 780, 786, 788, 790, 792, 794 can be displayed, provided to and utilized by the user for selection via the GUI 30. The video or image displayed in the display region 776 corresponds to the selected window 890. This provides multiple video or image data accessible to the user for selection, playing and altering.

Figure 60:
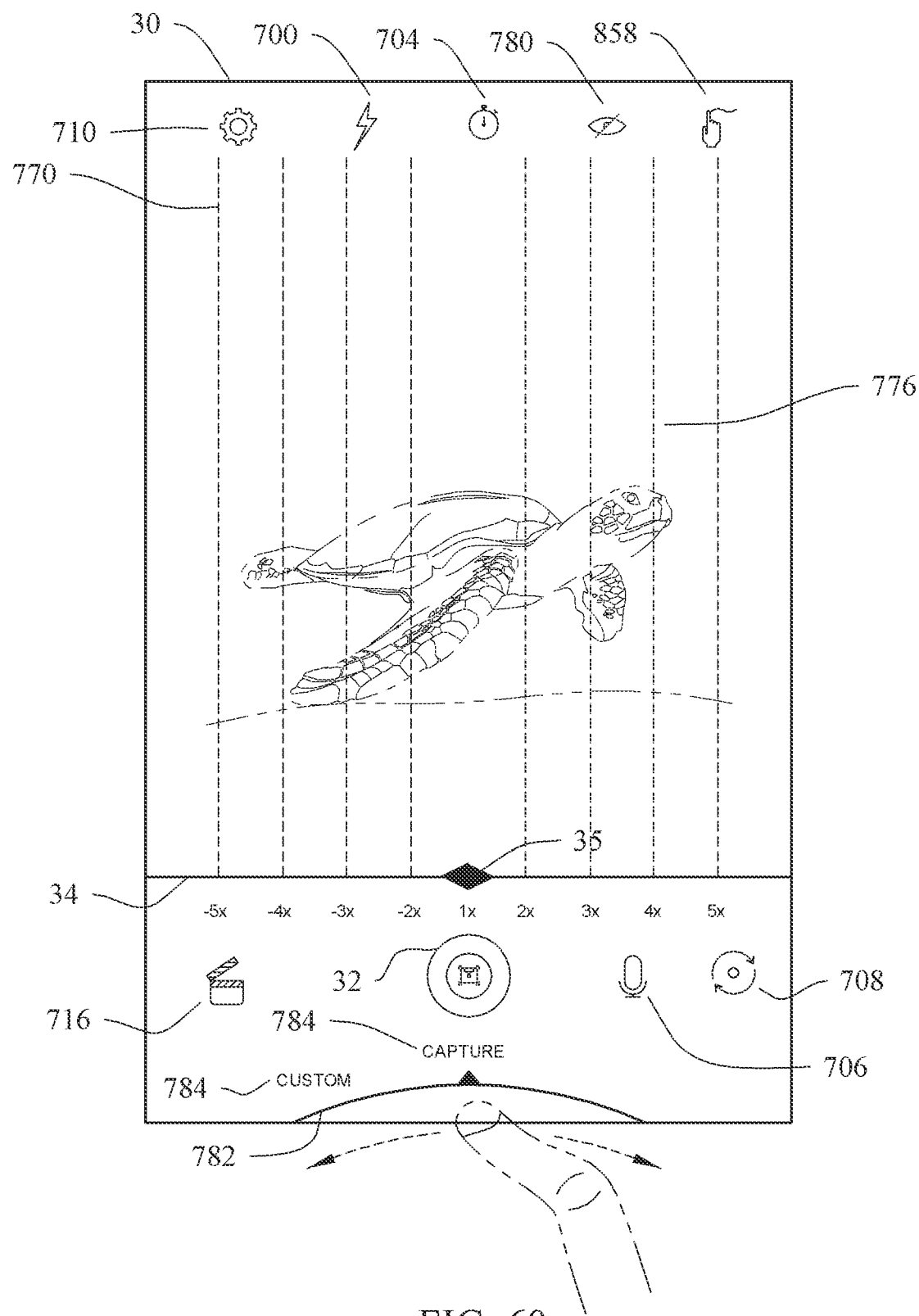
FIG. 60 is a sample GUI screenshot of a "Camera View" of the device employing the GUI with a "Capture" option selected on the selectable options bar utilizing the process and/or system of the present technology.

In the exemplary, FIG. 60 illustrates a user swiping left across the or near the selectable options bar 782, thereby changing from the "CUSTOM" option process to a "CAPTURE" process, with the previous "CUSTOM" option process being viewable to the left of the selected "CUSTOM" option process 784. Accordingly, the next option process 784 behind the selected option process 784 can be displayed and viewable to the user.

When the "CAPTURE" option process 784 is in the selected position on the selectable options bar 782, a drawing affordance 858 can be displayed and activated (e.g. via a tap gesture) to allow free hand drawing on the video or image.

In the "Camera View" of the "CUSTOM" option process, the recording operation can be operated by a one touch taping gesture or a touch and holding gesture of the recording start/stop control 32, as previously described. With the video recording or image capturing being directed saved to memory of the device or a remote device/server. During the recording operation, the time guidelines 770 can be displayed, and the user can tap (e.g. via a tap gesture) on the speed rate bar 34 or on the time guidelines 770, or slide the recording start/stop control 32 to change the speed rate, as previously described. The changing of the speed rate can be accomplished before the recording operation starts or during recording operation in real time. Any change in the speed rate can be displayed by a changing of a characteristic (e.g. color, line type, line weight, etc.) of the selected speed rate 34, the speed rate indicator 35 and/or time guideline 770.

In the exemplary, a user can swipe left or right on the "Camera View" to access a "Tools" mode or screen, which can include a polls affordance that can be displayed and activated (e.g. via a tap gesture) to provide and/or display polling information (e.g. polling data, usage data, reviews, etc.), a "Stat" affordance that can be displayed and activated (e.g. via a tap gesture) to provide and/or display statistical data, a "Map" affordance that can be displayed and activated (e.g. via a tap gesture) to provide and/or display map information (e.g. geotag data, location data, etc.), a "Quiz" affordance that can be displayed and activated (e.g. via a tap gesture) to provide and/or display a quiz or questionnaire, and a "Follow Friday" affordance that can be displayed and activated (e.g. via a tap gesture) for recommending to the user's social media followers who they recommend to follow. The user can continue swiping left or right to return to the "Camera View" screen, or to an additional screen.

Further in the exemplary, a user can swipe left or right on the "Camera View" screen to access a "Social Media" mode or screen, which can include, but not limited to, the following selectable options including "Following", "Trending", "#'s", "Tagged", "Family", "VIP", "Featured", "Media", "Favorite" or "Custom". Selecting on any one of the options can display additional options associated with the selected option. For example, selecting the option "Following" can display the following, but not limited to, sub-options including "Snapchat", "Instagram", "Tiktok", "Youtube", "Twitter" or "Facebook". Still further, the following affordance can be displayed and activated, "Home", "Search", "Notification" or "Profile". The user can continue swiping left or right to return to the "Camera View" screen, or to an additional screen.

Further in the exemplary, in any of the "Edit View" or "Review Screen" of the GUI, a user can swipe left or right on to sequentially access image editing options for the video or image being displayed in the display region. Non-limited examples of effects options can be a "Fade" effect, a "Chrome" effect, a "Transfer effect", an "Instant" effect", a "Mono" effect, a "Noir" effect, a "Process" effect, a "Tonal" effect or a "Structure" effect.

Any or all of the embodiments of the GUI 30 can include vertically oriented time guidelines 770 that extend vertically up from each of the speed rate indicators or the speed selection region 34 displayed on the GUI 30 or the display of the device utilizing the GUI. The speed rate indicators 34 can be, but not limited to, −2×, −3×, −4×, −"n"×, 1×, 2×, 3×, 4× or "n"×. It can be appreciated that the time guidelines 770 can, in the alternative, extend horizontally across a section of the GUI 30. The time guidelines 770 can be displayed while in camera live one-touch or touch and hold recording mode (e.g. "Camera View") or in-app one-touch edit mode (e.g. "Editing View" or "Review Screen").

It can be appreciated that any of the processes, operations, effects, etc. of the present technology can be implemented to the video or image live, in real time, while the user is recording a video or capturing an image, or while the video is playing or the image is being displayed.

It can be further appreciated that a user interface can be used in place of or in combination with the GUI 30 of the present technology, and wherein the user interface can include, but not limited to, graphical user interfaces, command line or command language interfaces, natural language interfaces, menu driven interfaces, graphical user interfaces, question-and-answer interfaces, form-fill interfaces, stylus interfaces, touch-sensitive interfaces, speech recognition interfaces, batch interfaces, conversational interfaces, direct manipulation interfaces, gesture interfaces, hardware interfaces, holographic user interfaces, motion tracking interfaces, object-oriented user interfaces, permission-driven interfaces, tangible user interfaces, text-based interfaces, web-based interfaces, or zero-input interfaces.

Referring to FIGS. 61-92, a boomerang-like or video loop operation (hereinafter "Boomi") is illustrated and will be described in the exemplary. It can be appreciated that the Boomi system, method and process may be understood as a unique video boomerang-like or video looping editing operation applicable to an entire video stream or to one or more selectable segments of the video stream. The Boomi process can be implementable and associated with the GUI 30 of the present technology, or can be implementable and associated with another video editing program or system, or can be implemented in its own GUI and/or program. One or more embodiments of the present technology can create a Boomi output video from raw input videos, a series of images, short burst video clips of at least a few seconds, burst sequences, or iris frame sequences (e.g., live photos).

Figure 61:
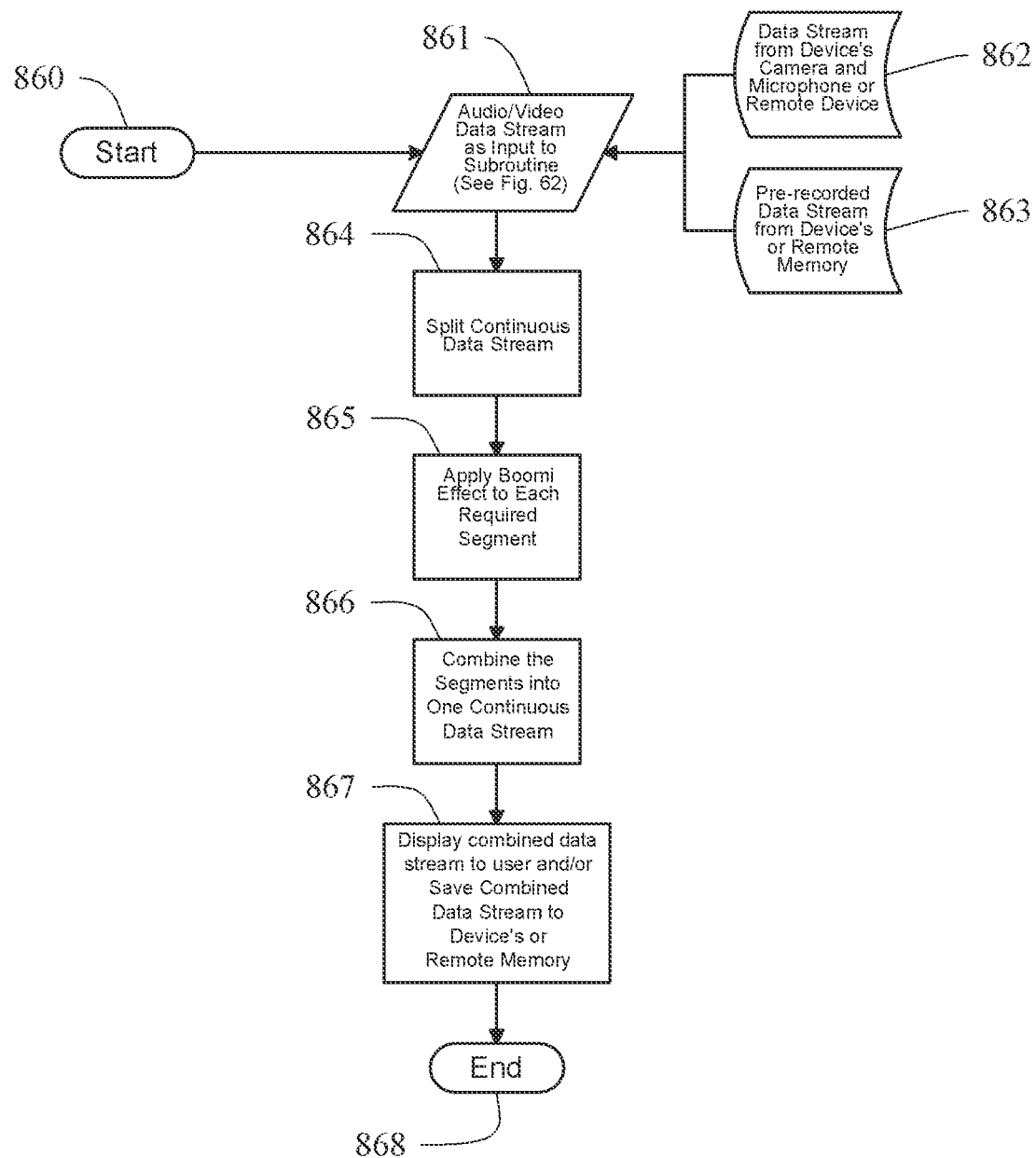
FIG. 61 is a flow chart of an example of the overall Boomi process associated with the present technology.

In a condensed form and as an exemplary pipeline for creating a Boomi output video, as shown in FIG. 61, the Boomi process, program or subroutine can be activated or started (step 860), and an audio/video or image sequence stream can be inputted (step 861) from the electronic device's camera and microphone or from a remotely connected camera and microphone (step 862) in real time or near real time, or the audio/video stream can be a pre-recorded video loaded from the electronic device's memory or from a remotely connected system, server, digital gallery or memory (step 863). It can be appreciated that the Boomi process can display the live or pre-recorded video stream on the GUI 30 or on a separate and remote display. Further, the Boomi process can communicate the Boomi output video to a remotely connected computer system for display and/or storage thereon.

After receiving the audio/video stream, preprocessing operations can be performed, such as but not limited to, receiving, selecting and/or optimizing Boomi parameters. Then, the Boomi process can split the continuous data stream into multiple segments (step 864), which can include one or more segments that do not include a Boomi effect and one or more segments that do. Prior, during or after the frame splitting operation, Boomi process may determine the loop parameters, such as a starting frame, an ending frame, intermediate frames, a loop period, speed and direction of each segment.

The Boomi process can also include various example embodiments for creating one or more Forward or Reverse loop video sequences. A Forward loop video sequence can be understood in the context of the present technology as playing a Boomi segment or sequence of frames starting from a selected start frame in a forward time direction until reaching an end frame and, immediately thereafter, plays the frames again in the same direction. Appreciatively, at the end of the first loop play, the video jumps back to the starting frame and plays the frames in the same forward direction. This Forward loop operation can be repeated any number of times as defined by a loop parameter. For example, if the loop parameter is 3, then the Forward loop sequence or that specific selected Boomi segment would play 3 times before continuing to any next frame directly after the end frame of the sequence.

Similarly, a Reverse loop video sequence can be understood in the context of the present technology as playing a Boomi segment or sequence of frames starting from a selected start frame in a forward time direction until reaching an end frame and, immediately thereafter, plays the frames again in a reverse direction back to the starting frame and then plays the same frames again in a forward direction leading to the end frame. Appreciatively, when the play reaches the end frame the first time, the end frame or a next frame thereafter can be understood as a frame reversal point for video play. This Reverse loop operation can be repeated any number of times as defined by the loop parameter. For example, if the loop parameter is 3, then the Reverse loop sequence or that specific selected Boomi segment would play forward and then reverse 3 times before continuing to any next frame directly after the end frame of the sequence.

It can be appreciated that resultant frames, segment, sequence or video output from any subroutine of the Boomi process can be returned, forward, loaded, retrieved and/or shared with any other subroutine of the Boomi process or of the present technology.

The Boomi process can then apply a Boomi effect to each of the segments selected (Boomi segments) to include an effect (step 865). The applying of the Boomi effect can initiate one or more additional subroutines to process the Boomi segments as per one or more Boomi effect attributes assignable by the user or loaded as presets or default parameters. The Boomi effect segments and the non-Boomi effect (normal) segments are combined into one continuous video data stream (step 866). The combined video data stream can be displayed to the user and/or saved to the device's memory, to a remote memory, or a cloud storage system (step 867) and/or displayed to a device's display or a remote display. After which, this process can stop or end (step 868).

A general exemplary use of the Boomi process can include selecting one or more frames of a video stream for applying a Boomi effect. These frames can be associated as a Boomi segment, where one or more Boomi segments can be selected from a single video stream at different locations on the video stream. One or more Boomi effect attributes can be assigned, selected and/or modified for each Boomi segment. The Boomi process can apply the Boomi effect(s) to each Boomi segment(s) and then combine the Boomi segment(s) with any non-Boomi segment(s) to form one continuous video stream. The continuous video stream can then be played and/or saved. Depending on the Boomi segment(s) selection and Boomi effect(s) attributes, the playing of the continuous video stream can including playing non-Boomi segment(s) including no changes to its corresponding frame(s) and playing Boomi segment(s) with changes to its corresponding frame(s).

It can be appreciated that a user can open or initiate the Boomi camera application (app) or any camera app with the live Boomi effect feature. The Boomi process can be a standalone app or operate as a subroutine or subprocess of an existing app. Further, the Boomi process can be implemented or executed on the electronic device or on a remote system accessible by the electronic device.

Figure 62:
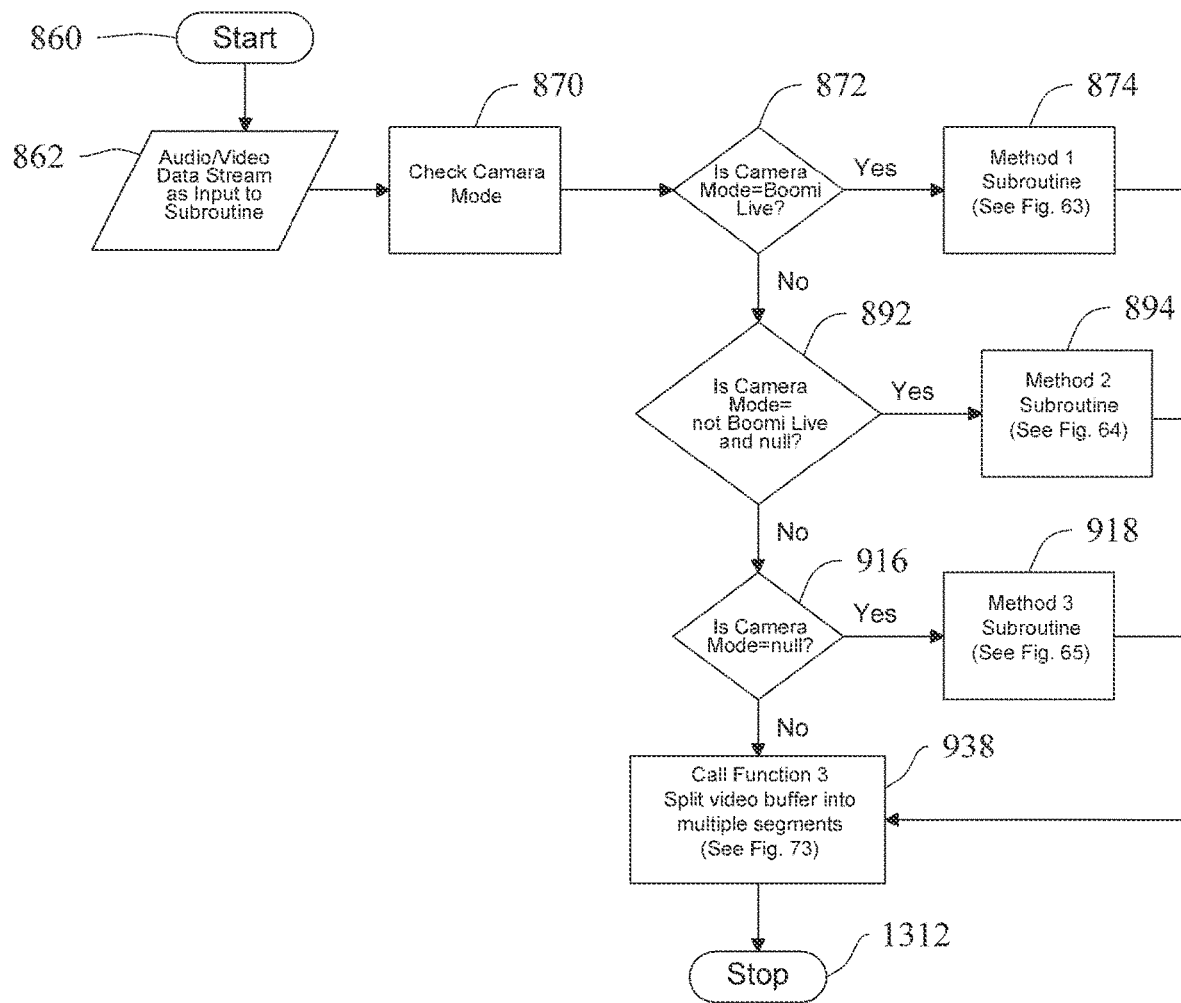
FIG. 62 is a flow chart of an example of a main Boomi process including subroutines that can be utilized.
Figures 72, 73:
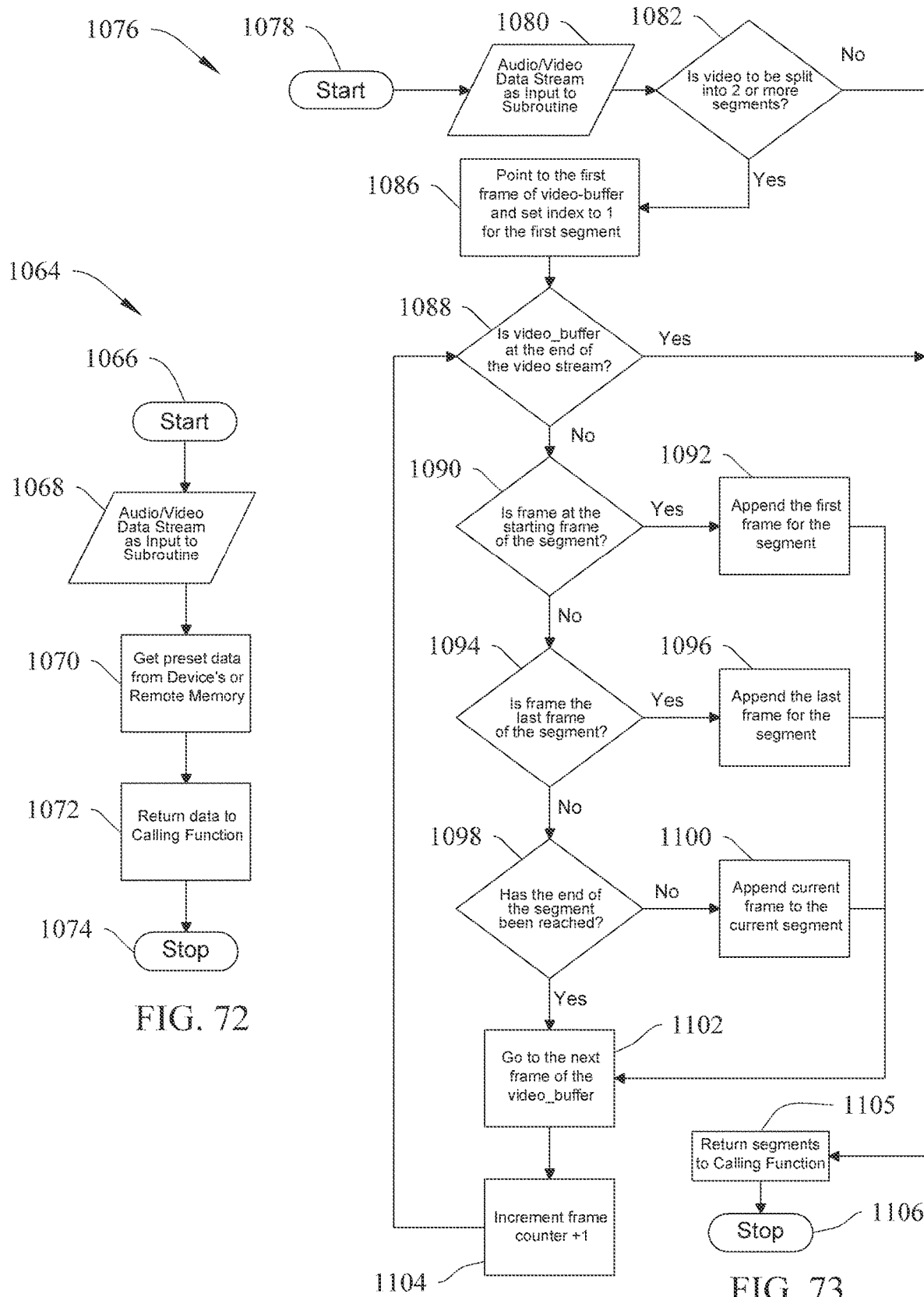
FIG. 72 is a flow chart of an example of the call function 2 for getting default parameters for the live Boomi function.
FIG. 73 is a flow chart of an example of the call function 3 for splitting the video data into multiple segments.

FIG. 62 illustrates the Boomi process including optional call functions that can be called from the main program or from other programs. This process or subroutine can start (step 860) upon initiation by a command from the GUI 30 or another activation operation. After starting, this process or subroutine can acquire the audio/video data stream as an input (step 862). A check camera mode operation (step 870) can be initialized to determine if the audio/video data stream is from the device's camera or is a pre-recorded video. This can be accomplished by first determining if the camera mode is Boomi live (step 872), and if so then the audio/video data stream can be acquired from a Method 1 subroutine (step 874). If the camera mode is not Boomi live, then the process continues to determine if the camera mode is null (step 892), and if so then the audio/video data stream can be acquired from a Method 2 subroutine (step 894). A camera mode of not Boomi live can mean that the device's camera is not in a Boomi live mode, and a camera mode of null can mean that the device's camera is active and in another camera mode other than Boomi live. If the camera mode does not meet any of these requirements, then the process can determine if the camera mode is null (step 916), and if so then the audio/video data stream can be acquired from a Method 3 subroutine (step 918). If the camera mode does not meet any of these requirements or the resultant from any of steps 872, 874, 876 the subroutine can then proceed to calling function 3 (step 938), as best illustrated in FIG. 73, which splits the video data into appropriate segments.

It can be appreciated that user can have three or more methods to create a final video produce with Boomi effect. These methods can be, but not limited to, Method 1 being a live recording with live Boomi, Method 2 being live recording without Boomi where the Boomi effect can be added in a Boomi editor, and/or Method 3 being a pre-recorded video loaded into the Boomi editor or into a camera mode of the Boomi process.

Figure 63:
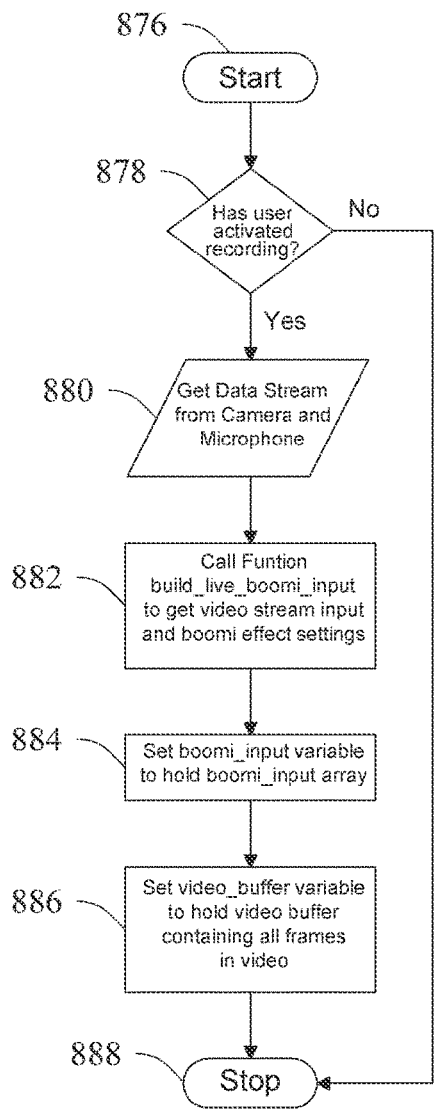
FIG. 63 is a flow chart of an example of the method 1 subroutine for live recording with live Boomi.

Referring to FIG. 63, after step 872, the Method 1 subroutine can be initiated (step 876) to acquire the audio/video data stream. The Method 1 subroutine can determine if the user has activated a recording (step 878), and if not then the method 1 subroutine can stop (step 888). If yes, the Method 1 subroutine can get the audio/video data stream from the electronic device's camera and microphone (step 880) in real time or near real time. This can be accomplished by the user activating a record button or affordance in the GUI 30 while in the Boomi mode, or in a standalone Boomi app. Next, the Method 1 subroutine can call a build live input function (step 882) capable of building a live Boomi input, which can get the audio/video data stream input and the Boomi effect settings to apply to the video. After which, the Method 1 subroutine can set input variables to hold an input array (step 884) and set a video buffer variable (step 886) to hold a video buffer containing all the frames in the video. The audio/video data stream can then be returned to the Boomi process as input (step 938 in FIG. 62), and Method 1 can stop (step 888).

APPENDIX I—METHOD 1 PSEUDO CODE

The following Method 1 code example below shows pseudo code that may be used for the purpose of accomplishing Method 1.

Code Example—Method 1

```
#  Process the case when the camera mode is in "Live Boomi"
if (Camera Mode == Boomi Live)
{
    #  Method 1: Live recording with Live Boomi
    #  User has touched the Record button to begin recording
    #  Get the data stream from the camera.
    #  call the function build live_boomi_input() to get the video stream input and the
        boomi effect settings to apply to the video.
    $return_value = build_live_boomi_input ($camera_stream)
    #  Set the boomi_input variable to hold the boomi_input array.
    $boomi_input = $return_value.boomi_input;
    #  Set the video_buffer variable to hold the video_buffer containing all the frames in
        the video
    $video_buffer = $boomi_input.video_buffer
}
else if (Camera Mode !=- Boomi Live and Camera Mode != null)
```

Figure 64:
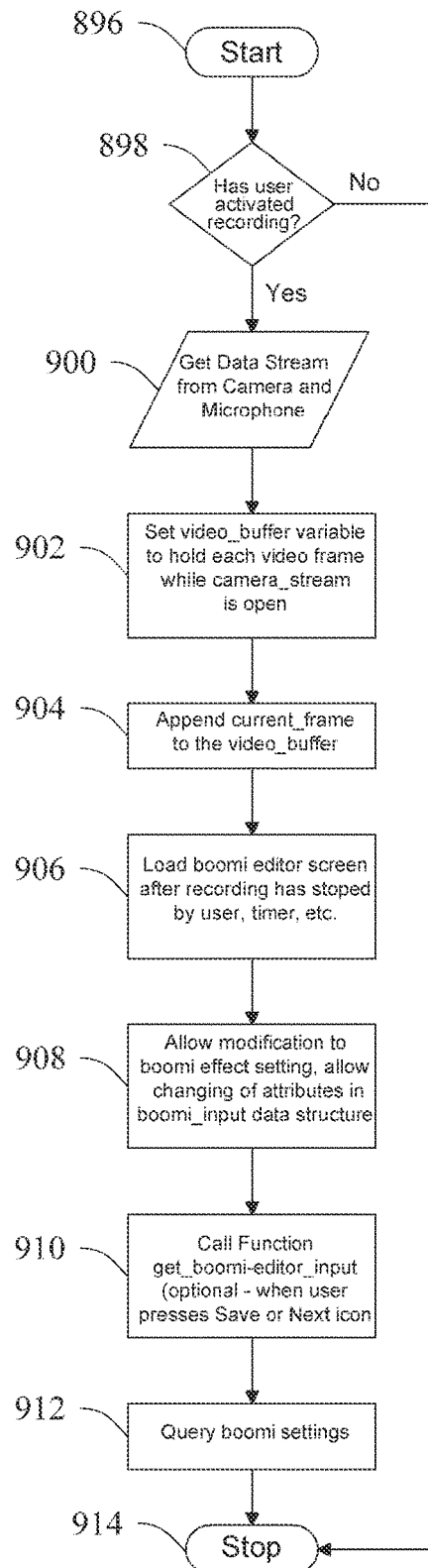
FIG. 64 is a flow chart of an example of the method 2 subroutine for live recording without Boomi effects, which can be added in the Boomi editor.

Referring to FIG. 64, after step 892, the Method 2 subroutine can be initiated (step 896) to acquire the audio/ video data stream from the device's camera while in a different camera mode other than a live Boomi mode, and add it to the Boomi editor. The Method 2 subroutine can determine if the user has activated a recording (step 898), and if not then the Method 2 subroutine can stop (step 914). If yes, the Method 2 subroutine can get the audio/video data stream from the electronic device's camera and microphone (step 900) in real time or near real time. Next, a video buffer can be set (step 902) that can hold each video frame in the camera stream while the camera is open. Then, the current frame can be appended to the video buffer (step 904). After the user has stopped recording, the Boomi process can load a Boomi editor screen (step 906). The user can modify the Boomi effect settings while in the Boomi editor screen and change one or more attributes in the audio/video data stream structure (step 908). Additionally, the Method 2 subroutine can call a get Boomi editor input function (step 910), for example when the user presses a save or next icon from the Boomi editor screen. After, a query operation (step 912) can be initiated to query the Boomi settings. The audio/video data stream can then be returned to the Boomi process as input (step 938 in FIG. 62), and Method 2 can stop (step 914).

APPENDIX II—METHOD 2 PSEUDO CODE

The following Method 2 code example below shows pseudo code that may be used for the purpose of accomplishing Method 2.

Code Example—Method 2

```
#  (Camera Mode !=- Boomi Live) means that it's not Boomi Live and
    #  (Camera Mode != null) means that the camera is active and in another camera mode.
    #  Method 2: Live recording without Boomi - Boomi is to be added in the Boomi Editor
    #  User has touched the Record button to begin recording
        #  Get the data stream from the camera.
    #  Set the video_buffer variable to hold each video frame in the camera stream
    while (the $camera stream is open)
    {
        #  Append the current_frame to the video_buffer
        $video_buffer.append($current_frame);
    }
    #  After the user has stopped recording, the application loads the Boomi Editor Screen.
    DisplayScreen (Boomi_Editor);
    #  The user can modify the Boomi Effect settings while in the Boomi_Editor screen.
    #  Through the user interface, the User can change every attribute in the $boomi_input
        data structure.
    # Call the function get_boomi_editor_input when the User presses the Save or Next
    icon from the Boomi_Editor screen.
        #  function get_boomi_editor_input queries the boomi settings.
    $boomi_input = get_boomi_editor_input ()
}
else
}
```

Figure 65:
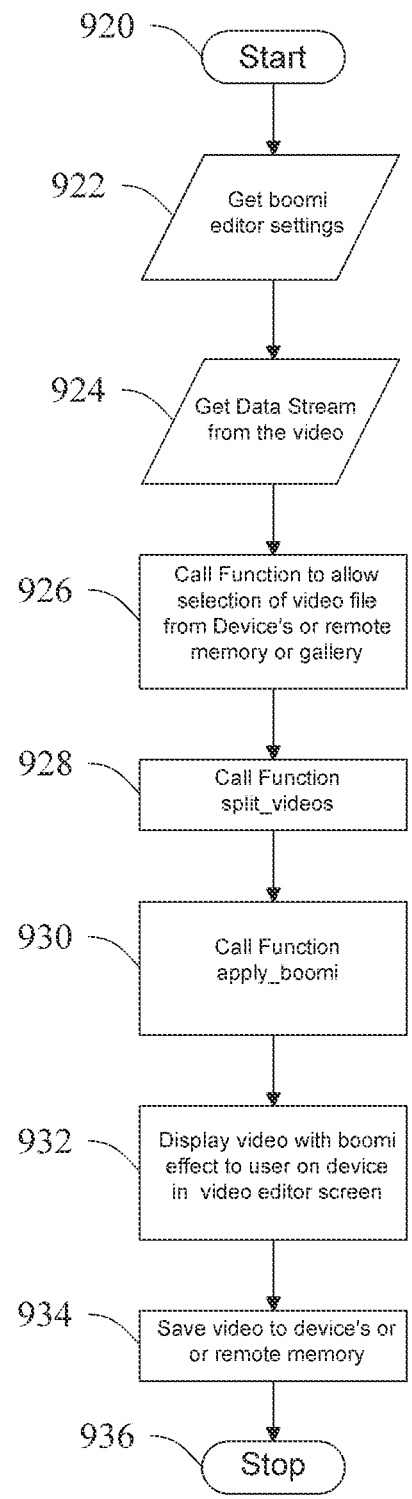
FIG. 65 is a flow chart of an example of the method 3 subroutine for utilizing pre-recorded video that is loaded into the Boomi editor.

Referring to FIG. 65, after step 916, the Method 3 subroutine can be initiated (step 920) to acquire a pre-recorded audio/video data stream from the electronic device or a remote system, and load it into the Boomi editor or a "BoomiCam" editor. The "BoomiCam" editor can be similar to the Boomi editor but with additional access to a camera or display feed. Next, the Method 3 subroutine can get Boomi editor settings (step 922), and get the audio/video data stream (step 924) by, for exampling, opening a video file. A call function can be utilized (step 926) that allows the user to select a file from the electronic device, a digital gallery, or a remote system, and then open the file. After which, call function 3 to split the video data into segments (step 938) can be initiated, and then call function 4 to apply Boomi effect to the appropriate segment can be initiated (step 930). Then the video with Boomi effects can be displayed to the user on the electronic device running or access the Boomi process (step 932). The video can then be saved on the electronic device or a remote system (step 934). The audio/video data stream can then be returned to the Boomi process as input (step 938 in FIG. 62), and Method 3 can stop (step 936).

APPENDIX III—METHOD 3 PSEUDO CODE

The following Method 3 code example below shows pseudo code that may be used for the purpose of accomplishing Method 3.

Code Example—Method 3

```
#   The Camera Mode was null.
    #   Method 3: Pre-recorded video loaded into the BoomiCam Editor
        #   Get the boomi editor settings.
    $boomi_input = get_boomi_editor_input ()
    #   Get the data stream from the video.
    #   Open the video file
    $filename = select_file ();        #   Function to allow user to select the file from
                                           the device Gallery
    $video_buffer = open_file ($filename);
}
```

After the audio/video data stream is acquired and inputted, as illustrated in FIG. 62, the Boomi process can then continue to call functions operational to the process. In a simplest exemplary Boomi process, after the audio/video data is acquired utilizing Methods 1, 2 or 3, call function 3 can be called at step 938 (see FIG. 73, 1076) to split the video data or buffer into multiple segments including a normal or non-Boomi segment and a Boomi effect segment. In step 930, call function 4 can be called (see FIG. 74, 1108) to apply the Boomi effects to the Boomi effect segments.

After which, the Boomi process can display to the user the resultant video including the Boomi effect utilizing a video editor screen (step 932). Then the resultant video can be saved to the electronic device's memory or to a remote memory (step 934). After all appropriate call functions have been called and implemented and the resultant video stream has been displayed and/or saved, the Boomi process can stop (step 1312).

Additional call functions can be utilized with the Boomi process, such as but not limited to, a call function 1 can be initiated (see FIG. 66, 940) to create the data structure that holds the Boomi effects parameters. A call function 2 can be initiated (see FIG. 72, 1064) to get default parameters for the live Boomi process. A call function 5 can be initiated (see FIG. 77, 1196) to create at least one frame utilizing a frame interpolation process. A call function 6 can be called (see FIG. 78, 1212) to create additional frames utilizing a fame interpolation process. A call function 7 1246 can be called (see FIG. 79, 1246) to create additional frames by utilizing a frame copying process. A call function 8 can be called (see FIG. 80, 1264) to delete one or more frames from the selected segment or the video buffer including the selected segment. A call function 9 can be called (see FIG. 81, 1292) to create a reverse stack of frames utilized in the Boomi process. The call functions can be called or initiated in sequential order, separately as required, or in any particular order.

It can be appreciated that any adding or dropping operations associated with the Boomi process can be achieved utilizing any of the frame adding, frame blending and/or frame dropping operations associated with the present technology, for example, as illustrated in FIGS. 3A-G and as described above.

Figure 66:
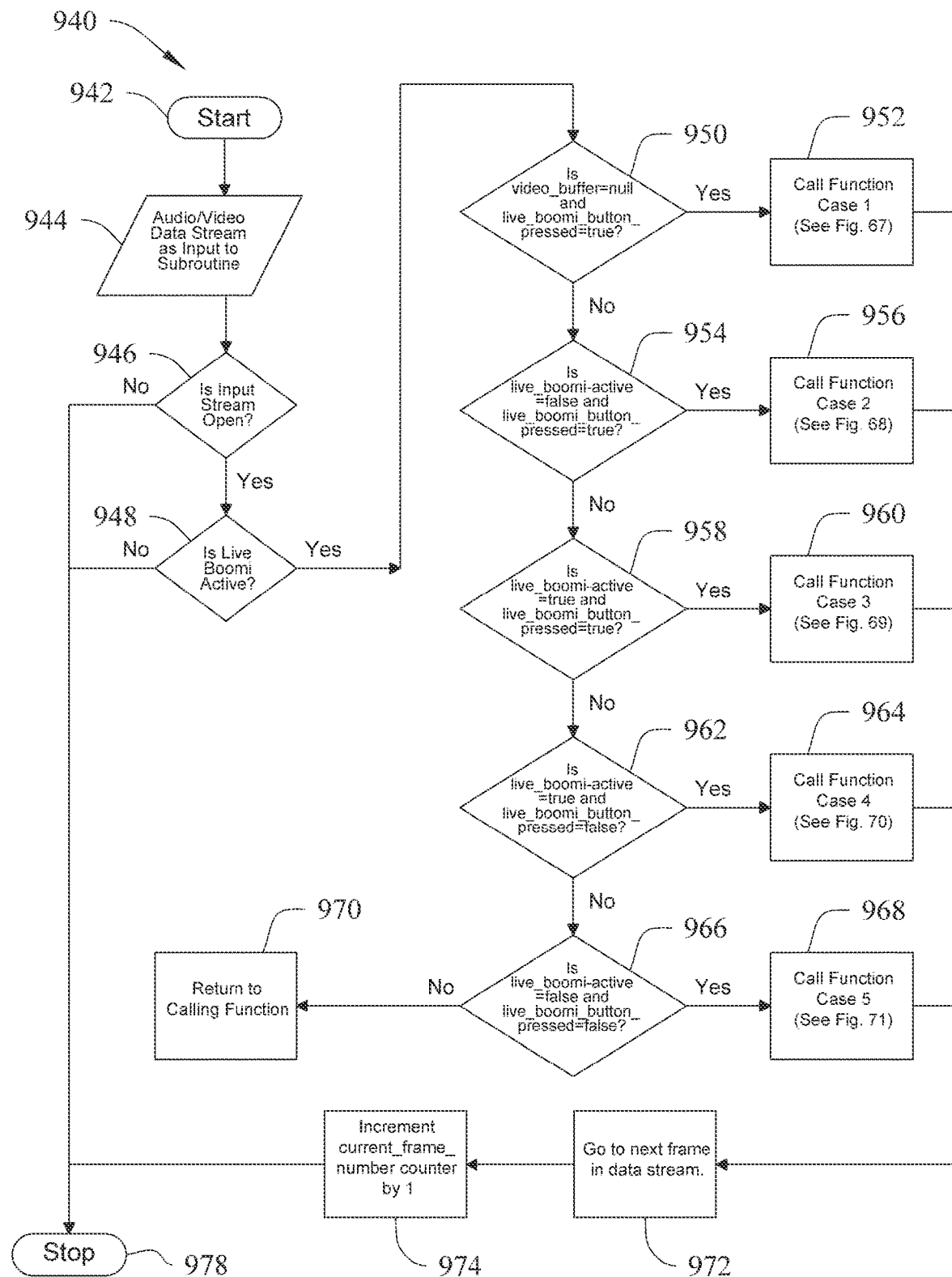
FIG. 66 is a flow chart of an example of the call function 1 for creating data structure that can hold the Boomi effect parameters.

As best illustrated in FIG. 66, the call function 1 subroutine 940 can be initiated (step 942), and the audio/video data stream can be acquired and inputted (step 944) from any of the Methods 1, 2 or 3 as discussed above. The call function 1 subroutine can input the video stream received from the camera or pre-recorded stream, and can return a structure containing two elements being live_boomi that can hold the settings for the Boomi effect and video_buffer that can contain all of the frames in the recorded video stream.

The call function 1 subroutine can declare local variable names and types, however it can be appreciated that any name or type can be associated with any variable. For example, data type video_buffer $video_buffer can be RAM memory to store each frame of the video data stream, data type boomi_nput $live_boomi_input can be the data structure, variable $live_boomi_button can be true or false, and variable $live_boomi_active can be true or false.

The call function 1 subroutine can: set an index variable to the first record to 1, write the frames to the video buffer frame by frame while the user is recording, point a current frame variable to the first frame of the video buffer, check if there is a preset for the live Boomi operation by getting the preset data from the electronic device's or remote system's storage or memory, and determine if there are multiple segments to apply the live Boomi effect to and the settings for each segment can be contained in individual records in the live Boomi presets as indexed by the index variable.

APPENDIX IV—CALL FUNCTION 1 VARIABLES AND DATA TYPES

The following call function 1 code example below shows pseudo code that may be used for the purpose of accomplishing call function 1.

| Code Example—Call Function 1 |
|---|

```
function build_live_boomi_input ($camera)
{
#   Purpose: creates the data structure that holds the boomi effect parameters.
#   Function input variable: $camera = the video stream received from the camera
#   Function returns a structure containing two elements
#   1.  $live_boomi is a structure that holds the settings for the Boomi effect
#   2.  $video_buffer contains all of the frames in the recorded video stream
    #   declare local variable names and types
    Data type video_buffer $video_buffer;      #   ram memory to store each frame of
                                                   the video stream data
    Data type boomi_input $live_boomi_input;   #   structure
    variable $live_boomi_button;       #   true or false
    variable $live_boomi_active;       #   true or false
    #   Set the index to the first record
    $index = 1;
    #   write the frames to the video_buffer frame by frame while the user is recording
    #   Point the current frame variable to the first frame of the $video_buffer
    $current_frame = $camera_stream.frame;
    #   Check if there's a preset for the live boomi
    #   The "get_live_boomi_presets" function call gets the preset data from the device's
        storage or memory
    #   If there are multiple segments to apply the live boomi effect to, the settings for
        each segment is
    #   contained in individual record in the live_boomi presets, as indexed by the variable
$index.
    $live_boomi presets = get live_boomi_presets ();
    #   set the indexer for the $live_boomi_presets data
    $boomi_index = 1;
    while (the $camera_stream is open)
    {
```

This subroutine can determine if the input or camera stream is open (step 946), and if not then proceed to stop the subroutine (step 978). If yes, then proceed to determine if the live Boomi button or affordance is active (step 948), and if no then proceed to stop the subroutine (step 978). If yes, then proceed to determine if the video buffer is null and the live Boomi button or affordance is pressed (step 950). If both are true or yes, then this subroutine can proceed to call function Case 1 (step 952), if no then proceed to determine if the live Boomi button or affordance is pressed and the live Boomi is not active (step 954). If both are true or yes, then this subroutine can proceed to call function Case 2 (step 956), if no then proceed to determine if the live Boomi button or affordance is pressed and the live Boomi is active (step 958). If both are true or yes, then this subroutine can proceed to call function Case 3 (step 960), if no then proceed to determine if the live Boomi button or affordance is not pressed and the live Boomi is active (step 962). If both are true or yes, then this subroutine can proceed to call function Case 4 (step 964), if no then proceed to determine if the live Boomi button or affordance is not pressed and the live Boomi is not active (step 966). If both are true or yes, then this subroutine can proceed to call function Case 5 (step 968), if no then proceed to return to the calling function (step 970).

After Cases 1-5 subroutines have concluded, the process can then go to the next frame in the data stream of the audio/video data stream for processing (step 972). Next, this subroutine can increment the current frame number count by +1 (step 974), and then return the resultant video data to the calling function and stop (step 978).

Referring to FIG. 67, after the Case 1 subroutine has been initiated (step 980), the audio/video data stream is acquired or inputted (step 982). The Case 1 subroutine can be activated at the start of a recording process. After the audio/video data stream is acquired, the starting frame number can be set for the current segment (step 984). Then the current frame can be appended to the video buffer (step 986). An indication or alert can be provided to the user via the GUI 30 that the process is in the middle of a live Boomi segment (step 988). Next, this subroutine can return the resultant video data to the calling function and stop (step 990).

APPENDIX V—CALL FUNCTION 1 CASE 1

The following Case 1 code example below shows pseudo code that may be used for the purpose of accomplishing Case 1 for call function 1.

| Code Example—Call Function 1 Case 1 |
|---|

```
#   Check if the Live Boomi button is active.
        #   The user is pressing the record button, or it's in hands free mode.
        #   get_live_boomi_status is a function that checks the status of the
            live_boomi_button and the returns true or false
        #   true = the Live Boomi button is active
        #   false = the Live Boomi button is inactive
        #   the function get_button_status is a function provided to the developer by the
platform's software development kit. (SDK)
        #   "live_boomi" is the text label for the boomi affordance.
        $is_live_boomi_button_pressed = get_button_status("live_boomi");
        #   Case 1: Live Boomi button is activated at the start of the recording.
```

```
Code Example—Call Function 1 Case 1 if (($video_buffer == null) and ($is_live_boomi_button_pressed == true))
{
    #  $video_buffer == null =>    can only happen during start of the
                                   video stream
    #  Set the starting frame number for the current boomi segment
    $live_boomi_input[$index].starting frame_number-$current frame_number;
    #  Append the current_frame to the video buffer
    $video_buffer.append($current_frame);
    #  Indicate that we're in the middle of a live boomi segment
    $live_boomi_active = true;
}
```

Referring to FIG. 68, after the Case 2 subroutine has been initiated (step 992), the audio/video data stream is acquired or inputted (step 994). The Case 2 subroutine can be activated while in the middle of a recording process. After the audio/video data stream is acquired, the live Boomi input ending frame number can be set to the previous frame of the audio/video data stream (step 996). After, the current frame can be appended to the video buffer as the next segments' first frame (step 998). This can complete the current non-Boomi segment. After which, the index can be incremented to go to the next live Boomi input record. Then, the live Boomi input starting frame number can be set to the current frame number for the next segment. An indication or alert can be provided to the user via the GUI 30 that the process is in the middle of a live Boomi segment (step 1006). Next, this subroutine can return the resultant video data to the calling function and stop (step 1008).

APPENDIX VI—CALL FUNCTION 1 CASE 2

The following Case 2 code example below shows pseudo code that may be used for the purpose of accomplishing Case 2 for call function 1.

```
Code Example—Call Function 1 Case 2

# Case 2: Live Boomi button has been activated while in the middle the recording.
    else if (($is_live_boomi_button_pressed == true) and ($live_boomi_active == false))
    {
        # Set the live_boomi_input ending_frame_number to the previous frame.
        $live_boomi_input[$index].ending_frame_number=$current_frame_number – 1;
            # Append the current frame to the video buffer as the next segment's
                first frame
            $video_buffer.append($current_frame);
            # The current non-boomi segment is complete. Increment the index to
                go to the next $live_boomi_input record.
            $index = $index + 1;
            # Set the live_boomi_input starting_frame_number to the
                current_frame_number for the next segment
            $live_boomi_input[$index].starting_frame_number=$current_frame_number;
            # Indicate that we're in the middle of a live boomi segment
            $live_boomi_active = true;
    }
```

Referring to FIG. 69, after the Case 3 subroutine has been initiated (step 1010), the audio/video data stream is acquired or inputted (step 1012). The Case 3 subroutine can be activated while in the middle of a recording process and the camera stream is in the middle of a Boomi segment. After the audio/video data stream is acquired, the current frame can be appended to the video buffer (step 1014). Next, this subroutine can return the resultant video data to the calling function and stop (step 1016)

APPENDIX VII—CALL FUNCTION 1 CASE 3

The following Case 3 code example below shows pseudo code that may be used for the purpose of accomplishing Case 3 for call function 1.

```
Code Example—Call Function 1 Case 3

# Case 3: Live Boomi button has been previously activated and the camera stream in the middle
of a boomi segment
    else if (($is_live_boomi_button_pressed == true) and ($live_boomi_active == true)
```

| Code Example—Call Function 1 Case 3 |
|---|

```
{
    # Append the current_frame to the video_buffer
    $video_buffer.append($current_frame);
}
```

Figures 70, 71:
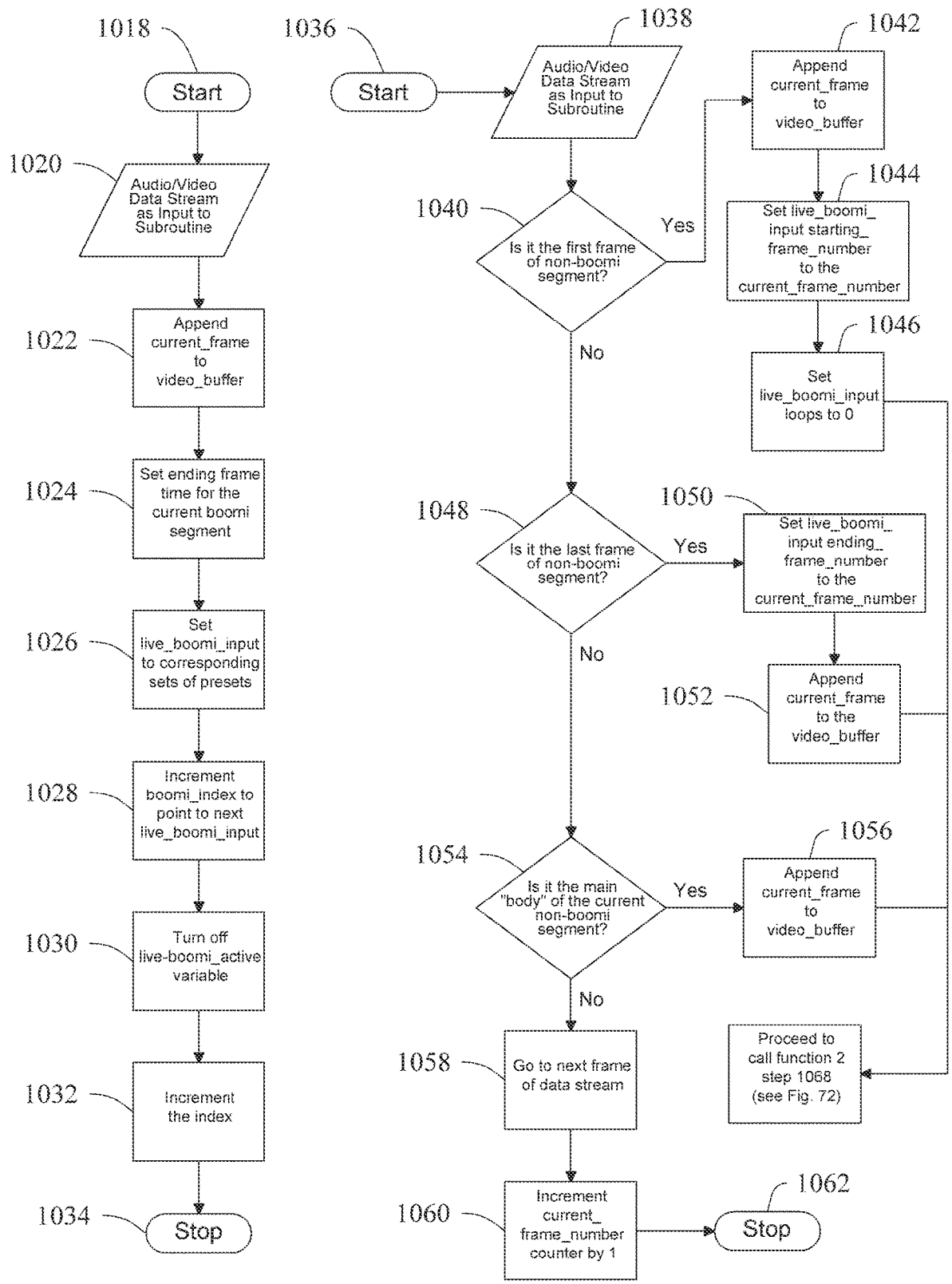
FIG. 70 is a flow chart of an example of case 4 of call function 1 where the live Boomi button or affordance is inactivate and the camera stream is in the middle of a Boomi segment.
FIG. 71 is a flow chart of an example of case 5 of call function 1 where the live Boomi button or affordance is inactivate and the camera stream is not in the middle of a Boomi segment.

Referring to FIG. 70, after the Case 4 subroutine has been initiated (step 1018), the audio/video data stream is acquired or inputted (step 1020). The Case 4 subroutine can be activated while in the middle of a Boomi segment. This can happen when the user has release the Boomi button or affordance after holding it for a predetermined number of frames. After the audio/video data stream is acquired, the current frame can be appended to the video buffer to end the Boomi effect (step 1022). Then, the ending frame time for the current Boomi segment can be set (step 1024). The live Boomi input can be set to the corresponding sets of presets (step 1026). The presets can include the number of loops of the Boomi segment, and how fast or slow to play the Boomi segment. After which, the Boomi index can be incremented to point to the next live Boomi input (step 1028). Then, the live Boomi active variable can be turned off (step 1030) to indicate the end of the current Boomi section. This can complete the current live Boomi input, and then the index can be incremented by +1 (step 1032). Next, this subroutine can return the resultant video data to the calling function and stop (step 1034).

APPENDIX VIII—CALL FUNCTION 1 CASE 4

The following Case 4 code example below shows pseudo code that may be used for the purpose of accomplishing Case 4 for call function 1.

Referring to FIG. 71, after the Case 5 subroutine has been initiated (step 1036), the audio/video data stream is acquired or inputted (step 1038). The Case 5 subroutine can be activated when the Boomi button or affordance is inactive and the camera stream is not in the middle of a Boomi segment. This can be associated with the non-Boomi segments or normal segments. After the audio/video data stream is acquired, this subroutine can determine if the current frame is the last frame of the non-Boomi segment (step 1040). If yes, the live Boomi input record may not have been set, then the current frame can be appended to the video buffer (step 1042). Then, the live Boomi input starting frame number can be set to the current frame number (step 1044). After which, the live Boomi input loops can be set to zero (0) (step 1046) to indicated to not apply the Boomi effect to this segment and to proceed to the next frame in the data stream, for example to step 1068 of call function 2, as further described below.

If it was determined that it is not the first frame in step 1040, then this subroutine can proceed to determine if the current frame is the last frame in the non-Boomi segment and it is the end of the recording (step 1048). If it is the last frame then the live Boomi input ending frame number can be set to the current frame number (step 1050). After which, the current frame can be appended to the video buffer (step 1052) and to proceed to the next frame in the data stream,

| Code Example—Call Function 1 Case 4 |
|---|

```
# Case 4: Live Boomi button is inactive and the camera stream is in the middle of a boomi
segment
    # This happens when the user has released the Live Boomi button after holding
      it for some frames
    else if (($is_live_boomi_button_pressed == false) and ($live_boomi_active == true))
    {
        # Append the current_frame to the video_buffer to end the boomi effect
        $video_buffer.append($current_frame);
        # Set the ending frame time for the current boomi segment
        $live_boomi_input[$index].ending_frame_ number = $current frame_number;
        # Set the $live_boomi_input to the corresponding sets of presets.
        $live_boomi_input[$index].loops=$live_boomi_presets[$boomi_index].loops;
            # number of loops
        $live_boomi_input[$index].speed= live_boomi_presets[$boomi_index].speed;
            # how fast or slow to play the boomi segment
        $live_boomi_input[$index].direction=$live_boomi_presets[$boomi_index].
          direction;            # Forward only OR Forward and Reverse
        # Increment $boomi index to point to the next $live_boomi_input input.
        $boomi_index = $boomi_index + 1;
        # turn off the $live_boomi_active variable to indicate the end of the
          current boomi section
        $live_boomi_active = false;
        # The current live_boomi_input is complete. Increment the index
        $index = $index + 1;
    }
``` for example to step 1068 of call function 2, as further described below. If it is not the last frame then this subroutine can proceed to determine if it is the main body of the current non-Boomi segment (step 1054). If it is the main body then the current frame can be appended to the video buffer (step 1056) and to proceed to the next frame in the data stream, for example to step 1068 of call function 2, as further described below.

If it is not, then this subroutine can proceed to the next frame of the audio/video data stream (step 1058). The next frame can be appreciated to be an operator that returns the next frame of the audio/video data stream, where the next frame can be the frame directly after the current frame. Next, the current frame number counter can be incremented by +1 (step 1060). Then, this subroutine can return the resultant video data to the calling function and stop (step 1062).

APPENDIX IX—CALL FUNCTION 1 CASE 5

The following Case 5 code example below shows pseudo code that may be used for the purpose of accomplishing Case 5 for call function 1.

At this point, the video data can have the following properties, but not limited to, the live Boomi input array can include an $index number of elements, and the video buffer can contain every frame captured while the camera stream was open.

As best illustrated in FIG. 72, the call function 2 subroutine 1064 can be initiated (step 1066), and the audio/video data stream can be acquired and inputted (step 1068). The call function 2 subroutine can get the default parameters for the live Boomi function presets (step 1070). The get function can be any device specific function call that is capable of getting preset data from the device's or remote memory. Next, the data can be returned to the calling function (step 1072) and stop (step 1074).

APPENDIX X—CALL FUNCTION 2

The following call function 2 code example below shows pseudo code that may be used for the purpose of accomplishing call function 2.

---

Code Example—Call Function 1 Case 5

```
# Case 5: Live Boomi button is inactive and the camera stream is NOT in the middle of a
boomi segment
   # This is the non-boomi segments
   else if (($is_live_boomi_button_pressed == false) and ($live_boomi_active ==
false))
   {
      if ( $live_boomi_input[$index] == null)
      # First frame of the a non-boomi segment. The $live_boomi_input
         record has not been set
      {
         # Append the current_frame to the video_buffer
         $video_buffer.append($current_frame);
         # Set the live_boomi_input starting_frame_number to the
            $current_frame_number.
         $live_boomi_input[$index].starting_frame_number=$current_frame
            _number;
         # Set the live_boomi input loops to 0 to indicate to not apply
            the boomi effect to this segment.
         $live_boomi_input[$index].loops = 0;
      }
      # else if it's the last frame of the non-boomi segment, and it's the end
         of the recording.
      else if ($video_buffer.next_frame == null)
      {
         # Set the live_boomi_input ending_frame_number to the
            $current_frame_number.
      $live_boomi_input[$index].ending_frame number=
current_frame_number;
         # Append the current_frame to the video_buffer
         $video_buffer_append($current_frame);
      }
      else
      # else it's the main "body" of the current non-boomi segment
      {
         # Append the current_frame to the video_buffer
         $video_buffer.append($current_frame);
      }
   }
   # Go to the next frame of the camera_stream
   # For simplicity and avoiding syntax issues, the "next_frame" operator
      returns the next frame of the $camera_stream
   #
   $current_frame = $camera_stream.next_frame;    #    Where next_frame is
                                                      the frame directly
                                                      after the
                                                      $current_frame
   # Increment the $current_frame_number counter by 1.
   $current_frame_number += 1;
} # End of the while $camera stream is open condition
```

| Code Example—Call Function 2 |
|---|

```
# Get the default parameters for the live boomi
function get_live_boomi_presets ( )
{
    # The "get_app_data" function is any device specific function call gets the preset data
from the device's storage
    $live_boomi_preset_input = get_app_data ("live_boomi_presets")
    # return the data to the calling function
    return $live_boomi_preset_input;
}
# End of Function get_live_boomi presets
```

Referring to FIG. 73, the call function 3 subroutine 1076 can be initiated (step 1078), and the audio/video data stream can be acquired and inputted (step 1080). The call function 3 subroutine can be configured or configurable to split the video buffer into two or more segments, and can return an array of video segments. Each segment array can include their own separate and independent Boomi effect, thereby providing a unique continuous video stream with multiple video loop segments different from each other. An array of structured memory buffers can contain the frames of the video segments and other information about the segments. After acquiring the audio/video data stream, this subroutine can determine if the data stream is to be split into 2 or more segments (step 1082), and if not then proceeds to return the resultant video data to the calling function (step 1105) and stop (step 1106). If yes, then the subroutine can point to the first frame of the video buffer and set the index of the first segment to 1 (step 1086).

After which, this subroutine can proceed to determine if the video buffer is at the end of the video stream (step 1088). If it is determined that the video buffer is at the end of the video stream, then this process can proceed to return the segment to the calling function (step 1105) and stop (step 1106). If it is determined that the video buffer is not at the end of the video stream (step 1088), then this subroutine can proceed to determine if the current frame is at the starting frame of the segment (step 1090). If yes, then the first frame can be appended for the segment (step 1092) and then the subroutine can proceed to the next frame of the buffer (step 1102).

If the frame is not at the starting frame, then the subroutine can proceed to determine if the current frame is the last frame of the segment (step 1094). If yes, then the last frame can be appended for the segment (step 1096) and then proceed to the next frame of the buffer (step 1102). If no, then the subroutine can proceed to determine if the end of the segment has been reached (step 1098).

If the end of the segment has not been reached (step 1094), then the current frame can be appended for the current segment (step 1100) and then proceed to the next frame of the buffer (step 1102). If yes, then the subroutine can go to the next frame of the buffer (step 1102) and then increment the frame counter by +1 (step 1104), and then proceed back to step 1088 to create a loop cycle. This determining of the location of the frames can be repeated until all the frames have been appended as the first frame, the last frame, and middle (body) frames, which results in leaving this loop cycle and proceeding to return the resultant video data to the calling function (step 1105) and stop (step 1106). It can be appreciated that call function 3 determines a location of each segment in the video stream, a starting and ending point for each segment, and a time length of each segment.

APPENDIX XI—CALL FUNCTION 3

The following call function 3 code example below shows pseudo code that may be used for the purpose of accomplishing call function 3.

| Code Example—Call Function 3 |
|---|

```
function split_videos ($video_buffer, $boomi_input)
# Purpose: Split the video buffer into multiple segments
# Function input variables: $video_buffer is the video to be split into 2 or more segments.
# Function input variables: $boomi_input contains the boomi effect variables
# Function returns an array of video segments
    # an array of structured memory buffers that will contain the frames of the video
        segments and
    # other information about the segment
    variable $segments is an array Data type video_buffer
    # The $current_frame variable is used to traverses the $video_buffer one frame at a
        time.
    # Point to the first frame of the video_buffer
    $current_frame = $video_buffer.frame;
    # Set index the first segment
    $index = 1;
    # Traverse through the video stream frame by frame
    Repeat while video has not reached the end of the video stream
    {
        # if the video stream frame is at the starting frame of the segment
        If $current_frame_number == $boomi_input[$index].starting_frame_number
        {
            # The start of a new segment has been reached.
            # Append the first frame for the segment
            $segments[$index].append ($current_frame);
        }
        # else if the current frame is the last frame.
```

-continued

Code Example—Call Function 3

```
    else if $current_frame_number == $boomi_input[$index].ending_frame_number
    {
      # The end of the segment has been reached.
      # Append the last frame for the segment
      $segments[$index].append ($current_frame);
      # Increment index;
      $index = $index + 1;
    }
    else # The end of the segment has not yet been reached.
    {
      # Append the current frame to the current segment
      $segments[$index].append ($current_frame);
    }
    # Go to the next frame of the $video_buffer
    $current_frame = $video_buffer.next_frame;
    # Increment the frame counter
    $current frame_number += 1;
    # end of the Repeat statement
  }
  # at this point, the $segments array contains the number of video segments.
  # The total number of segments is indicated by the value of $index variable.
  # Return the $segments array variable;
  return $segments;
}
# End of function split_videos
```

Figure 74:
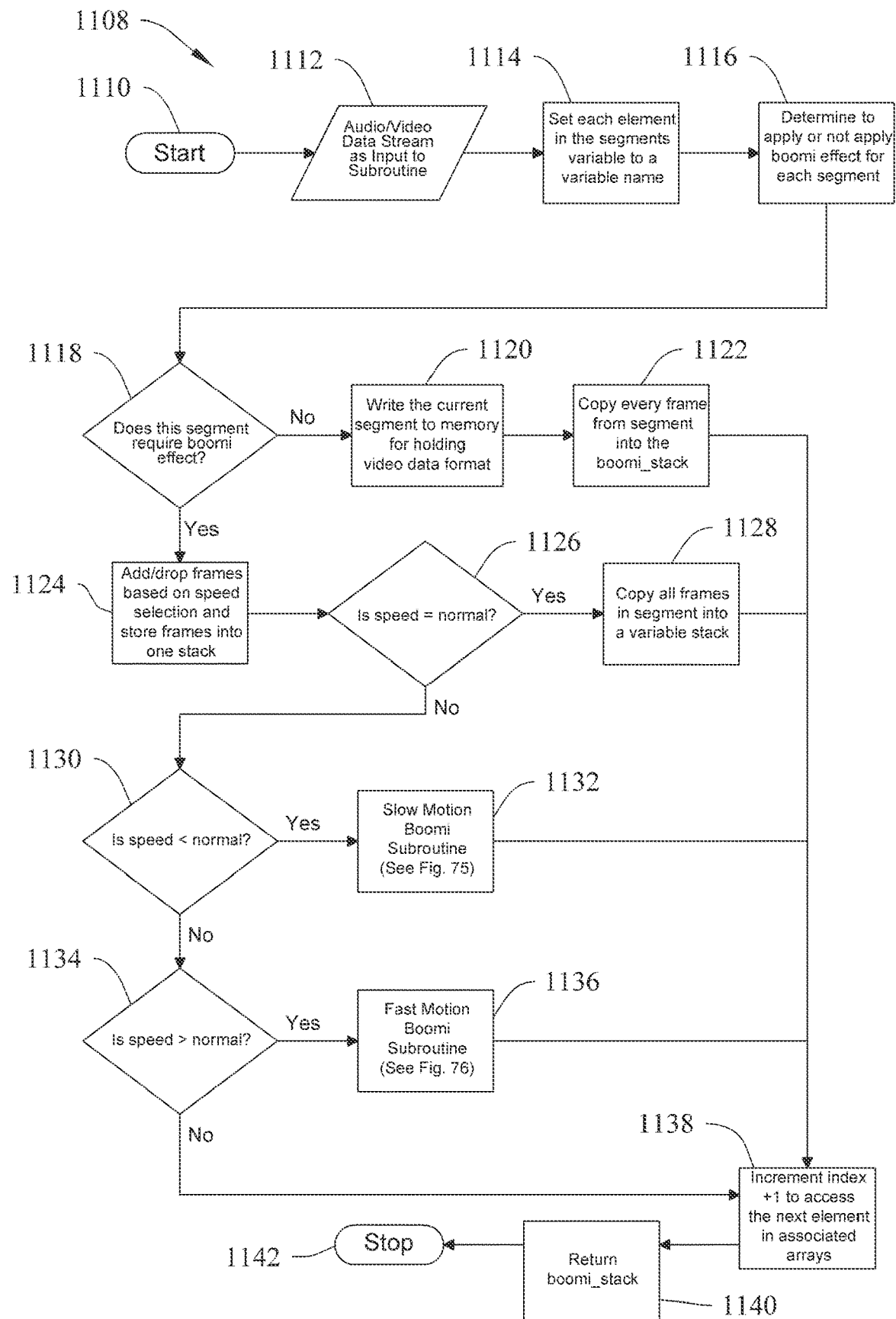
FIG. 74 is a flow chart of an example of the call function 4 for applying the Boomi effect to the required segments.

Referring to FIG. 74, the call function 4 subroutine 1108 can be initiated (step 1110), and the audio/video data stream can be acquired and inputted (step 1112). The call function 4 subroutine can apply the Boomi effect to the required Boomi segments. Call function 4 can include a segments variable including an array of two or more video segments that may or may not contain a Boomi effect, and an input that can contain the Boomi effect variables. The call function 4 can return the video buffer that can contain joined non-Boomi segments and Boomi effect segments.

After acquiring the audio/video data stream, this subroutine can set each element in the segments variable to a variable name (step 1114). After which, this subroutine can determine to apply or not apply a Boomi effect for each segment (step 1116), and to determine if this segment requires a Boomi effect (step 1118). If the segment does not require a Boomi effect, then the current segment is written to a memory buffer for holding video data format (step 1120), which then can copy every frame from the segment into the Boomi stack (step 1122), and then the subroutine can proceed to increment the index by +1 to access the next element in the associated arrays (step 1138).

If the segment does require a Boomi effect, then one or more frames can be added or dropped from the segment based on a speed selection, and store the frames into one stack (step 1124. Then, this subroutine can return the resultant video data to the calling function and stop (step 1106). After which, this subroutine can determine if the speed is normal (step 1126), as illustrated in FIG. 74. If yes, then all the frames in the segment can be copied into a variable stack (step 1128), and then the subroutine can proceed to increment the index by +1 to access the next element in the associated arrays (step 1138).

APPENDIX XII—CALL FUNCTION 4 NORMAL SPEED

The following normal speed subroutine for call function 4 code example below shows pseudo code that may be used for the purpose of accomplishing the normal speed subroutine of call function 4.

Code Example—Call Function 4 Normal Speed

```
# Normal Speed Mode
  if ($boomi_info[$index].speed == normal)
  {
    # Copy all of the frames in $segment into a variable $stack;
    $stack = $segment;
  }
```

If no, then the subroutine can proceed to determine if the speed is less than normal (step 1130). If it is less than normal, then a slow motion Boomi subroutine can be initiated (step 1132), and then the subroutine can proceed to increment the index by +1 to access the next element in the associated arrays (step 1138). If it is not less than normal, then the subroutine can proceed to determine if the speed is greater than normal (step 1134). If the speed is greater than normal, then a fast motion Boomi subroutine can be initiated (step 1136), and then the subroutine can proceed to increment the index by +1 to access the next element in the associated arrays (step 1138). If no, then the index can be incremented by +1 to access the next element in the associated arrays (step 1138). After which, the Boomi stack can be returned and this subroutine can stop (step 1142).

Figure 75:
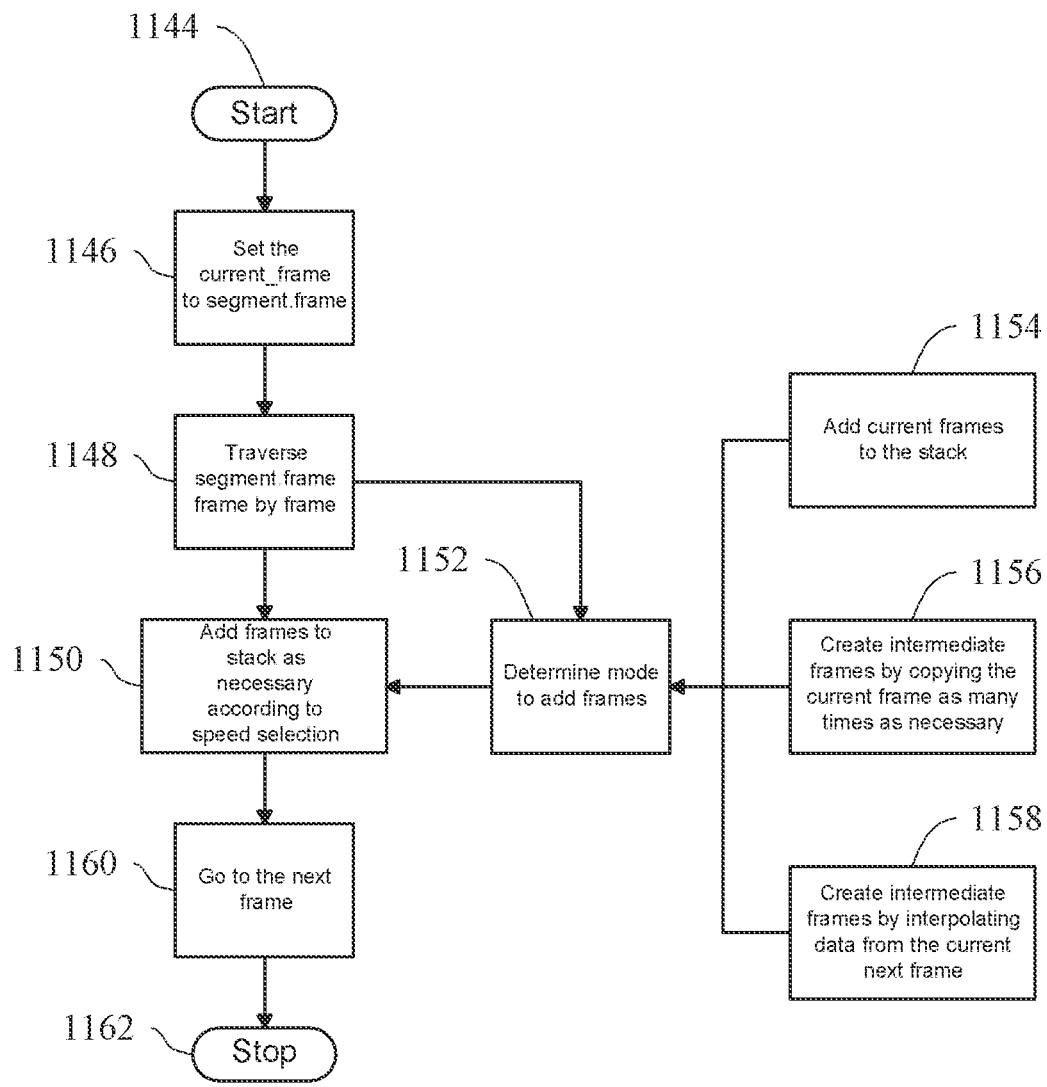
FIG. 75 is a flow chart of an example of the slow motion subroutine associated with call function 4.

Referring to FIG. 75 the slow motion subroutine of call function 4 can be initiated (step 1144), and the current frame can be set to the segment frame (step 1146). Then, a segment variable frame can be traversed frame by frame (step 1148) and frames can be added to the stack as necessary (step 1150) according to speed selection.

If frames are to be added to the stack, then this subroutine can determine which mode is best to add the frames to the stack (step 1152). The same frame can be added to the stack (step 1154) or frames can be created. Intermediate frames can be created by copying the current frames as many times as necessary (step 1156). Alternatively, the intermediate frames can be created by interpolating data from the current and/or next frames (step 1158). These frames can then be added to the stack. Then, the subroutine can go to the next frame in the segment for processing (step 1160). After which, this subroutine can return the resultant video data to the calling function and stop (step 1162).

APPENDIX XIII—CALL FUNCTION 4 SLOW MOTION

The following slow motion subroutine for call function 4 code example below shows pseudo code that may be used for the purpose of accomplishing the slow motion subroutine of call function 4.

---

Code Example—Call Function 4 Slow Motion

```
#   Slow Motion Mode Boomi
    else (if $boomi_info[$index].speed < normal )
    {   #   Set the current frame to the $segment. frame;
        $current_frame = $segment.frame;
        #   Traverse the $segment variable frame by frame and add
frames
        to the $stack as necessary.
        while ($current_frame != null)
        {
            #   Add Frames according to the speed selected.
            #   Add the current frames to the $stack
            $stack.append ($current_frame);
            #   We can either simply add the same frame to the stack,
                or we can create new frames by interpolating
            #   the current frame with the next frame in the $segment.
            if ($interpolate == "off")
            {
                #   Simply add frames
                #   Create the intermediate frames by copying the
                    current as many times as necessary.
                $added_frames=
                build_identical_frames($current_frame,
                $boomi_info[$index].speed)
            }
            else
            {
                #   Create the intermediate frames by
                    Interpolating the data from the current the
                    next frame.
                $added_frames=
                build_interpolated_frames($current_frame,
                $segment.next_frame, $boomi_info[$index].speed)
            }
            #   Add the added_frames to the $stack
            $stack.append($added_frames);
            #   Go to the next frame in $segment;
            $current_frame = $segment.next_frame;
        }
    }
```

---

Figure 76:
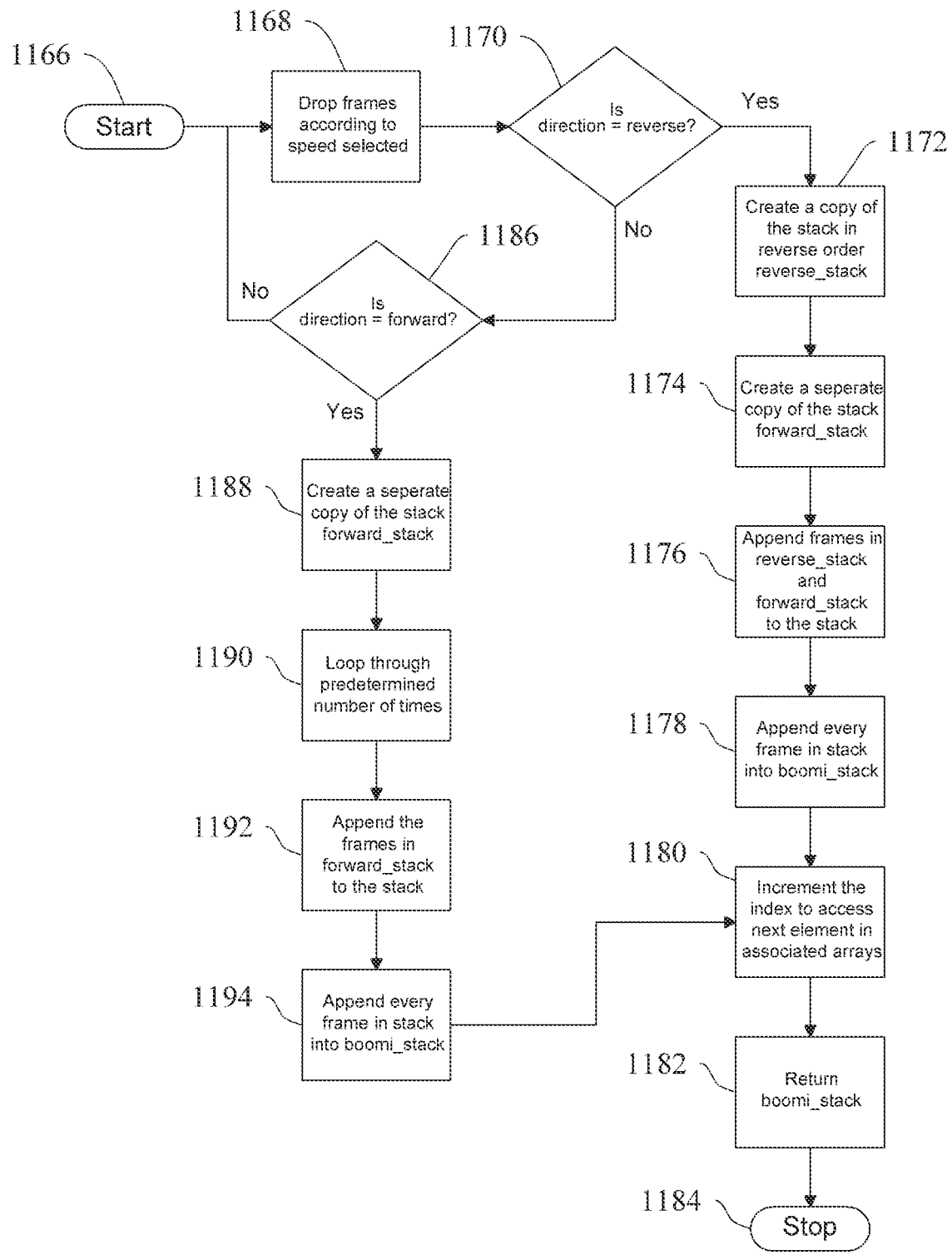
FIG. 76 is a flow chart of an example of the fast motion subroutine associated with call function 4.

Referring to FIG. 76 the fast motion subroutine of call function 4 can be initiated (step 1166), and if frames are to be added to the stack, then this subroutine can determine to drop frames according to speed selection (step 1168), and then determine if the direction is "reverse" (step 1170). If the direction is "reverse", then this subroutine can create a copy of the stack in reverse order (step 1172) to create a reverse stack. This can be accomplished by reversing the order sequence of the frames in the stack. The reverse stack can contain a copy of all the frames in the stack but in reverse order.

Then a separate copy of the stack can be created and referred to as a forward stack (step 1174). The forward stack can contain a copy of all the frames in stack prior to reversing. After which, the frames of the reverse stack and the forward stack can be appended to the stack (step 1176). Then every frame in the stack can be appended into the Boomi stack (step 1178).

If the direction is not "reverse" in step 1170, then the subroutine can proceed to determine if the direction is "forward" step (1186). If it is not "forward", then the process can return to the start. If is a "forward" direction, then the above "reverse" process is bypassed, and a separate copy of the stack is created (step 1188) and referred to as the forward stack. Then, a loop variable is determined or acquired and the forward stack is processed a number of times as defined by the loop (step 1190). The frames of the forward stack can then be appended to the stack (step 1192), and the every frame in the stack can be appended into the Boomi stack (step 1194).

This subroutine can then proceed from the appended Boomi stack of steps 1178 and/or 1194 to incrementing by +1 the index to access the next element in the associated arrays (step 1180). The Boomi stack can be returned to the call function (step 1182) and this subroutine can stop (step 1184).

APPENDIX XIV—CALL FUNCTION 4 FAST MOTION

The following fast motion subroutine for call function 4 code example below shows pseudo code that may be used for the purpose of accomplishing the fast motion subroutine of call function 4.

---

Code Example—Call Function 4 Fast Motion

```
#   Fast Motion Mode Boomi
    else if ($boomi_info[$index].speed > normal)
    {#  Drop Frames according to the speed selected.
        #   Call function drop_frames to process the $stack
        $stack = drop_frames($stack, $boomi_info[$index].speed);}
        #   if direction == "reverse" then, reverse order the sequence of frames in
            the stack
        #   and append the reversed order stack to the stack.
        if ($boomi_info[$index].direction == "reverse")
        {#      Create a copy of $stack in reverse order. $reverse_stack contains a
copy of all the frames in $stack but in reverse order.
            $reverse_stack = reverse_stack($stack);
            #   Create a separate copy of the $stack. $forward_stack
                contains a copy of all the frames in $stack;
            $forward_stack.append($stack);
            for ($i=1; $i <= $loops; $i++;)
            {   #   Append the frames in the $reverse stack and
                    $forward_stack to the stack $loop number of times
                $stack.append($reverse_stack);
                $stack.append($forward_stack);}
```

| Code Example—Call Function 4 Fast Motion |
|---|
| ```
            #   Append every frame in $stack into $boomi_stack
            $boomi_stack.append($stack);}
        else
        {   #   If user selected only forward then we don't need to reverse
            #   Create a separate copy of the $stack. $forward_stack
                contains a copy of all the frames in $stack;
            $forward_stack.append($stack);
            #   Loop through $loop number of times
            for ($i=1; $i < $loops; $i++;)
            {   #   Append the frames in $forward stack to the stack
                $stack.append($forward_stack);}
            #   Append every frame in $stack into $boomi_stack
            $boomi_stack.append($stack);
        }
    }
    #   increment the index to access the next element in the associated arrays.
    $index += 1;
}
return $boomi_stack;
}
# End of function apply_boomi
``` |

Figure 77:
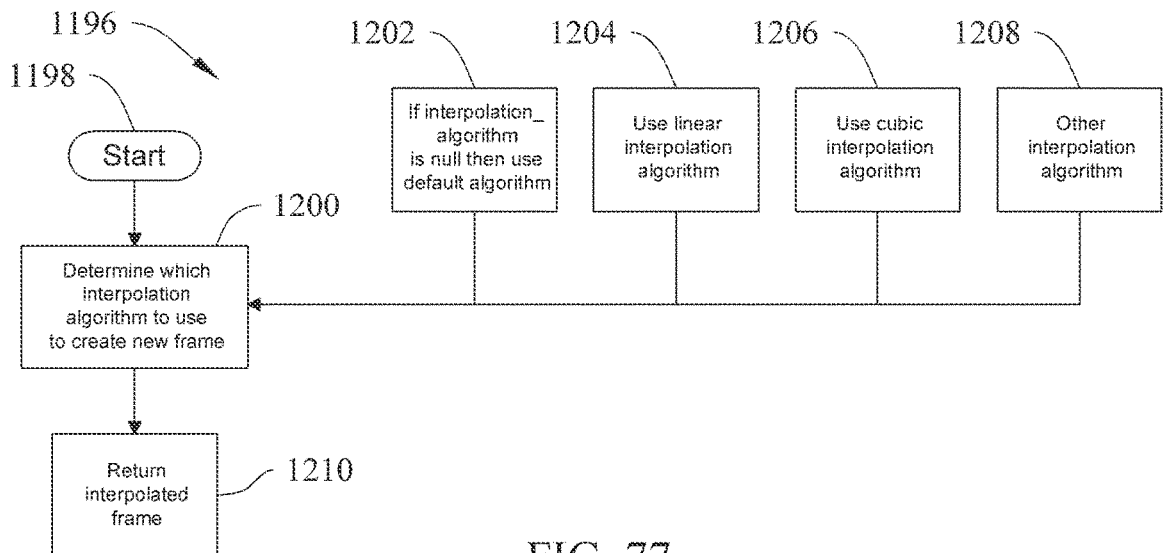
FIG. 77 is a flow chart of an example of the call function 5 for creating one or more frames by interpolating the images in frame1 and frame2.

Referring to FIG. 77, the call function 5 subroutine 1196 can be initiated (step 1198), and a determination of which interpolation algorithm can be used to create a new frame (step 1200). Call function 5 can be utilized, if required, to create one or more frames by interpolating the images in a first frame "frame1" and a second frame "frame2". It can be appreciated that an interpolation algorithm can be a type of algorithm used to create an interpolated frame. Interpolation algorithms may be known to those skilled in the art such as, but not limited to, linear interpolation and cubic interpolation. This call function 5 can determine which interpolation algorithm is best or will suffice, and takes into account which interpolation algorithm to use to create the new frame. In determining the interpolation algorithm, call function 5 can use a default algorithm if this setting is "null" (step 1202), a liner algorithm (step 1204), a cubic algorithm (step 1206) or any other known interpolation algorithm (step 1208). After the new frame is created, then the interpolated frame can be returned to the call function for further processing (step 1210).

APPENDIX XV—CALL FUNCTION 5

The following call function 5 code example below shows pseudo code that may be used for the purpose of accomplishing call function 5.

| Code Example—Call Function 5 |
|---|
| ```
function do_frame interpolation($frame1, $frame1, $interpolation_algorithm)
#   Purpose: Create 1 frame by interpolating the images in $frame1 and $frame2
#   Function input variable: $frame1 is the first frame
#   Function input variable: $frame2 is the second frame
#   function input variable: $interpolation_algorithm is the type of algorithms to use for creating
    the interpolated frame
#   Function returns the variable $interpolated frame that 1 frame
    #   There are many different interpolation algorithms. For simplicity, we assume that any
        known
    #   interpolation algorithms will suffice. The function takes into account which
        interpolation
    #   algorithm to use to create the new frame.
    #   These functions are not defined in the pseudo code, as there are many prior art.
    #   function linear_interpolation($frame1, $frame2)
    #   function cubic_interpolation ($frame1, $frame2)
    #   If
    if ($interpolation_algorithm == null)
    {
        #   use the default algorithm
        $interpolated_frame = default_interpolation($frame1, $frame2)
    }
    else if ($interpolation_algorithm == "linear")
    {
        $interpolated_frame = linear_interpolation($frame1, $frame2)
    }
    else if ($interpolation_algorithm == "cubic")
    {
        $interpolated_frame = cubic_interpolation($frame1, $frame2)
    }
    # This function can be extended to include any interpolation algorithm
    return $interpolated_frame;
}
# End of function do_frame_interpolation
``` |

Figure 78:
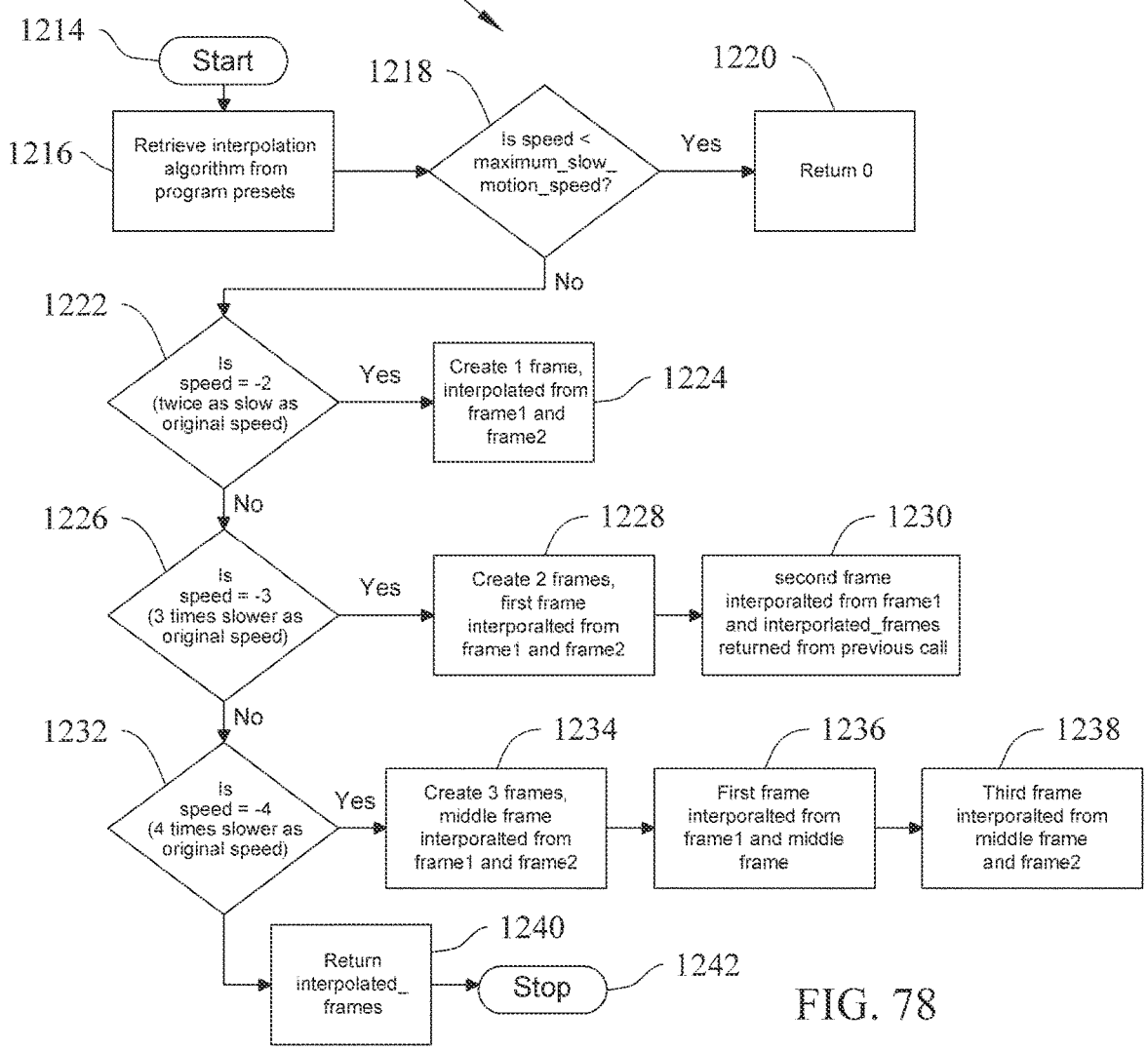
FIG. 78 is a flow chart of an example of the call function 6 for creating additional frames by interpolating the images in frame1 and frame 2 to create one or more interpolated frames.

Referring to FIG. 78, the call function 6 subroutine 1212 can be initiated (step 1214), and can retrieve an interpolation algorithm from program presets (step 1216). Call function 6 can be utilized, if required, to create additional frames by interpolating the images in frame1 and frame2 to create one or more interpolated frames. The speed variable can be used to determine how many frames to be interpolated, and every speed supported by the present technology can be checked. In the exemplary, the maximum slow motion speed can be set during loading of the program. After the interpolation algorithm is retrieved in step 1216, this subroutine can determine if the speed is less than the maximum slow motion speed (step 1218). If yes, then this subroutine can return a variable of zero (0) (step 1220).

If the speed is not less than the maximum slow motion speed, then this subroutine can proceed to determine if the speed is equal to −2 times or twice as slow as the original speed (step 1222). If yes, then one frame is created by interpolating it from frame1 and frame2.

If the speed is not less than twice as slow as the original, then the subroutine can proceed to determine if the speed is equal to −3 times or three times as slow as the original speed (step 1226). If yes, then two frames are created by interpolating a first frame from frame1 and frame2 (step 1228) and a second frame from frame1 and an interpolated frame from a previous call (step 1230).

If the speed is not less than three times as slow as the original, then the subroutine can proceed to determine if the speed is equal to −4 times or four times as slow as the original speed (step 1232). If yes, then three frames are created by interpolating a middle frame from frame1 and frame2 (step 1234), a first frame from frame1 and a middle frame (step 1236), and a third frame from a middle frame and frame2 (step 1238).

It can be appreciated and within the scope of the present technology that this interpolation according to speed can be accomplished for additional speed slower and faster than the original speed.

After the new frame(s) has been created, the interpolated frames can be returned to the calling function (step 1240) and this subroutine can stop (step 1242).

APPENDIX XVI—CALL FUNCTION 6

The following call function 6 code example below shows pseudo code that may be used for the purpose of accomplishing call function 6.

Code Example—Call Function 6

```
function build_interpolated_frames($frame1, $frame1, $speed)
#   Purpose: Create additional frames by interpolating the images in $frame1 and $frame2 to
create 1 or more interpolated frames.
#   Function input variables: $frame1 is the first frame
#   Function input variables: $frame2 is the second frame
#   Function input variables: $speed is used to determine how many frames to interpolate.
#   Function returns the variable $interpolated_frames that contains the interpolated frames;
{
    #   Check every supported speed
    #   the constant MAXIMUM_SLOW_MOTION_SPEED is set during program load.
    #   $interpolation_algorithm is retrieved from program presets
    $interpolation_algorithm = get_app_data ("interpolation_algorithm")
    if ($speed < MAXIMUM_SLOW_MOTION_SPEED)
    {
      return 0;
    }
    else if ($speed == −2)
    {
      #   Slow motion is twice as slow as original speed of the video.
      #   Create 1 frame, interpolated from $frame1 and $frame2.
      $interpolated_frames[1] = do_frame_interpolation ($frame1, $frame2,
      $interpolation_algorithm);
    }
    else if ($speed == −3)
    {
      #   Slow motion is 3 times as slow as original speed of the video.
      #   Create 2 frames
      #   First frame interpolated from $frame1 and $frame2.
      $interpolated_frames[1] = do_frame_interpolation ($frame1, $frame2,
      $interpolation_algorithm);
      #   2nd frame interpolated from $frame1 and $interpolated frames returned in
          previous call.
      $interpolated_frames[2] = do_frame_interpolation ($frame1, $interpolated_frames[1],
      $interpolation_algorithm);
    }
    else if ($speed = −4)
    {
      #   Slow motion is 4 times as slow as original speed of the video.
      #   Create 3 frames,
      #   The middle frame (2nd frame) is interpolated from $frame1 and $frame2.
      $interpolated_frames[2] = do_frame_interpolation ($frame1, $frame2,
      $interpolation_algorithm);
      #   1st frame is interpolated from $frame1 and $interpolated_frames[2]
      $interpolated_frames[1] = do_frame_interpolation ($frame1, $interpolated_frame[2],
      $interpolation_algorithm);
      #   3rd frame is interpolated from $interpolated_frames[2] and $frame2;
      $interpolated_frames[3] = do_frame_interpolation ($interpolated_frame[2], $frame2,
      $interpolation_algorithm);
```

| Code Example—Call Function 6 |
|---|

```
        }
        # This can easily be extended to support slower speeds to create a smoother slow
            motion effect
        return $interpolated_frames;
}
# End of function build_interpolated_frames
```

Figure 79:
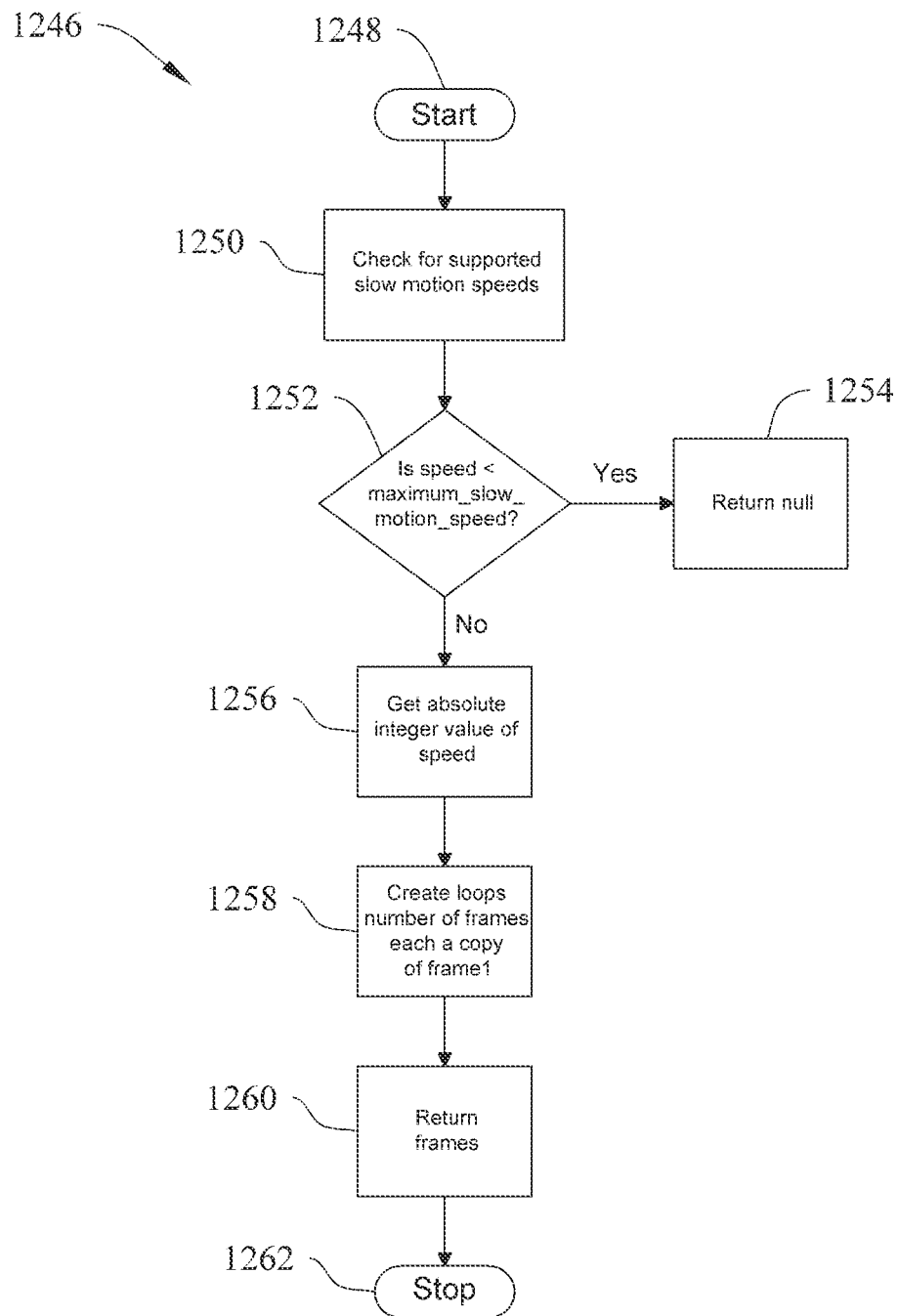
FIG. 79 is a flow chart of an example of the call function 7 for creating additional frames by copying a frame to create one or more frames of identical images.

Referring to FIG. 79, the call function 7 subroutine 1246 can be initiated (step 1248), and can check for support slow motion speeds (step 1250). Call function 7 can be utilized, if required, to create additional frames by copying a frame to create one or more frames of identical images. The speed variable can be used to determine how many frames to copy. After the slow motion speed is checked in step 1250, this subroutine can determine if the speed is less than the maximum slow motion speed (step 1252). If yes, then this subroutine can return a variable of "null" (step 1254).

If the speed is not less than the maximum slow motion speed, then this subroutine can get an absolute integer value of the speed (step 1256), which can remove any negative signs or values. After which, this subroutine can then create loop numbers of frames, each being a copy of frame1 (step 1258). A new variable can be utilized to hold the frames. The frames can then be returned to the calling function (step 1260) and this subroutine can stop (step 1262). It can be appreciated that this subroutine can be extended to support slower speeds than twice as slow as the original speed.

APPENDIX XVII—CALL FUNCTION 7

The following call function 7 code example below shows pseudo code that may be used for the purpose of accomplishing call function 7.

Figure 80:
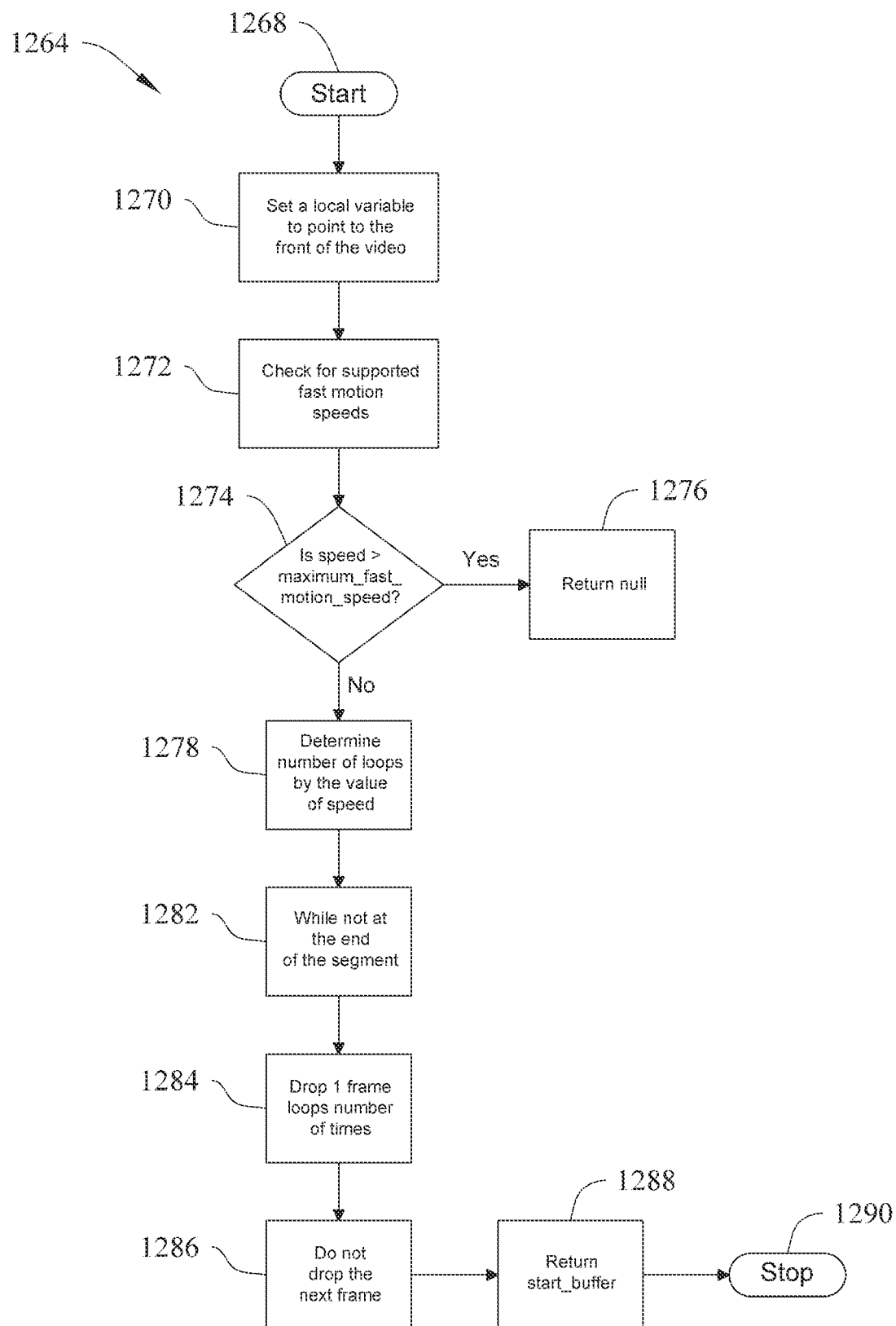
FIG. 80 is a flow chart of an example of the call function 8 for deleting one or more frames from the selected segment.

Referring to FIG. 80, the call function 8 subroutine 1264 can be initiated (step 1268), and can be utilized, if required, to delete one or more frames from the video buffer. The speed variable can be the number of speed variables used to decide how many frames to not create. After starting, this subroutine can set a local variable to point to the front of the video stream (step 1270). Then the supported fast motion speeds can be checked (step 1272). This can include determining if the speed is greater than a maximum fast motion speed (step 1274). If yes, then this subroutine can return a variable of "null" (step 1276).

If the speed is less than the maximum fast motion speed, then this subroutine can determine the number of loops by the value of the speed (step 1278). While not at the end of the segment (step 1278), a frame dropping operation can proceed, which can include dropping one frame a predetermined (loops) number of times (step 1284), and then not dropping the next frame (step 1286). The frames can then be returned to the calling function (step 1288) and this subroutine can stop (step 1290). It can be appreciated that this subroutine can be extended to support faster speeds than twice as fast as the original speed.

| Code Example—Call Function 7 |
|---|

```
function build identical frames($frame, $speed)
#   Purpose: Create additional frames by copying $frame to create 1 or more frames of identical
        images.
#   Function input variables: $frame is of type frame
#   Function input variables: $speed is used to determine how many frames to copy.
#   Function returns the video_buffer $frames containing $speed number of copies of
        $current_frame
{
    #   Check for supported slow motion speeds
    #   the constant MAXIMUM_SLOW_MOTION_SPEED is set during program load.
    if ($speed < MAXIMUM_SLOW_MOTION_SPEED)
    {
        return null;
    }
    else
    {
        #   Get the absolute integer value of $speed. (Removes the negative sign)
        $loops = abs($speed);
        #   motion is twice as slow as original speed of the video.
        #   Create $loops number of frames, each a copy of $frame1
        Data type video buffer $frames;   #   new variable to hold frames
        for ($i = 1; $i < $loops; $i++)
        {
            $frames.append ($frame);
        }
    }
    #   This can easily be extended to support slower speeds.
    return $frames;
}
# End of function build_identical_frames
```

APPENDIX XVIII—CALL FUNCTION 8

The following call function 8 code example below shows pseudo code that may be used for the purpose of accomplishing call function 8.

---

Code Example—Call Function 8

---

```
function drop_frames($video_buffer, $speed)
#   Purpose: Delete 1 or more frames from a video_buffer.
#   Function input variables: $video_buffer is the data containing a data type video_buffer
#   Function input variables: $speed is the number of speed variable used to decide how many
    frames create.
#   Function returns the variable $boomi_frames that contains frame copies of $current_frame
{
    #   set a local variable to point to the front of the $video
    $start_buffer = $video_buffer;
    #   Check for supported fast motion speeds
    #   the constant MAXIMUM_FAST_MOTION_SPEED is set during program load.
    if ($speed > MAXIMUM_FAST_MOTION_SPEED)
    {
        return null;
    }
    else
    {
        #   The number of loops is determined by the value of $speed.
        $loops = $speed;
        #   while not at the end of the segment
        while ($video_buffer != null)
        {
            #   Drop 1 frame $loops number of times
            #   Dropping frames in this example is calling an object the frame to
                next_frame in the $video_buffer data container
            for ($i = 1; $i <= $loops; $i++)
            {
                $video_buffer delete_frame;
            }
            #   don't drop the next frame
            $video_buffer.next_frame;
        }
        #   This can easily be extended to support slower speeds.
        return $start_buffer;
    }
}
#   End of function drop_frames
```

Figure 81:
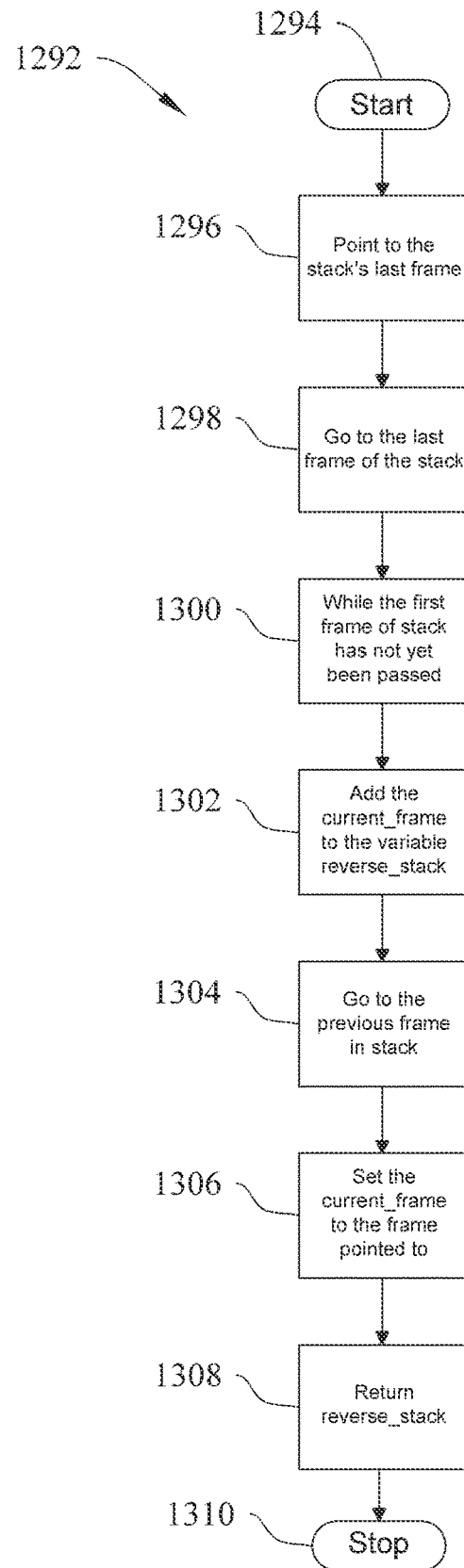
FIG. 81 is a flow chart of an example of the call function 9 for receiving the selected segment as input and returning the selected segment with the frames in reverse order.

Referring to FIG. 81, the call function 9 subroutine 1292 can be initiated (step 1294), and can be utilized to receive the video buffer as input and return another video buffer with the frames in reverse order.

The frames can then be returned to the calling function (step 1288) and this subroutine can stop (step 1290).

APPENDIX IXX—CALL FUNCTION 9

The following call function 9 code example below shows pseudo code that may be used for the purpose of accomplishing call function 9.

---

Code Example-Call Function 9

---

```
function reverse_stack($stack)
#       Purpose: Receive a video_buffer as input and return a video_buffer with the frames in reverse
        order.
#       Function input variables: $stack is of data type video_buffer
#       Function returns the variable $reverse_stack containing every frame in the $stack input but in
        reverse order.
{
        # point to the stack's last_frame
        $last_frame_pointer = $stack.last_frame;
        #       Go to the last_frame of the $stack
        $last_frame = $stack.last_frame;
        $current_frame = $last_frame;
        #       while the first frame of the $stack    has not yet been passed
        while ($current_frame != null)
        {
                #       Add the current_frame to the variable $reverse_stack
                $reverse_stack.append($current_frame);
                #       Go to the previous frame in $stack.
                #       Use $current_frame.previous_frame function
                $last_frame_pointer = $current_frame.previous_frame;
                #       Set the current_frame to the frame pointed to by $last_frame_pointer
                $current frame = $last_frame_pointer.frame;
```

Code Example-Call Function 9

```
        }
            return $reverse_stack;
    }
#       End of function reverse_stack
```

Referring to FIGS. 82-91, exemplary scenarios showing different segments selected for Boomi effects are illustrated and described include exemplary screenshots of the GUI 30 while in the Boomi editor. In these exemplary scenarios, frames of the video stream and Boomi parameters can be entered by the user. These inputs can be utilized in determining the Boomi call functions described above. In these exemplary scenarios are utilized in a live Boomi mode, where the audio/video data stream is provided from the electronic device's camera and microphone in real time or near real time. It can be appreciated that these scenarios can further be inherently applied to a pre-recorded video stream from the electronic device's memory, from a camera in a different camera mode, or from a remote system or memory.

In these scenarios, the Boomi editing mode or screen can include the frames from video or still images in sequential order, with a traveling time playing bar 808, and one or more adjustable loop frames or boxes 830, which represent the selected frames of a segment S1, S2, etc.

Figure 82:
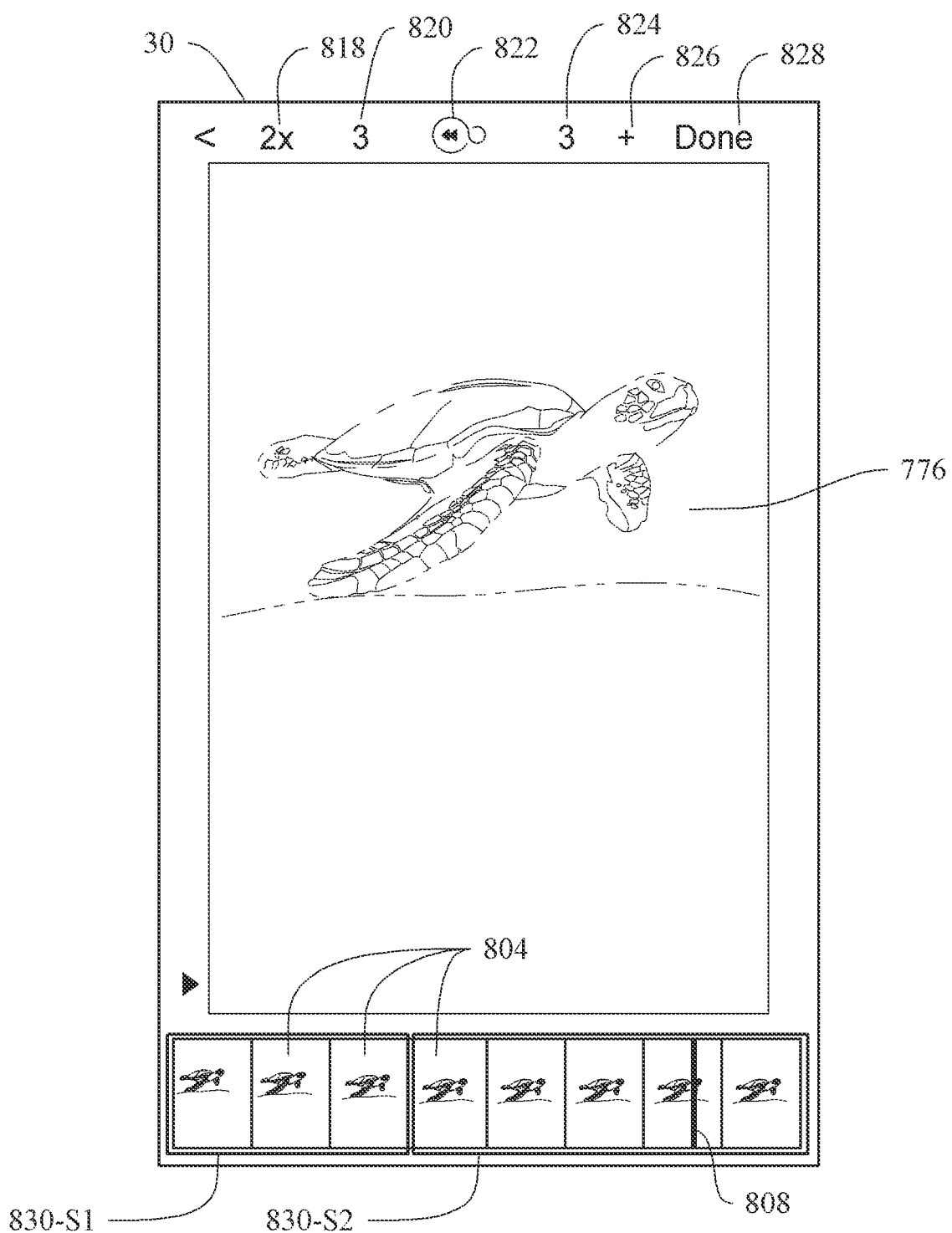
FIG. 82 is a sample GUI screenshot of a "Camera View" of the device employing the GUI with a Boomi option activated showing the two live Boomi segments of an exemplary scenario 1.
Figure 83:
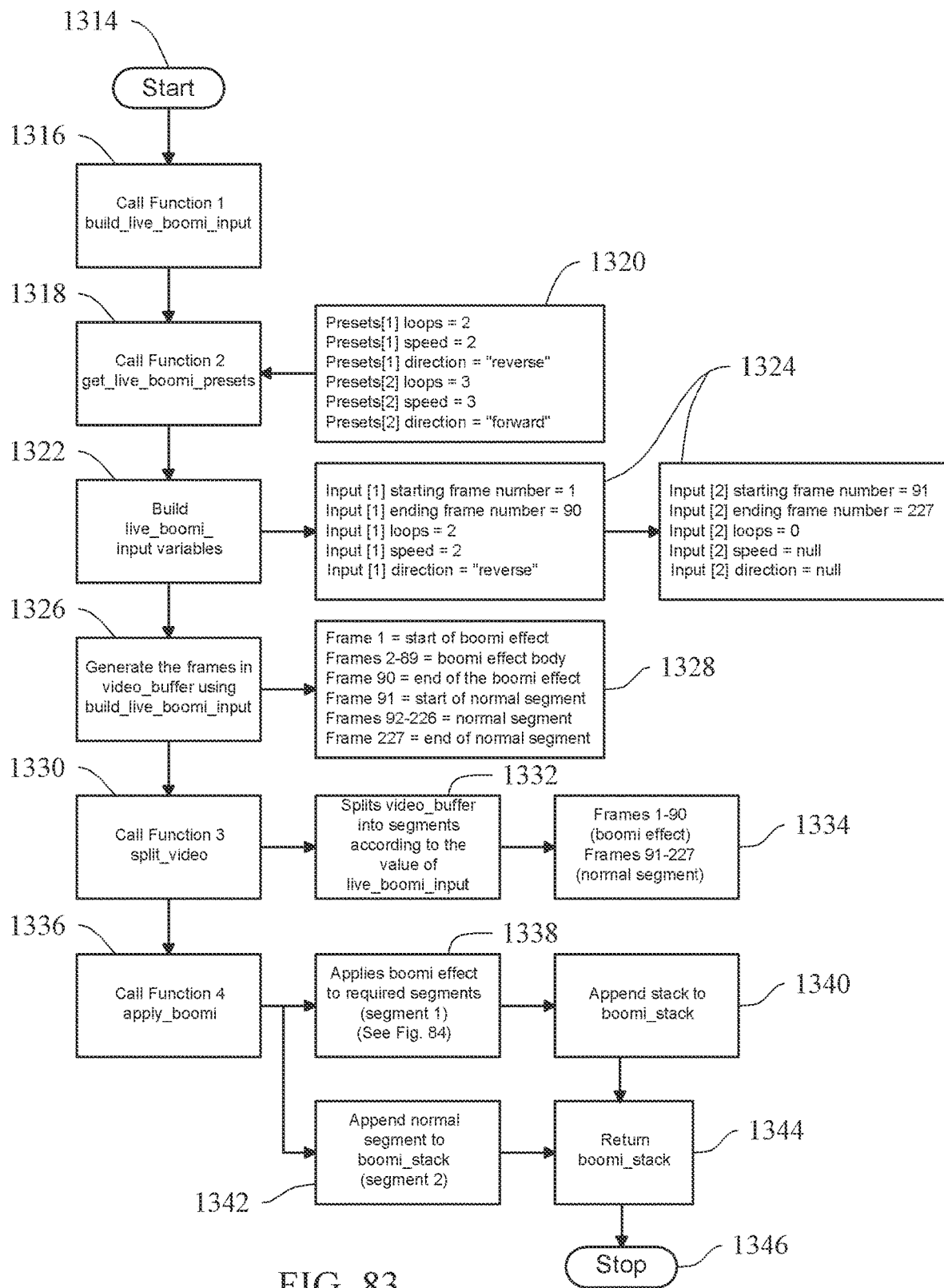
FIG. 83 is a flow chart of an exemplary scenario 1 including two live Boomi segments, with the first segment being the Boomi effect segment, and the camera fps is 30.
Figure 84:
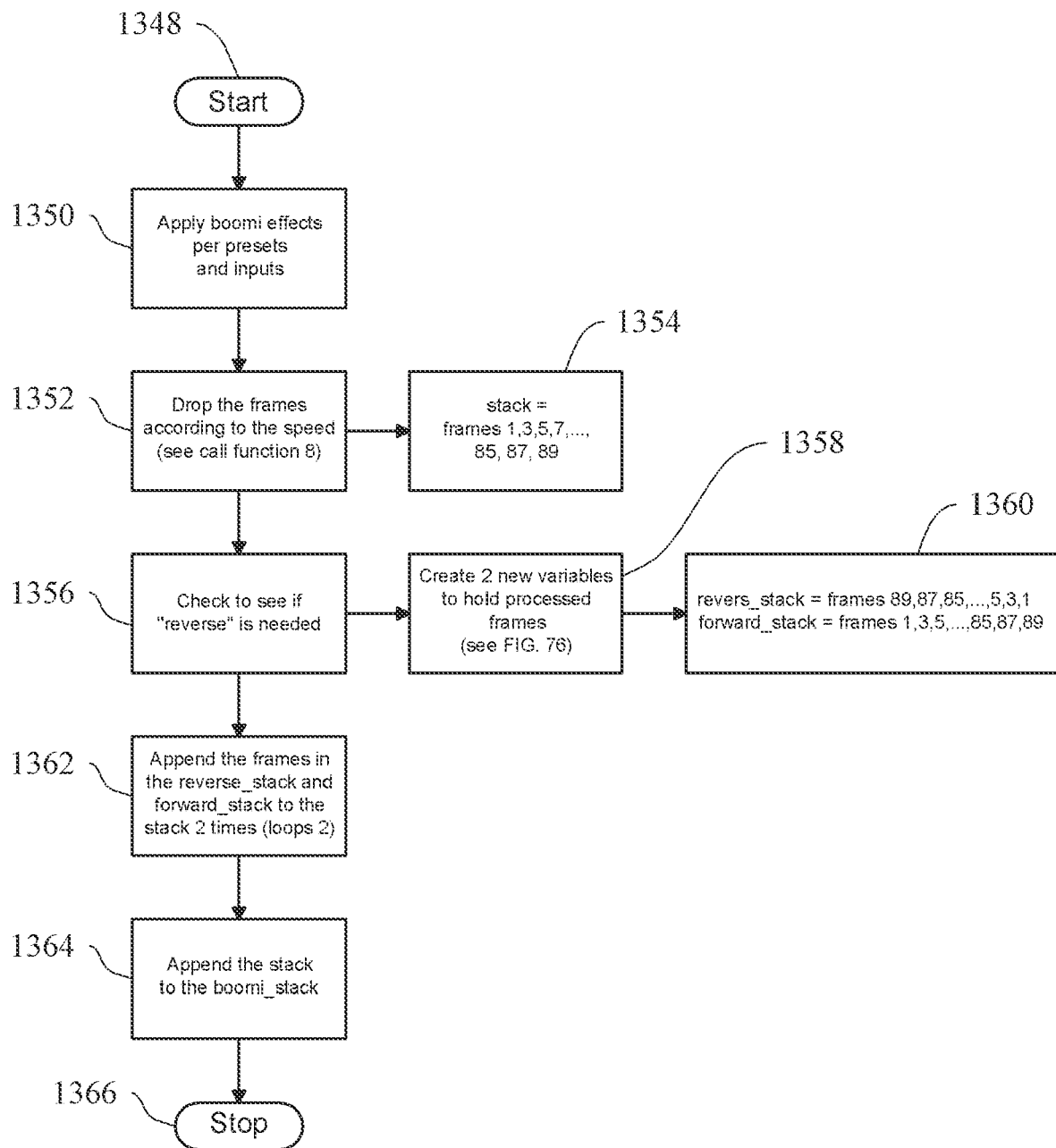
FIG. 84 is a flow chart of an example of the apply Boomi subroutine for the required segment of the exemplary scenario 1 in FIG. 83.

In exemplary scenario 1, as best illustrated in FIGS. 82-84, the number of live Boomi segments is 2, and the Boomi segment position is the first segment 830-S1, and the camera is operating at 30 fps.

For this scenario, two live Boomi loop segments have been selected 830-S1, 830-S2, with the first segment 830-S1 being selected as the Boomi segment position, as best illustrated in FIG. 82. The first segment 830-S1 can be different color, thickness, line type, brightness, pattern or other characteristic to that of the second segment 830-S2. The loop boxes 830-S1, 830-S2 can surround the frames that are part of that loop segment, and the size, length or configuration of each of the loop boxes 830-S1, 830-S2 can be adjusted to remove or add frame to the loop segment. Further, multiple loop boxes can be displayed or utilized to represent multiple loops. The loop boxes 830-S1, 830-S2 can have a characteristic (e.g. color, line type, line weight, etc.) different to that of, but not limited to, the time playing bar 808 or the frames.

Referring to FIG. 83, the exemplary scenario 1 Boomi process can be initiated (step 1314), with Method 1 being utilized since the audio/video data stream is being provided from the electronic devices' camera and microphone. Next, this process can initiate call function 1 (step 1316) to build the video buffer and the live Boomi input. Then call function 2 can be initiated (step 1318) to get the live Boomi presets (step 1320). In this scenario, the presets can be:
    live boomi presets[1].loops=2
    live boomi presets[1].speed=2
    live boomi presets[1].direction="reverse"
    live boomi presets[2].loops=3
    live boomi presets[2].speed=3
    live boomi presets[2].direction="forward"

Additionally, the call function 2 can then build the live Boomi input variables (steps 1322 and 1324) including:
    live boomi input[1].starting_frame_number=1
    live boomi input[1].ending_frame_number=90
    live boomi input[1].loops=2
    live boomi input[1].speed=2
    live boomi input[1].direction="reverse"
    live boomi input[2].starting_frame_number=91
    live boomi input[2].ending_frame_number=227
    live boomi input[2].loops=0
    live boomi input[2].speed=null
    live boomi input[2].direction=null After which, the build live Boomi input function can generate the frames in the video buffer (step 1326). This results in the video buffer containing 1-227 frames separated into two segments (step 1328), characterized as:
    Frame #1 being the start of the Boomi effect
    Frames #2-89 being the body of the Boomi effect
    Frame #90 being the end of the Boomi effect
    Frame #91 being the start of the normal (non-Boomi effect) segments
    Frames #92-226 being the normal segment
    Frame #227 being the end of the normal segment Then, process can proceed to call function 3 (step 1330) to split the video buffer into segments according to the value of the live Boomi input (step 1332). Resulting in frames 1-90 including Boomi effect and frames 91-227 being the normal segment (step 1334).

After the video buffer is split, call function 4 can be initiated (step 1336) to apply the Boomi effect on the segments that require it, this being the first segment including frames 1-90 (step 1338).

After the Boomi effect has been applied, the first segment can be appended to the Boomi stack (step 1340), and the normal segment being the second segment including frames 91-227 can be appended to the Boomi stack (step 1342).

The Boomi stack can then be returned for display and/or storage (step 1344) and the process can stop (step 1346).

Referring to FIG. 84, the step of applying the Boomi effect can be initiated (step 1348), which applies the Boomi effect to the first segment per the Boomi presets and input (step 1350). In this scenario, the inputs for the first segment (frames 1-90) include 2 loops, a speed of 2 and a direction of "reverse". This results in the dropping of frames according to the loops and speed input (step 1352), resulting in a forward stack including frames 1, 3, 5, 7, . . . , 85, 87, 89 (step 1354). The frames can be dropped by initiating call function 8 as shown in FIG. 80.

Next, the process can check to see if the direction is "reverse" (step 1356). In this scenario the result is yes, which initiates the fast motion subroutine of call function 4 as per the subroutine shown in FIG. 76. Thereby creating 2 new variables to hold the processed frames (step 1358). The new variables can be a reverse stack including frames 89, 87, 85, . . . , 5, 3, 1 and a forward stack including frames 1, 3, 5, . . . , 85, 87, 89 (step 1360).

The reverse stack can be accomplished by initiating call function 9 as shown in FIG. 81. The forward stack can be accomplished by initiating call function 8 as shown in FIG. 80.

After which, the frames in the reverse stack and the forward stack can be appended to the stack 2 times (step 1362) as per the loops 2 input. This results in an appended stack of the reverse stack containing:
- a first loop including frames 1, 3, 7, . . . , 89, 89, 87, 85, . . . , 5, 3, 1 of the original frames; and
- a second loop including frames 1, 3, 7, . . . , 89, 89, 87, 85, . . . , 5, 3, 1, 1, 3, 5, . . . , 85, 87, 89, 89, 87, 85, . . . , 5, 3, 1 of the original frames This also results in an appended stack of the forward stack containing:
- a first loop including frames 1, 3, 7 . . . , 89, 89, 87, 85, . . . , 5, 3, 1, 1, 3, 5, . . . , 85, 87, 89 of the original frames; and
- a second loop including frames 1, 3, 7 . . . , 89, 89, 87, 85, . . . , 5, 3, 1, 1, 3, 5, . . . , 85, 87, 89, 89, 87, 85, 5, 3, 1, 1, 3, 5, . . . , 86, 87, 89 of the original frames After which, the appended stack can then be appended to the Boomi stack (step 1364), which contains the video for the Boomi effect and is then returned to the call function, and this subroutine can stop (step 1366).

In this scenario, the first segment 830-S1 received the Boomi effect, and the second segment 830-S2 is normal with no frames altered, added or deleted.

APPENDIX XX—SCENARIO 1

The following Boomi process example below shows a step by step look at the contents of the memory buffer that contain each individual frames as they are generated as a run time results, which may be used for the purpose of accomplishing the Boomi process under scenario 1.

---

Example—Scenario 1

Scenario 1:
1.     Number of Live Boomi segments = 2
2.     Boomi Segment Position is the first segment.
3.     camera fps = 30
function call to "build_live_boomi_input" to build the $video_buffer and $live_boomi_input
function call to get_live_boomi_presets yields:
$live_boomi_presets[1].loops = 2
$live_boomi_presets[1].speed = 2
$live_boomi_presets[1].direction = "reverse"
$live_boomi_presets[2].loops = 3
$live_boomi_presets[2].speed = 3
$live_boomi_presets[2].direction = "forward"
Building the $live_boomi_input variables yields:
$live_boomi_input[1].starting_frame_number = 1
$live_boomi_input[1].ending_frame_number = 90
$live_boomi_input[1].loops = 2
$live_boomi_input[1].speed = 2
$live_boomi_input[1].direction = "reverse"
$live_boomi_input[2].starting_frame_number = 91
$live_boomi_input[2].ending_frame_number = 227
$live_boomi_input[2].loops = 0
$live_boomi_input[2].speed = null
$live_boomi_input[2].direction = null
The build_live_boomi_input function generates the frames in $video_buffer as follows:
$video_buffer contains frames 1-227.
Frame # 1:              # start of the boomi effect
Frames # 2 thru # 89:    # Boomi effect body
Frames # 90:          # end of the boomi effect
Frames # 91:          # start of normal segment
Frames # 92 thru # 226:  # normal segment
Frames # 227:         # end of normal segment and video
function call to "split_videos($video_buffer, $boomi_input);" to split the $video_buffer into $segments according to the value of $live_boomi_input.
$segments[1] Frames: 1 thru 90        (90 frames, boomi effect)
$segments[2] Frames: 91 thru 227      (137 frames, normal segment)
Total number of frames before boomi effect: 227
function call to "apply_boomi($video_segments,$boomi_input);" applies the boomi effect on the segments that require the boomi effect and returns one video stream that contains every segment combined.
for $segments[1], # Boomi effect required
        $live_boomi_input[1].starting_frame_number = 1
        $live_boomi_input[1].ending_frame_number = 90
        $live_boomi_input[1].loops = 2
        $live_boomi_input[1].speed = 2
        $live_boomi_input[1].direction = "reverse"
        drops the frames according to the speed
        $stack = frames 1,3,5,7 ... 85, 87, 89
        check to see if we need to "reverse". Create 2 new variables to hold the processed frames.
        $reverse_stack = frames 89,87,85,83, ... 5, 3, 1      (45 frames)
        $forward_stack = frames 1,3,5, ...85,87,89          (45 frames)
        execute required number of times to generate the following:
        #        Append the frames in the $reverse_stack and $forward_stack to the stack 2 times
        $stack.append_frame($reverse_stack);
                first loop: $stack = frames 1,3,7...,89,89,87,85,...,5,3,1 of the original frames (90 frames)
                second loop: $stack = frames 1,3,7...,89,89,87,85,...,5,3,1,1,3,5,...,85,87,89,89,87,85,...5,3,1 of the original frames (180 frames)

Example—Scenario 1

```
        $stack.append_frame($forward_stack);
                first loop: $stack = frames 1,3,7...,89,89,87,85,...,5,3,1,1,3,5,...,85,87,89 of the
original frames (135 frames)
                second loop: $stack = frames
1,3,7...,89,89,87,85,...,5,3,1,1,3,5,...,85,87,89,89,87,85,...5,3,1,1,3,5,...,86,87,89 of the original
frames (225 frames)
        Appending the $stack to $boomi_stack:
        $boomi_stack Frames:         1 thru 225 as show above.
        Total Frames: 137
for $segments[2], # No boomi effect required
        append the $segment to $boomi_stack
        $boomi_stack Frames:
1,3,7...,89,89,87,85,...,5,3,1,1,3,5,...,85,87,89,89,87,85,...5,3,1,1,3,5,...,86,87,89 (of the original
frames), 226 thru 318 (originally, frames 91 thru 227 in $segments[2])
        Total number of frames after boomi effect: 225 + 137 = 362
return $boomi_stack which contains the video for the boomi effect
```

Figure 85:
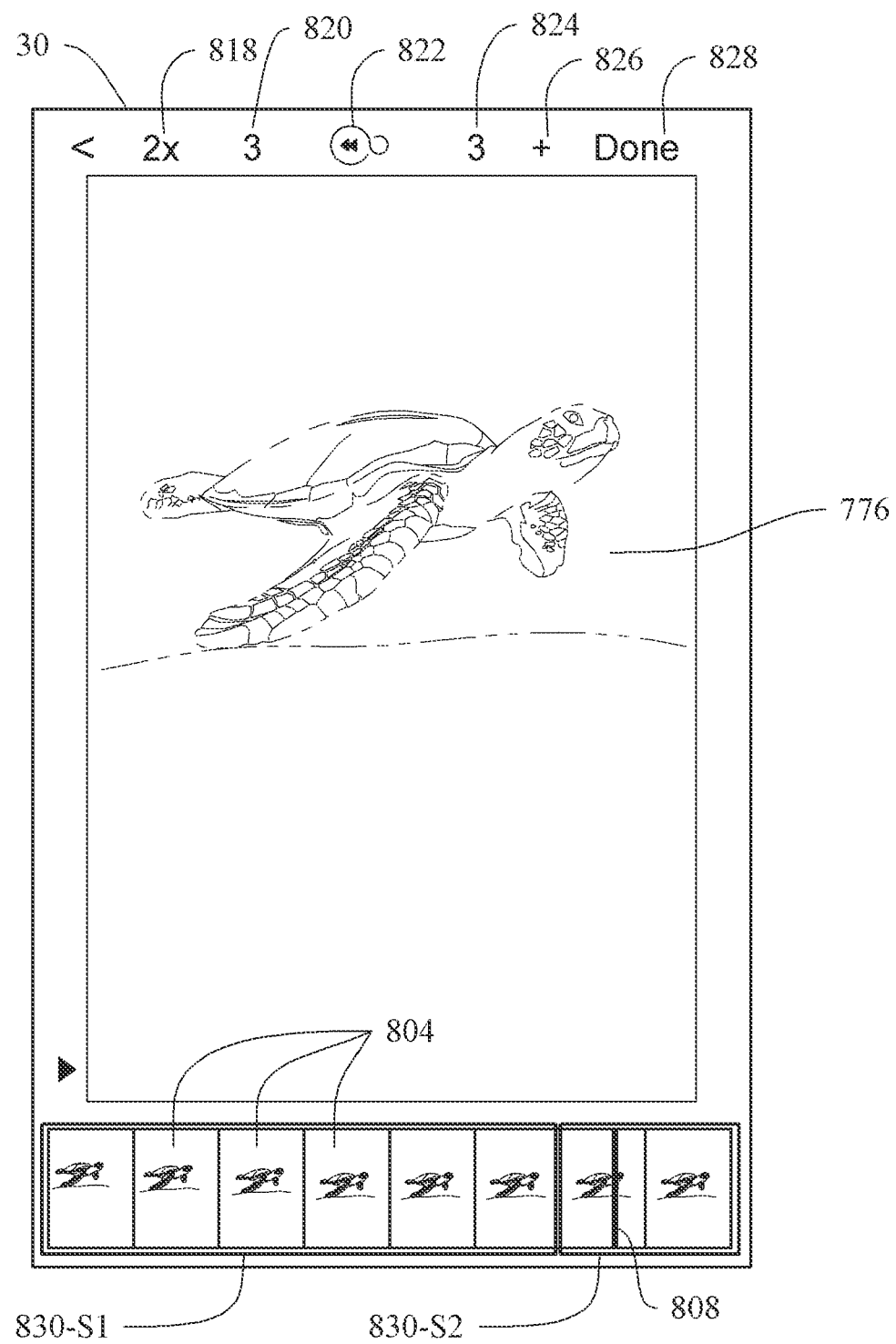
FIG. 85 is a sample GUI screenshot of a "Camera View" of the device employing the GUI with a Boomi option activated showing the two live Boomi segments of an exemplary scenario 2.
Figure 86:
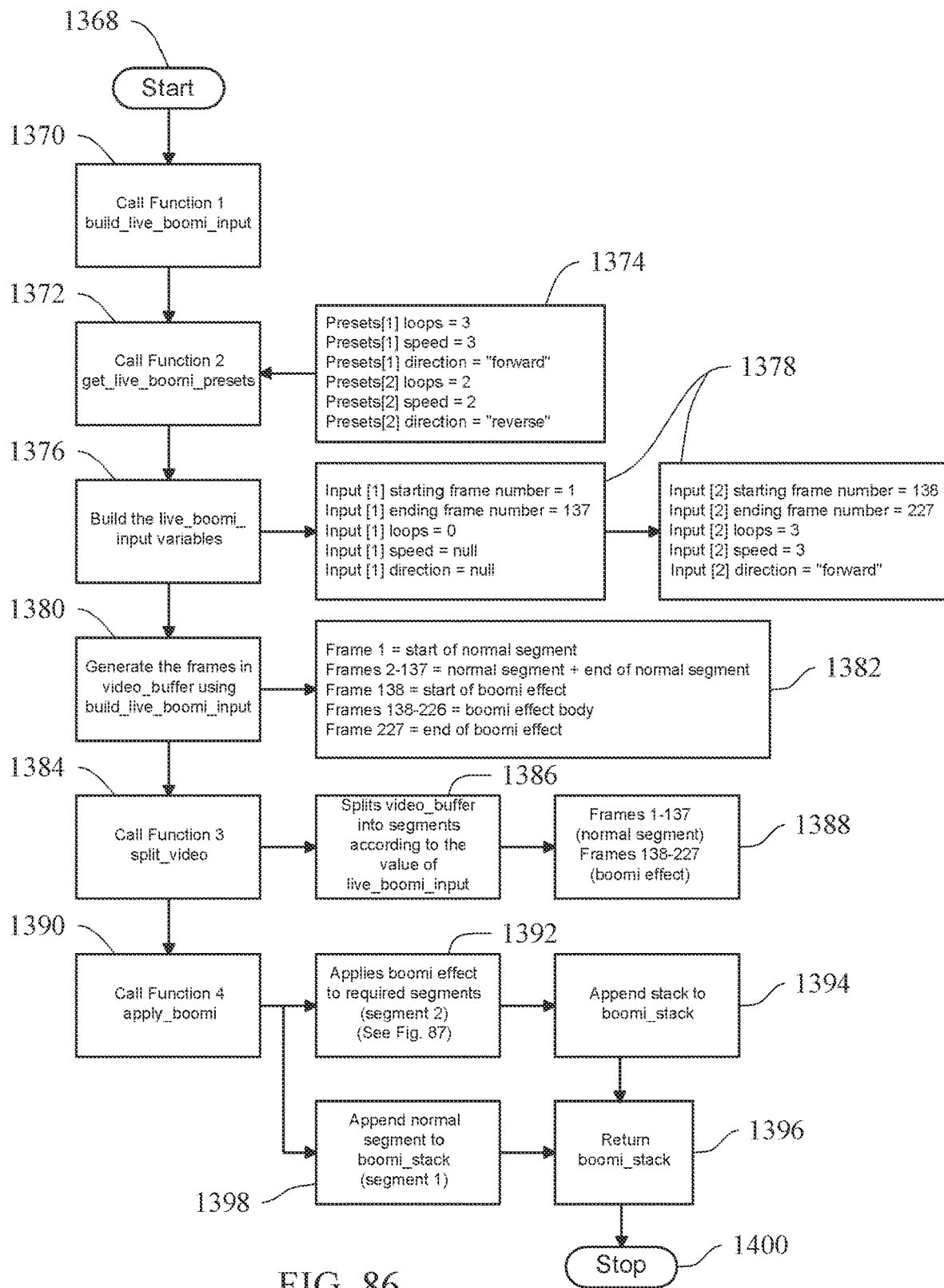
FIG. 86 is a flow chart of an exemplary scenario 2 including two live Boomi segments, with the second segment being the Boomi effect segment, and the camera fps is 30.
Figure 87:
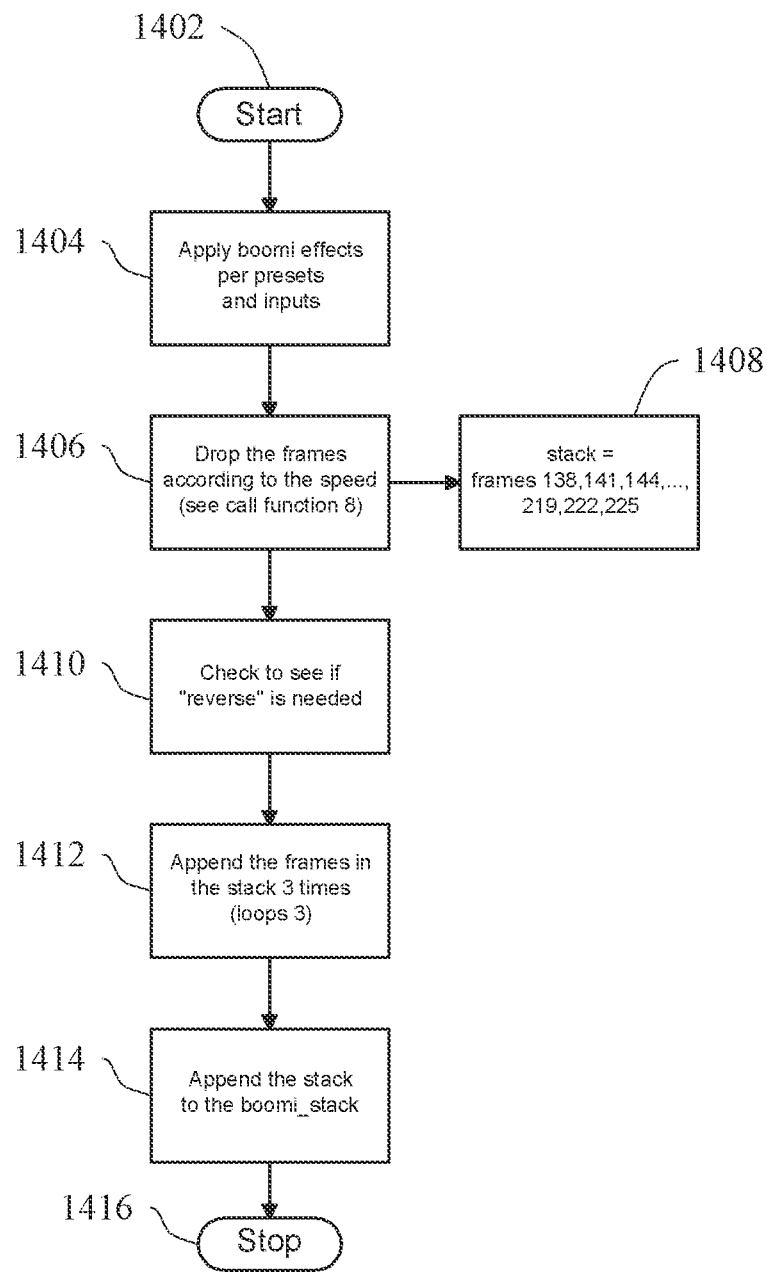
FIG. 87 is a flow chart of an example of the apply Boomi subroutine for the required segment of the exemplary scenario 2 in FIG. 86.

In exemplary scenario 2, as best illustrated in FIGS. 85-87, the number of live Boomi segments is 2, and the Boomi segment position is the second segment 830-S2, and the camera is operating at 30 fps.

For this scenario, two live Boomi loop segments have been selected 830-S1, 830-S2, with the second segment 830-S2 being selected as the Boomi segment position, as best illustrated in FIG. 85. The second segment 830-S2 can be different color, thickness, line type, brightness, pattern or other characteristic to that of the first segment 830-S1. The loop boxes 830-S1, 830-S2 can surround the frames that are part of that loop segment, and the size, length or configuration of each of the loop boxes 830-S1, 830-S2 can be adjusted to remove or add frame to the loop segment. Further, multiple loop boxes can be displayed or utilized to represent multiple loops. The loop boxes 830-S1, 830-S2 can have a characteristic (e.g. color, line type, line weight, etc.) different to that of, but not limited to, the time playing bar 808 or the frames.

Referring to FIG. 86, the exemplary scenario 2 Boomi process can be initiated (step 1368), with Method 1 being utilized since the audio/video data stream is being provided from the electronic devices' camera and microphone. Next, this process can initiate call function 1 (step 1370) to build the video buffer and the live Boomi input. Then call function 2 can be initiated (step 1372) to get the live Boomi presets (step 1374). In this scenario, the presets can be:

live boomi presets[1].loops=3
live boomi presets[1].speed=3
live boomi presets[1].direction="forward"
live boomi presets[2].loops=2
live boomi presets[2].speed=2
live boomi presets[2].direction="reverse"

Additionally, the call function 2 can then build the live Boomi input variables (steps 1376 and 1378) including.

live boomi input[1].starting_frame_number=1
live boomi input[1].ending_frame_number=137
live boomi input[1].loops=0
live boomi input[1].speed=null
live boomi input[1].direction=null
live boomi input[2].starting_frame_number=138
live boomi input[2].ending_frame_number=227
live boomi input[2].loops=3
live boomi input[2].speed=3
live boomi input[2].direction="forward"

After which, the build live Boomi input function can generate the frames in the video buffer (step 1380). This results in the video buffer containing 1-227 frames separated into two segments (step 1382), characterized as:

Frame #1 being the start of the normal segment
Frames #2-137 being the normal segment+end of the normal segment
Frame #138 being the start of the Boomi effect
Frames #138-226 being the Boomi effect body
Frame #227 being the end of the end of the Boomi effect Then, process can proceed to call function 3 (step 1384) to split the video buffer into segments according to the value of the live Boomi input (step 1386). Resulting in frames 1-137 being the normal segments and frames 138-227 being the Boomi effect segment (step 1388).

After the video buffer is split, call function 4 can be initiated (step 1390) to apply the Boomi effect on the segments that require it, this being the second segment including frames 138-227 (step 1392).

After the Boomi effect has been applied, the second segment can be appended to the Boomi stack (step 1394), and the normal segment being the first segment including frames 1-137 can be appended to the Boomi stack (step 1398).

The Boomi stack can then be returned for display and/or storage (step 1396) and the process can stop (step 1400).

Referring to FIG. 87, the step of applying the Boomi effect can be initiated (step 1402), which applies the Boomi effect to the second segment per the Boomi presets and input (step 1404). In this scenario, the inputs for the second segment (frames 138-227) include 3 loops, a speed of 3 and a direction of "forward". This results in the dropping of frames according to the loops and speed input (step 1406), resulting in a stack including frames 138, 141, 144, ..., 219, 222, 225 (step 1408). This frame dropping operation can be accomplished by initiating the call function 8 subroutine shown in FIG. 80. It can be appreciated that every second and third frame in the stack sequence has been drooped, which corresponds with the speed=3 input.

Next, the process can check to see if the direction of the Boomi segment is "reverse" (step 1410). In this scenario, the result is no, which initiates the fast motion subroutine of call function 4 and the call function 8 subroutine, as per the subroutines shown in FIGS. 76 and 80.

After which, the frames in the stack (forward stack) can be appended to the stack 3 times (step 1412) as per the loops=3 input. This results in an appended stack of the forward stack containing:

a first loop including frames 138, 141, 144, ..., 219, 222, 225 of the original frames;

a second loop including frames 138, 141, 144, . . . , 219, 222, 225, 138, 141, 144, . . . , 219, 222, 225 of the original frames; and a third loop including frames 138, 141, 144, . . . , 219, 222, 225, 138, 141, 144, . . . , 219, 222, 225, 138, 141, 144, . . . , 219, 222, 225 of the original frames After which, the appended stack can then be appended to the Boomi stack (step 1414), which contains the video for the Boomi effect and is then returned to the call function, and this subroutine can stop (step 1416).

In this scenario, the second segment 830-S2 received the Boomi effect, and the first segment 830-S1 is normal with no frames altered, added or deleted.

APPENDIX XXI—SCENARIO 2

The following Boomi process example below shows a step by step look at the contents of the memory buffer that contain each individual frames as they are generated as a run time results, which may be used for the purpose of accomplishing the Boomi process under scenario 2.

Example—Scenario 2

```
Scenario 2:
1.      Number of Live Boomi segments = 2
2.      Boomi Segment Position is the 2nd segment
3.      camera fps = 30
function call to "build_live_boomi_input" to build the $video_buffer and $live_boomi_input
function call to get_live_boomi presets yields:
$live_boomi presets[1].loops = 3
$live_boomi_presets[1].speed = 3
$live_boomi_presets[1].direction = "forward"
$live_boomi_presets[2].loops = 2
$live_boomi_presets[2].speed = 2
$live_boomi_presets[2].direction = "reverse"
Building the $live_boomi_input variables yields:
$live_boomi_input[1].starting_frame_number = 1
$live_boomi input[1].ending_frame_number = 137
$live_boomi_input[1].loops = 0
$live_boomi_input[1].speed = null
$live_boomi_input[1].direction = null
$live_boomi_input[2].starting_frame_number = 138
$live_boomi_input[2].ending_frame_number = 227
$live_boomi_input[2].loops = 3
$live_boomi_input[2].speed = 3
$live_boomi_input[2].direction = "forward"
The build_live_boomi_input function generates the frames in $video_buffer as follows:
$video_buffer contains frames 1-227.
Frames # 1:               # start of the normal segment
Frames # 2 thru # 137:    # the normal segment + end of normal segment
Frames # 138:             # Start of the boomi effect
Frames # 138 thru # 226:  # boomi effect body
Frames # 227:             # end of the boomi effect
function call to "split_videos($video_buffer, $boomi_input);" to split the $video_buffer into
$segments according to the value of $live_boomi_input.
$segments[1] Frames: 1 thru 137          (137 frames, normal segment)
$segments[2] Frames: 138 thru 227 (90 frames, boomi effect)
Total number of frames: before boomi effect: 227
function call to "apply_boomi($video_segments,$boomi_input);" applies the boomi effect on the
segments that require the boomi effect and returns one video stream that contains every segment
combined.
fast motion during boomi effect builds:
for $segments[1], # No boomi effect required
        $boomi_stack.append($segment);
        Appending the $segment to $boomi_stack:
        $boomi_stack Frames:       1 thru 137
        Total Frames: 137
for $segments[2], # Boomi effect required
        $live_boomi_input[2].starting_frame_number = 138
        $live_boomi_input[2].ending_frame_number = 227
        $live_boomi_input[2].loops = 3
        $live_boomi_input[2].speed = 3
        $live_boomi_input[2].direction = "forward"
        drops the frames according to the speed
        $stack = frames 138,141,144, ... ,219,222,225 (29 frames)
        passes we don't need to "reverse".
        executes required number of times to generate the following:
        #       Append the frames in the $stack to the stack 3 times
        $stack.append_frame($forward_stack);
                first loop:    $stack = frames 138,141,144,...,219,222,225 of the original frames
(29 frames)
                second loop:   $stack = frames
138,141,144,...,219,222,225,138,141,144,...,219,222,225 of the original frames (58 frames)
                third loop:    $stack = frames
138,141,144,...,219,222,225,138,141,144,...,219,222,225,138,141,144,...,219,222,225 of the
original frames (87 frames)
        Appending the $stack to $boomi_stack:
        $boomi_stack Frames:       1 thru 137 (the original frames as
```

| Example—Scenario 2 |
| --- |
| recorded),138,141,144,...,219,222,225,138,141,144,...,219,222,225,138,141,144,...,219,222,225<br>Total number of frames after boomi effect: 137 + 87 = 224 total frames<br>return $boomi_stack which contains the video for the boomi effect |

Figure 88:
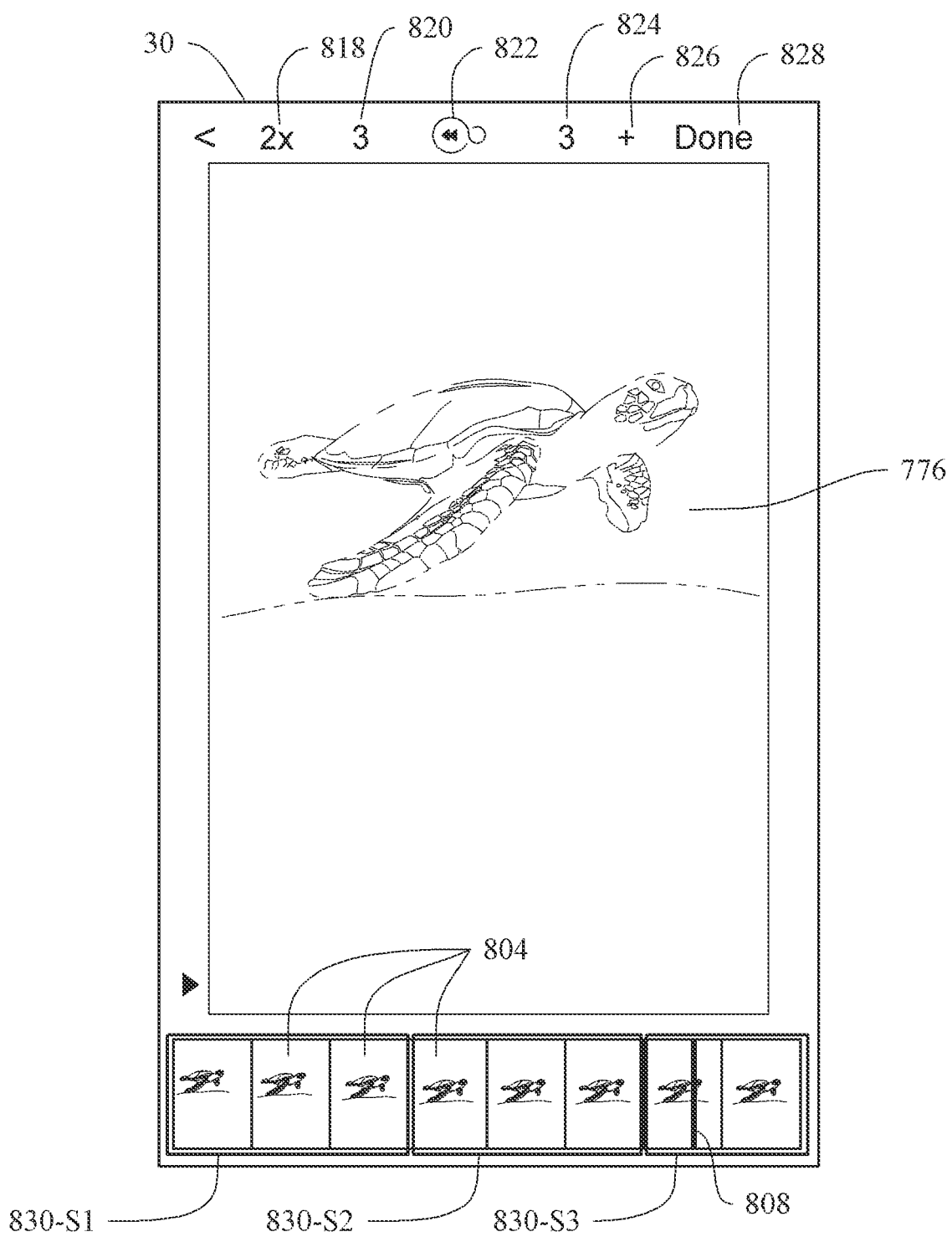
FIG. 88 is a sample GUI screenshot of a "Camera View" of the device employing the GUI with a Boomi option activated showing the three live Boomi segments of an exemplary scenario 3.
Figure 89:
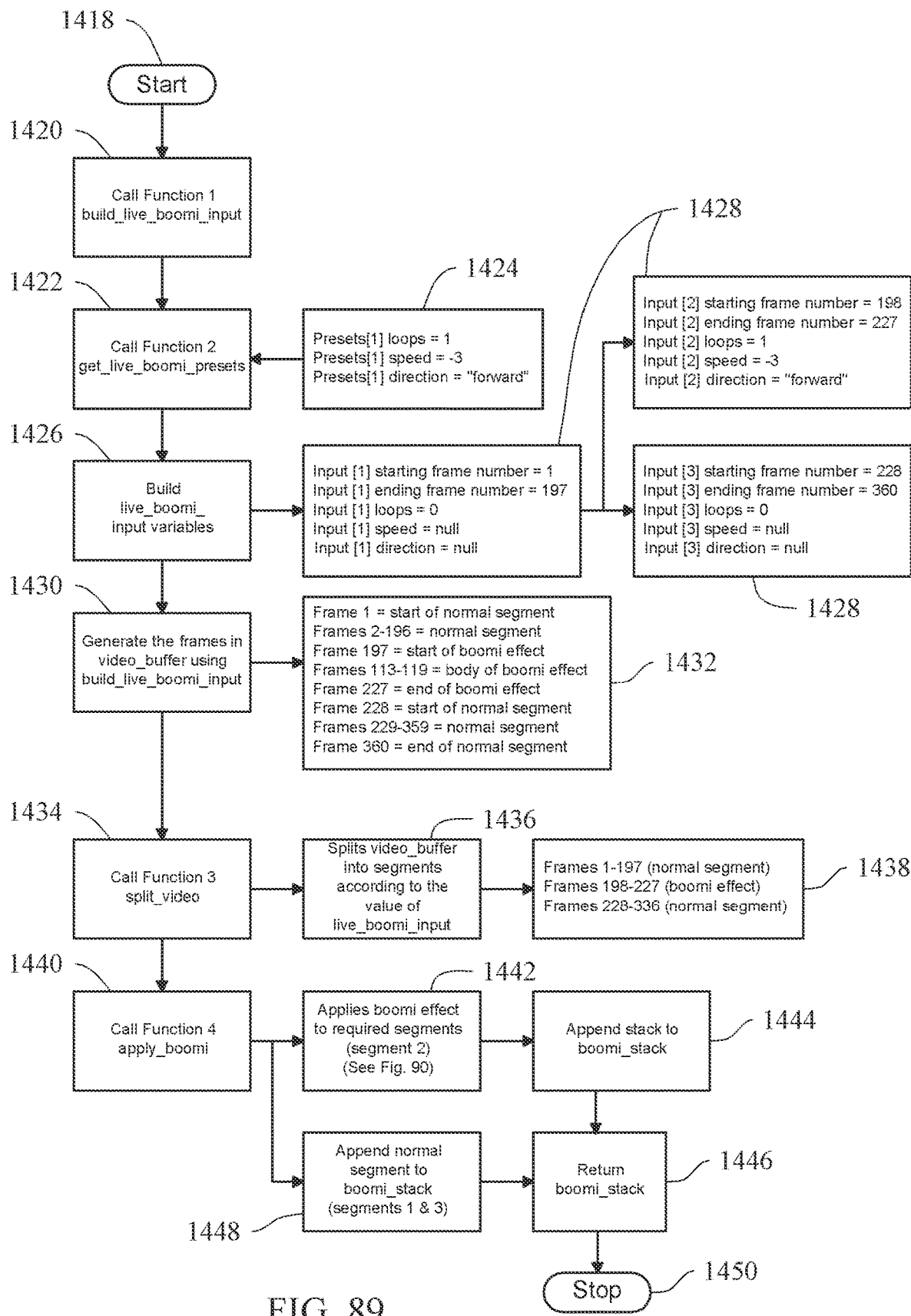
FIG. 89 is a flow chart of an exemplary scenario 3 including three live Boomi segments, with the middle segment being the Boomi effect segment, and the camera fps is 30.
Figure 90:
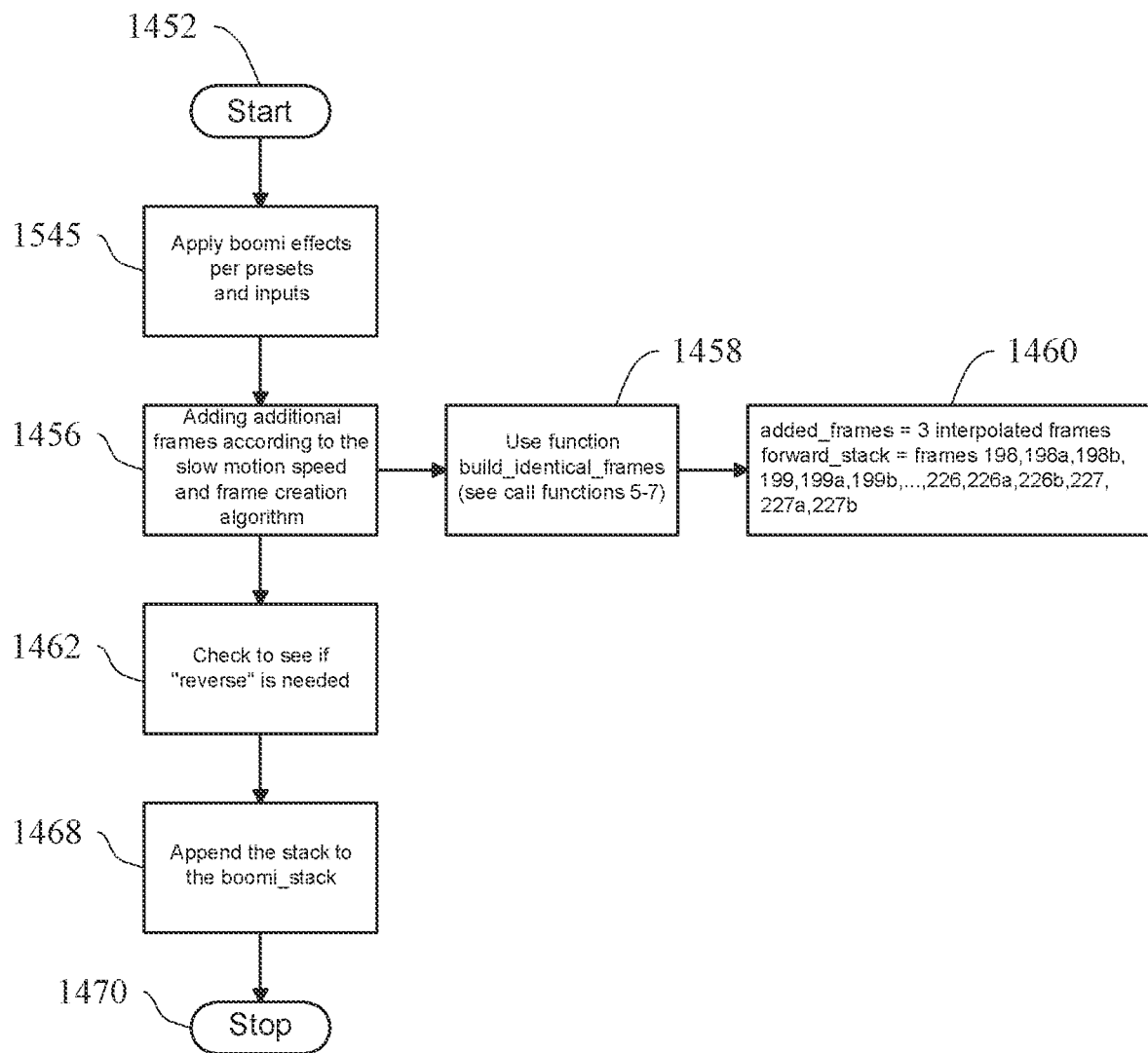
FIG. 90 is a flow chart of an example of the apply Boomi subroutine for the required segment of the exemplary scenario 3 in FIG. 89.

In exemplary scenario 3, as best illustrated in FIGS. 88-90, the number of live Boomi segments is 3, and the Boomi segment position is the second (middle) segment 830-S2, and the camera is operating at 30 fps.

For this scenario, three live Boomi loop segments have been selected 830-S1, 830-S2, 830-S3 with the middle segment 830-S2 being selected as the Boomi segment position, as best illustrated in FIG. 88. The middle segment 830-S2 can be different color, thickness, line type, brightness, pattern or other characteristic to that of the first and third segments 830-S1, 830-S3. The loop boxes 830-S1, 830-S2, 830-S3 can surround the frames that are part of that loop segment, and the size, length or configuration of each of the loop boxes 830-S1, 830-S2, 830-S3 can be adjusted to remove or add frame to the loop segment. Further, multiple loop boxes can be displayed or utilized to represent multiple loops. The loop boxes 830-S1, 830-S2, 830-S3 can have a characteristic (e.g. color, line type, line weight, etc.) different to that of, but not limited to, the time playing bar 808 or the frames.

Referring to FIG. 89, the exemplary scenario 3 Boomi process can be initiated (step 1418), with Method 1 being utilized since the audio/video data stream is being provided from the electronic devices' camera and microphone. Next, this process can initiate call function 1 (step 1420) to build the video buffer and the live Boomi input. Then call function 2 can be initiated (step 1422) to get the live Boomi presets (step 1424). In this scenario, the presets can be:

live boomi presets[1].loops=1
live boomi presets[1].speed=
live boomi presets[1].direction="forward"

Additionally, the call function 2 can then build the live Boomi input variables (steps 1426 and 1428) including:

live boomi input[1].starting_frame_number=1
live boomi input[1].ending_frame_number=197
live boomi input[1].loops=0
live boomi input[1].speed=null
live boomi input[1].direction=null
live boomi input[2].starting_frame_number=198
live boomi input[2].ending_frame_number=227
live boomi input[2].loops=1
live boomi input[2].speed=3
live boomi input[2].direction="forward"
live boomi input[3].starting_frame_number=228
live boomi input[3].ending_frame_number=360
live boomi input[3].loops=0
live boomi input[3].speed=null
live boomi input[3].direction=null After which, the build live Boomi input function can generate the frames in the video buffer (step 1430). This results in the video buffer containing 1-360 frames separated into three segments (step 1432), characterized as.

Frame #1 being the start of the normal segment
Frames #2-196 being the normal segment+end of the normal segment
Frame #197 being the start of the Boomi effect
Frames #198-226 being the Boomi effect body
Frame #227 being the end of the end of the Boomi effect
Frame #228 being the start of the normal segment
Frames #229-359 being the normal segment
Frame #360 being the end of the normal segment Then, process can proceed to call function 3 (step 1434) to split the video buffer into segments according to the value of the live Boomi input (step 1436). Resulting in frames 1-197 being the normal segments, frames 198-227 being the Boomi effect segment, and frames 229-360 being another normal segment (step 1438).

After the video buffer is split, call function 4 can be initiated (step 1440) to apply the Boomi effect on the segments that require it, this being the second (middle) segment including frames 198-227 (step 1442).

After the Boomi effect has been applied, the second segment can be appended to the Boomi stack (step 1444), and the normal segments being the first and third segments including frames 1-197 and 228-360 can be appended to the Boomi stack (step 1448).

The Boomi stack can then be returned for display and/or storage (step 1446) and the process can stop (step 1450).

Referring to FIG. 90, the step of applying the Boomi effect can be initiated (step 1452), which applies the Boomi effect to the second (middle) segment per the Boomi presets and input (step 1454). In this scenario, the inputs for the second segment (frames 198-227) include 1 loop, a speed of −3 and a direction of "forward". This results in the adding of 2 frames according to the loops and speed input (step 1456), resulting in a stack including 3 interpolated frames 198, 198a, 198b, 199, 199a, 199b, . . . , 226, 226a, 226b, 227, 227a, 227b (step 1460). It can be appreciated that the frames with the suffix "a" and "b" have been added by interpolation. The adding of the additional frames can be accomplished by initiated any one of call functions 5-7 as shown in FIGS. 77-79, respectively.

Next, the process can check to see if the direction is "reverse" (step 1462). In this scenario the result is no, but with a three times (−3) the normal speed attribute, which initiates the slow motion subroutine of call function 4. Thereby the process will add additional frames according to the slow motion speed and frame creation algorithm of call function 7 to build identical frames, as per the subroutines shown in FIGS. 76 and 79.

After each frame in the second segment has been copied two times and added to the segment to create a forward stack, then this forward stack can be appended to the stack 1 times (step 1464) as per the loops=1 input. This results in an appended forward stack containing:

first loop including frames 198, 198a, 198b, 199, 199a, 199b, . . . , 226, 226a, 226b, 227, 227a, 227b, 198, 198a, 198b, 199, 199a, 199b, . . . , 226, 226a, 226b, 227, 227a, 227b of the original frames After which, the appended forward stack can then be appended to the Boomi stack (step 1468), which contains the video for the Boomi effect and is then returned to the call function, and this subroutine can stop (step 1470).

In this scenario, the second (middle) segment 830-S2 received the Boomi effect, and the first and third segments 830-S1, 830-S3 are normal with no frames altered, added or deleted.

APPENDIX XXII—SCENARIO 3

The following Boomi process example below shows a step by step look at the contents of the memory buffer that contain each individual frames as they are generated as a run time results, which may be used for the purpose of accomplishing the Boomi process under scenario 3.

| Example—Scenario 3 |
|---|

Scenario 3:
1.       Number of Live Boomi segments = 3
2.       Boomi Segment Position is the middle segment
3.       camera fps = 30
function call to "build_live_boomi_input" to build the $video_buffer and $live_boomi_input
function call to get_live_boomi_presets yields:
$live_boomi_presets[1].loops = 1
$live_boomi_presets[1].speed = −3
$live_boomi_presets[1].direction = "forward"
Building the $live_boomi_input variables yields:
$live_boomi_input[1].starting_frame_number = 1
$live_boomi_input[1].ending_frame_number = 197
$live_boomi_input[1].loops = 0
$live_boomi_input[1].speed = null
$live_boomi_input[1].direction = null
$live_boomi_input[2].starting_frame_number = 198
$live_boomi_input[2].ending_frame_number = 227
$live_boomi_input[2].loops = 1
$live_boomi_input[2].speed = −3
$live_boomi_input[2].direction = "forward"
$live_boomi_input[3].starting_frame_number = 228
$live_boomi_input[3].ending_frame_number = 360
$live_boomi_input[3].loops = 0
$live_boomi_input[3].speed = null
$live_boomi_input[3].direction = null
The build_live_boomi_input function generates the frames in $video_buffer as follows:
$video_buffer contains frames 1-360
Frames # 1:                # start of the normal segment
Frames # 2 thru # 196:      # the normal segment
Frames # 197:              # Start of the boomi effect
Frames # 198 thru # 226     # body of the boomi effect
Frames # 227:              # End of the boomi effect
Frames # 228:              # start of normal segment
Frames # 229 thru # 359:      # normal segment
Frames # 360:              # end of normal segment and video
function call to "split_videos($video_buffer, $boomi_input);" to split the $video_buffer into
$segments according to the value of $live_boomi_input.
$segments[1] Frames: 1 thru 197    (197 frames, normal segment)
$segments[2] Frames: 198 thru 227 (30 frames, boomi effect)
$segments[3] Frames: 228 thru 360 (133 frames, normal segment)
Total number of frames: before boomi effect: 360
function call to "apply_boomi($video_segments, $boomi_input);" applies the boomi effect on the segments that require the boomi effect and returns one video stream that contains every segment combined.
fast motion during boomi effect builds:
$segments[1], # No boomi effect required
      $boomi_stack.append($segment);
      Appending the $segment to $boomi_stack:
          $boomi_stack Frames:       1 thru 197 (197 frames)
$segments[2], # Slow motion Boomi effect required
      $live_boomi_input[2].starting_frame_number = 198
      $live_boomi_input[2].ending_frame_number = 227
      $live_boomi_input[2].loops = 1
      $live_boomi_input[2].speed = −3
      $live_boomi_input[2].direction = "forward"
      adding additional frames according to the slow motion speed and frame creation
algorithm.
      In this example, use function build_identical_frames
      $added_frames = 3 interpolated frames
      $forward_stack = frames 198,198a,198b,199,199a,199b,...,226,226a,226b,227,227a,227b
(90 frames)
      because $live_boomi_input[2].direction = "forward"
      passes we don't need to "reverse".
      yields:
      #      Append the frames in the $stack to the stack 1 times ($live_boomi_input[2].loops
= 1)
      $stack.append_frame($forward_stack);
          first loop:      $stack = frames 198,198a,198b,...,227,227a,227b,198,198a,198b,
...227,227a,227b (180 frames)
      Appending the $stack to $boomi_stack:
          $boomi_stack Frames:      1 thru
197,198,198a,198b,...,227,227a,227b,198,198a,198b,...,227,227a,227b
      Total Frames so far: 197 + 180 = 377 frames)
$segments[3], # No boomi effect required
      $boomi_stack.append($segment);
      Appending the $segment to $boomi_stack:
          $boomi_stack Frames:      1 thru
197,198,198a,198b,199,199a,199b,...,227,227a,227b, 198,198a,198b,1...,227,227a,227b,228 thru 360 (510 frames)

-continued

Example—Scenario 3

Figure 91:
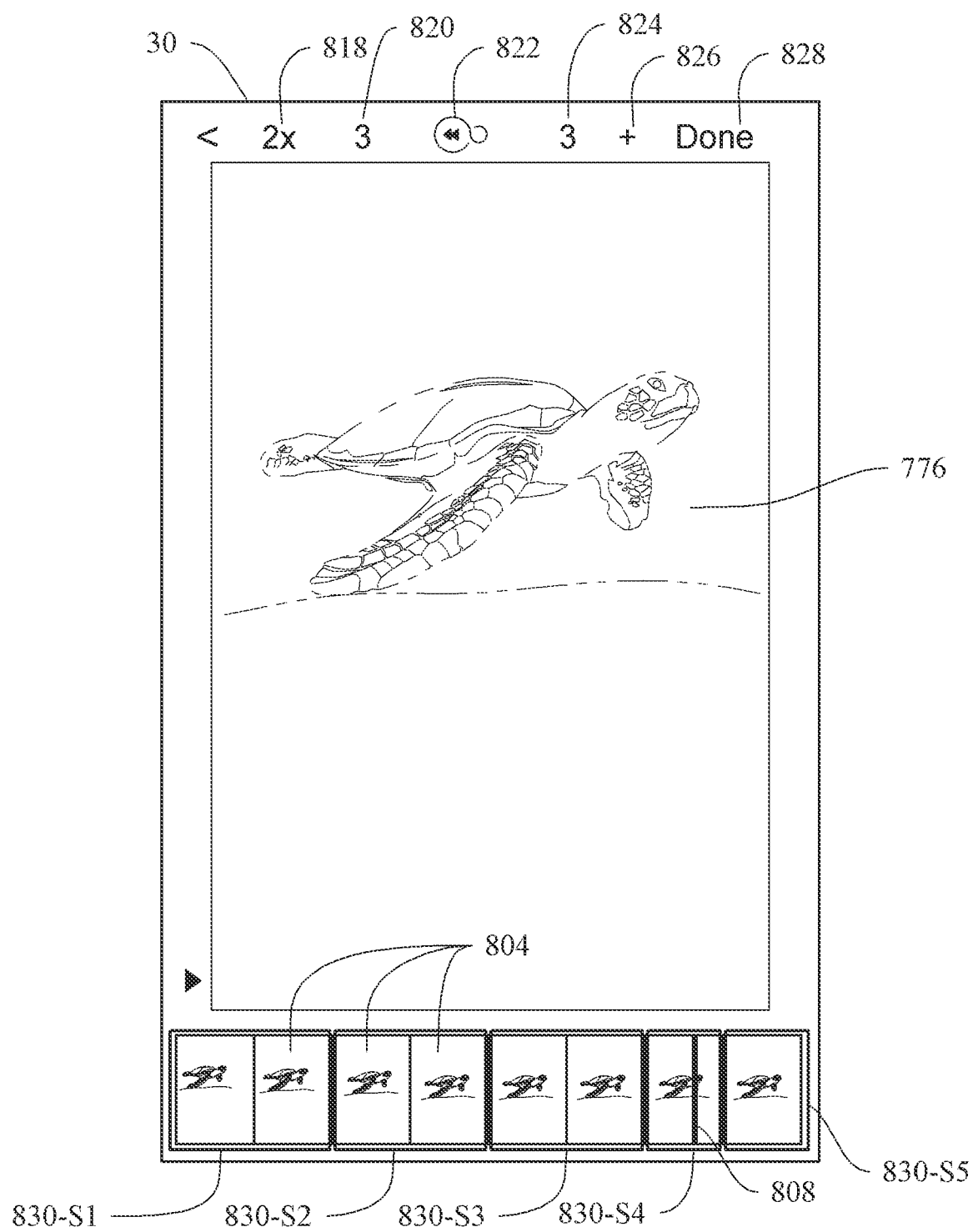
FIG. 91 is a sample GUI screenshot of a "Camera View" of the device employing the GUI with a Boomi option selected showing five live Boomi segments with segments 2 and 4 being the Boomi effect segments.

Total number of frames: 377 + 150 = 527
return $boomi_stack which contains the video for the boomi effect Referring to FIG. 91, an additional exemplary screenshot of the GUI 30 is illustrated, which shows the number of live Boomi segments is five 830-S1 to 830-S5 with the Boomi segment positions being the second and fourth segments 830-S2, 830-S4. The non-Boomi segments being the first, third and fifth segments 830-S1, 830-S3, 830-S5. The Boomi segments 830-S2, 830-S4 can be different color, thickness, line type, brightness, pattern or other characteristic to that of the non-Boomi segments 830-S1, 830-S3, 830-S5. Further, the Boomi segments can be different in color, thickness, line type, brightness, pattern or other characteristic from each other. This can indicate which Boomi segment is actively being edited and which is not actively being edited. For example, the second segment 830-S2 can include a RED frame around its selected frames indicating that it is currently not being edited, while the fourth segment 830-S4 can include a GREEN frame around its selected frames indicating that it is actively being edited.

In an exemplary use, as best illustrated in FIGS. 82, 85, 88 and/or 91, a video stream can be captured on the electronic device's camera or a pre-recorded video can be loaded into the Boomi editor. The frames 804 of the video stream can be displayed to the user in sequence via the GUI 30. The user can select one or more frames 804 to apply a Boomi effect thereto, with these frames being surrounded or enclosed by a moveable and adjustable box 830. Once the frames are selected by the Boomi box, then these frames are associated with a Boomi segment(s). The user can select to add "+" 826 additional Boomi segment(s) from the video stream, which applies an additional moveable and adjustable box on the frames 804 to select the frames associated with the additional Boomi segment(s). For example, the boxes 830-S1 in FIG. 82, 830-S2 in FIGS. 85 and 88, and 830-S2 and 830-S4 in FIG. 91 represent the Boomi segments. The user can further select a playback speed 818, the number of loops 820, a forward/reverse direction 822, and the number of seconds 824 associated with the loops for each Boomi segment(s).

After the Boomi effect attributes have been selected for each Boomi segment, which can be selected and applied while the video stream is playing, the Boomi process will play the video stream from the first frame until it reaches the first frame of a Boomi segment. At this point, the Boomi process will play the Boomi segment with all its Boomi effects. This can include a different speed, a different number of playback loops, a different direction, and/or a different number of seconds for the loops. Once the Boomi segment has completed playing, based on its Boomi effect attributes, then video stream continues to play any next segment of frames directly following the last frame of the Boomi segment. This could be another Boomi segment with different Boomi effects, or a normal segment.

Using exemplary scenario 3 as an example, upon opening the Boomi app or editor and capturing a video stream or loading a video stream into the Boomi editor, the user selected segment 2 (frames 196-227) for Boomi effect. The user assigned Boomi effect attributes (step 1428) to the Boomi segment. The Boomi process determined any appropriate subroutines and applied the Boomi effects to the Boomi segment. The non-Boomi and Boomi segments were appended into one continuous video stream and played to the user via the GUI 30.

The playing of the resultant video stream could be described as playing the first segment (frames 1-196) as normal speed with no changes, and then playing the Boomi segment (frames 197-227) as 1 loop in a forward direction at a slow motion speed of −3 or three times slower than the original speed. Once the Boomi segment completed its play, then the third segment (frames 228-360) will play at normal speed with no changes.

If the user selected 2 loops for the Boomi segment, then this portion of the video stream would be played 2 times. Additionally, if the user selected a fast motion speed of 2 or twice as fast as the original speed in combination with the 2 loops, then this Boomi segment of the video stream would play twice as fast as the non-Boomi segments and with two loops.

In the present description, for purposes of explanation, numerous specific details are set forth in order to provide a thorough understanding of the present technology. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

A possible method of using the Boomi effect of the present technology is illustrated in FIG. 92. A user can launch an application software (App) on a device capable of running the App, utilizing a user interface of the present technology. The App can open in an image composition screen, which can be as a default setting. As discussed above, favorite or predetermined settings can optionally be selectable by the user, and device settings can be applied and the device is in a ready state, while optionally still in the image composition screen.

The user can start recording, utilizing the device's camera, a remote camera or a remote video stream, by touching or touching/holding a "Record" affordance associated with the App or user interface to provide video data input for utilization by the App. One aspect can be that the icon or a button associated with the icon can be animated to indicate a live recording is active. Optionally, the user can open a file from the device's memory or from a remote memory accessible by the App as the video data input.

The App can then receive the video data as input and can store the frames in a video buffer, which can be accessible by subroutines. The video data can be displayed to the user in a video display region, and the frames of the video data can be displayed to the user in a video frame display region of the user interface.

The user can the select one or more frames in the video frame display region to create one or more special effects segments for applying special effects thereto. The App can then initiate a subroutine that can split the vide date into one or more special effects and one or more normal segments.

Further, the user can provide a speed parameter, a number of loop parameter, a direction parameter and/or a loop time (number of seconds for each loop) parameter utilizing the user interface.

The App then initiates subroutines associated with any of the speed parameter, the number of loop parameter, the direction parameter and/or the loop time parameter. These subroutines can then apply their corresponding special effects to the special effects segments separately and respectively, to create one or more special effect output segments.

The special effect output segments and any normal segments are combined to create a continuous output video, which can be displayed in the video display region and/or the App can save the output video to the device's internal memory, to an external memory and/or to the cloud.

The App can further provide an option allowing the user to post the final video to social media platform. The App can upload the final video onto additional platforms and/or clouds, and display the composition screen allowing the user to start recording a new video.

In the alternative, it can be appreciated that the first or native speed rate of the video data can be modified or changed to the modified speed rate when a finger touches the display screen or GUI 30, and then revert from the modified speed rate to the first or native speed rate when the finger is taken off the screen, or vice versa. This operation can be accomplished by the processing unit while the video data is being played on the GUI 30 in real time utilizing any of the video modification processes described with the present technology. This operation can further be accomplished with a pointing device instead of finger touch, in that the first or native speed rate is modified or changed to the modified speed rate when the point device is activated or aimed at the display screen, and then revert to the first or native speed rate when the pointing device is deactivated or aimed away from the display screen.

Alternatively, the GUI 30 can be configured or configurable to utilize additional user feedback associated with the device implementing the present technology. This feedback can use vibration frequency and intensity, and 3D tactile to indicate the zoom, speed factors, and/or other operational factors.

In use, it can now be understood that a user could initiate a camera operation using an electronic device that includes or is operably associated with the present technology software application, or the user could initiate camera operation using present technology software application that is operably associated with the camera.

Upon operation of the present technology software application, a user interface is provided to the user for controlling the functions of the present technology software application and/or the camera.

The user can initiate a recording function of the camera using the interface, at which time the present technology software application would receive any raw video data from the camera or remote video feed, which can be associated with a microphone or a peripheral microphone(s). During this operation, the raw video data from the camera and/or microphone is diverted to the present technology software application instead of a memory unit, which would normally receive the raw data from the camera.

The interface provides a simple input from the user to control the recording speed rate of the raw video data received from the camera. For exemplary purposes, this input by the user on the interface can be movement across a portion of a touchscreen or pressure applied to a portion of the touchscreen. It can be appreciated that this input can come in a variety of forms such as, but not limited to, movement of a cursor, voice commands, activation of icons, operation of switches or buttons, on-screen gestures, infrasonic devices, and the like.

If the user does not provide input to change the speed rate, then the raw video data from the camera is displayed and is written to memory.

Alternatively, if the user does provide input to change the speed rate, then the raw video data is processed using the present technology software application and its associated algorithms in real time. The raw video data includes one or more frames, and these frames processed to create in a final video data stream that corresponds to the speed rate inputted by the user.

This is accomplished utilizing the present technology software application to create a modified video data stream. This modified video data stream can be created by dropping specifically identified frames from the raw video data or adding frames to the raw video data by copying specially identified frames and adding these copied frames adjacent to their original frame or by "frame blending", which interpolates one or more frames in between two reference frames. The number of dropped frames or added frames can be determined and repeated by the present technology software application until the desired speed rate is achieved.

The present technology software application can then write the raw video data or the modified video data stream to memory, thereby providing to be displayed a video in a normal speed rate, a fast motion speed rate or a slow motion speed rate.

It can be appreciated that the speed rate of the video is not modified after writing to memory, thereby recording the video in real time with or without special effects and omitting the need for postproduction editing to change the video speed rate.

The present technology can be configured or configurable so that the algorithm creates a smoother time modification of the video data stream. For example, the algorithm could fill in video gaps when the user jumps from one speed to another. The algorithm can interpolate data between two or more data points, thus creating even more smoothness, for example, when going from −3× slow to 4× fast.

During playback, the video can be very abrupt. This can be algorithmically corrected to smooth out the video to enhance the viewer's experience with perceived higher resolution during the transition into the beginning of each special effect, during each special effect and the transition from the special effect to normal time—occurring while the user is moving around and panning the camera as a user would need while capturing special moments (peak moments) in an active sporting event.

An example of "Peak moment" is when an object being videoed jumps, it is the instant where there is no more upward momentum, but the person has not yet begun to fall. Artificial intelligence (AI) can be utilized to calculate "peak moment" of the action in a scene being recorded, and take a predetermined desired action, such as using slow motion slightly before and slightly after the "peak moment".

Referring to FIGS. 93-103, a compensating timer 1500 can be utilizable with the present technology is illustrated and will be described in the exemplary. It can be appreciated that the present technology provides fast and slow motion editing of video data in real or near real time, or to prerecorded video. The camera screen or GUI 30 can include the record button 32 that the user can move in all directions on the screen to active the zoom in/out special effects and the fast/slow motion control, as discussed above.

It may be known that some camera apps have a digital timer that displays the time elapsed since recording started, and with some camera apps having a digital timer that displays the time left until the end of the pre-determined recording length. Even further, some known camera apps have a graphical display of the time elapsed during recording by a different colored outline circumscribing the record button at a constant rate while the record button is touched. When the outline finishes circumscribing the entirety of the record button, the recording automatically stops or can continue recording with another lap of the outline being circumscribed.

However, there are many disadvantages to these known digital timers utilized during recording with camera apps. The fast and slow motion compensating timer display of the present technology provides clear advantages over known digital timers, since the present technology compensating timer is engaged while recording a video in combination with the fast and slow motion special effects editing of the present technology.

A first disadvantage of known digital recording timers is that the recording time elapsed is not the same as the playback time once the video has been processed with the fast and/or slow special effects. Another disadvantage of known digital recording timers is that the user cannot easily determine the amount of time elapsed in the playback time because of the above first disadvantage. An even further disadvantage of known digital recording timers the user cannot easily determine the amount of recording time left for recordings with a preset video playback time because of the above first disadvantage. Still further, known timers do not compensate for changes in the recording speed, which affects the playback length of time. These known timers only display the "real time" recording, which is equal to the playback time with no compensation for the fast and/or slow motion special effects.

The compensating timer of the present technology overcomes these disadvantages by automatically speeding up or slowing down the rate of which the timer mechanism (digital or graphical) proceeds based on real-time input by the user. For example, as the user employs the one-touch real-time fast and slow motion editing while recording the video, the present technology speeds up or slows down the compensating timer appropriately, and displays it in an animated manner on the screen. The timer can display the correct playback time remaining in the currently recording video. The timer can also display the amount of playback time elapsed since video recording started.

The present technology compensating timer can display the compensated values of the video playback time while the user is recording and while the user is applying a special effect of the present technology to the video. This allows the user to know how many seconds/minutes are still available in the current recording instance.

In the exemplary, the present technology compensating timer 1500 can be implemented in or with any of the special effects aspects of the present technology, to provide a compensating timer that corresponds with playing speed of the video data based on any of the special effects aspects of the present technology. For example, the compensating timer can increase in speed or counting rate depending on the speed up subroutine 158 and/or the frame adding subroutine 162 of FIG. 9, or any of their alternative subroutines or subprocess. Such alternative subroutines utilizable with the compensating timer can be, but not limited to, the Boomi process 860 of FIG. 61 and any of its Methods 1-3 and/or any of its Call Functions 1-9.

Some exemplary scenarios or implementations of the present technology compensating timer can include an animated time indicator such as, but not limited to, an animated record button or affordance 1574, an animated slice indicator 1576, an animated progress bar 1630, a compensating digital timer display 1636 including a time elapsed clock 1638 and/or a time left/remaining clock 1639.

Figure 93:
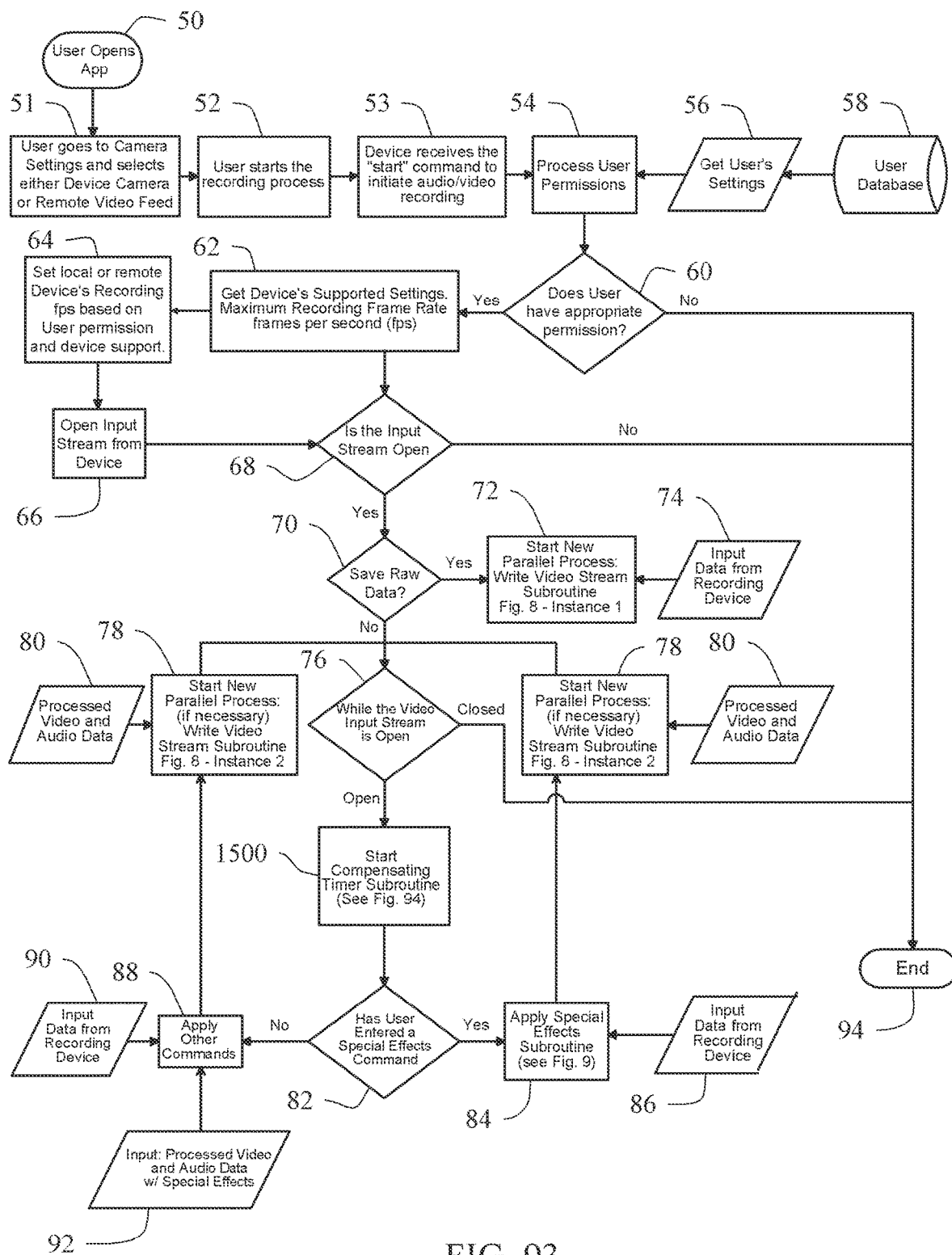
FIG. 93 is a flow chart of an example of a main process that initially determines if a speed up and/or slowdown special effects should be utilized in real time and the compensating timer process to be utilized and displayed in the GUI.

Referring to FIG. 93, an embodiment of the process of the present technology is described which determines if any special effects option has been requested for video data stream from the camera or remote source, and which compensating timer process is to be initiated and displayed in the GUI 30. For exemplary purposes, the special effects can be the changing of video speed rate by modifying of frames in the raw video data, as described in the present technology. The compensating timer process can be configured or configurable to initiate subroutines and/or subprocesses to assist in the overall process.

FIG. 93 is similar to FIG. 7 except that a compensating timer process 1500 is provided after step 76 to determine if while the video input stream is open and before step 82 to determine if a special effect command as been entered by the user. If the video input stream is open, as determined in step 76, the process proceeds to initiate the compensating timer subroutine 1500, which determines what type of timer is selected by the user and the corresponding timer attributes. After which, the process proceeds to step 82 and displays the appropriate compensating timer and time information to the user by way the GUI 30.

It can be appreciated that the compensating timer process, method and/or system of the present technology can be utilized or implemented as a standalone system, method, process or application to display a time aspect of a playing video on a GUI. Further, can be independent of any changes in speed associated with the video, accordingly calculating and displaying a time aspect of a playing video on a GUI not based or associated with changing a speed of the video.

Figure 94:
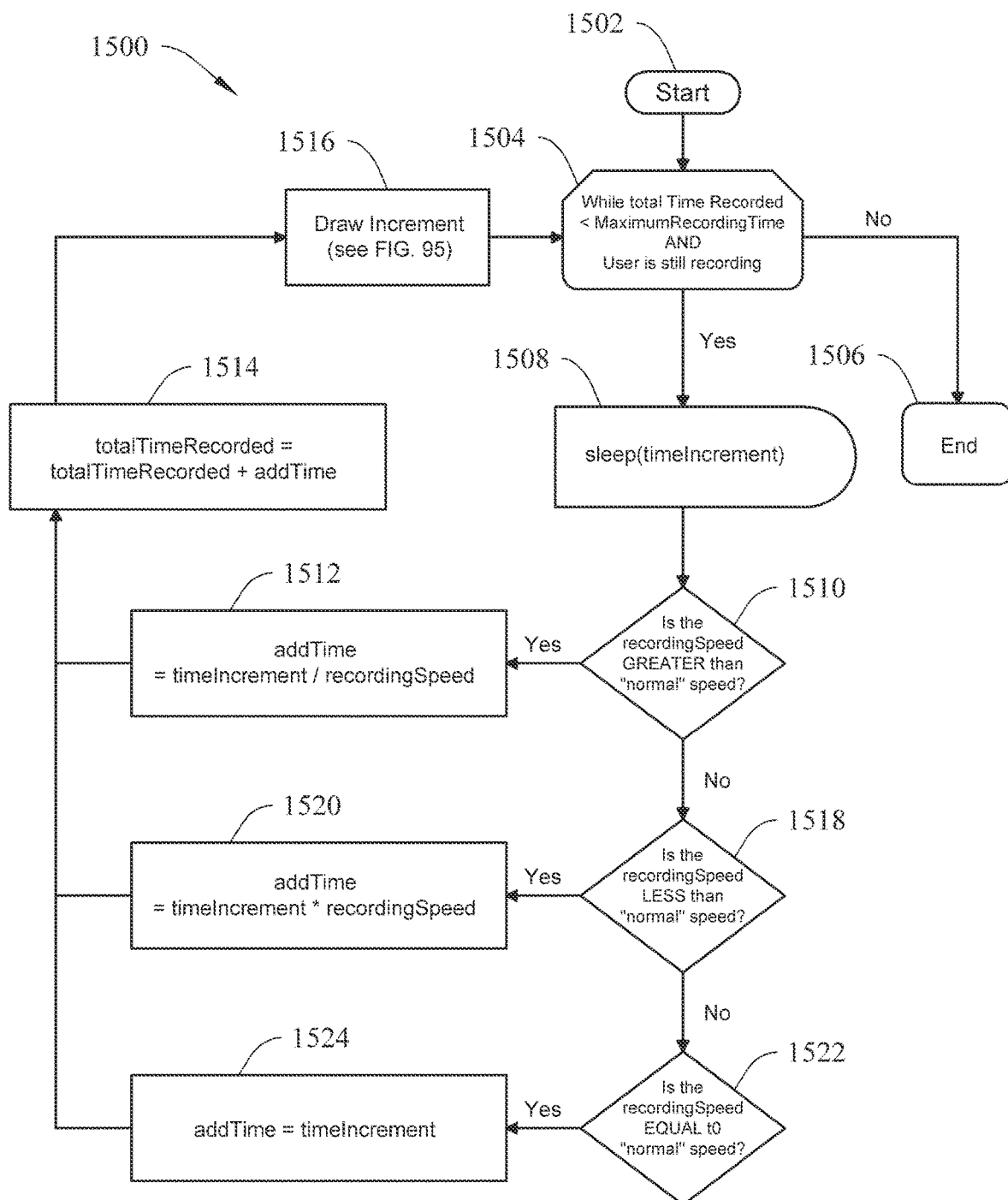
FIG. 94 is a flow chart of an example of the compensating timer subroutine associated with applying a compensating timer to main process of the present technology.

Referring to FIG. 94, the compensating timer subroutine 1500 of the present technology is initiated and the user interface can be provided with timer display options. The compensating timer subroutine can start (step 1502), and then determine if the total time recorded of the video being recorded is less than a maximum recording length and while the user is recording (step 1504). It can be appreciated that the compensating timer subroutine is only initiated if the video stream is open, which can provide the recording length allowed and/or the maximum recording time allowed. Any of these attributes can be determined or entered by the user, for example in step 56 or other steps that acquires user preference or setting inputs. If the total time recorded is not less than the maximum recording length or the recording is not active, then the process ends (step 1506).

If in step 1504 the total time recorded is determined to be less than the maximum recording length and the recording is active, then the process proceeds to step 1508 to sleep for an amount of time in the preset attribute "timeIncrement". After which, the compensating timer subroutine proceeds to step 1510 to determine if the recording speed is greater than the normal or native speed of the video being recorded. Step 1510 can acquire this determination from step 156 of the apply special effects subroutine of FIG. 9. If step 1510 determines that the recording speed is greater than the normal speed, the process proceeds to step 1512 to calculate additional time) by dividing the sleep time increment by the recording speed.

The process then proceeds to step 1514 to calculate a new or adjusted total time recorded by adding the total time recorded and the additional time from step 1512. After which, the process then proceeds to initiate a draw increment subroutine (step 1516) and then back to step 1504.

If in step 1510 the recording speed is determined to not be greater than the normal speed, then the process proceeds step 1518 to determine if the recording speed is less than the normal speed. Step 1518 can acquire this determination from step 160 of the apply special effects subroutine of FIG. 9. If the recording speed is less than the normal speed, the process then proceeds to step 1520 to calculate the additional time by multiplying the sleep time increment by the recording speed. After which, the process then proceeds to step 1514 utilizing the additional time calculated from step 1520.

If in step 1518 the recording speed is determined to not be less than the normal speed, then the process proceeds step 1522 to determine if the recording speed is equal to the normal speed. If the recording speed is equal to the normal speed, the process then proceeds to step 1524 to calculate the additional time, which is equal to the sleep time increment. After which, the process then proceeds to step 1514 utilizing the additional time calculated from step 1524.

It can be appreciated that steps 1504 and 1508-1516 creates a total time recorded process loop that continues to adjust the total time recorded value until it equals or is greater than the predetermined maximum recording time and while the user is still recording, as per step 1504.

APPENDIX XXIII—COMPENSATING TIMER FUNCTION PSEUDO CODE

The following compensating timer code example below shows pseudo code that may be used for the purpose of accomplishing an overall process of the compensating timer function.

Figure 95:
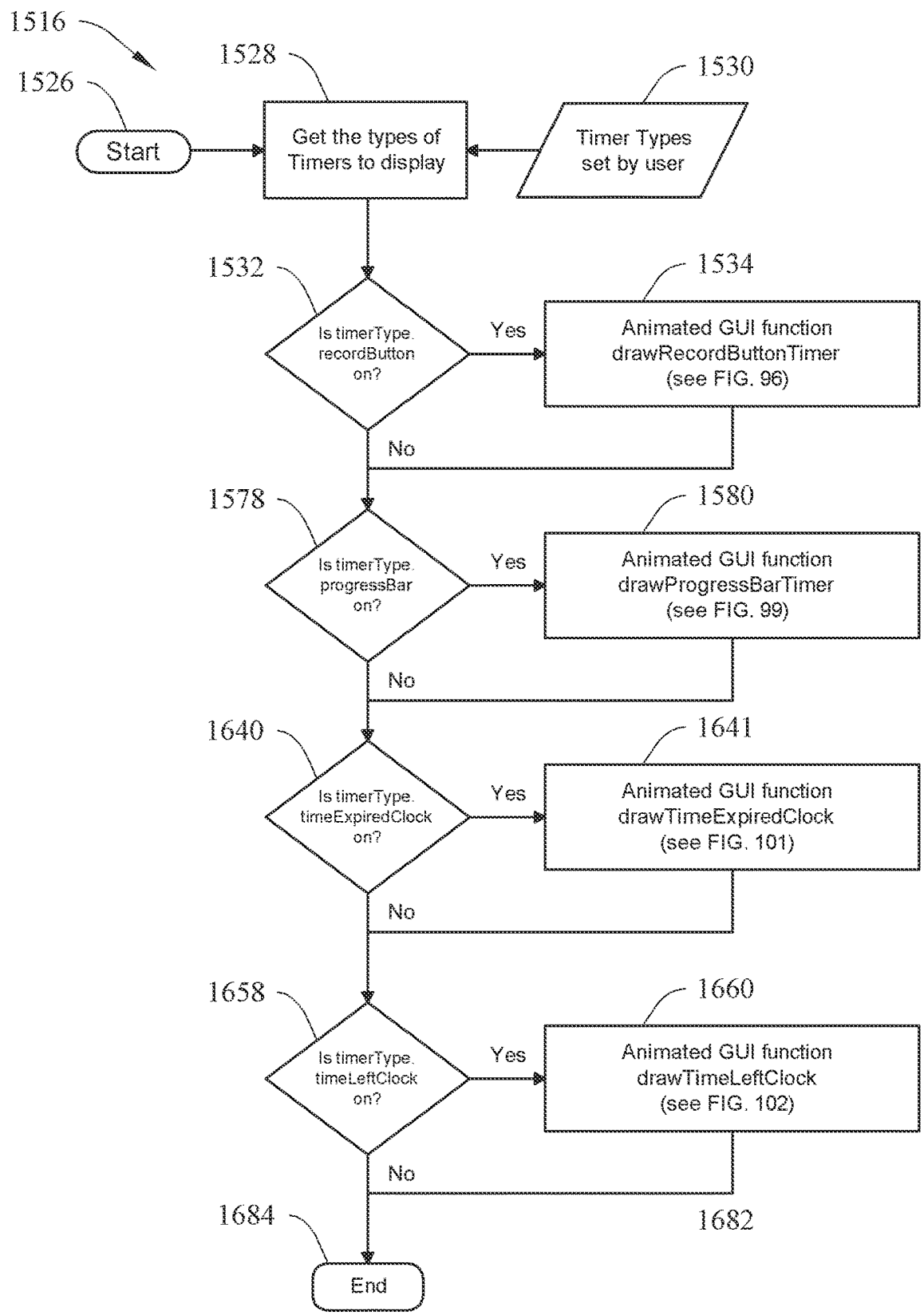
FIG. 95 is a flow chart of an example of the draw increment subroutine associated with determining which types of timers are to be displayed in the GUI.

Referring to FIG. 95, the draw increment subroutine 1516 of the compensating timer subroutine is described in the exemplary. After the draw increment subroutine 1516 is initiated or started (step 1526), the types of timers to display in the GUI 30 is acquired (step 1528). The types of timers can be set by the user in step 1530 or can be preset by default parameters. In the exemplary, the types of timers displayable in the GUI 30 can be, but not limited to, an animated record button timer, an animated progress bar timer, a displayable time expired clock and/or a displayable time left (remaining) clock.

After the acquisition of the types of timers in step 1528, the process then proceeds to step 1532 to determine if the animated record button timer type is on or active. If yes, then an animated GUI function subroutine for drawing a record button timer is initiated (step 1534). After step 1534, the process then proceeds to step 1578 to determine if the animated progress bar timer type is on or active. Further, if in step 1532 the timer type was determined not to be set to the animated record button, then the process proceeds to step 1578.

In step 1578, the subroutine then determines if the animated progress bar timer type is on. If yes, then an animated GUI function subroutine for drawing a progress bar timer is initiated (step 1580).

After step 1580, the process then proceeds to step 1641 to determine if the time expired clock timer type is on. Further, if in step 1578 the timer type was determined not to be set to the animated progress bar, then the process proceeds to step 1640.

In step 1640, the subroutine then determines if the expired clock timer type is on. If yes, then an animated GUI function subroutine for drawing a time expired clock is initiated (step 1641).

After step 1641, the process then proceeds to step 1658 to determine if the time left or time remaining clock timer type is on. Further, if in step 1640 the timer type was determined not to be set to the time expired clock, then the process proceeds to step 1658.

In step 1658, the subroutine then determines if the time left or remaining clock timer type is on. If yes, then an animated GUI function subroutine for drawing a time left or remaining clock is initiated (step 1660).

After step 1660, the process then stops or ends (step 1684). Further, if in step 1658 the timer type was determined Code Example—Compensating Timer

```
# Some variables set and modified in the function
maximumRecordingLength;       # global variable set by user or default before recording
totalTimeRecorded = 0;        # global variable, the total time recorded in milliseconds since recording started
is Recording = true;          # global variable, false when user stops recording or time has expired
recordingSpeed;               # global variable, indicates the fast/slow motion speed
function compensating Timer {
    while ((totalTimeRecorded < maximumRecordingLength) and (is Recording == true))
        (timeIncrement = 50 milliseconds
            Thread.sleep(timeIncrement )
            if (recordingSpeed > "normal")
            {totalTimeRecorded = totalTimeRecorded + (timeIncrement/ recordingSpeed)}
            else if (recordingSpeed == "normal")
            {totalTimeRecorded = totalTimeRecorded + timeIncrement * recordingSpeed)}
            else if (recordingSpeed == "normal")
            {totalTimeRecorded = totalTimeRecorded + timeIncrement}}
    return totalTimeRecorded}
``` not to be set to the time left or remaining clock, then the process proceeds to step 1684.

It can be appreciated that the draw increment subroutine 1516 determines the types of timers to be used and initiates the appropriate timer type subroutines, and then provides the selected timer types to the compensating timer subroutine 1500, which then provides the timer types and data to the main process to be displayed to the user by way of the GUI 30. It can further be appreciated additional and/or different timer types can be utilized with the compensating timer of the present technology.

Figure 96:
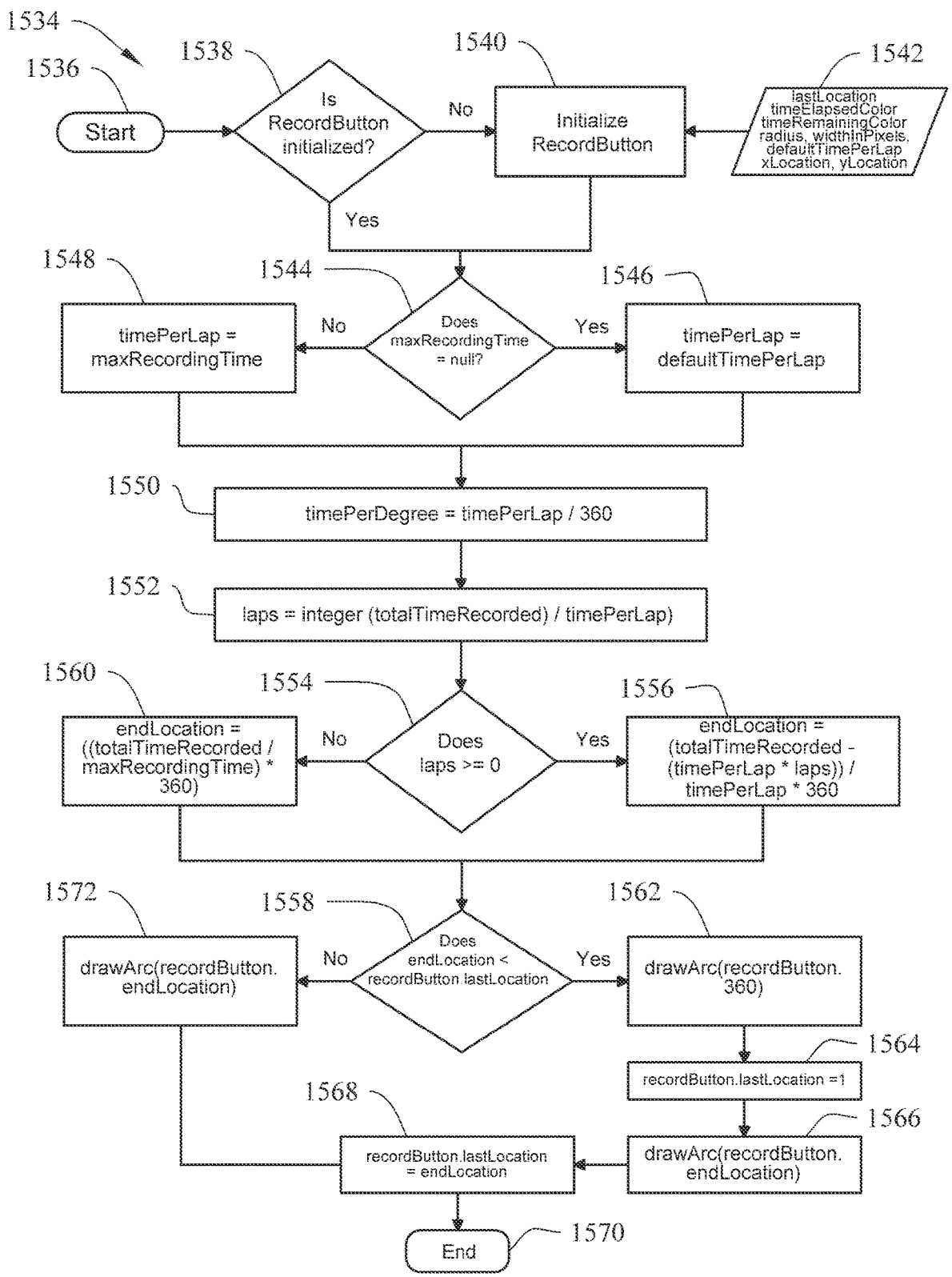
FIG. 96 is a flow chart of an example of the animated GUI function subroutine associated with drawing an animated record button timer in the GUI while video recording is in progress.
Figure 97:
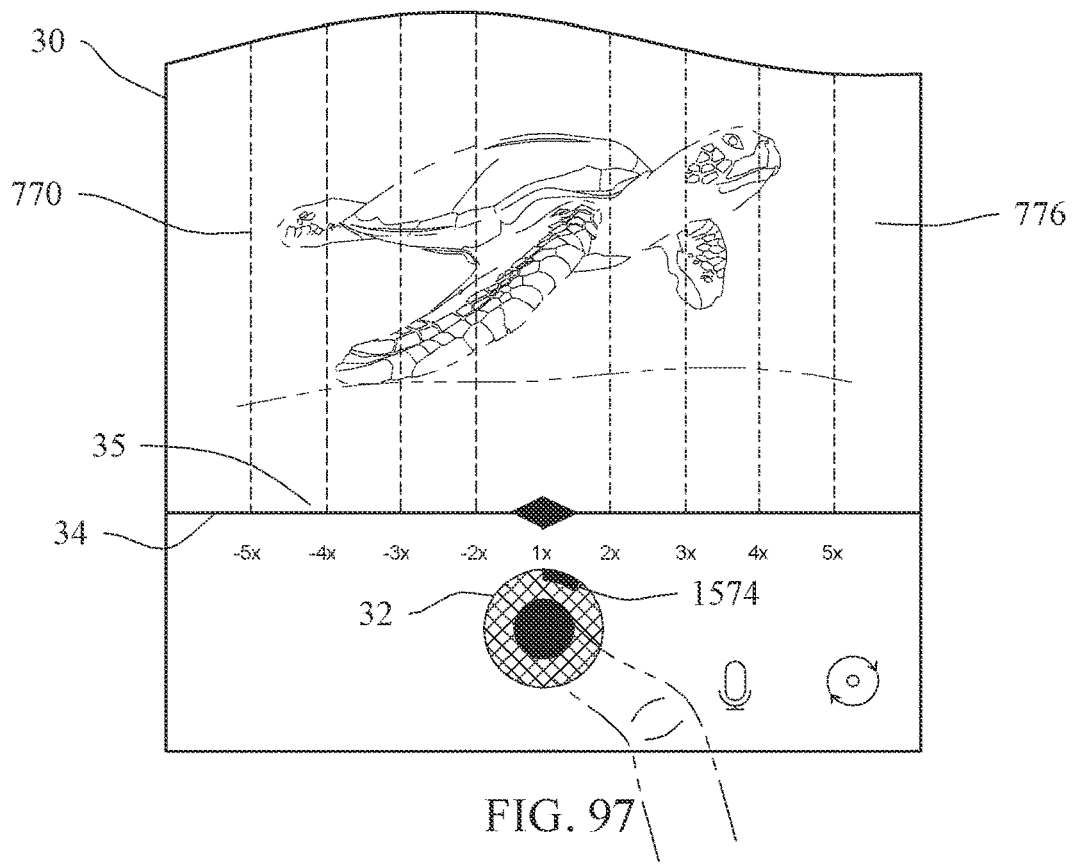
FIG. 97 is a sample GUI screenshot of the device employing the GUI with the animated record button activated and the compensating timer arc.

With reference to FIGS. 96 and 97, an example of the animated record affordance 32 is provided with a flow chart algorithm for the animated GUI function subroutine for drawing a record button timer 1534 while video recording is in progress. This algorithm can produce a compensating timer that is an animated arc traveling within the record button 32 that is displayed in the GUI 30. The record affordance 32 can contain the rotating curve outline 1574 or other moving element that is a color different to other elements of the record affordance 32, as best illustrated in FIG. 97.

This subroutine starts (step 1536) upon initiation by a command from the draw increment subroutine, which is initiated in the compensating timer subroutine that is part of the main process of the present technology. After starting, this subroutine then determines if the record button timer is initialized in step 1538. If the record button timer is not initialized then this subroutine will initialize the record button timer (step 1540) and acquires attributes associated with the record button timer (step 1542). The record button timer attributes can be, but not limited to, a last location of the record button, a time elapsed color, a time remaining color, a radius of the record button and/or width in pixels, a default time per lap, a horizontal or X-axis location, and/or a vertical or Y-axis location.

After the record button timer is initialized (step 1540) and the record button attributes are acquired (step 1542), the process can proceed to step 1544 to determine if the maximum recording time is null. If the maximum recording time is null, then the time per lap value equals the default timer per lap (step 1546). If the maximum recording time is not null, then the time per lap value equals the maximum recording time (step 1548).

Further, if in step 1538 the record button was determined to be initialized, then the process proceeds to step 1544.

This subroutine then proceeds from both steps 1546 and 1548 to step 1550 to calculate a time per degree value. In step 1550, the time per degree value is calculated by dividing a time per lap by 360 that represents the 360° around the record button 32. The time per degree can be utilized to determine degree values representing the maximum recording time as set about to a center of the record button.

The draw record button subroutine then proceeds to step 1552 to calculate a number of laps by taking an integer being the total time recorded and dividing it by the time per lap value.

After both the time per degree and number of laps values have been calculated, this subroutine can then proceed to step 1554 to determine if the number of laps is greater than or equal to zero. If it is, then the end location of the arc is calculated in step 1556 by subtracting the resultant of the time per lap multiplied by the number of laps from the total time recorded. This resultant is then divided by the time per laps value multiplied by 360. After which, this subprocess then proceeds to step 1558 to determine if the end location is less than the last location of the record button.

If the number of laps is less than zero from step 1554, then this subroutine proceeds to step 1560 to calculate the end location value for an animated section 1574, 1576 of the record button or affordance 32 by dividing the total time recorded from step 1514 by the maximum recording time, and then multiply the resultant therefrom by 360. After which, this subprocess then proceeds to step 1558.

The end location can be utilized to continuously represent a preceding or downstream section of the animated record button representing the present, viewing or elapsed time of the recorded video, any later or downstream section representing any time remaining.

If in step 1558 the end location is determined to be less than the last location of the record button, then this subroutine proceeds to step 1562 to draw an arc 1574, 1576 about the record button 32 with an end of the arc being the end location being 360 degrees from the start point. After which, the last location of the record button is then set to 1 in step 1564, which then proceeds to draw the arc with an end location set by step 1556 or 1560.

If in step 1558 the end location is greater than the last location of the record button, then this subroutine then proceeds to step 1572 to draw an arc 1574, 1576 about the record button 32 with an end of the arc being the end location calculated in step 1556 or 1560. The beginning of the arc 1574 to draw is the end location calculated in a previous iteration of the function. The global variable "recordButton" is a data structure that holds this value in one of its attributes "lastLocation". It can be appreciated that the arc is animated in that it travels radially based on the total time recorded that is continuously adjusted in step 1514 and any implemented slow or fast motion special effects as per steps 1510, 1518 or 1522 in FIG. 94.

In the alternative, when the default "maxRecordingTime" has been reached, instead of the ending the recording altogether, the arc animation can restart at the beginning of the arc 1574, for example, like a lap counter. This can coincide or be associated with the number of laps value.

After steps 1566 or 1572, this subroutine then proceeds to step 1568 to determine a last location within the record button 32 where the drawing of the arc ended. The value of "lastLocation" determines the starting point to start drawing in the function "drawArc" by accessing the data structure recordButton.lastLocation. This subroutine stops or ends (step 1570) when the end location of the traveling arc 1574, 1576 reaches or is equal to the last location of the record button 32. Accordingly, the last location is equal to or represents the maximum recording time of the video, thereby creating the animated section that travels 360° about the record button 32 at a speed corresponding to any changing playing speed of the video until the end of the video, which is the maximum recording time.

It can be appreciated that this record button drawing subroutine 1534 can be called by every iteration from the compensating timer subroutine 1500 of the present technology.

Utilizing the "lap" feature, the last location can extend past the 360 degree to create a new lap. This is accomplished in step 1504 in FIG. 94 conditional while the subroutine loop and the logic in steps 1544 and 1546 take into account of multiple laps.

APPENDIX XXIV—DRAW RECORD BUTTON FUNCTION PSEUDO CODE

The following draw record button code example below shows pseudo code that may be used for the purpose of accomplishing a draw record button function.

| Code Example—Draw Record Button |
|---|

```
function drawRecordButton {
        initializeRecordButton
                lastLocation
                timeElapsedColor
                timeRemainingColor
                radius # number of pixels from the center of the record affordance to the outer rim of
                        the progress indicating outline of the affordance.
                widthInPixels # number of pixels wide of the radial progress outline.
                xLocation
                yLocation
        #       Initialization draws the progress bar according to settings
        Go to xLocation and the yLocation on the screen
        Draw Initialization with the color scheme.
        #       maxRecordingTime is entered at runtime.
        if maxRecordingTime == null
                timePerLap = defaultTimePerLap
        else
                timePerLap = maxRecordingTime
        timePerDegree = timePerLap/360
        laps = integer (totalTimeRecorded / timePerLap)
        if laps >= 1
                endLocation = (totalTimeRecorded / timePerLap) * 360
        else
                endLocation = (totalTimeRecorded - (timePerLap * laps))/timePerLap * 360
        #       Case where endLocation is starting a new lap
        if (endLocation < recordButton.lastLocation)
        {
                drawArc(recordButton,360)
                recordButton.lastLocation = 1;
                drawArc(recordButton, endLocation)
        }
        else
        {
                drawArc(recordButton, endLocation)
        }
        recordButton lastLocation = endLocation
}
```

It can be appreciated that the draw record button subroutine calculates a real time animated arc that travels around the record button wherever the record button is located on the GUI 30, as best illustrated in FIG. 97. Further, that the arc is associated with radial degrees based on the maximum recording time of the recorded video or a maximum recording set by the user for a video being recorded.

The animated record affordance 32 can include an animated clockwise or counter clockwise rotating curve 1574 outlining the record button 32, which can turn a different color as a way of visually depicting how much time the user has used and how much time remains in the recording. The clockwise or counterclockwise rotation of the curve 1574 can be set by the user.

The rate of which the outline is drawn can be determined by the length of time to record, and the playback speed of the recording as determined by the fast/slow motion controls. When user engages the fast motion special effect of the present technology, for example, the outline can be drawn proportionally slower. For example, when the user goes from 1× to 2×, the outline drawing will slow down to half speed. Further in the exemplary, when the user engages the slow motion special effect of the present technology, the outline is drawn proportionally faster. For example, when the user goes from 1× to −2×, the outline drawing will speed up to twice the speed.

The animated record affordance 32 can change color, shape and/or size, and can blink during recording to indicate there is only a few seconds remaining in the current recording.

In this example, while pressing or touching the record button 32, the user can slide his/her finger to the right to engage the fast motion special effects as discussed above, and/or the user can slide his/her finger to the left to engage the slow motion special effects as discussed above. The further the user slides the finger to the right, the faster the fast motion becomes during video playback, and the further the user slides the finger to the left, the slower the slow motion becomes during video playback. It can be appreciated that the user can reverse the settings so that the fast motion is engaged by sliding the record button to the left and slow motion is engaged by sliding the record button to the right.

This is useful for users who are either right handed or left handed to select what is comfortable for them.

Further in this example, the user can initiate recording by touching and holding the record button 32, and stops recording by lifting or removing the finger from the record button 32. During recording, as per step 1538, an inside of the record button 32 has turned red, and a portion 1574 of the outer rim of the record button 32 is red. The length of the video can be preset before recording begins, thereby determining the time per degree value per step 1544. If the maximum length of the video was not preset, i.e., the user can record for as long as the user desires given the limits of the device such as storage and battery available with the electronic device, then the recording is open ended. If "maxRecordingTime" was not set, then a "defaultTimePerLap" can be used instead to determine the length of time it will take to circumscribe the record button 32. Once "totalTimeRecorded" is greater than "defaultTimePerLap", then the circumscription can renew at the beginning. If the user exceeds the "maxRecordingTime", the animation can continue by overlapping the previously colored outline with a new color once the circumscription has been completed and the "endingLocation" variable has reached the original starting location. The portion 1574 of the outer rim can turn from a first color (grey) to a second color (red) as the recording progresses. The red portion of the outer rim indicates the relative amount of time in the recording. The grey area of the rim that has not yet turned red indicates the relative amount of time available for recording to continue.

Figure 98:
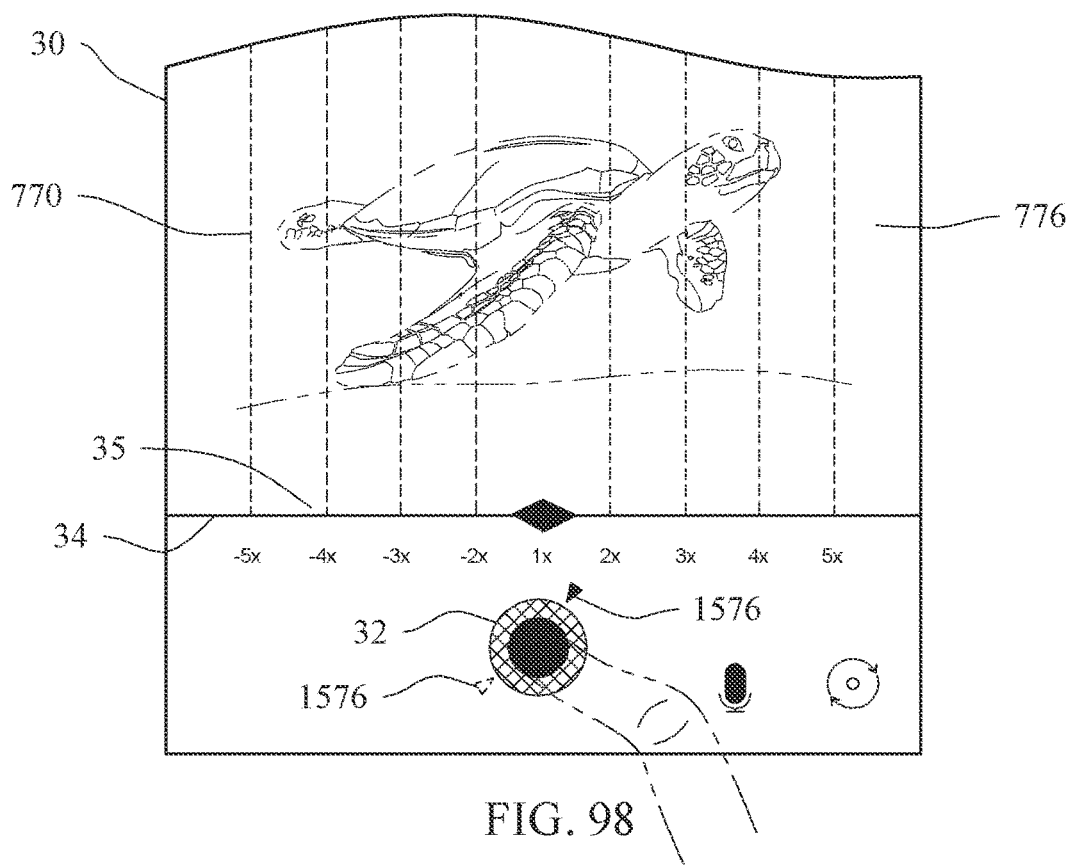
FIG. 98 is a sample GUI screenshot of the device employing the GUI with the record button activated and the animated slice indicator encircling the record button.

Alternatively, the animated record affordance 32 can be displayed as a slice indicator 1576, as best illustrated in FIG. 98, which may not be part of the record affordance 32 but detached therefrom. The slice indicator 1576 can be a radial section that encircles and travels around the record button 32 as the recording progresses, as shown in FIG. 98 illustrating the slice indicator in broken lines at a separate location. Instead of an outline color of the record button 32 changing, the animation can move the slice indicator 1576 around the record button 32, with the slice indicator's position around the record button 32 to indicate the progress of the recording. The slice indicator 1576 can further move with the recording button 32 as the recording button is moved around the screen by the user, for example as the user zooms in/out as per FIG. 25 and/or uses the fast/slow motion special effects on the GUI 30.

The rate of which the slice indicator moves is determined by the length of time to record, and the playback speed of the recording as determined by the fast/slow motion controls. When user engages the fast motion special effect of the present technology, the slice moves proportionally slower. For this embodiment, the slice indicator 1576 can traverse around the record button 32 as recording progresses. For example, the user goes from 1× to 2×, then the slice movement will slow down to half speed. Further in the exemplary, when user engages the slow motion special effect of the present technology, the slice moves proportionally faster. For example, the user goes from 1× to −2×, then the traversing of the slice indicator 1576 will speed up to twice the speed.

The slice indicator can change color during recording to indicate there is only a few seconds remaining in the current recording. Further, the slice indicator 1576 can change color to indicate that a new lap has begun.

In the present technology, the rate of which the outlining animation 1574, 1576 progresses may not be a constant linear rate. Rather, the animation speed may be determined by the fast and slow motion special effect commands entered by the user as the user is recording the video, as described above. For example, when the user slides his/her finger to the left, the slow motion special effects is initiated. While recording happens in "real time", the section of the recorded video where the user activated the slow motion control during recording, that section plays in slow motion as described above. Further, while recording happens in "real time", the section of the recorded video where the user activated the fast motion control during recording, that section plays in fast motion as described above.

The compensating timer of the present technology compensates for any fast or slow motion special effects invoked by the user during the live recording session. When the user engages the fast motion special effect, the compensating timer compensates by slowing down the outlining or slice movement animation rate while recording. When the user engages the slow motion special effect, the compensating timer compensates by speeding up the outlining or slice movement animation rate while recording.

It can be appreciated that the left/right orientation for the slow/fast motion special effects affordances on the GUI 30 can be reversed in the camera setting so that the user can slide the finger to the right to engage slow motion, and slide his finger to the left for fast motion.

Figure 99:
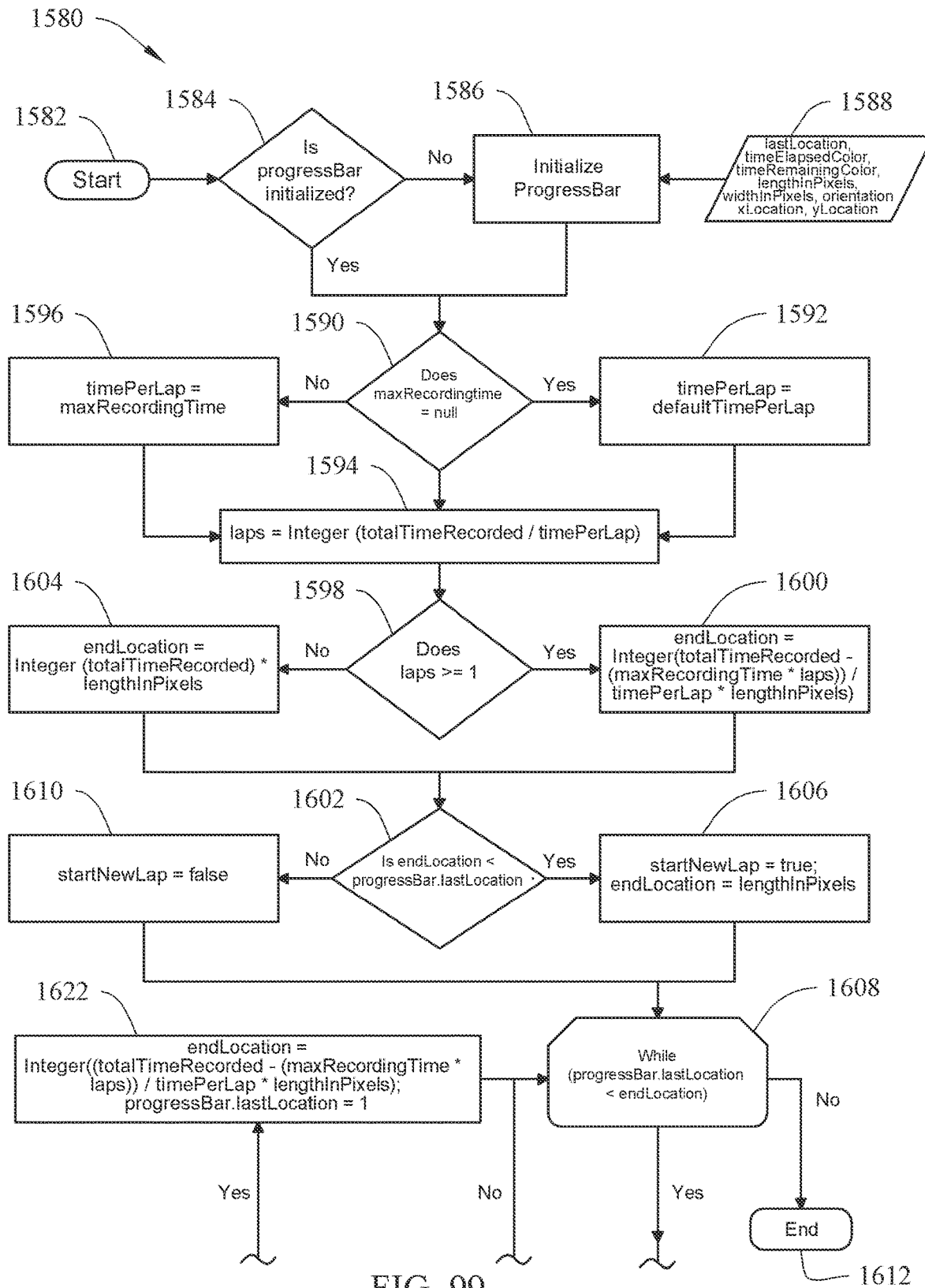
FIG. 99 is a flow chart of an example of the animated GUI function subroutine associated with drawing an animated progress bar timer in the GUI while video recording is in progress.
Figure 100:
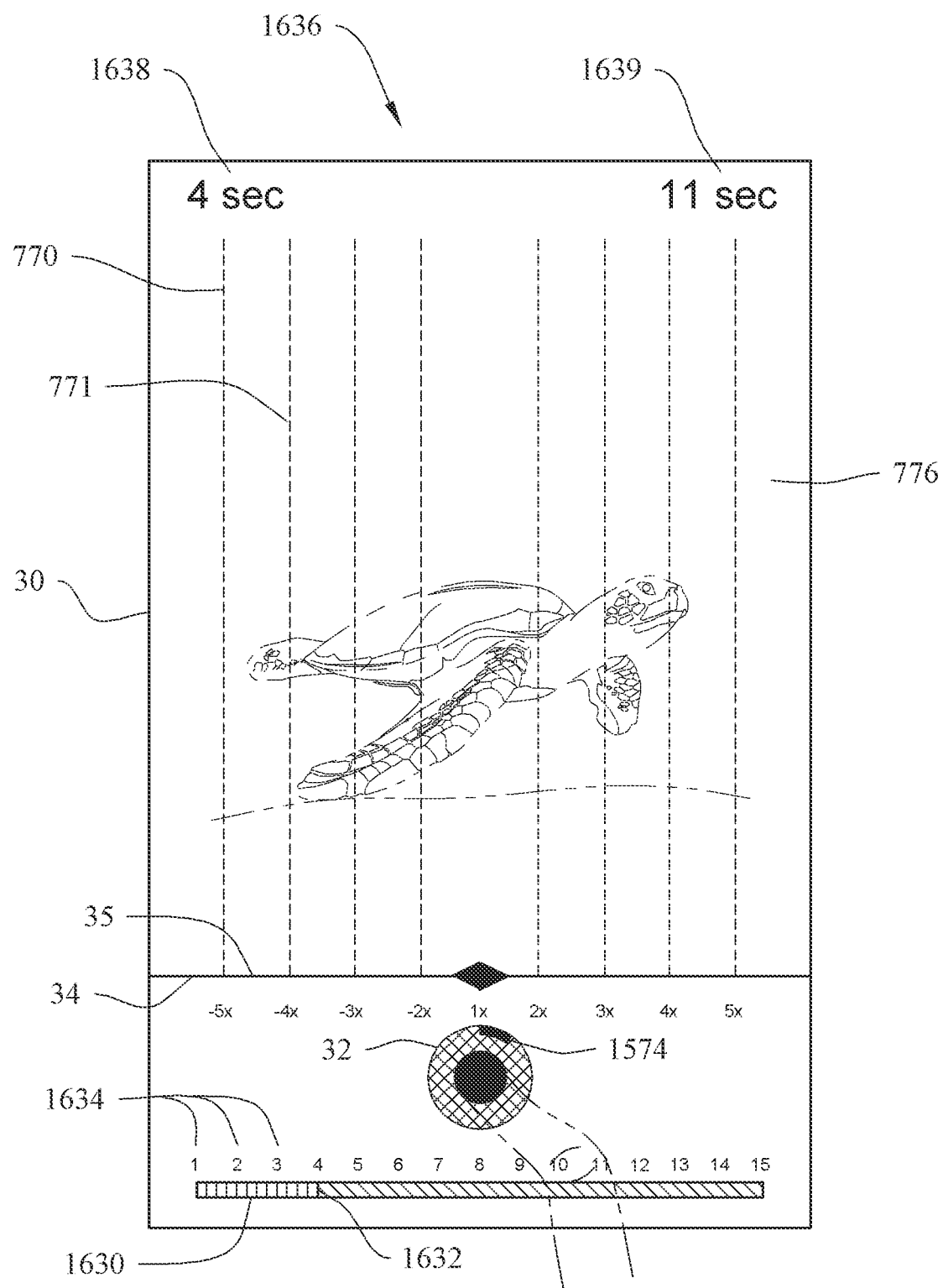
FIG. 100 is a sample GUI screenshot of the device employing the GUI with the animated record button activated, the animated progress bar, the time elapsed/expired clock and the time left/remaining clock, wherein the animated record button, the animated slice indicator the animated progress bar, the time elapsed/expired clock, and the time left/remaining clock can be displayed on the GUI in any combination or separately.

With reference to FIGS. 99 and 100, an example of the animated progress bar 1630 is provided with a flow chart algorithm for the animated GUI function subroutine for drawing a progress bar timer 1580 while video recording is in progress. This algorithm can produce a compensating timer being an animated progress bar 1630 that is displayed in the GUI 30. The progress bar 1630 can include a traveling vertical line or bar edge 1632 or other moving element that is a color different to other elements of the progress bar 1630. For example, a section of the progress bar 1630 left of the line 1632 can be a first color (red) and a section right of the line 1632 can be a second color (green) different to that of the first color. It can be appreciated that the progress bar 1630 can be located at the top or bottom of the GUI 30 as a horizontal progress bar or vertically oriented such that it can be located to either the left side or the right side of the GUI 30.

This subroutine starts (step 1582) upon initiation by a command from the draw increment subroutine, which is initiated in the compensating timer subroutine that is part of the main process of the present technology. After starting, this subroutine then determines if the progress bar timer is initialized in step 1584. If the progress bar timer is not initialized then this subroutine will initialize the progress bar (step 1586) and acquires attributes associated with the progress bar timer (step 1588). The progress bar timer attributes can be, but not limited to, a last location of the progress bar, a time elapsed color, a time remaining color, a length of the progress bar in pixels, a width of the progress bar in pixels, a horizontal or X-axis location, a vertical or Y-axis location, and/or orientation.

After the progress bar timer is initialized (step 1586) and the progress bar attributes are acquired (step 1588), the process can proceed to step 1590 to determine if the maximum recording time is null. Further, if it was determined in step 1584 that the progress bar was not initialized, then the process proceeds to step 1590.

If in step 1590 it is determined that the maximum recording time is null, then this subroutine proceeds to step 1592 to set a time per lap value to equal a default time per lap value. After which, the process then proceeds to step 1594 to calculate the number of laps by taking an integer being the total time recorded and dividing it by the time per lap value. Within the scope of the present technology, the syntax integer takes the integer value of the result.

If in step 1590 the maximum recording time is not null, then step 1596 sets the time per lap value to the maximum recording time value. After which, the process then proceeds to step 1594.

Once the number of laps is calculated in step 1594, the process then determines if the number of laps is greater than or equal to 1 in step 1598. If it is, then the end location associated with the animated progress bar is calculated in step 1600 by taking an integer of the total time recorded subtracted from the resultant of the maximum time recorded multiplied by the number of laps. This resultant is then divided by the time per laps value multiplied by the length in pixels. After which, this subprocess then proceeds to step 1602 to determine if the end location is less than the last location of the progress bar.

If in step 1598 the number of laps is less than the last location of the progress bar, then the process the end location associated with the animated progress bar is calculated by taking an integer of the total time recorded multiplied by the length in pixels. After which, this subprocess then proceeds to step 1602.

At step 1602, if it is determined that the end location is less than the last location of the progress bar then a subprocess (step 1606) sets a start new lap value to "true" and sets the end location to equal the length in pixels. After which, this subprocess then proceeds to step 1608 to determine if a last location of the progress bar is less than the end location calculated from steps 1600 or 1604.

If in step 1602 the end location is not less than 1, then a subprocess sets the start new lap value to "false". After which, this subprocess then proceeds to step 1608.

Step 1608 provides process routes while the last location of the progress bar is less than the end location. If the progress bar last location is not less than the end location, then this subroutine stops or ends (step 1612).

Still while the progress bar last location is less than the end location, then this subroutine proceeds to step 1614 to determine if an orientation of the progress bar is horizontal. If it is, then this subroutine proceeds to step 1616 to draw a vertical line 1 pixel wide at the progress bar last location. After which, this subroutine proceeds to step 1618 to recalculate the progress bar last location by taking the progress bar last location and adding 1 pixel thereto. Then the process continues back to step 1620 to determine if the start new lap equals "true" and if the progress bar last location equals the length in pixels. If these values are not met, then the process continues back to step 1608.

However, if both values are valid in step 1620, then the process proceeds to step 1622 to calculate the end location representing the line 1632 that travels across the progress bar 1630 by taking an integer of a resultant the total time recorded from step 1514 minus by the resultant of maximum recording time multiplied by the number of laps, which is divided a resultant of the time per lap multiplied by the length in pixels of the progress bar 1630. In step 1622, the progress bar last location is set to equal 1. This end location can be utilized to determine a location of the line 1632 representing the present or viewing time of the recorded video, with the preceding or upstream section representing elapsed time and any later or downstream section representing the time remaining.

After step 1622, the process proceeds back to step 1608 for further processing of the progress bar.

If in step 1614 the orientation was not equal to horizontal, then this subroutine proceeds to step 1624 to determine if the orientation of the progress bar is vertical. If it is, then it proceeds to step 1626 to draw a horizontal line 1 pixel wide at the progress bar last location. After which, this subroutine proceeds to step 1618 to recalculate the progress bar last location and then continues back to step 1620.

If in step 1624 the orientation was not equal to vertical, then this subroutine proceeds to step 1618.

It can be appreciated that steps 1608 and 1614-1622 creates a loop that increases the last location of the vertical or horizontal line 1632 of the progress bar 1630 by 1 pixel each time, and then compares the recalculated progress bar last location to the end location calculated from step 1622 to determine if it has reached the end location that represents the end of the maximum recording time or the default time per lap, all while the progress bar last location is less than the end location.

This loop continuously adds 1 pixel to the last location of the line 1632, thereby progressively traveling the line 1632 in a horizontal or vertical direction until it reaches the end location of the progress bar 1630 as defined in step 1622. It can be appreciated that the line 1632 is animated in that it travels along the progress bar 1630, as best illustrated in FIG. 100, based on the total time recorded that is continuously adjusted in step 1514 in FIG. 94 and any implemented slow or fast motion special effects as per steps 1510, 1518 or 1522 in FIG. 94.

This subroutine stops or ends (step 1612) when the last location of the traveling line 1632 reaches or is equal to the end location of the progress bar 1630. Accordingly, the end location is equal to or represents the maximum recording time of the video, thereby creating the animated section that travels along the progress bar 1630 at a speed corresponding to any changing playing speed of the video until the end of the video, which is the maximum recording time.

In the case where the "maxRecordingTime" was not set by the user, then this subroutine uses the default time per lap for example, 60 seconds, as describe below in a non-limiting example of a draw progress bar pseudo code. As recording progresses, the compensating timer moves the traveling line 1632 as normal. In step 1590, when maxRecordingTime=null, that means that the user did not set the variable "maxRecordingTime". Thus, the subroutine uses the "defaultTimePerLap" in step 1592 instead of "maxRecordingTime" in step 1596. When the default time per lap has been reached, instead of the ending the recording altogether, the animated progress bar restarts at the beginning of the progress bar 1630, for example, like a lap counter. This can coincide or be associated with the number of laps value.

The animated progress bar can repeatedly restart from its beginning for an indefinite number of times as recording progresses as each "defaultTimePerLap" is completed.

The progress bar 1630 can change colors for each lap. For example, for the first lap, the color for the recorded time can be light red and the color for the time left can be light green. For the second lap, the colors can be a darker shade of red and green, and so on for the third lap. The colors can also change to other colors altogether.

A "lap counter" display can be added along with the animated progress bar so that the user can visually determine how much time has elapsed.

The lap feature can be applied for all of the embodiments

APPENDIX XXV—DRAW PROGRESS BAR FUNCTION PSEUDO CODE

The following draw progress bar code example below shows pseudo code that may be used for the purpose of accomplishing a draw progress bar function.

Code Example—Draw Progress Bar

```
function drawProgressBar {
    initializeProgressBar
        lastLocation
        currentLap
        timeElapsedColor
        timeRemainingColor
```

| Code Example—Draw Progress Bar |
|---|

```
                lengthInPixels
                widthInPixels
                orientation
                xLocation
                yLocation
        #       Initialization draws the progress bar according to settings
        Go to xLocation and the yLocation on the screen
        Draw Initialization with the color scheme.
        maxRecordingTime = Entered at runtime.
        if maxRecordingTime == null
                timePerLap = defaultTimePerLap
        else
                timePerLap = maxRecordingTime
        laps = integer (totalTimeRecorded / timePerLap)
        if laps >= 1
                endLocation = int( (totalTimeRecorded - (maxRecordingTime * laps) / timePerLap *
lengthInPixels)
        else
                endLocation = int( (totalTimeRecorded / timePerLap) * lengthInPixels)
        #       Case where endLocation is starting a new lap
        if (endLocation < progressBar.lastLocation)
        {
                startNewLap = true
                endLocation = lengthInPixels
        }
        else
        {
                startNewLap = false
        }
        while (progressBar.lastLocation <= endLocation)
        {
                if orientation = horizontal
                        at location, draw a vertical line with the height widthInPixels and width of 1
pixel wide
                if orientation == vertical
                        at location, draw a horizontal line with 1 pixel height, and width of
widthInPixels wide
                progressBar.lastLocation = progressBar.lastLocation + 1 pixel
                if ((startNewLap = true) and (progressBar.lastLocation == endLocation))
                {
                        endLocation = (totalTimeRecorded - (timePerLap * laps))/timePerLap *
lengthInPixels
                        progressBar.lastLocation = 1;
                        currentLap = laps
                        updateLapDisplay (currentLap)
                }
        }
}
```

A non-limiting example associated with the above pseudo code for the draw progress function can be represented as:

maxRecordingTime=60 sec lengthinPixels=1000 timePerLap=60 sec totalTimeRecorded(1)=15 totalTimeRecorded(2)=59.99 totalTimeRecorded(3)=85 laps(1)=int(15/60)=0 laps(2)=int(59.99/60)=0 laps(3)=int(85/60)=1 endLocation(1)=int(15/60*1000)=250 endLocation(2)=int(59.99/60*1000)=999 endLocation(3)=int((85−(60*laps))/60*1000)= endLocation(3)=int((85−(60*1))/60*1000)=999 maxRecordingTime=null timePerLap=30 sec

With the above example in mind, each of these examples in this sample output are sample values for that iteration. The iterations may not be linearly sequential. In other words, iteration 2 might not be the next iteration after iteration 1. There could be many iterations between each sample point between sample 1 and sample 2 that were omitted for brevity.

It can be further appreciated that the draw progress bar subroutine calculates a real time animated progress bar 1630 timer in the GUI 30 that includes a line 1632 that travels in the horizontal or vertical along the progress bar until the line reaches the end location of the progress bar, as best illustrated in FIG. 100.

Further appreciation can be understood that the progress bar timer is similar in function to the animated record button or slice indicate, but instead of a curved circle or arc, the advancing colored section to indicate elapsed playback time, the display shows a horizontal bar 1630 with the horizontal axis labeled with time indicators 1634. In some embodiments, the time indicators 1634 may be hidden or a percentage of time can be displayed.

The progress bar timer 1630 can be prominently displayed on the GUI 30. The progress bar timer 1630 display the elapsed "playback" time, and can display a countdown to the time remaining for a pre-determined video length.

In the exemplary, when the user engages the fast motion special effect of the present technology, the rate of which the progress bar timer 1630 changes slows down proportionally slower. For example, when the user goes from 1× to 2×, then the timer rate of change slows down to half the "real time" speed while recording. Further in the exemplary, when the user engages the slow motion special effect of the present technology, the rate of which the progress bar timer 1630 changes speeds up proportionally faster. For example, when the user goes from 1× to -2×, then the progress bar timer rate of change speeds up to twice the "real time" speed while recording.

For illustrative purposes, FIG. 100 illustrates the animated progress bar 1630 at the bottom of the GUI 30 with two different colors associated with different sections for example, a red and green section. The animated progress bar 1630 can also be displayed at the top of the GUI 30, or for vertical orientation, at either the left or right side of the GUI. The red and green sections of the progress bar 1630 are a proportion of time consumed and time left to record, respectively. The red section (seconds 1-4) is displayed at the left side of the line 1632 and graphically shows the amount of "playback time" consumed in the current recording. The green section (seconds 5-15) is displayed in the right side of the line 1632 is the amount of time left to record until the end of the preset recording time is reached or when the next lap starts.

As the user continues recording and using the real-time fast/slow motion special effects, the time consumed, and time left values are adjusted in real-time in a compensated manner as described above. The display is an animated process of the progress bar 1630 changing from green to red starting from the left and moving to the right in a compensated manner such that when the user engages the slow motion, the animation speeds up, and when the user engages the fast motion, the animation slows down.

Since the progress bar 1630 is always a proportion of used vs. available playback time left in the current recording session, if the user does not set a preset maximum length of time for the recording, then the compensating timer of the present technology can set a default maximum time to provide the second value in the ratio.

The progress bar timer 1630 can change color, size, shape or any other attributes such as blinking during recording to indicate there is only a few seconds remaining in the current recording.

In the present technology, the rate of which the line 1632 animation progresses may not be a constant linear rate. Rather, the animation speed may be determined by the fast and slow motion special effect commands entered by the user as the user is recording the video, as described above. For example, when the user slides his/her finger to the left, the slow motion special effects is initiated. While recording happens in "real time", the section of the recorded video where the user activated the slow motion control during recording, that section plays in slow motion as described above. Further, while recording happens in "real time", the section of the recorded video where the user activated the fast motion control during recording, that section plays in fast motion as described above.

The compensating timer of the present technology compensates for any fast or slow motion special effects invoked by the user during the live recording session. When the user engages the fast motion special effect, the compensating timer compensates by slowing down the line 1632 animation rate while recording. When the user engages the slow motion special effect, the compensating timer compensates by speeding up the line 1632 animation rate while recording.

It can be appreciated that the left/right orientation for the slow/fast motion special effects affordances on the GUI 30 can be reversed in the camera setting so that the user can slide the finger to the right to engage slow motion, and slide his finger to the left for fast motion.

Figure 101:
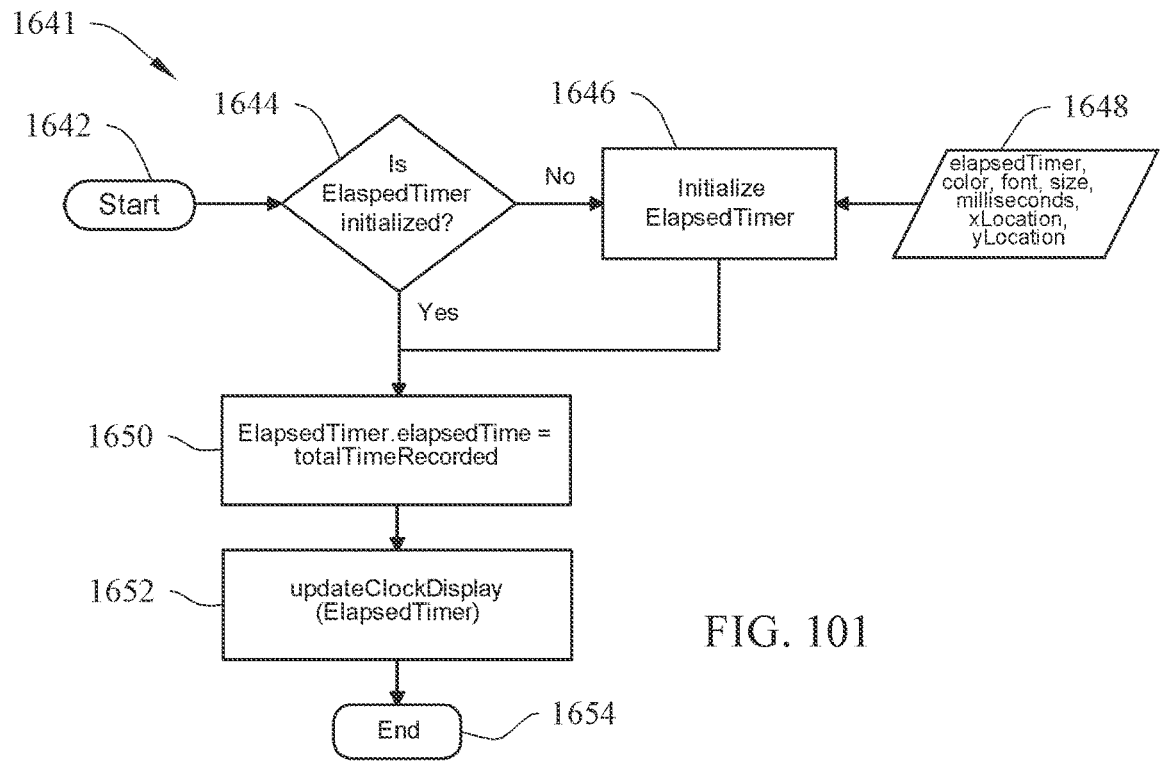
FIG. 101 is a flow chart of an example of the animated GUI function subroutine associated with displaying time elapsed/expired clock in the GUI while video recording is in progress.
Figure 102:
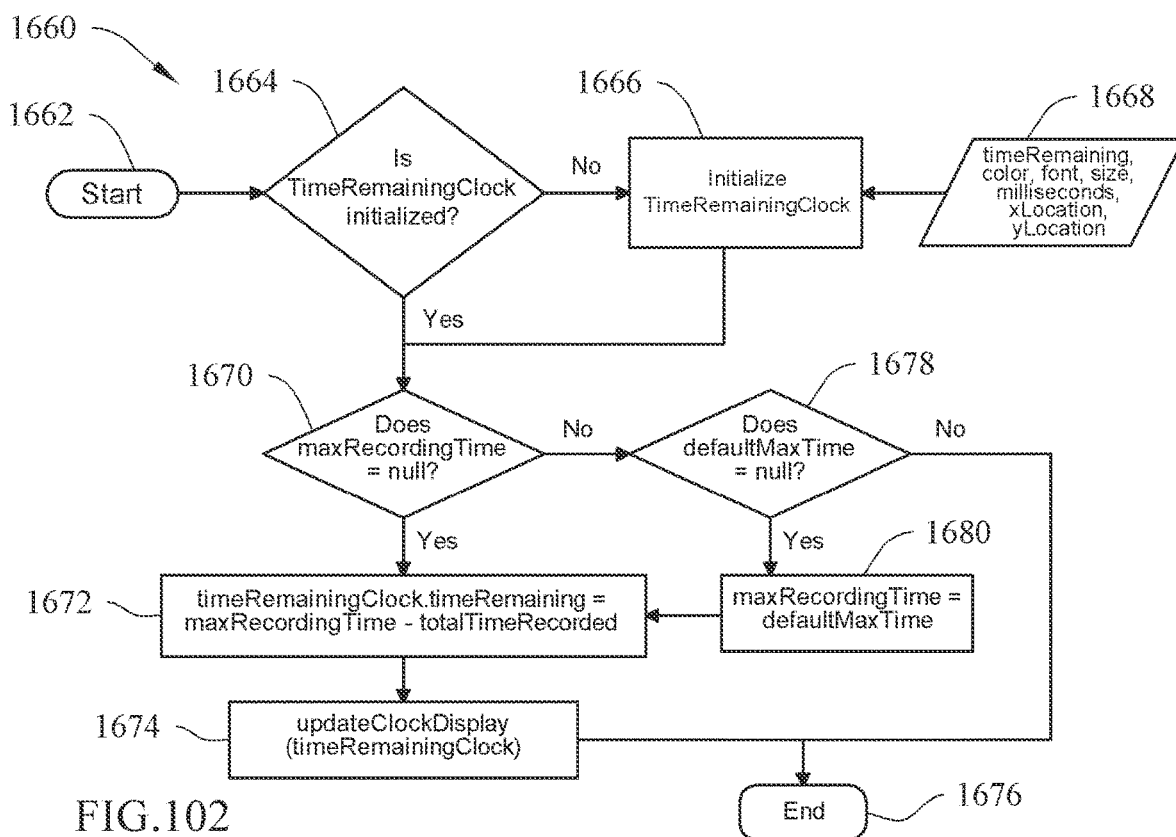
FIG. 102 is a flow chart of an example of the animated GUI function subroutine associated with displaying the time left/remaining clock in the GUI while video recording is in progress.

With reference to FIGS. 100-102, an example of a compensating digital timer display 1636 is provided with a flow chart algorithm for the animated digital timer display function subroutine for displaying while video recording is in progress. This algorithm can produce a compensating timer being an animated digital timer 1636 including an elapsed "playback" time or time elapsed/expired clock 1638 and/or a countdown to the time remaining for a pre-determined video length of time left/remaining clock 1639, both of which can be displayable in the GUI 30.

Referring to FIG. 101, the draw increment subroutine can call a time expired/elapsed clock subroutine 1641 to calculate and display an elapsed or expired time of the present recording time. This subroutine starts (step 1642) upon initiation by a command from the draw increment subroutine, which is initiated in the compensating timer subroutine that is part of the main process of the present technology. After starting, this subroutine then determines if the elapsed timer is initialized in step 1644. If the elapsed timer is not initialized then this subroutine will initialize the elapsed timer (step 1646) and acquires attributes associated with the elapsed timer (step 1648). The elapsed timer attributes can be, but not limited to, an elapsed time color, elapsed time font, elapsed time size, milliseconds, an elapsed time horizontal or X-axis location, and/or an elapsed time vertical or Y-axis location.

After the elapsed timer is initialized (step 1646) and the elapsed time attributes are acquired (step 1648), the process can proceed to step 1650 to calculate an elapsed time. Further, if in step 1644 the elapsed timer was determined to be initialized, then the process proceeds to step 1650.

In step 1650, the elapsed time of the elapsed timer is calculated, which equals the total time recorded. After which, this subroutine then proceeds to step 1652 which updates the time elapsed clock display with the elapsed time of the elapsed timer from step 1650.

After which, this subroutine stops or ends (step 1654).

APPENDIX XXVI—DRAW ELAPSED TIMER FUNCTION PSEUDO CODE

The following draw elapsed timer code example below shows pseudo code that may be used for the purpose of accomplishing a draw elapsed timer function.

Code Example—Draw Elapsed Timer

```
function drawElapsedTimer {
    initializeElapsedTimer
        elapsedTime
```

-continued

| Code Example—Draw Elapsed Timer |
|---|
|         color |
|         font |
|         size |
|         milliseconds |
|         xLocation |
|         yLocation |
|     #    Initialization draws the Timer Clock according to settings |
|     Go to xLocation and the yLocation on the screen |
|     Draw Initialization with the color, font attributes |
|     ElapsedTimer.elapsedTime = totalTimeRecorded |
|     updateClockDisplay (ElapsedTimer) |
| } |

It can be appreciated that the draw elapsed timer subroutine calculates an elapsed time of the total time recorded and then displays and updates the time elapsed clock 1638 in the GUI 30, as best illustrated in FIG. 100.

In the exemplary, when the user engages the fast motion special effects of the present technology, the rate of which the elapsed timer changes slows down proportionally slower. For example, when the user goes from 1× to 2×, then the elapsed timer rate of change slows down to half the "real time" speed while recording. Further in the exemplary, when the user engages the slow motion special effects of the present technology, the rate of which the elapsed timer changes speeds up proportionally faster. For example, when the user goes from 1× to −2×, then the elapsed timer rate of change speeds up to twice the "real time" speed while recording. As such, this change is updated to the elapsed timer and displayed according in the elapsed time clock 1638.

The elapsed digital timer clock 1638 can change color, blink or any other attribute during recording to indicate there is only a few seconds remaining in the current recording.

Referring to FIG. 102, the draw increment subroutine can call a time left/remaining clock subroutine 1660 to calculate and display a remaining time of the present recording time. This subroutine starts (step 1662) upon initiation by a command from the draw increment subroutine, which is initiated in the compensating timer subroutine that is part of the main process of the present technology. After starting, this subroutine then determines if the time remaining clock is initialized in step 1664. If the time remaining clock is not initialized then this subroutine will initialize the time remaining clock (step 1666) and acquires attributes associated with the time remaining clock (step 1668). The time remaining clock attributes can be, but not limited to, a time remaining color, a time remaining font, a time remaining size, milliseconds, a time remaining horizontal or X-axis location, and/or a time remaining vertical or Y-axis location.

After the time remaining clock is initialized (step 1666) and the time remaining clock attributes are acquired (step 1668), the process can proceed to step 1670 to determine if the maximum recording time is null. If it is, then this process proceeds to step 1672 to calculate a time remaining clock time remaining value. Further, if in step 1664 the time remaining clock was determined to be initialized, then the process proceeds to step 1670.

In step 1672, the time remaining value of the time remaining clock is calculated by subtracting the total time recorded from the maximum recording time. After which, this subroutine then proceeds to step 1674 which updates the time remaining clock display with the time remaining value of the time remaining clock from step 1672. After which, this subroutine stops or ends (step 1676).

However, if in step 1670 the maximum recording time is not null, then this process proceeds to step 1678 to determine if the default maximum time is null. If it is, then the process proceeds to step 1680 to set the maximum recording time value to equal the default maximum recording time, which is then utilized in step 1672.

If in step 1678 the default maximum time is not null, then the process stops (step 1676).

APPENDIX XXVII—DRAW TIME REMAINING CLOCK FUNCTION PSEUDO CODE

The following draw time remaining clock code example below shows pseudo code that may be used for the purpose of accomplishing a time remaining clock function.

| Code Example—Draw Time Remaining Clock |
|---|
| function drawTimeRemainingClock { |
|     initializeTimeRemaining |
|         timeRemaining |
|         color |
|         font |
|         size |
|         milliseconds |
|         xLocation |
|         yLocation |
|     #    Initialization draws the Timer Clock according to settings |
|     Go to xLocation and the yLocation on the screen |
|     Draw Initialization with the color, font attributes |
|     # maxRecording Time is entered at runtime. |
|     if (maxRecordingTime == null) |
|         if (defaultMaxTime != null) |
|             maxRecordingTime = defaultMaxTime |
|         else |
|             #    do not display the timeRemainingClock |
|             return to calling function |
|     timeRemainingClock.timeRemaining = maxRecordingTime - totalTimeRecorded |
|     updateClockDisplay (timeRemainingClock) |
| } |

It can be appreciated that the draw time remaining clock subroutine calculates a time remaining of the total time recorded and then displays and updates a time remaining clock 1639 in the GUI 30, as best illustrated in FIG. 100.

In the exemplary, when the user engages the fast motion special effects of the present technology, the rate of which the time remaining clock changes slows down proportionally slower. For example, when the user goes from 1× to 2×, then the time remaining clock rate of change slows down to half the "real time" speed while recording. Further in the exemplary, when the user engages the slow motion special effects of the present technology, the rate of which the time remaining clock changes speeds up proportionally faster. For example, when the user goes from 1× to −2×, then the time remaining clock rate of change speeds up to twice the "real time" speed while recording. As such, this change is updated to the time remaining and displayed according in the time remaining clock 1639, according displaying a countdown to the time remaining for a pre-determined or preset video length.

It can be appreciated that the draw time remaining clock subroutine calculates a time remaining of the total time recorded and then displays and updates the time remaining clock 1639 in the GUI 30, as best illustrated in FIG. 100.

For illustrative purposes, FIG. 100 illustrates the time elapsed clock 1638 with "4 sec", which indicates the amount of "playback time" consumed during the current recording. Further, FIG. 100 illustrates the time remaining clock 1639 with "11 sec", which indicates the amount of time left to record until the end of the preset recording time is reached. Alternatively, the time elapsed clock display 1638 and/or the time remaining clock display 1639 can indicate seconds and milliseconds, with the millisecond portion can count up or count down as appropriately.

As the user continues recording and using the real-time fast/slow motion special effects of the present technology, the elapsed time and the time remaining values are adjusted in real-time in a compensated manner as described above. The GUI 30 shows an animated elapsed time clock 1638 that counts-up for the playback time consumed, and a time remaining clock 1639 that counts-down to the end of the preset recording for the playback time available.

If there is no preset maximum length of time for the recording as set by the user, then only the elapsed time clock 1638 can be displayed, and the available time left to record can be omitted. Alternatively, the maximum length of time can be automatically set by the compensating timer application if the user does not specify the maximum time.

Figure 103:
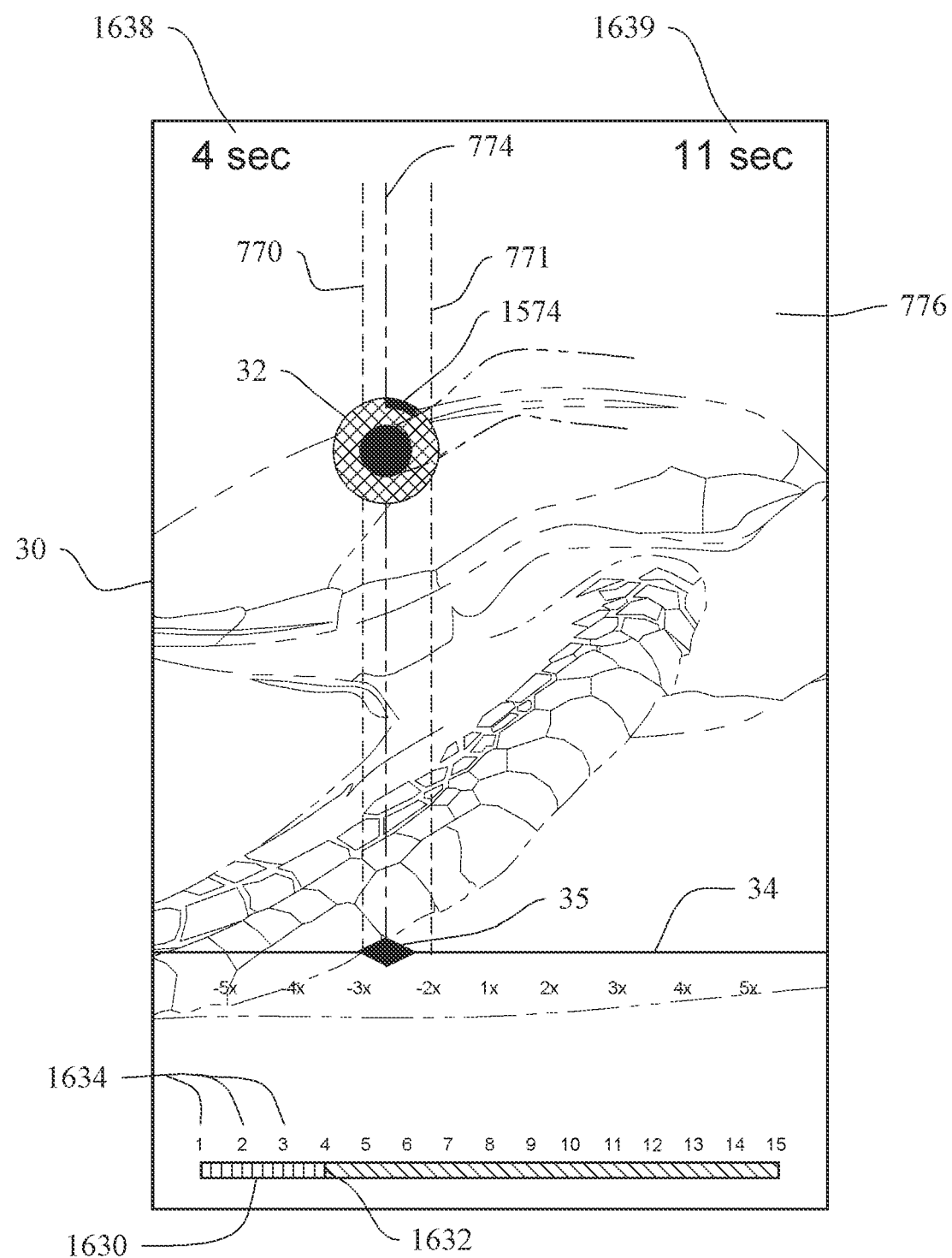
FIG. 103 is a sample GUI screenshot of the device employing the GUI with the animated record button activated and set to a slow motion factor level and set to a zoom in factor level, the animated progress bar, and with a slow motion time guideline nearest the finger or record button activated, and with the animated progress bar, the time elapsed/expired clock and the time left/remaining clock displayed in operation at an adjusted total time of 4 seconds/milliseconds and a maximum recording time of 11 seconds/milliseconds.

Referring to FIG. 103, an exemplary screenshot of the GUI 30 is illustrated showing the special effects, the zoom in and the compensating timer aspects of the present technology in operation. In a non-limiting example, the user's finger is touching and holding the record button 32 thereby placing the present technology in a recording mode. Further, while touching the record button 32, the user's finger is moved to the right or left to change the speed rate to a slow motion speed of −3×, and thereby activating the nearest time guideline 770 and/or displaying the active time guideline 771. Further, the finger time guideline 771 is illustrated to assist the visual indication of how far the finger or pointing device is from the next time guideline 770.

Further in this example, the user's finger is moved vertically and to the left to activate the zooming function in combination with the slow motion speed rate.

The predetermined or set maximum recording time for this example is 15 seconds, as illustrated at the end location of the progress bar 1630, and by adding the time elapsed 1638 (4 seconds) and the time remaining 1639 (11 seconds).

The arc 1574 of the record button 32 is accordingly positioned at or near a "4 second" area of the circular outline of the record button or the separate arc being the slice indicator.

The line 1632 of the progress bar 1630 is accordingly positioned at "4" thereby represent a time elapse or present recording time of 4 seconds, which corresponds with the time elapsed clock 1638.

It can be appreciated that with continuous playing of the video or recording of the video, the arc 1574, the line 1632, the time elapsed clock 1638 and/or the time remaining clock 1639 are updated in real time based on the active speed rate that is dependent on the location of the record button 32.

It can be further appreciated that at any time while the finger is touching the record button 32, the user can move the record button anywhere on the GUI to change the speed rate and/or the zoom factor. Consequently changing the adjusted total time recorded value in real time and accordingly increasing or decreasing the animated travel of the arc 1574, 1576 and/or the animated travel of the line 1632, and further increasing or decreasing the counting up speed of the time elapsed clock 1638 and/or the counting down speed of the time remaining clock 1639.

The time elapsed clock 1638 and/or the time remaining clock 1639 can be displayed in an upper section of the GUI 30, with the progress bar 1630 displayed in a lower section of the GUI 30. In an alternative example, locations of the progress bar 1630, the animated digital timer 1636, the elapsed time clock 1638 and the time remaining clock 1639 can have configurations such as, but not limited to: the animated digital timer at the top of the GUI, and the progress bar not displayed; the animated digital timer at the bottom of the GUI and the progress bar not displayed; the animated digital timer at the top of the GUI and progress bar at the bottom of the GUI; the animated digital timer at the bottom of the GUI and progress bar at the top of the GUI; the progress bar at the bottom of the screen and the animated digital timer not displayed; and the progress bar at the top of the GUI and the animated digital timer not displayed.

It can further be appreciated that the animated record button 32 with the rotating curve outline 1574, the animated record button 32 with the slice indicator 1576, the animated progress bar 1630, the elapsed time clock 1638 and the time remaining clock 1639 can be selected by the user in step 1530 of FIG. 95, and can be displayed in the GUI 30 separately and/or in any combination.

It can be appreciated that the compensating digital timer 1636 can be utilized with any video recording application, software and/or system that speeds up or slows down a video being recorded or a prerecorded video being edited. Additionally, the compensating digital timer 1636 can be utilized with video data in real time or near real time from a camera, from at least one memory of an electronic device or from a remote system in communication with an electronic device utilizing the compensating digital timer of the present technology. In this alternative, the compensating digital timer 1636 can be utilized with the speeding up or slowing down of the recording, which contains the compensating digital timers for playback at a later time on the electronic device or another electronic device playing the recorded video data.

The present technology can be embedded to any camera device, such as action cameras like GoPro®, DSLR's, mirrorless cameras, Pro Level video gear, gimbals, tripods, on the camera and remotely triggered flash lighting, eye glass cameras, drones, webcams. The present technology can be embedded into remote controls and connected through Bluetooth® or other protocols, to existing electronic gear that does not have the present technology embedded.

The user interface of the present technology can be represented in 3-D or 2-D. The user can slide a finger or stylus side to side on the touchscreen of the electronic device in one plane of motion. With a 3-D user interface, the electronic device can sense the changes in depth of the user's controllers, the amount of pressure the user is applying, and adjust the special effects appropriately. Joysticks can be employed and utilized with the present technology.

The user interface could be pressure sensitive so that the user could press harder or softer on the device and the device would interpret these as controls to modify the playback speed with the fast forward and slow motion special effects.

The present technology can allow for recording at sufficiently high frames per seconds with the resulting "raw" unedited video (recorded with no special effects applied) can be edited post recording, and the slow motions will remain smooth because the high recording frame rate supports it relative to a slower playback fps.

It can be appreciated that brainwave sensing devices, implanted or surface attachment, or wireless remote sensing, can be utilized with the present technology to directly control the time speed special effects with a thought.

Compression technology can be utilized with the present technology to improve recording at even higher frame rate to record finer details in the scenery and reduce file size. Device performance can improve and users can therefore record at even higher frame rate to record finer details in the scenery while reducing the file size.

Audio processing algorithms can be utilized with the present technology to give the clearest and most understandable audios to the videos during segments where the scene speeds up and slows down according to the special effects in the present technology. Third party API's from companies such as Dolby Labs, DTS, Inc., Fraunhofer Institut, Philips, Technicolor, IMAX, Sony, and others can be utilized to perform the audio processing.

Data encryption algorithms can be utilized with the present technology to provide secure transmission and storage of the videos.

Cryptography and blockchain technology algorithms can be utilized with the present technology to create a distributed ledger to record the original content creator of the videos produced with the present technology. The videos can be accessed by requiring cryptographic tokens to be "redeemed" for access permission.

It should be understood that the particular order in which the operations in the figures have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the method described above with respect to the figures.

For situations in which the systems, interfaces and/or methods discussed above collect information about users, the users may be provided with an opportunity to opt in/out of programs or features that may collect personal information (e.g., information about a user's preferences or usage of a smart device, biometric data, and environmental data such as location). In addition, in some or all implementations, certain data may be anonymized in one or more ways before it is stored or used, so that personally identifiable information is removed. For example, a user's identity may be made anonymous so that the personally identifiable information cannot be determined for or associated with the user, and so that user preferences or user interactions are generalized (for example, generalized based on user demographics) rather than associated with a particular user. Data encryption can also be utilized and "tokenized" access using the blockchain technology can also be utilized to further obfuscate the user's identity.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, middleware, software, API's or any combination thereof.

While embodiments of the real time video special effects system and method have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above described. And although creating special effects in video recordings while recording is in progress have been described, it should be appreciated that the real time video special effects system and method herein described is also suitable for change frame attributes, change record frame rate, change playback frame rate, and time compression and expansion and other real-time special effects associated with any data stream in real time.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A non-transitory computer readable medium with an executable program stored thereon comprising instructions for execution by at least one processing unit for applying a compensating timer to video data, such that the instructions when executed by the at least one processing unit causes the at least one processing unit to: display video data on a user interface that is being displayed on a display of an electronic device, wherein the video data being displayed at a modified speed including a first speed rate and a second speed rate different to the first speed rate; calculate an adjusted total time recorded value utilizable with an animated time indicator, wherein the adjusted total time recorded value is dependent on the first speed rate and the second speed rate; wherein the animated time indicator is in part based on the adjusted total time recorded value equal to a total time recorded value of the video data added with a time value;

wherein the time value is a time increment divided by the second speed rate when the second speed rate is greater than the first speed rate; and display on the user interface the animated time indicator.

2. The non-transitory computer readable medium of claim 1, wherein the processing unit is further caused to calculate the adjusted total time recorded value while the video data is being recorded, and while the adjusted total time recorded value is less than a maximum recording time value of the video data.

3. The non-transitory computer readable medium of claim 1, wherein the processing unit is further caused to calculate the time value by an operation selected from the group consisting of dividing a time increment with the second speed rate when the second speed rate is greater than the first speed rate, and multiplying the time increment with the second speed rate when the second speed rate is less than the first speed rate.

4. The non-transitory computer readable medium of claim 1, wherein the animated time indicator is selected from the group consisting of any one or any combination of:
- an animated affordance configured or configurable to provide a first input receivable and usable by the processing unit in starting or stopping a recording operation of the video data by the electronic device, and wherein the animated affordance is moveable on the user interface to provide a second input receivable and usable by the processing unit in changing the first speed rate of the video data to the second speed rate;
- an animated progress bar including a total length in part based on a maximum recording time value or a default time per lap value, and a first section with a first section length that increases along the total length based in part on the adjusted total time recorded value or a total time recorded value, one of the maximum recording time value or the default time per lap value, and a length value in pixels;
- a time elapsed clock configured or configurable to count up numerically to the maximum recording time value; and
- a time remaining clock configured or configurable to count down numerically from the maximum recording time value.

5. A non-transitory computer readable medium with an executable program stored thereon comprising instructions for execution by at least one processing unit for applying a compensating timer to video data, such that the instructions when executed by the at least one processing unit causes the at least one processing unit to:
- display video data on a user interface that is being displayed on a display of an electronic device, wherein the video data being displayed at a modified speed includes a first speed rate and a second speed rate different to the first speed rate;
- calculate an adjusted total time recorded value utilizable with an animated time indicator, wherein the adjusted total time recorded value is dependent on the first speed rate and the second speed rate;
  - wherein the animated time indicator is in part based on an adjusted total time recorded value equal to a total time recorded value of the video data added with a time value;
  - wherein the time value is a time increment multiplied by the second speed rate when the second speed rate is less than the first speed rate; and
- display on the user interface the animated time indicator.

6. The non-transitory computer readable medium of claim 5, wherein the processing unit is further caused to calculate the adjusted total time recorded value while the video data is being recorded, and while the adjusted total time recorded value is less than a maximum recording time value of the video data.

7. The non-transitory computer readable medium of claim 5, wherein the processing unit is further caused to calculate the time value by an operation selected from the group consisting of dividing a time increment with the second speed rate when the second speed rate is greater than the first speed rate, and multiplying the time increment with the second speed rate when the second speed rate is less than the first speed rate.

8. The non-transitory computer readable medium of claim 5, wherein the animated time indicator is selected from the group consisting of any one or any combination of:
- an animated affordance configured or configurable to provide a first input receivable and usable by the processing unit in starting or stopping a recording operation of the video data by the electronic device, and wherein the animated affordance is moveable on the user interface to provide a second input receivable and usable by the processing unit in changing the first speed rate of the video data to the second speed rate;
- an animated progress bar including a total length in part based on a maximum recording time value or a default time per lap value, and a first section with a first section length that increases along the total length based in part on the adjusted total time recorded value or a total time recorded value, one of the maximum recording time value or the default time per lap value, and a length value in pixels;
- a time elapsed clock configured or configurable to count up numerically to the maximum recording time value; and
- a time remaining clock configured or configurable to count down numerically from the maximum recording time value.

9. A non-transitory computer readable medium with an executable program stored thereon comprising instructions for execution by at least one processing unit for applying a compensating timer to video data, such that the instructions when executed by the at least one processing unit causes the at least one processing unit to:
- display video data on a user interface that is being displayed on a display of an electronic device, wherein the video data being displayed at a modified speed including a first speed rate and a second speed rate different to the first speed rate;
- calculate an adjusted total time recorded value utilizable with an animated time indicator, wherein the adjusted total time recorded value is dependent on the first speed rate and the second speed rate;
  - wherein the animated time indicator is in part based on an adjusted total time recorded value equal to a total time recorded value of the video data added with a time value;
  - wherein the animated time indicator is an animated affordance including a total length radially incremented into time per degree, wherein the time per degree is equal to a time per lap value divided by 360, and wherein the time per lap value is a maximum recording time value or a default time per lap value;
  and
- display on the user interface the animated time indicator.

10. The non-transitory computer readable medium of claim 9, wherein the animated affordance includes a first section with a first section length that increases along the total length based in part by any one of:
   the adjusted total time recorded value or the total time recorded value divided by the maximum recording time value with a resultant thereof multiplied by 360; and
   the adjusted total time recorded value or the total time recorded value minus by a resultant of the time per lap value multiplied by a number of laps, divided by a resultant of the time per lap value multiplied by 360.

11. The non-transitory computer readable medium of claim 9, wherein the animated affordance is a record affordance configured or configurable to provide a first input receivable and usable by the processing unit in starting or stopping a recording operation of the video data by the electronic device, and wherein the record affordance is moveable on the user interface to provide a second input receivable and usable by the processing unit in changing the first speed rate of the video data to the second speed rate.

12. A non-transitory computer readable medium with an executable program stored thereon comprising instructions for execution by at least one processing unit for applying a compensating timer to video data, such that the instructions when executed by the at least one processing unit causes the at least one processing unit to:
   display video data on a user interface that is being displayed on a display of an electronic device, wherein the video data being displayed at a modified speed including a first speed rate and a second speed rate different to the first speed rate;
   calculate an adjusted total time recorded value utilizable with an animated time indicator, wherein the adjusted total time recorded value is dependent on the first speed rate and the second speed rate;
      wherein the animated time indicator is in part based on an adjusted total time recorded value equal to a total time recorded value of the video data added with a time value;
      wherein the animated time indicator is an animated affordance including a total length radially incremented into time per degree, wherein the time per degree is equal to a time per lap value divided by 360, and wherein the time per lap value is a maximum recording time value or a default time per lap value;
   and
   display on the user interface the animated time indicator.

13. The compensating timer system of claim 12, wherein the animated progress bar includes a first section with a first section length that increases along the total length in part based on any one of:
   the adjusted total time recorded value or the total time recorded value multiplied by a length value in pixels; and
   the adjusted total time recorded value or the total time recorded value minus by a resultant of the maximum recording time value multiplied by a number of laps, divided by a resultant of the time per lap value multiplied by the length value in pixels.

14. A non-transitory computer readable medium of claim 12,
   wherein the animated time indicator is a time elapsed clock configured or configurable to count up numerically to a maximum recording time value.

15. A non-transitory computer readable medium of claim 12,
   wherein the animated time indicator is a time remaining clock configured or configurable to count down numerically from the maximum recording time value.

16. A non-transitory computer readable medium of A non-transitory computer readable medium of wherein the animated time indicator is a combination of a time elapsed clock configured or configurable to count up numerically to the maximum recording time value, and a time remaining clock configured or configurable to count down numerically from the maximum recording time value.

* * * * *